United States Patent [19]

Getson, Jr. et al.

[11] 4,159,534
[45] Jun. 26, 1979

[54] FIRMWARE/HARDWARE SYSTEM FOR TESTING INTERFACE LOGIC OF A DATA PROCESSING SYSTEM

[75] Inventors: Edward F. Getson, Jr., Lynn; Frank V. Cassarino, Jr., Weston, both of Mass.

[73] Assignee: Honeywell Information Systems Inc., Waltham, Mass.

[21] Appl. No.: 821,939

[22] Filed: Aug. 4, 1977

[51] Int. Cl.$^2$ .............................................. G06F 11/00
[52] U.S. Cl. .................................... 364/200; 235/302
[58] Field of Search ... 364/200 MS File, 900 MS File; 235/302; 340/146.1 R

[56] References Cited

U.S. PATENT DOCUMENTS

| 3,576,541 | 4/1971 | Kwan et al. | 364/200 |
| 3,579,199 | 5/1971 | Anderson et al. | 364/200 |
| 4,048,481 | 9/1977 | Bailey, Jr. et al. | 364/200 |

Primary Examiner—Mark E. Nusbaum
Assistant Examiner—Thomas M. Heckler
Attorney, Agent, or Firm—Gerald E. Lester; Nicholas Prasinos; Ronald T. Reiling

[57] ABSTRACT

A firmware/hardware method and system is provided for testing interface logic in a data processing system having a plurality of system units intercommunicating over a common electrical bus. Under firmware control, an incorrect parity is generated in a main memory address to be loaded into output registers of a system unit supplying information to the bus. A bus cycle request is issued by the system unit, and when the bus is made available the system unit acknowledges the memory address to initiate a transfer of data from the bus into the input registers of the system unit. Thereafter, the data in the output registers of the device may be compared with the data in the input registers to detect interface logic errors.

5 Claims, 14 Drawing Figures

FIRMWARE/HARDWARE SYSTEM FOR TESTING INTERFACE LOGIC OF A DATA PROCESSING SYSTEM

BACKGROUND OF THE INVENTION

1. Field of the Invention

The invention relates to the testing of interface logic in a data processing system, and more particularly to a firmware/hardware method of testing interface logic without dismantling the processing system or using specialized attachments to provide return signals.

2. Prior Art

Diagnostic testing of data processing systems heretofore has required return cycle responses from system units other than the unit to be tested, the attachment of specially designed diagnostic test units to the system, or the detachment of a system unit from the processing system for isolated testing. No satisfactory means has been provided for testing through an interface in an operational environment, and isolating the test results from errors induced by the interface logic of system units not under test.

The present invention is directed to a method and system for testing the interface logic of system units intercommunicating by way of a common bus. The system under test need not be detached from the processing system, nor integrated with special diagnostic equipments. Rather, the system unit under test may be isolated from errors occuring in the interface logic associated with other system units without altering the system configuration.

SUMMARY OF THE INVENTION

The invention is directed to a method and system for diagnostically testing the interface logic of system units electrically coupled to a common communication bus of a data processing system.

More particularly, a data transfer from a system unit to the common bus is initiated by firmware wherein the output data and address registers of the system unit are loaded with known data and a main memory address, respectively. Further, the address registers are loaded with an incorrect parity under firmware/hardware control.

The system unit thereafter issues a bus cycle request, and when the common bus is made available the data in the output registers is transferred to the common bus. Since an incorrect parity has been incorporated into the main memory address, the memory unit does not respond to the address. Thus, any errors which may be detected during the diagnostic test shall be isolated to the interface logic of the system unit.

A system unit acknowledgement of the non-occurring memory unit response is generated under firmware/hardware control to gate the data on the common bus into the system unit's input data and address registers. The contents of the output registers of the system unit then are compared with the contents of its input registers. If a match is not detected, an error in the interface logic is indicated.

DESCRIPTION OF THE DRAWINGS

For a more complete understanding of the present invention and for further objects and advantages thereof, references may now be had to the following description taken in conjunction with the accompanying drawings in which.

DESCRIPTION OF THE PREFERRED EMBODIMENTS

FIG. 1

Figure 1:
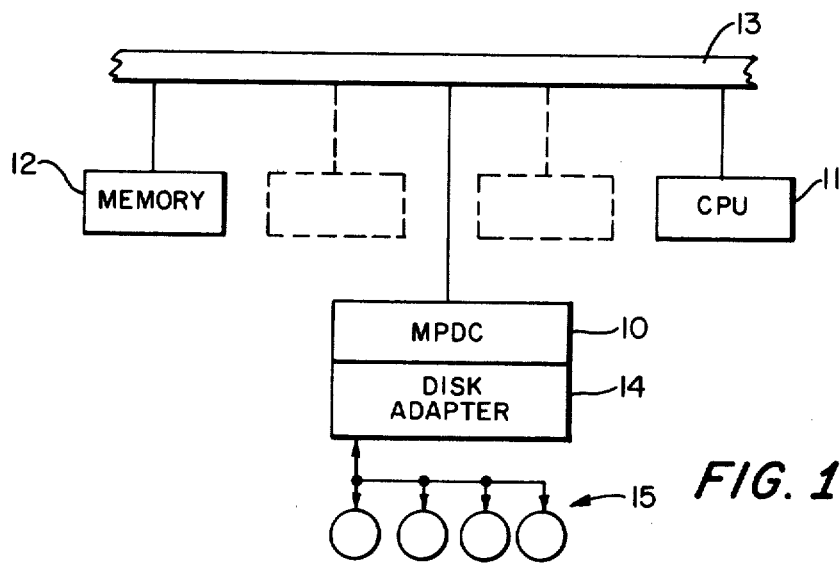
FIG. 1 is a functional block diagram of a data processing system having system units electrically coupled to a common communication bus.

FIG. 1 illustrates in functional block diagram form a computer system having a medium-performance disk controller (MPDC) 10 in electrical communication with a central processor unit 11 and a main memory unit 12 by way of a common communication bus hereinafter referred to as megabus 13. The MPDC 10 is a microprogrammed peripheral control subsystem for storing and retrieving data from mass storage media. The controller includes a Read Only Store (ROS) memory to be later described having stored therein microprogram instructions. The ROS communicates with mass storage adapters such as the device adapter 14, which has the facility to support plural daisy-chained disk devices 15.

The megabus 13 provides an information path between any two units in the system. The paths are asynchronous in design, thereby enabling units of various speeds to operate efficiently. The bus accommodates information transfers including communication requests, control commands, status signals and data transfers between main memory 12 and disk devices 15.

Any system unit requiring communication with any other system unit issues a bus cycle request. When the bus cycle is granted, the requesting unit becomes the master and the addressed system unit becomes the slave. Some bus interchanges require a response cycle as well as a request cycle. By way of example, the master unit may identify itself to a slave unit and indicate that a response is required. When the required information becomes available, the slave assumes the role of master and initiates a transfer to the requesting unit.

In the servicing of bus cycle requests, the central processor has the lowest priority, the MPDC 10 has the next to the lowest priority, and the memory 12 has the highest priority.

A more detailed background description of the system of FIG. 1 is given in U.S. Pat. No. 3,993,981 which is assigned to the assignee of the present invention, and which is incorporated by reference herein.

FIGS. 2 AND 3

Figure 2:
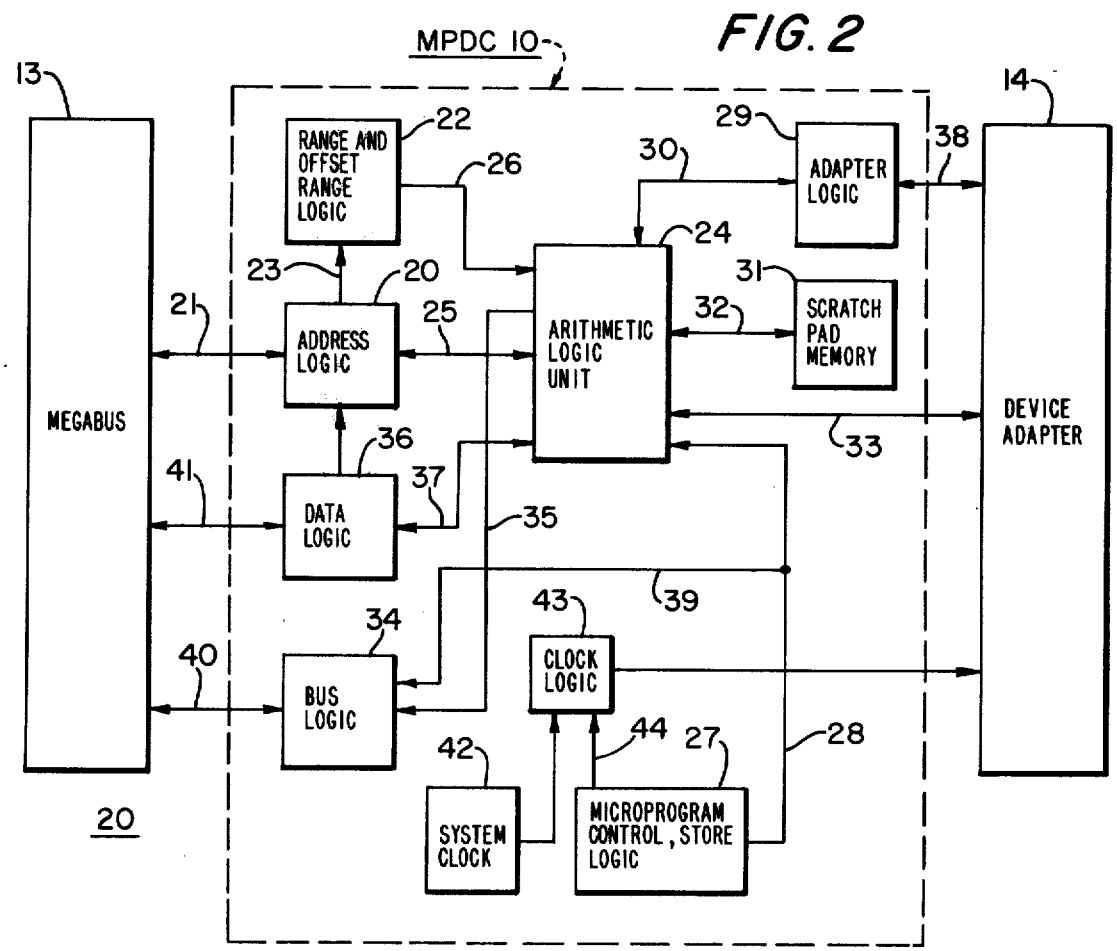
FIG. 2 is a functional block diagram of the disk controller of FIG. 1.

FIG. 2 illustrates in functional block diagram form the MPDC 10 of FIG. 1, and FIG. 3 graphically illustrates the binary instruction formats necessary for the operation of the MPDC.

The megabus 13 is connected to an address logic unit 20 by way of an address cable 21. Logic unit 20 is comprised of address transceivers through which memory addresses, channel destination numbers and function codes are transferred between the MPDC 10 and the megabus 13. The logic unit 20 further is comprised of control logic for distributing information on the address cable 21 throughout the MPDC.

Logic unit 20 is connected to a range and offset range logic unit 22 by way of a unidirectional control cable 23, and connected to an arithmetic logic unit 24 by way of a bidirectional control cable 25. The logic unit 22 includes a 16-bit range counter which is loaded with the number of bytes to be transferred during a read or write operation. The logic unit further includes a 16-bit offset range counter which is loaded with a count indicating the number of leading data bytes to be ignored during a read data transfer.

The arithmetic logic unit (ALU) 24 is the focal point of all data operations within the MPDC. Such data operations may occur between MPDC 10 and the megabus 13, or between the MPDC and the device adapter 14. The ALU performs both logic and arithmetic operations on incoming data, and is comprised of an A-operand multiplexer (AMUX), a B-operand multiplexer (BMUX), an eight-bit arithmetic unit (AU), and an eight-bit accumulator (ACU) to be further described. Under firmware control, the AMUX selects one of eight data fields and the BMUX selects one of four data fields. The AU performs 8-bit arithmetical and logical operations on the data selected by the multiplexers, and supplies the result to the accumulator for temporary storage.

The ALU receives range and offset range control signals from the logic unit 22 by way of a control cable 26, and firmware control signals from a microprogram control store logic unit 27 by way of a control cable 28. The ALU 24 further communicates with an adapter logic unit 29 by way of a bidirectional control cable 30, and with a scratchpad memory unit 31 by way of a bidirectional control cable 32. In addition, the ALU 24 communicates with the device adapter 14 by way of a bidirectional control cable 33, and supplies control information to a bus logic unit 34 by way of a unidirectional control cable 35. The ALU also receives and transfers data to a data logic unit 36 by way of a bidirectional data cable 37.

The adapter logic unit 29 is connected to the device adapter 14 by way of a bidirectional communication cable 38. The logic unit 29 provides the MPDC with a communication path to control the transfer of data and status information between the adapter 14 and the MPDC 10. The scratchpad memory unit 31 includes logic comprised of an index register, an address register, an address selector, a scratchpad memory, and the logic elements controlling the operation of the scratchpad memory. The scratchpad memory is a 1.024 K-bit by 8-bit read/write memory which is segmented into indexed and non-indexed sections, each section containing two quadrants. The non-indexed section of the memory is comprised of 256 work locations and 256 reserve locations. The indexed section of the memory is comprised of 256 locations for the storage of device-related information and 256 reserve locations. The 256 locations for device-related information are further subdivided into four sections, each comprising 64 locations per channel.

The address register of the scratchpad memory unit 31 is a 10-bit register, wherein the high order bit selects either the indexed or non-indexed mode. The second high order bit selects a 256-location quadrant, and the next two bits select 64 locations within the quadrant. The six low order bits select a scratchpad address. Data is written into the selected address of the scratchpad memory unit from the AMUX of the ALU 24 during the execution of a firmware memory write command. The data out of the scratchpad memory is delivered to the AMUX and the BMUX for distribution throughout the MPDC.

The microprogram control store logic unit 27 is typical of that known in the art, and includes a return register unit, a selector, a microprogram address counter, a Read Only Store (ROS) memory, a microprogram instruction register (MPIR), a decoder and a firmware distribution unit to be further described. The ROS provides permanent storage for resident control firmware and diagnostic microprograms, and may be addressed to select various microinstruction sequences for execution. The ROS provides a 16-bit wide output derived from the outputs of sixteen 1,024 by 4-bit programmable Read Only Memory (PROM) chips. The ROS output is applied to the MPIR which is a 16-bit wide register used to store the output of the ROS for one clock cycle during a microinstruction execution.

The bus logic unit 34 receives control signals from the ALU 24 by way of cable 35, and from the microprogram control store logic unit 27 by way of cable 28 and a control cable 39. The logic unit 34 is connected to the megabus 13 by way of a bidirectional control cable 40. The bus logic unit 34 performs asynchronous handshaking operations by responding to and generating magebus cycle requests. Further, simultaneous requests and grants of megabus cycles are accommodated on a priority basis with the MPDC at an intermediary priority position and the main memory at a position of increased priority.

The data logic unit 36 includes error checkers, five 16 word by 4-byte first-in-first-out (FIFO) data buffers and a read selector for accommodating the transfer of data or a bidirectional data cable 41 between the MPDC 10 and the megabus 13. Any information entering the MPDC 10 from the megabus 13 is gated through data transceivers and checked for parity. The same logic is used to deliver the MPDC channel number to the megabus 13 in response to a bus cycle request from a system unit. Four of the five FIFOs receive data, and the fifth FIFO is used to prevent the MPDC from making a cycle request when the data FIFOs are full. The FIFO chips are capable of stacking 14 words, plus retaining one word in the input and output registers to provide a total capacity of 16 words.

Clock signals for controlling the operation of the MPDC 10 are provided by a system clock unit 42 comprised of an 8 MHz crystal oscillator. The system clock signal is applied to a clock logic unit 43 which provides a 4 MHz square wave that is distributed throughout the MPDC. The clock logic unit 43 also receives control signals from the microprogram control store logic unit 27 by way of a control line 44 to enable or reset the logic unit.

The operations performed by the MPDC 10 include a direct memory access (DMA) read, a DMA write, an I/O output command, an I/O input command and an interrupt operation. Each of the operations require a single bus cycle except for the DMA read and the I/O input commands which require two bus cycles.

Figure 3A:
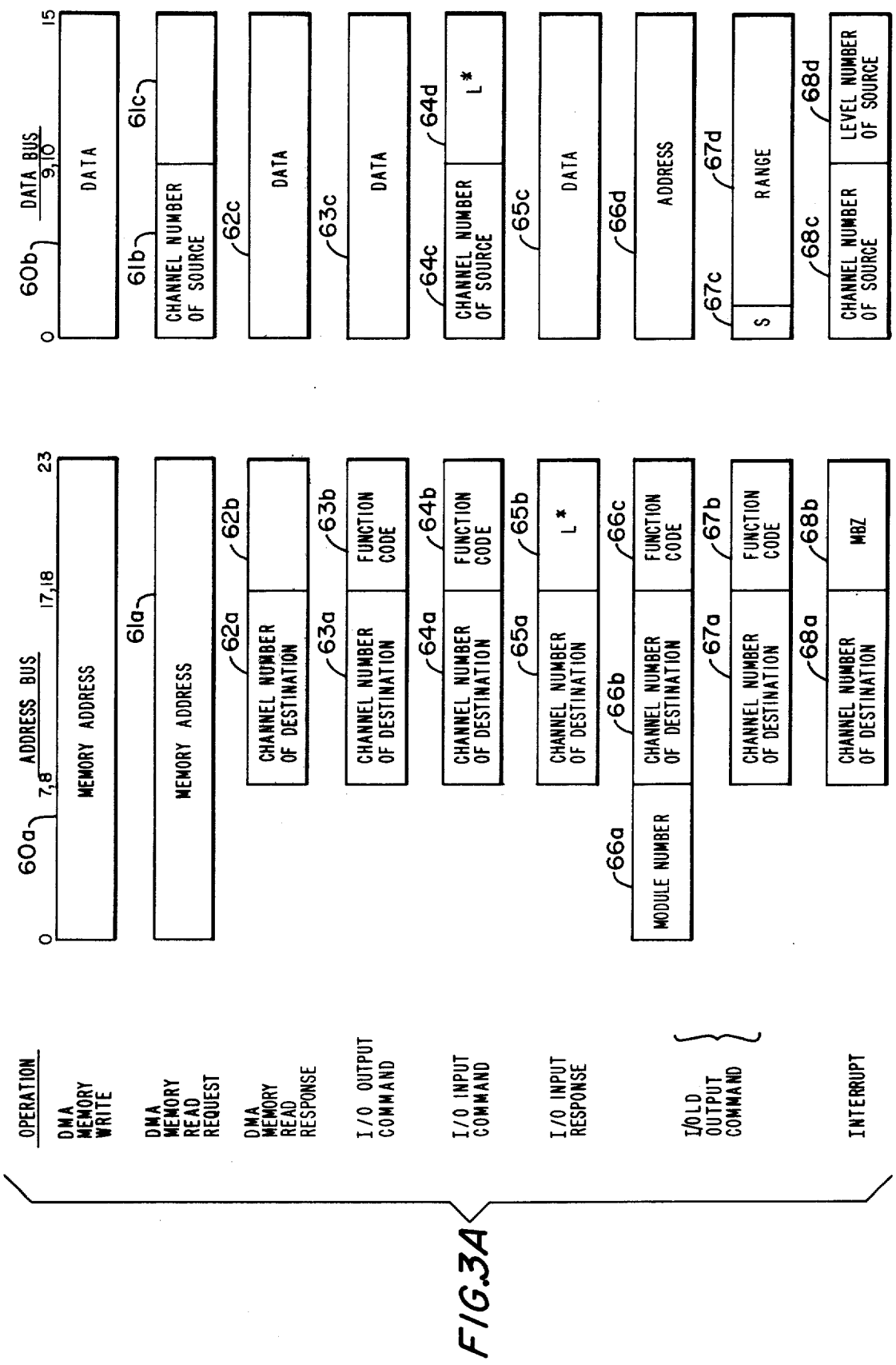
FIGS. 3A and 3B are a graphical illustration of communication words transferred through the common bus of FIG. 1.
Figure 3B:
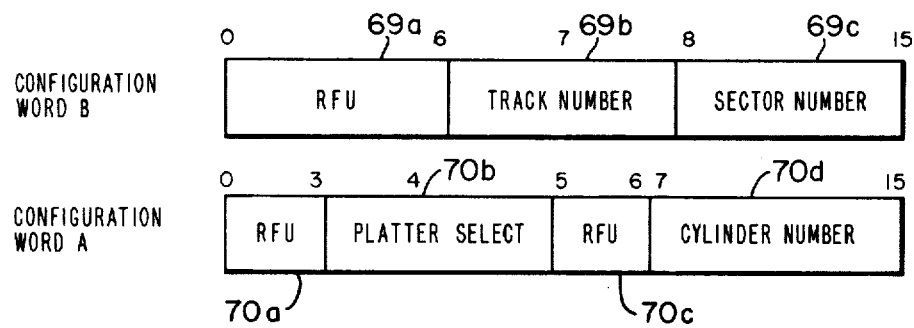

Referring to FIGS. 3a and 3b, the specific parameter formats for machine instructions used in megabus communications with the MPDC are illustrated. When a data transfer is to occur, the CPU 11 of FIG. 1 issues a machine instruction referred to as an I/O Output Command which includes a destination channel number, a 6-bit function code, and a data word as illustrated by the I/O output command format of FIG. 3a. The destination channel number identifies the system device to which a request is directed, and the function code provides the address in scratchpad memory unit 31 to which a data transfer is directed. The function code further identifies a CPU command as an input or an output command. The data word may include a task to be executed, range and offset range counts, a main memory address, or configuration words used to control the disk device during a data transfer. As shown in FIG. 3a, the destination channel numbers and function codes are transferred between the megabus 13 and the MPDC 10 by way of the address logic unit 20. The source channel number, main memory addresses, range and offset range and information stored in reserve areas are transferred between the megabus and the MPDC by way of the data logic unit 36. If data is to be written into main memory 12 of FIG. 1, the CPU 11 issues a DMA memory write operation. In response thereto, the starting memory address 60a is applied to the megabus 13 via the address cable 21, and the data 60b to be written into memory is applied to the megabus via the cable 41. As illustrated in FIG. 3a, the memory address register is a 24-bit register, while the data register is a 16-bit register.

If data is to be read from main memory 12, the CPU 11 issues a machine instruction referred to as a DMA memory read request. The instruction includes a 24-bit memory address 61a, a 10-bit source channel number 61b, and a 6-bit reserve area 61c. The memory address 61a is received from the megabus 13 via cable 21 leading to the address logic unit 20. The channel number 61b and reserve area 61c are received by the data logic unit 36 by way of data cable 41. In response to the DMA read request instruction, the MPDC issues a DMA memory read response instruction comprising a 10-bit destination channel number 62a, a 6-bit reserve area 62b, and 16 bits of data 62c to be transferred. The destination channel number and reserve area are transferred to the megabus by way of the address cable 21, while the 16 bits of data are transferred to the megabus by way of data cable 41. It is to be understood that the contents of the reserve area 62b is identical to that of the reserve area 61c. Thus, information stored by the CPU into the reserve area 61c is returned to the megabus by way of the reserve area 62b.

The CPU 11 may transfer data from main memory and indicate a task which the MPDC 10 is to perform upon the data. For example, the CPU may issue an I/O output command instruction comprising a 10-bit destination channel number 63a to identify the MPDC, a 6-bit function code 63b to identify a scratchpad memory address, and 16 bits of data 63c to be stored in the indicated scratchpad location. As before described, the destination channel number and function code are received by the address logic unit 20 by way of address cable 21, and the data is stored in the data logic unit 36. The data is transferred under firmware control from the logic unit 36 to the ALU 24, and thereafter stored in the scratchpad memory unit 31. The CPU 11 issues additional I/O output commands to store into the scratchpad a range, an offset range, a main memory address, a task to be executed and configuration words for controlling the operation of the disk device during a data transfer. The firmware further may determine from the low order bit of the function code whether the task includes an input or an output operation. The task may include any of the before-described MPDC operations.

If the CPU 11 requires information from the MPDC 10, an I/O input command instruction may be issued. The instruction is comprised of a 10-bit destination channel number 64a, a 6-bit function code 64b, a 10-bit source channel number 64c identifying the source of the request, and a 6-bit reserve area 64d. In response to the CPU request, the MPDC issues an I/O input response instruction comprising a 10-bit destination channel number 65a, a 6-bit reserve area 65b having stored therein the data appearing in reserve area 64d, and 16 bits of data 65c.

When data is to be written into the scratchpad memory unit 31, a two cycle operation occurs. The CPU 11 issues an I/O load output command which is comprised of two instructions. The first instruction includes an 8-bit module number 66a indicating the high order eight bits of a main memory address, a 10-bit destination channel number 66b, a 6-bit function code 66c, and 16 address bits 66d indicating the low order bits of a 24-bit main memory address. The module number, destination channel number and function code are transferred through address logic unit 20 and ALU 24 to the scratchpad memory unit 31 under firmware control. The firmware thereafter accesses the function code in the scratchpad memory to identify the scratchpad memory address into which the main memory address data is to be written. Upon loading the address in the scratchpad memory, the firmware commands the bus logic unit 34 to issue a ready signal to the megabus 13. The CPU in response thereto issues a second instruction including a 10-bit destination channel number 67a designating the MPDC, a 6-bit function code 67b, a high order bit 67c indicating whether the range count is positive or negative, and 15 range bits 67d indicating the number of data bytes to be transferred. The firmware thereupon accesses the function code to determine the scratchpad memory locations into which the range and S bit are to be stored.

In an interrupt operation, the MPDC issues an interrupt instruction comprising a 10-bit destination channel number 68a, a 6-bit logic zero area 68b, a 10-bit source channel number 68c, and a 6-bit source priority level number 68d. When the MPDC completes an operation, the interrupt instruction is issued to the CPU 11. If the priority level number of the MPDC is higher than the priority level of the task that is currently being performed by the CPU, the MPDC interrupt will be serviced immediately. Otherwise, the MPDC enters a wait state until a CPU is received.

The formats of two configuration words used to control the operation of a disk device during a data transfer are illustrated in FIG. 3b. The configuration words A and B include an image of an ID field of a disk sector on which a particular operation will be initiated. More particularly, the configuration word B includes a 7-bit area reserved for user (RFU) 69a, a 1-bit track number 69b and an 8-bit sector number 69c. The sector number field is incremented by one after each data field is successfully transferred during a read or a write operation.

Configuration word A includes a 4-bit RFU field 70a, a 1-bit platter select field 70b, a 2-bit RFU field 70c, and a 9-bit cylinder number field 70d. The cylinder number and platter select fields are used as the seek arguments for disk seek operations.

The operation of the invention may best be described in the context of a read or a write operation. If the firmware on evaluating a task word in memory unit 31 detects a command for writing a record onto a disk, the firmware accesses the configuration words A and B in memory unit 31 by way of the ALU 24. The firmware thereafter stores the words in the device adapter 14, which compares the words with track information read from the disk. During the period that the logic unit 29 is searching for an ID match, the firmware commands the bus logic unit 34 to request data from the main memory unit 12. In response thereto, the main memory transfers 32 bytes of data to the FIFOs of the data logic unit 36. As the data is being loaded into the data logic unit, the range count in logic unit 22 is decremented and the address logic unit is incremented.

When an ID match occurs, the adapter 14 initiates a write gap operation on the indicated record of the disk system. Sixteen of the 32 bytes of data in the data logic unit 36 thereupon are moved from the data logic unit 36 to the device adapter 14 by way of ALU 24. As the data is being transferred to the adapter 14, the firmware commands the bus logic unit 34 to request additional data from the memory unit 12. The above-described process continues until the range field of the logic unit 22 is exhausted.

If data is to be read from a disk device and written into main memory 12, the CPU 11 first issues machine instructions for storing configuration words A and B, range, offset range, a beginning main memory address and a task to be performed into the scratchpad memory. In response to firmware initiated control signals from the adapter logic unit 29, the device adapter 14 searches a disk device to find the data record to be transferred. When the disk track has been identified as before described, the data is transferred under hardware control to the data logic unit 36 by way of cable 33 and ALU 24. The hardware accesses the offset range count of the logic unit 22 to detect the number of leading data bytes to be ignored. The logic unit 36 thereafter forms 2-byte words from the succeeding data, and transfers a word under hardware control to the megabus 13 each time two bytes are received. The data transfer continues from the disk adapter 14 to the data logic unit 36 until the range register of the address logic unit 20 indicates that the data transfer is complete.

FIGS. 4 AND 5

Figure 4:
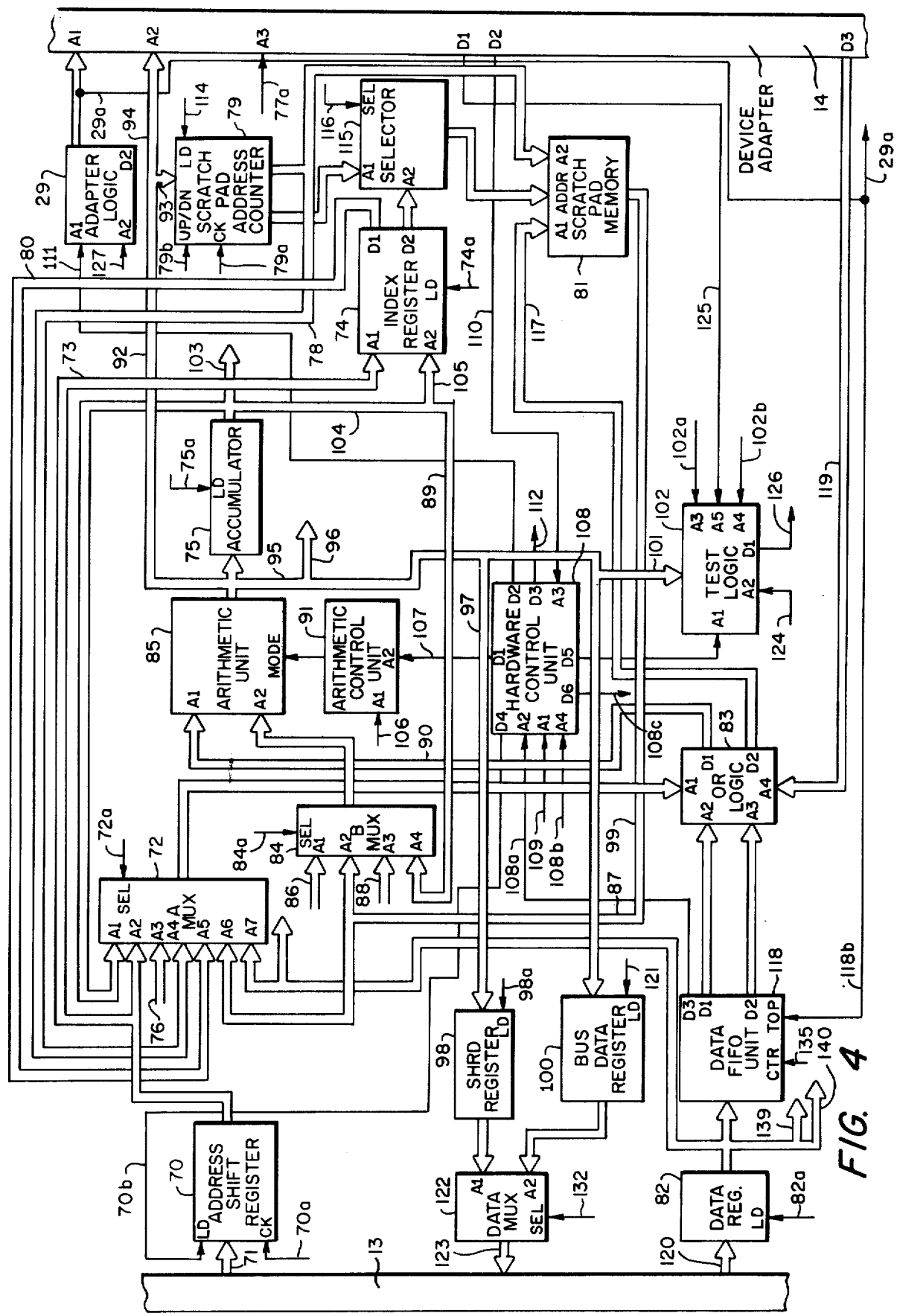
FIGS. 4 and 5 are a detailed functional block diagram of the disk controller of FIG. 1.
Figure 5:
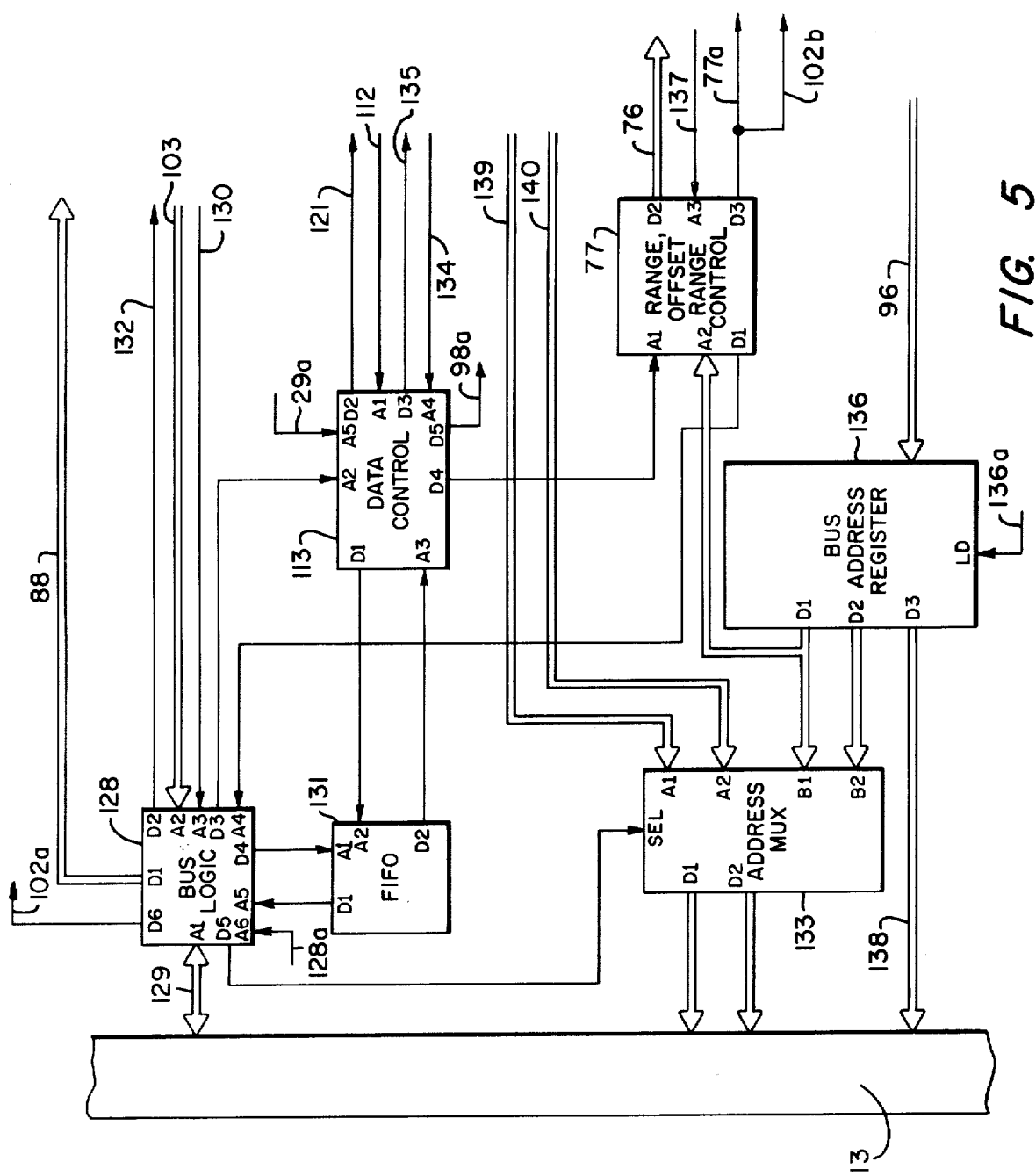

FIGS. 4 and 5 illustrate in a more detailed functional block diagram form the system of FIG. 2.

A 24-bit address shift register 70 is connected to the megabus 13 by way of a 24-bit data cable 71. The output of the shift register is applied to the A2 input of an 8 to 1 multiplexer 72 (AMUX). Bits 15 and 16 of the shift register output are applied by way of a data cable 73 to the two-bit A1 input of an index register 74. The clock (CK) input to shift register 70 is connected to a control line 70a leading to a firmware output terminal to be further described.

The A1 input to AMUX 72 is connected to the 8-bit output of an accumulator 75, and the A3 input to AMUX 72 is connected by way of a data cable 76 to the output of a range and offset range control unit 77 to be later described. The A4 input to AMUX 72 is connected by way of a data cable 78 to an output of an 8-bit scratchpad address counter 79. The A5 input to AMUX 72 is connected to a data cable 80 leading from the D1 two-bit output of index register 74, and the A6 input to AMUX 72 is connected to the 8-bit output of a 1 K by 8-bit scratchpad memory 81. The A7 input to AMUX 72 is connected to the output of a 16-bit data register 82. The select (SEL) input to the AMUX 72 is connected by way of a control line 72a to a firmware output terminal. The 8-bit output of AMUX 72 is connected to the A1 input of an OR logic unit 83.

A 4-to-1 multiplexer 84 (BMUX) has an 8-bit output connected to the A2 input of an arithmetic unit 85. The A1 input to BMUX 84 is supplied by firmware on a control cable 86. The A2 input to BMUX 84 is connected to the output of scratchpad memory unit 81 by way of a data cable 87. The A3 input to BMUX 84 is supplied by way of a control cable 88, and the A4 input to the multiplexer is connected to the output of accumulator 75 by way of a data cable 89. The select (SEL) input to the multiplexer is supplied by firmware on a control line 84a.

The A1 input to arithmetic unit 85 is connected by way of a data cable 90 to the 8-bit D1 output of logic unit 83, and the mode input to the arithmetic unit is connected to the output of an arithmetic control unit 91. The 8-bit output of the arithmetic unit is applied to the input of accumulator 75, and applied by way of data cables 92 and 93 to the data input of counter 79. Further, the output of the arithmetic unit is applied by way of data cables 92 and 94 to the A2 input of device adapter 14, and by way of data cable 95 to a data cable 96. The arithmetic unit output also is applied by way of data cables 95 and 97 to the input of a second half-read (SHRD) register 98, and by way of data cables 95 and 99 to the 8 bit data inputs of a 16-bit bus data register 100. The arithmetic unit output in addition is applied to data cables 95 and 101 leading to the data input of a test logic unit 102.

The output of accumulator 75 further is applied to a data cable 103, and to the two bit A2 input of index register 74. The load (LD) input to the accumulator is connected by way of a control line 75a to a firmware output terminal.

The A1 input of arithmetic control unit 91 is connected by way of a control line 106 to an output terminal of the firmware control system, and the A2 input to the control unit 91 is connected by way of a control line 107 to the D1 output of a hardware control unit 108.

The A1 input to control unit 108 is connected to a control line 109 leading to an output of the firmware control system, and the A2 input to the control unit 108 is connected to a control line 108a. The A3 interrupt input of control unit 108 is supplied by the device adapter 14 to a control line 110. The A4 input to the control unit is connected to a control line 108b leading from system hardware control. The D2 output of control unit 108 is connected by way of a control line 111 to the A1 input of adapter logic unit 29, and the D3 output of the control unit 108 is connected to a control line 112 leading to the A1 input of a data control unit 113. The D4 output of control unit 108 is connected by way of a control line 70b to the load (LD) input of shift register 70, and the D5 output is connected to the A1 input of test logic unit 102. The D6 output of the control unit is connected to a control line 108c leading to the system hardware control.

Firmware generated clock signals on a control line 79b are supplied to the clock (CK) input of address counter 79, and firmware control signals on a control line 114 are supplied to the LD input of the counter. Further, the up/down select input to the counter receives firmware control signals by way of a control line 79b. Two output bits of the counter are applied to the A1 input of a selector 115. The low order six bits of the counter output are applied to the A2 input of the scratchpad memory unit 81.

The A2 input of selector 115 is connected to the D2 output of index register 74, the LD input of which is supplied by firmware to a control line 74a. The 3 bit output of the selector 115 is applied to the address (ADDR) input of scratchpad memory unit 81, and the SEL input of the selector receives firmware control signals by way of a control line 116.

The A1 input to memory unit 81 is connected by way of a data cable 117 to the 8 bit D2 output of logic unit 83. The A2 input to logic unit 83 is connected to the D1 output of data FIFO unit 118, and the A3 input to logic unit 83 is connected to the D2 output of unit 118. The A4 input to logic unit 83 is supplied by the device adapter 114 by way of a data cable 119.

The data input to the data register 82 is connected to a 16 bit data cable 120 electrically connected to the megabus 13, and the output of the data register further is connected to the input of the data FIFO unit 118. The LD input to the register is supplied by hardware control on a control line 82a. The output of the register further is applied to data cables 139 and 140.

The LD input to data register 100 is supplied by data control unit 113 on a control line 121. The output of register 100 is applied to the A2 input of a 2-to-1 data multiplexer 122. The 16 bit A1 input to the multiplexer is supplied by the SHRD register 98, the LD input of which is supplied by data control unit 113 on a control line 98a. The output of the multiplexer is applied by way of a 16 bit data cable 123 to the megabus 13.

Referring to test logic unit 102, a status signal is applied to the A2 input of the logic unit by the firmware control system on a control line 124. In addition, the bus logic unit 128 supplies a status signal by way of a control line 102a to the A3 input of the logic unit 102, and the control unit 77 supplies an end of range signal to the A4 input of the logic unit by way of a control line 102b. The A5 input of logic unit 102 is connected to a control line 125 carrying interrupt signals from the D1 output of device adapter 14. The test logic unit supplies a control signal to a control line 126 leading to a firmware control system to be further described.

The adapter logic unit 29 also receives a firmware signal on a control line 127 connected to its A2 input. The output of the logic unit is applied to the A1 input of device adapter 14. A control line 29a leading from the output of the logic unit is connected to the A5 input of data control unit 113, and to a control line 118b leading to the transfer on parallel (TOP) input of Data FIFO unit 118

As illustrated by FIG. 5, the megabus 13 is connected to bus logic unit 128 by way of a bidirectional data cable 129. The A2 input to logic unit 128 is connected to data cable 103 carrying the output of accumulator 75, and the A3 input to the logic unit is connected to a control line 130 leading to an output of the firmware control system. The A4 input to logic unit 128 is connected to the D1 output of control unit 77, and the A5 input to the logic unit is connected to the D1 output of a first-in-first-out (FIFO) unit 131. The A6 input to the logic unit is supplied by system hardware on a control line 128a. The D1 output of logic unit 128 is connected to data cable 88, and the D2 output is connected to a control line 132 leading to the select (SEL) input of data multiplexer 122. The D3 output of the logic unit is connected to the A2 input of data control unit 113, and the D4 output is connected to the A1 input of FIFO unit 131. The D5 output of logic unit 128 is connected to the SEL input of a dual 2-to-1 address multiplexer 133, and the D6 output of the logic unit is connected to control line 102a.

The A2 input to FIFO unit 131 is connected to the D1 output of control unit 113, and the D2 output of the FIFO unit is connected to the A3 input of control unit 113. The A4 input to control unit 113 is connected to an output of the firmware control system by way of a control line 134, and the A5 input of the control unit is connected to line 29a. The D2 output of the control unit is connected to control line 121, and the D3 output is applied by way of a control line 135 to a control (CTR) input of data FIFO unit 118. The D4 output of data control unit 113 is applied to the A1 input of control unit 77, and the D5 output is applied to control line 98a leading to the LD input of register unit 98.

The A2 input to control unit 77 is connected to the D1 output of a bus address register unit 136, and the A3 input to the control unit is connected by way of a control line 137 to an output of the firmware control system. The D2 output of the control unit 77 is applied to data cable 76 leading to an input of AMUX 72. The D3 output of control unit 77 is applied to a control line 77a leading to the A3 input of device adapter 14, and to control line 102b leading to the A4 input of test logic unit 102 as before described.

The bus address register unit 136 is comprised of a 24-bit up counter which may be controlled to count either bytes or words, where a word is comprised of two bytes. The 8-bit D1 output of unit 136 also is applied to the B1 input of address multiplexer 133, and the 8-bit D2 output of the unit 136 is applied to the B2 input of multiplexer 133. The 8-bit D3 output of unit 136 is applied by way of a data cable 138 to the megabus 13. The LD input to the register unit 136 is supplied by firmware on a control line 136a. The 8-bit A1 and A2 inputs to address multiplexer 133 are supplied by data register 82 by way of data cables 139 and 140.

In operation, the MPDC 10 interfaces with the disk adapter 14 which in turn may service plural disk devices as illustrated in FIG. 1.

If an unsolicited bus request is received from the megabus 13, the bus logic unit 128 issues a signal on line 102a leading to the test logic unit 102. Further, a device adapter 14 request is indicated by an interrupt signal on control line 127. The logic unit thereby is notified whether a device adapter request or a megabus 13 request is to be serviced. The test logic unit 102 thereupon indicates to the firmware by way of a signal on control line 125 the microinstruction sequence to be executed. In the event that a request is directed to a disk device which is already involved in executing a task, the bus logic unit 128 will issue a not accepted (NAK) status signal to the megabus 13 under system hardware control. If a disk device not presently involved in executing a task is addressed by the megabus 13, but the MPDC is presently involved in executing a previous task involving a second disk device, then the logic unit 128 may issue a wait status signal to the megabus 13. If the disk device which is addressed is not busy, and the MPDC is not involved in servicing the device while executing a previous task, then an accept (ACK) status signal is issued to the megabus 13.

It is to be understood that in the operation of the MPDC, the data paths for a data transfer are prepared by firmware operating in combination with the system of FIGS. 4 and 5. The data transfer, however, occurs under system hardware firmware control. Detailed descriptions of such hardware may be found in U.S. Pat. No. 3,993,981, and in the following Honeywell reference manuals: MPDC Reference Manual, Doc. No. 71010241-100, Order No. FM55, Rev. 0; MPDC Cartridge Disc Adapter Reference Manual, Doc. No. 71010239-100, Order No. FM57, Rev. 0; and MPDC Disc Adapter Reference Manual, Doc. No. 71010441-100, Order No. FK90, Rev. 0.

In a read or a write operation, the CPU 11 of FIG. 1 initially supplies a channel destination number and a function code to the address shift register 70. The shift register is compared under system hardware control to a destination number set in hex rotary switches, and if a match is detected the bus logic unit 128 acknowledges the match to the bus 13. As before described, the acknowledgement may be a wait, a nonacceptance (NAK), or an acceptance (ACK). If an ACK acknowledgement is issued by the logic unit 128 to the megabus 13, the logic unit in addition issues a busy signal to the megabus 13 to place subsequent bus requests in a wait state. The system hardware thereafter controls the transfer of data between megabus 13 and MPDC 10.

In order to provide means for controlling the operation of the disk device during a read or a write operation, the CPU 11 also supplies a configuration word A to megabus 13 which under hardware control is loaded into the data register 82 and address shift register 70. Upon completing the load operation, the system hardware issues an ACK signal to the megabus 13 followed by a busy signal. Firmware senses the busy signal, and controls the transfer of the data in address shift register 70 and data register 82 through the arithmetic unit 85 for storage into scratchpad memory 81. When the firmware has completed the memory store operation, it signals the system hardware which then controls the loading of the address and data registers with a configuration word B. The configuration word B then is loaded into scratchpad memory under firmware control, and the process is repeated to receive in order a main memory address, a range count, a task and a status request. When the task is loaded into the data register 82 and stored in scratchpad memory 81, the task is executed under firmware control. Upon completing the task, the function code is interrogated to detect the presence of status requests which may be honored.

In the memory store operation, the firmware senses the function code to determine the scratchpad address in which information is to be stored from data register 82. Further, firmware is able to distinguish between data formats by interrogating the function code. A function code of hex 0 7 indicates that a task has been loaded into the scratchpad memory, a function code of hex 1 1 identifies a configuration word A and a function code of hex 1 3 identifies a configuration word B. In addition, a function code of hex OD identifies a range count (data bytes to be transferred). It is to be noted that the configuration words A and B, the task, and the range have formats as illustrated by the data field of I/O output command word of FIG. 3a. A main memory address input, however, is comprised of the module number and address fields illustrated by the I/O LD output command word of FIG. 3a.

During a read operation wherein data is read from a disk device and stored in main memory unit 12, the system hardware loads the high order bits of a main memory address, a function code and a channel destination number from megabus 13 into the address shift register 70, and loads the low order bits of the main memory address, a range or a task into the data register 82. Under firmware control, the information in the address shift register 70 is clocked through the AMUX 72 and the OR logic unit 83 to the A1 input of the arithmetic unit 85. Further, in response to a firmware command on line 106, the arithmetic control unit 91 issues a mode to the arithmetic unit 85 to select the A1 input. The A1 input to the arithmetic unit thereupon is supplied to the input of the scratchpad address counter 79, and loaded into the address counter under a firmware command supplied to control line 114.

Two bits of the address shift register output on data cable 73 are supplied to the A1 input of index register 74 to indicate the disk device from which information is to be read. Under firmware control by way of control line 74a, the two indentification bits are loaded into the index register. The output of the index register is supplied to the selector 115 as is the two high-order bits of the address counter 79.

The firmware further initializes the address counter 79 by issuing an up/down signal on control line 79a, and a clock signal on control line 79b. The counter is commanded to count up or down at the rate indicated by the firmware generated clock signal. In response to the inputs from the index register and the address counter, the selector 115 addresses the scratchpad memory unit 81. The data resident in the data register 82 thus is transferred under firmware control to the scratchpad memory address indicated by selector 115 by way of a data path through the AMUX 72, the OR logic unit 83 and data cable 117. The configuration words A and B, a main memory address, a range, and a task thereby are loaded into scratchpad memory.

Upon completing the memory store operation, the firmware accesses the function code in the address shift register 70 to determine whether a task is indicated. More particularly, the firmware supplies a hex code 0 7 by way of cable 86 to the A1 input of BMUX 84. The BMUX is selected to the A1 input via a firmware control signal on control line 84a. The hex code thereupon is routed through the arithmetic unit 85 and stored in accumulator 75. Thereafter, the output of address counter 79 is channelled through the AMUX 72 and the OR logic unit 83 to the A1 input of arithmetic unit 85. Under firmware control, the arithmetic unit compares the code in the accumulator 75 with the output of the address counter 79. If a match occurs, a task is indicated and the test logic unit 102 issues a signal to the firmware by way of control line 126 to initiate the execution of a next sequence of microinstrucions. In addition, the bus logic unit 128 in response to firmware control signals on line 130 sets the addressed disk device channel busy.

Thereafter, any further information which is sent by way of megabus 13 to address the device for which the present task is assigned shall be acknowledged with a NAK status signal.

Upon detecting the presence of a task, the firmware accesses the task stored in the scratchpad memory 81 and transfers that information through the AMUX 72 and OR logic unit 83 to the arithmetic unit 85. Under firmware control, the arithmetic unit 85 and the test logic unit 102 tests the task information to determine the command to be executed. For example, the task may indicate that a disk seek, a recalibrate, a read or a write operation is required. The results of these tests are supplied by the test logic unit 102 to firmware by way of control cable 126.

In a write operation wherein data is to be read from main memory unit 12 and written on a disk device, the adapter logic unit 29 under firmware control issues a strobe to the device adapter 14 to load an internal data counter with a count of four. Further, the adapter logic unit 29 is commanded to issue a sequence of four strobes to load configuration words A and B into a data buffer of the device 14. More particularly, the information is routed under firmware control from the scratchpad memory 81 through the BMUX 84 and the arithmetic unit 85 to data cables 92 and 94 leading to the device adapter 14.

Before the logic unit 29 issues a BEGIN EXECUTION command to the device adapter 14, the megabus 13 must be set up for the transfer of data. The firmware supplies two dummy bytes of offset range to the BMUX 84 by way of cable 86, and controls the transfer of the bytes through the arithmetic unit 85 and along data cable 96 to the bus address register 136. The loading of the address register 136 is accomplished under firmware control on line 136a. The firmware then accesses the range information stored in the scratchpad memory unit 81, and transfers that information through the BMUX 84 and the arithmetic unit 85 to data cable 96 leading to the bus address register 136. As the range data is loaded into register 136, the offset range data is transferred to control unit 77. The two bytes of range data thereafter are transferred from the bus address register 136 into the control unit 77 under firmware control, and three bytes of address information in scratchpad memory are stored into the bus address register 136. The MPDC thereby is prepared for receiving data from main memory for writing on the indicated disk device.

To initiate a data transfer, the firmware accesses the scratchpad memory 81 to transfer the MPDC channel number previously supplied by the CPU 11, and transfers the channel number through the BMUX and arithmetic unit 85 for storage in the bus data register 100. At this time, the main memory address from which data is to be initially read resides in the bus address register 136, and the MPDC channel destination number resides in bus data register 100.

The firmware also supplies bus logic commands to the BMUX 84 by way of cable 86, and stores those commands in the accumulator 75. From the accumulator, the commands are supplied by way of data cable 103 to the bus logic unit 128. These commands in logical sequence instruct the bus logic unit 128 to issue a response-required request to main memory to acknowledge that data is to be supplied to the MPDC, to issue a main memory channel number identifying the main memory unit as the system unit addressed, and to issue an indication as to whether the MPDC is in a byte or a word mode.

In normal operation, a read or a write command is always preceded by a seek command wherein the firmware commands the adapter device 14 to position the read-write heads of the disk device. In addition, the device adapter is instructed to select the proper head from which the information is to be read or written. The device adapter 14 then compares the configuration words A and B with data read from the surface of the disk. If a match is detected which indicates that a designated record is in position, the device adapter 14 issues a write command to the disk device and begins to write a header gap on the record. During this period, the device adapter 14 also issues an interrupt by way of control line 110 to the hardware control unit 108. In response thereto, the control unit issues a signal to the A1 input of test logic unit 102 to notify firmware by way of control cable 126 that control should be turned over to the before-described system hardware. Firmware thereupon issues an enable hardware command to control line 109, and further issues commands by way of control line 134 to the data control unit 113 to control the operation of FIFO unit 131 in requesting data from memory. The FIFO unit 131 operates to anticipate the availability of space in the data FIFO unit 118 for the receipt of data word from main memory. More particularly, each time the bus logic unit 128 requests a data word from main memory, a dummy byte is loaded into the FIFO unit 131. The bus logic unit 128 thereafter requests a second word of data only if the dummy byte has dropped from the input register of the FIFO unit 131 into the FIFO stack. Main memory thereupon issues data words by way of megabus 13 to the data register 82.

When the bus logic unit 128 has requested a data word from main memory and accepted the word, the logic unit issues a signal to the A2 input of data control unit 113. In response thereto, the control unit issues a command on control line 135 to the data FIFO unit 118 to store data from the data register 82. The above-described operation is repeated until the data FIFO unit 118 is filled with 32 bytes of data.

When the data FIFOs are filled, unit 118 issues a signal by way of control lines 118a to the hardware control unit 108. Control unit 108 thereupon issues a strobe by way of control line 111 to the adapter logic unit 29. Logic unit 29 in turn issues a strobe to the device adapter 14 to indicate that a data byte may be transferred from the data FIFOs to the device adapter 14. The same strobe is applied by way of control lines 29a and 118b to the TOP (transfer out parallel) terminal of data FIFO unit 118. The D1 and D2 outputs of the FIFO unit thereupon are transferred through the OR Logic 83 and through the arithmetic unit 85 to the device adapter 14 by way of data cables 92 and 94.

The logic unit 29 strobe also is applied by way of control line 29a to the data control unit 113. The reception of two of such strobes indicates that a two-byte data word has been transferred from the data FIFO unit 118 to device adapter 14. The data control unit 113 thereupon issues a control signal to the A2 input of FIFO unit 131 to drop a dummy byte out of the output register of the FIFO stack. The input register of the FIFO unit thereby is emptied, and issues a signal to the bus logic unit 128 to initiate a request for an additional data word from main memory. The above-described process continues until the device adapter unit 14 indicates that a record has been written.

It is to be understood that the device adapter 14 controls the write operation on the disk device. As the data is being written on the disk, the device adapter signals the test logic unit 102 by way of control line 125 to cease supplying data until the internal buffers of the device adapter have been emptied. During this period, the test logic unit 102 notifies the firmware control system that control may be transferred from the hardware to the firmware. When the device adapter 14 is ready to receive additional data, the logic state of control line 125 is changed. The test logic unit 102 thereupon notifies the firmware to return control to the hardware to resume the data transfer. This process continues until a data transfer is completed as indicated by a range count of zero.

Each time the bus logic unit 128 requests an additional data word, the data control unit 113 under system hardware control decrements the range counters of control unit 77 by one. Further, after a data request including a main memory address has been issued to the megabus 13 and accepted by the main memory unit 12, the control unit 77 increments the bus address register 136 by two and decrements the range counters by one. When the range count has been exhausted, the range control unit 77 issues an end-of-range (EOR) signal by way of control lines 77a and 102b to the device adapter 14 and the test logic unit 102, respectively.

It is to be noted that the control cable 125 includes two interrupt lines. A first interrupt line is a firmware request line to indicate that control should be returned to firmware while the device adapter 14 is between records. The second interrupt line is used to notify firmware that non-data service requests may be serviced. Such action normally indicates that there is some type of error in the device adapter 14.

If the EOR signal is issued during a record or at the end of a record on the disk device, the firmware will terminate the write order. If the EOR signal is received by the device adapter 14 before an end of record occurs, the device adapter fills the remaining portion of the record with dummy bytes. If an EOR signal does not occur, however, and there is no device adapter error indicated on interrupt cable 127, then the firmware will update the configuration words A and B in device adapter 14 to point to a next logical sector of the disk device.

FIG. 6

Figure 6:
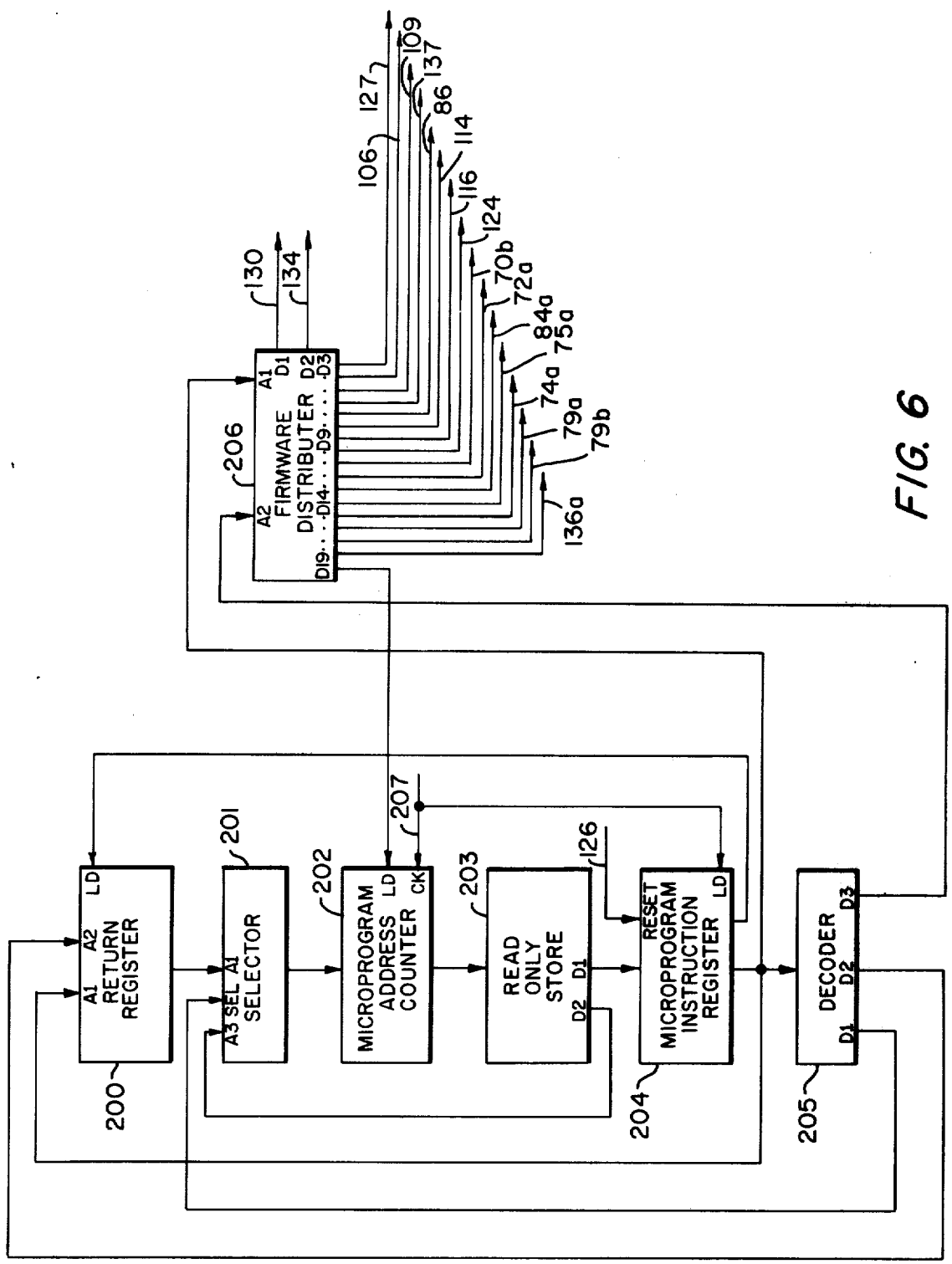
FIG. 6 is a functional block diagram of a firmware control system used in controlling the operation of the system of FIGS. 4 and 5.

FIG. 6 illustrates in functional block diagram form a firmware control system for controlling the operation of the system illustrated in FIGS. 4 and 5.

The 12-bit output of a 16-bit return register 200 is connected to the A1 input input of a selector 201. The 12-bit output of the selector 201 in turn is applied to the input of a 16-bit microprogram address counter 202, and the 12-bit output of the address counter is connected to the input of a 4.0 K by 16-bit Read Only Store (ROS) 203 having the microinstructions of a microprogram stored therein. The 16-bit D1 output of the ROS is connected to the input of a 16-bit microprogram instruction register 204, and the D2 output of the ROS is applied to the A3 input of the selector 201.

The microprogram instruction register 204 further receives a control signal from the test logic unit 102 of FIG. 4 by way of a control line 126 to reset or clear the register. The 16-bit output of the microprogram instruction register 204 is applied to the input of a decoder 205, to the A1 input of return register unit 200, and to the A1 input of a firmware distributor 206. A one-bit output of the register 204 is applied to the LD input of return register 200.

The D1 output of decoder 205 is applied to the A2 input of the selector 201, and the D2 output of the decoder is applied to the A2 input of return register unit 200. Further, the D3 output of decoder 205 is applied to the A2 input of distributor 206. The D1 output of the distributor is applied to control line 130 leading to the bus logic unit 128, and the D2 output is applied to control line 134 leading to the data control unit 113. The D3 output of distributor 208 is applied to control line 127 connected to the A2 input of adapter logic unit 29, and the D4 output is applied to control line 106 leading to the arithmetic control unit 91. The D5 output is supplied to control line 109 connected to the A1 input of hardware control unit 108, and the D6 output is connected to line 137 leading to the A3 input of control unit 77. The D7 output is connected to control cable 86, and the D8 output is applied to control line 114 carrying load commands to the counter 79. The D9 output is applied to control line 116, and the D10 output is applied to control line 124. The D11 output is applied to control line 70b, the D12 output to control line 72a and the D13 output to control line 84a. The D14 output is applied to line 75a, the D15 output to line 74a and the D16 output to line 79a. The D17 output is applied to line 79b and the D18 output to line 136a. The D19 output of distributor 206 is applied to the LD input of counter 202, the clock input of which is supplied by the system hardware by way of control line 207. Control line 207 further is connected to the LD input of register 204.

The 16-bit firmware commands stored in ROS 203 are divided into four fields: the OPCODE, the AMUX 72 select, the BMUX 84 selected and the miscellaneous fields. The firmware commands further are segmented into seven categories each representative of bit configurations for performing a designated operation. The seven basic categories of firmware commands are: miscellaneous commands, bus logic commands, ALU commands, constant value data commands, memory commands, test commands, and branch commands. Each of the firmware categories is identified by a particular OPCODE which is a binary decode of bits 0, 1 and 2 of ROS 203.

In operation, the microprogram address counter 202 is loaded from selector 201 under firmware control, and thereafter clocked by hardware system control signals on line 207. The address counter output addresses the ROS 203, which in response thereto supplies microinstructions to the instruction register 204. The register 204 loads the microinstructions under hardware control, and applies the microinstruction bit configuration to decoder 205, distributor 206 and return register 200.

The order in which the microinstruction sequences stored in ROS 203 are executed may be controlled in any of several ways. The test logic unit 102 may issue a reset signal causing a no-op instruction to occur in the instruction register 204. The instruction register thereupon skips the current instruction in the register, and proceeds to the next occurring instruction. In the alternative, the address counter 202 may be loaded with a microinstruction address formed from Read Only Store 203 and register 200. The firmware control system of FIG. 6 thus offers significant versatility in the execution of microprograms.

As each microinstruction addressed in ROS 203 is loaded into register 204, the instruction bit configuration and a binary code from decoder 205 identifying the instruction category are applied to distributor 206. In response thereto, the distributor applies firmware control signals to the system of FIGS. 4 and 5 as before described.

A copy of the microprogram stored in the ROS 203 is reproduced in its entirety, and attached hereto as Appendix A.

The operation of decoder 205 and firmware distributor 206 may better be understood by reference to Tables A-K. The OPCODES are defined in Table A, which provides a pointer to one of Tables B-K. For example, the OPCODE 0 0 0 refers to the miscellaneous commands of Table B. The OPCODE of 0 1 0 refers to Table C, the OPCODE 0 1 1 to Table D, the OPCODE 1 0 0 to Table E, and the OPCODE 1 0 1 to Table F. Further, the OPCODE 1 1 0 refers to Table G and the OPCODE 1 1 1 to Table I.

Table A

| Opcode Instructions | | | |
|---|---|---|---|
| MICROINSTRUCTIONS | | | |
| 0 | 0 | 0 | MISCELLANEOUS |
| 0 | 0 | 1 | RFU |
| 0 | 1 | 0 | BUS LOGIC |
| 0 | 1 | 1 | ALU |
| 1 | 0 | 0 | CONSTANTS |
| 1 | 0 | 1 | MEMORY |
| 1 | 1 | 0 | TEST |
| 1 | 1 | 1 | BRANCH |

Table B

Miscellaneous Commands

| OPERATION | BINARY VALUE | | | | | | | | | | | | | | | | MNEMONIC | HEX CODE | | | |
|---|---|---|---|---|---|---|---|---|---|---|---|---|---|---|---|---|---|---|---|---|---|
| NO OPERATION | 0 | 0 | 0 | 0 | 0 | 0 | 0 | 0 | 0 | 0 | 0 | 0 | 0 | 0 | 0 | 0 | NOP | 0 | 0 | 0 | 0 |
| CLEAR COMMAND | 0 | 0 | 0 | 1 | 0 | 0 | 0 | 0 | 0 | 0 | 0 | 0 | 0 | 0 | 0 | 0 | CLR | 1 | 0 | 0 | 0 |
| SET ERROR FLOPS | 0 | 0 | 0 | 0 | 1 | 0 | 0 | 0 | 0 | 0 | 0 | 0 | 0 | 0 | 0 | 0 | SEF | 0 | 8 | 0 | 0 |
| ENABLE HARDWARD DATA PATH | 0 | 0 | 0 | 0 | 0 | 1 | 1 | 0 | 0 | 0 | 0 | 0 | 0 | 0 | 0 | 0 | EMP | 0 | 6 | 0 | 0 |
| DISABLE HARDWARE DATA PATH | 0 | 0 | 0 | 0 | 0 | 0 | 1 | 0 | 0 | 0 | 0 | 0 | 0 | 0 | 0 | 0 | DMP | 0 | 2 | 0 | 0 |
| RESET DIAGNOSTIC MODE | 0 | 0 | 0 | 0 | 0 | 0 | 0 | 0 | 1 | 0 | 0 | 0 | 0 | 0 | 0 | 0 | RSD | 0 | 0 | 8 | 0 |
| SET DIAGNOSTIC MODE | 0 | 0 | 0 | 0 | 0 | 0 | 0 | 1 | 1 | 0 | 0 | 0 | 0 | 0 | 0 | 0 | STD | 0 | 1 | 8 | 0 |
| HALT | 0 | 0 | 0 | 0 | 0 | 0 | 0 | 0 | 0 | 1 | 0 | 0 | 0 | 0 | 0 | 0 | HLT | 0 | 0 | 4 | 0 |
| RFU | 0 | 0 | 0 | 0 | 0 | 0 | 0 | 0 | 0 | 0 | 1 | 0 | 0 | 0 | 0 | 0 | — | 0 | 0 | 2 | 0 |
| CLEAR FLOPS AND REGISTERS | 0 | 0 | 0 | 0 | 0 | 0 | 0 | 0 | 1 | 0 | 0 | 1 | 0 | 0 | 0 | 0 | CRF | 0 | 0 | 1 | 0 |
| RESET DEVICE ADAPTER | 0 | 0 | 0 | 0 | 0 | 0 | 0 | 0 | 1 | 0 | 0 | 0 | 1 | 0 | 0 | 0 | RDA | 0 | 0 | 0 | 8 |
| SET QLT (BLT DONE) | 0 | 0 | 0 | 0 | 0 | 0 | 0 | 0 | 0 | 0 | 0 | 0 | 1 | 0 | 0 | 0 | QLT | 0 | 0 | 0 | 4 |
| SET BUS ACK | 0 | 0 | 0 | 0 | 0 | 0 | 0 | 0 | 0 | 0 | 0 | 0 | 0 | 1 | 0 | 0 | SBA | 0 | 0 | 0 | 2 |
| RFU | 0 | 0 | 0 | 0 | 0 | 0 | 0 | 0 | 0 | 0 | 0 | 0 | 0 | 0 | 1 | 0 | — | 0 | 0 | 0 | 1 |
| ENABLE READ PATH | 0 | 0 | 0 | 0 | 0 | 1 | 1 | 0 | 0 | 0 | 0 | 0 | 0 | 0 | 0 | 0 | ERP | 0 | 6 | 0 | 0 |
| ENABLE WRITE PATH | 0 | 0 | 0 | 0 | 0 | 1 | 1 | 0 | 0 | 0 | 0 | 0 | 0 | 0 | 0 | 1 | EWP | 0 | 6 | 0 | 1 |

Table C

Bus Logic Commands

| OPERATION | BINARY VALUE | | | | | | | | | | | | | | | | MNEMONIC | HEX CODE | | | |
|---|---|---|---|---|---|---|---|---|---|---|---|---|---|---|---|---|---|---|---|---|---|
| INCREMENT ADDRESS CNTR. | 0 | 1 | 0 | 0 | 0 | 0 | 0 | 1 | 0 | 0 | 0 | 0 | 0 | 0 | 0 | 0 | IAC | 4 | 1 | 0 | 0 |
| RESET STATUS | 0 | 1 | 0 | 0 | 0 | 0 | 0 | 0 | 1 | 0 | 0 | 0 | 0 | 0 | 0 | 0 | RST | 4 | 0 | 8 | 0 |
| DECREMENT RANGE CNTR. | 0 | 1 | 0 | 0 | 0 | 0 | 0 | 0 | 0 | 1 | 0 | 0 | 0 | 0 | 0 | 0 | DRC | 4 | 0 | 4 | 0 |
| CYCLE | 0 | 1 | 0 | $A_1$ | $A_2$ | $A_3$ | 0 | 0 | 0 | 0 | 1 | 0 | 0 | 0 | 0 | $A_0$ | CYC | | | | |
| SET CHANNEL READY | 0 | 1 | 0 | 0 | 0 | 0 | 0 | 0 | 0 | 0 | 0 | 1 | 1 | 0 | 0 | 0 | SCR | 4 | 0 | 1 | 8 |
| RESET CHANNEL READY | 0 | 1 | 0 | 0 | 0 | 0 | 0 | 0 | 0 | 0 | 0 | 1 | 0 | 0 | 0 | 0 | RCR | 4 | 0 | 1 | 0 |
| SET REGISTER BUSY | 0 | 1 | 0 | 0 | 0 | 0 | 0 | 0 | 0 | 0 | 0 | 0 | 0 | 1 | 0 | 0 | SRB | 4 | 0 | 0 | 4 |
| RESET REGISTER BUSY | 0 | 1 | 0 | 0 | 0 | 0 | 0 | 0 | 0 | 0 | 0 | 0 | 0 | 0 | 1 | 0 | RPB | 4 | 0 | 0 | 2 |
| RESET INTERRUPT LATCH | 0 | 1 | 0 | 0 | 0 | 0 | 0 | 0 | 0 | 0 | 0 | 0 | 0 | 0 | 0 | 1 | RIL | 4 | 0 | 0 | 1 |
| CLEAR BUS | 0 | 1 | 0 | 0 | 0 | 0 | 0 | 0 | 1 | 0 | 0 | 0 | 1 | 1 | 0 | 0 | CLB | 4 | 0 | 8 | 6 |

$A_0 A_1 A_2 A_3$ = SELECT AOP MUX INPUT

Table D

ALU Commands

| OPERATION | BINARY VALUE | | | | | | | | | | | | | | | | MNEMONIC | HEX CODE |
|---|---|---|---|---|---|---|---|---|---|---|---|---|---|---|---|---|---|---|
| AOP NEGATION | 0 | 1 | 1 | $A_1$ | $A_2$ | $A_3$ | $B_0$ | $B_1$ | C | S | 0 | 0 | 0 | 0 | 1 | $A_0$ | ANT | N/A |
| BOP NEGATION | 0 | 1 | 1 | $A_1$ | $A_2$ | $A_3$ | $B_0$ | $B_1$ | C | S | 0 | 1 | 0 | 1 | 1 | $A_0$ | BNT | N/A |
| ZERO ALU | 0 | 1 | 1 | $A_1$ | $A_2$ | $A_3$ | $B_0$ | $B_1$ | C | S | 0 | 0 | 1 | 1 | 1 | $A_0$ | ZER | N/A |
| AOP TRANSFER | 0 | 1 | 1 | $A_1$ | $A_2$ | $A_3$ | $B_0$ | $B_1$ | C | S | 1 | 1 | 1 | 1 | 1 | $A_0$ | XFA | N/A |
| BOP TRANSFER | 0 | 1 | 1 | $A_1$ | $A_2$ | $A_3$ | $B_0$ | $B_1$ | C | S | 1 | 0 | 1 | 0 | 1 | $A_0$ | XFB | N/A |
| NOR A TO B | 0 | 1 | 1 | $A_1$ | $A_2$ | $A_3$ | $B_0$ | $B_1$ | C | S | 0 | 0 | 0 | 1 | 1 | $A_0$ | NOR | N/A |
| NAND A to B | 0 | 1 | 1 | $A_1$ | $A_2$ | $A_3$ | $B_0$ | $B_1$ | C | S | 0 | 1 | 0 | 0 | 1 | $A_0$ | NND | N/A |
| XOR A TO B | 0 | 1 | 1 | $A_1$ | $A_2$ | $A_3$ | $B_0$ | $B_1$ | C | S | 0 | 1 | 1 | 0 | 1 | $A_0$ | XOR | N/A |
| XNOR A TO B | 0 | 1 | 1 | $A_1$ | $A_2$ | $A_3$ | $B_0$ | $B_1$ | C | S | 1 | 0 | 0 | 1 | 1 | $A_0$ | XNR | N/A |
| AND A TO B | 0 | 1 | 1 | $A_1$ | $A_2$ | $A_3$ | $B_0$ | $B_1$ | C | S | 1 | 0 | 1 | 1 | 1 | $A_0$ | AND | N/A |
| OR A TO B | 0 | 1 | 1 | $A_1$ | $A_2$ | $A_3$ | $B_0$ | $B_1$ | C | S | 1 | 1 | 1 | 0 | 1 | $A_0$ | ORR | N/A |
| AOP PLUS ONE | 0 | 1 | 1 | $A_1$ | $A_2$ | $A_3$ | $B_0$ | $B_1$ | C | S | 0 | 0 | 0 | 0 | 0 | $A_0$ | INC | N/A |
| AOP MINUS ONE | 0 | 1 | 1 | $A_1$ | $A_2$ | $A_3$ | $B_0$ | $B_1$ | C | S | 1 | 1 | 1 | 1 | 0 | $A_0$ | DEC | N/A |
| SUBTRACT B FROM A | 0 | 1 | 1 | $A_1$ | $A_2$ | $A_3$ | $B_0$ | $B_1$ | C | S | 0 | 1 | 1 | 0 | 0 | $A_0$ | SUB | N/A |

Table D-continued

ALU Commands

| OPERATION | BINARY VALUE | | | | | | | | | | | | | | | MNEMONIC | HEX CODE |
|---|---|---|---|---|---|---|---|---|---|---|---|---|---|---|---|---|---|
| ADD A TO B       | 0 | 1 | 1 | $A_1$ | $A_2$ | $A_3$ | $B_0$ | $B_1$ | C | S | 1 | 0 | 0 | 1 | 0 | $A_0$ | ADD | N/A |
| LEFT SHIFT AOP   | 0 | 1 | 1 | $A_1$ | $A_2$ | $A_3$ | $B_0$ | $B_1$ | C | S | 1 | 1 | 0 | 0 | 0 | $A_0$ | LSH | N/A |
| CARRY OUT IN     | 0 | 1 | 1 | $A_1$ | $A_2$ | $A_3$ | $B_0$ | $B_1$ | 1 | S | X | X | X | X | X | $A_0$ | COTI | N/A |
| STORE RESULT IN AOP | 0 | 1 | 1 | $A_1$ | $A_2$ | $A_3$ | $B_0$ | $B_1$ | C | 1 | X | X | X | X | X | $A_0$ | SRIA | N/A |

$A_0 A_1 A_2 A_3$ = AOP REG. SELECT
$B_0 B_1$ = BOP REG. SELECT
C = DETERMINE CARRY IN
S = DETERMINE A OR B RESULT STORAGE

TABLE E

Constant Commands

| OPERATION | BINARY VALUE | | | | | | | | | | | | | | | MNEMONIC | HEX CODE |
|---|---|---|---|---|---|---|---|---|---|---|---|---|---|---|---|---|---|
| LOAD CONSTANT TO AOP    | 1 | 0 | 0 | $A_1$ | $A_2$ | $A_3$ | C | C | C | C | C | 0 | C | 0 | C | C | LCN | N/A |
| AOP ADDED WITH CONSTANT | 1 | 0 | 0 | $A_1$ | $A_2$ | $A_3$ | C | C | C | C | C | 0 | C | 1 | C | C | ACN | N/A |
| AOP ORED WITH CONSTANT  | 1 | 0 | 0 | $A_1$ | $A_2$ | $A_3$ | C | C | C | C | C | 1 | C | 0 | C | C | OCN | N/A |

$A_1 A_2 A_3$ = AOP REG. SELECT  C = VALUE OF CONSTANT.

Table F

Memory Commands

| OPERATION | BINARY VALUE | | | | | | | | | | | | | | | MNEMONIC | HEX CODE |
|---|---|---|---|---|---|---|---|---|---|---|---|---|---|---|---|---|---|
| MEMORY WRITE            | 1 | 0 | 1 | $A_1$ | $A_2$ | $A_3$ | 1 | 0 | 0 | 0 | 0 | 0 | 0 | 0 | $A_0$ | MWT | N/A |
| INCREMENT SP ADDRESS    | 1 | 0 | 1 | 0 | 0 | 0 | 0 | 1 | 0 | 0 | 0 | 0 | 0 | 0 | 0 | IMA | A100 |
| DECREMENT SP ADDRESS    | 1 | 0 | 1 | 0 | 0 | 0 | 0 | 0 | 0 | 0 | 1 | 0 | 0 | 0 | 0 | DMA | A008 |
| MEMORY WRITE & INC      | 1 | 0 | 1 | $A_1$ | $A_2$ | $A_3$ | 1 | 1 | 0 | 0 | 0 | 0 | 0 | 0 | $A_0$ | WIA | N/A |
| MEMORY WRITE & DEC      | 1 | 0 | 1 | $A_1$ | $A_2$ | $A_3$ | 1 | 0 | 0 | 0 | 0 | 1 | 0 | 0 | $A_0$ | WDA | N/A |
| SET SP TEST MODE        | 1 | 0 | 1 | 0 | 0 | 0 | 0 | 1 | 0 | 0 | 0 | 0 | 0 | 0 | 0 | SPT | A080 |
| RFU                     | 1 | 0 | 1 | 0 | 0 | 0 | 0 | 0 | 1 | 0 | 0 | 0 | 0 | 0 | 0 | —   | A040 |
| LOAD REQUESTING CHANNEL | 1 | 0 | 1 | 0 | 0 | 0 | 0 | 0 | 0 | 1 | 0 | 0 | 0 | 0 | 0 | LRC | A020 |
| LOAD INDEX REG. WITH AOP | 1 | 0 | 1 | $A_1$ | $A_2$ | $A_3$ | 0 | 0 | 0 | 1 | 1 | 0 | 0 | 0 | $A_0$ | LIR | N/A |
| SET MODULE BAD PARITY   | 1 | 0 | 1 | 0 | 0 | 0 | 0 | 0 | 0 | 1 | 0 | 0 | 1 | 0 | 0 | MBP | A004 |
| RFU                     | 1 | 0 | 1 | 0 | 0 | 0 | 0 | 0 | 0 | 0 | 0 | 0 | 1 | 0 | — | | A002 |

$A_0 A_1 A_2 A_3$ = AOP REG. SELECT

Table G

Test Commands

| OPERATION | BINARY VALUE | | | | | | | | | | | | | | | MNEMONIC | HEX CODE |
|---|---|---|---|---|---|---|---|---|---|---|---|---|---|---|---|---|---|
| TEST FOR ZERO | 1 | 1 | 0 | $A_1$ | $A_2$ | $A_3$ | 0 | 0 | 0 | 1 | T | T | T | T | T | $A_0$ | TFZ | N/A |
| TEST FOR ONE  | 1 | 1 | 0 | $A_1$ | $A_2$ | $A_3$ | 0 | 0 | 1 | 0 | T | T | T | T | T | $A_0$ | TFO | N/A |
| RETURN        | 1 | 1 | 0 | 0 | 0 | 0 | 1 | 0 | 0 | 0 | 0 | 0 | 0 | 0 | 0 | RTN | C200 |

$A_0 A_1 A_2 A_3$ = AOP REG. SELECT
TTTTT = TEST MUX INPUT.

Table H

Test Parameters

| MNEMONIC | FUNCTION | HEX CODE | DESCRIPTION |
|---|---|---|---|
| TAHR  | HDTSRQ+00    | 00 | ADAPTER HARDWARE REQUEST |
| TBCA  | SHRCOM+00    | 01 | BUS CYCLE ACTIVE |
| TRSP  | BSRSVP+30    | 02 | BUS RESPONSE REQUIRED |
| TEQZ  | ALUEQZ+00    | 03 | ALU OUTPUT EQUALS 00 |
| TEQF  | ALUEQF+00    | 04 | ALU OUTPUT EQUALS FF |
| TCOT  | ALUCOT+00    | 05 | ALU CARRY OUT |
| TREQ  | CREREQ+00    | 06 | CHANNEL REQUEST |
| TACK  | ACKRSP+00    | 07 | BUS ACK RESPONSE |
| TAX0  | ALUAX0−00    | 08 | AOP MULTIPLEXER, BIT 0 |
| TAX1  | ↓1           | 09 | ↓ BIT 1 |
| TAX2  | ↓2           | 0A | ↓ BIT 2 |
| TAX3  | ↓3           | 0B | ↓ BIT 3 |
| TAX4  | ↓4           | 0C | ↓ BIT 4 |
| TAX5  | ↓5           | 0D | ↓ BIT 5 |
| TAX6  | ↓6           | 0E | ↓ BIT 6 |
| TAX7  | ALUAZ2−00    | 0F | AOP MULTIPLEXER, BIT 7 |
| TORZ  | ORCAR3−00    | 10 | OFFSET RANGE ZERO |
| TRG2  | EORC(××)+00  | 11 | RANGE ZERO |
| TSBS  | SBSOBS+00    | 12 | SINGLE BYTE STORED |
| TSAWW | SPAWRP+00    | 13 | SP ADDRESS WRAPAROUND |
| TADB  | BUSY(××)+00  | 14 | ADAPTER BUSY |
| TNDR  | NDTSRQ+00    | 15 | NON-DATA SERVICE REQUEST |
| TORH  | OFRNGZ−00    | 16 | OFFSET RANGE HISTORY |

Table H-continued

| MNEMONIC | FUNCTION | Test Parameters HEX CODE | DESCRIPTION |
|---|---|---|---|
| TDCN | MYDCNN+00 | 17 | MY DATA CYCLE NOW |
| TBSY | BDRBS+00 | 18 | BUS DATA REGISTER BUSY |
| TUBR | UBRO(XX)+00 | 19 | UNSOLICITED BUS REQUEST |
| TINT | RESIN1+00 | 1A | RESUME INTERRUPT |
| TNAK | NAKRS P+00 | 1B | NAK RESPONSE |
| TBKT | BSAD23+00 | 1C | BYTE MODE |
| TATY | BSPYCK+00 | 1D | BUS PARITY CHECK |
| TNBR | NOHIRQ+00 | 1E | NO BUFFER REQUEST |
| TFDR | FDTSRQ+00 | 1F | FIRMWARE DATA SERVICE REQUEST |

Table I

Branch Commands

| OPERATION | BINARY VALUE | MNEMONIC | HEX CODE |
|---|---|---|---|
| GO TO | 1 1 1 1 A A A A A A A A A A A A | GTO | FXXX |
| LOAD RETURN | 1 1 1 0 A A A A A A A A A A A A | LRA | EXXA |

A = BRANCH ADDRESS

Table J

AOP Multiplexer Input Selection

| A₁ | A₁ | A₁ | A₁ | SELECTED REGISTER (SRIA)* | MNEMONIC | SELECTED REGISTER (SRIA) | MNEMONIC |
|---|---|---|---|---|---|---|---|
| 0 | 0 | 0 | 0 | ACCUMULATOR | AACU | ACCUMULATOR | AACU |
| 0 | 0 | 0 | 1 | SCRATCH PAD MEMORY | ASPM | SCRATCH PAD MEMORY | ASPM |
| 0 | 0 | 1 | 0 | SCRATCH PAD ADDRESS | ASPA | SCRATCH PAD ADDRESS (INDEXED) | ASPA |
| 0 | 0 | 1 | 1 | INDEX REGISTER | AIDX | SCRATCH PAD ADDRESS (INDEXED) | ASPA1 |
| 0 | 1 | 0 | 0 | ADAPTER DATA REGISTER | AAD0 | ADAPTER DATA REGISTER | AAD0 |
| 0 | 1 | 0 | 1 | ADAPTER DEVICE ID | AAD1 | ADAPTER DATA COUNTER | AAD1 |
| 0 | 1 | 1 | 0 | ADAPTER STATUS 1 | AAD2 | ADAPTER COMMAND REGISTER | AAD2 |
| 0 | 1 | 1 | 1 | ADAPTER STATUS 2 | AAD3 | ADAPTER UNIT SELECT | AAD3 |
| 1 | 0 | 0 | 0 | BUS ADDRESS OUT | ABUS1 | BUS REGISTER IN | ABUS1 |
| 1 | 0 | 0 | 1 | BUS DATA OUT 1 | ABUS2 | BUS DATA IN 1 | ABUS2 |
| 1 | 0 | 1 | 0 | BUS DATA OUT 2 | ABUS3 | BUS DATA IN 2 | ABUS3 |
| 1 | 0 | 1 | 1 | BUS RANGE OUT | ABUS4 | BUS ADDRESS IN | ABUS4 |
| 1 | 1 | 0 | 0 | ADAPTER RFU | AAD4 | RESET ADAPTER INDEX COUNT | AAD4 |
| 1 | 1 | 0 | 1 | ADAPTER RFU | AAD5 | ADAPTER STATUS & FIFO CLEAR | AAD5 |
| 1 | 1 | 1 | 0 | ADAPTER RFU | AAD6 | ADAPTER SEEK PULSE | AAD6 |
| 1 | 1 | 1 | 1 | ADAPTER RFU | AAD7 | ADAPTER DATA BYTE TAKEN | AAD7 |

*SRIA AND SRIA = STORE RESULT IN SELECTED AOP REGISTER.

Table K

BOP MUX Input

| B₀ | B₁ | SELECTED DATA INPUT | MNEMONIC |
|---|---|---|---|
| 0 | 0 | ACCUMULATOR | BACU |
| 0 | 1 | SCRATCH PAD MEMORY | BSPM |
| 1 | 0 | BUS STATUS<br>. 0-3 (ZEROS)<br>. 4 BUS YELLOW IND.<br>. 5 BUS NAK<br>. 6 BUS PARITY ERROR<br>. 7 BUS RED IND. | BBST |
| 1 | 1 | BOE CONSTANT | |

The instructions of Tables C-G and I include A-fields comprised of bits A₀-A₃. Each of the A-fields refer to registers providing data to the AMUX 72 of FIG. 4. Table D further includes instructions having a B-field comprised of bits B₀ and B₁. The B-field is defined by Table K, wherein it is indicated that the BMUX may be selected to the accumulator 75, the scratchpad memory unit 81, to the bus logic unit 128 by way of cable 88 for bus status inputs, and to the firmware control system by way of cable 86 for a constant value input. Where two-byte arithmetic is being performed by the arithmetic unit 85, the C-field of Table D is used to provide a carry-in feature wherein the result of a previous AU 85 operation may be used in a subsequent operation. The F-field of the instructions of Table D provides a command to store the result of the AU 85 operation into a register designated by the A-field. The remaining low-order bits of Table D refer to the mode select bits for commanding the AU 85 to perform the indicated operation.

The instruction set of Table E includes a C-field for constant values, and the low-order bits of the instructions of Table F provide for the generation of strobes for loading the registers indicated by the A-field thereof. The instruction set of Table G includes test or T-fields which are defined by the entries of Table H. The A-field of Table I refers to the address of the microprogram to which a transfer is to be made.

Table L provides a cross-reference between the mnemonics used in the Tables A-K and the component parts of the system as described in FIGS. 4-8.

TABLE L

| Microinstruction Mnemonic | Hardware Device |
|---|---|
| RFU | Reserved For User |
| Bus Logic | Bus logic unit 128 |
| ALU | Arithmetic Unit 85,<br>Arithmetic Control Unit 91,<br>Accumulator 75 |
| Accumulator | Accumulator 75 |
| Scratchpad Memory | Scratchpad Memory Unit 81 |
| Scratchpad Address | Scratchpad Address Counter 79 |
| BLT | Bus Logic Tests |
| Address Counter | Bus Address Counters 300,<br>302 and 303 |
| Range Counter | Range Counters 306-309 |
| AOP | AMUX 72 |

TABLE L-continued

| Microinstruction Mnemonic | Hardware Device |
|---|---|
| BOP | BMUX 84 |
| SP Address | Scratchpad Address Counter |
| Memory | Scratchpad memory Unit 81 |

FIG. 7

Figure 7A:
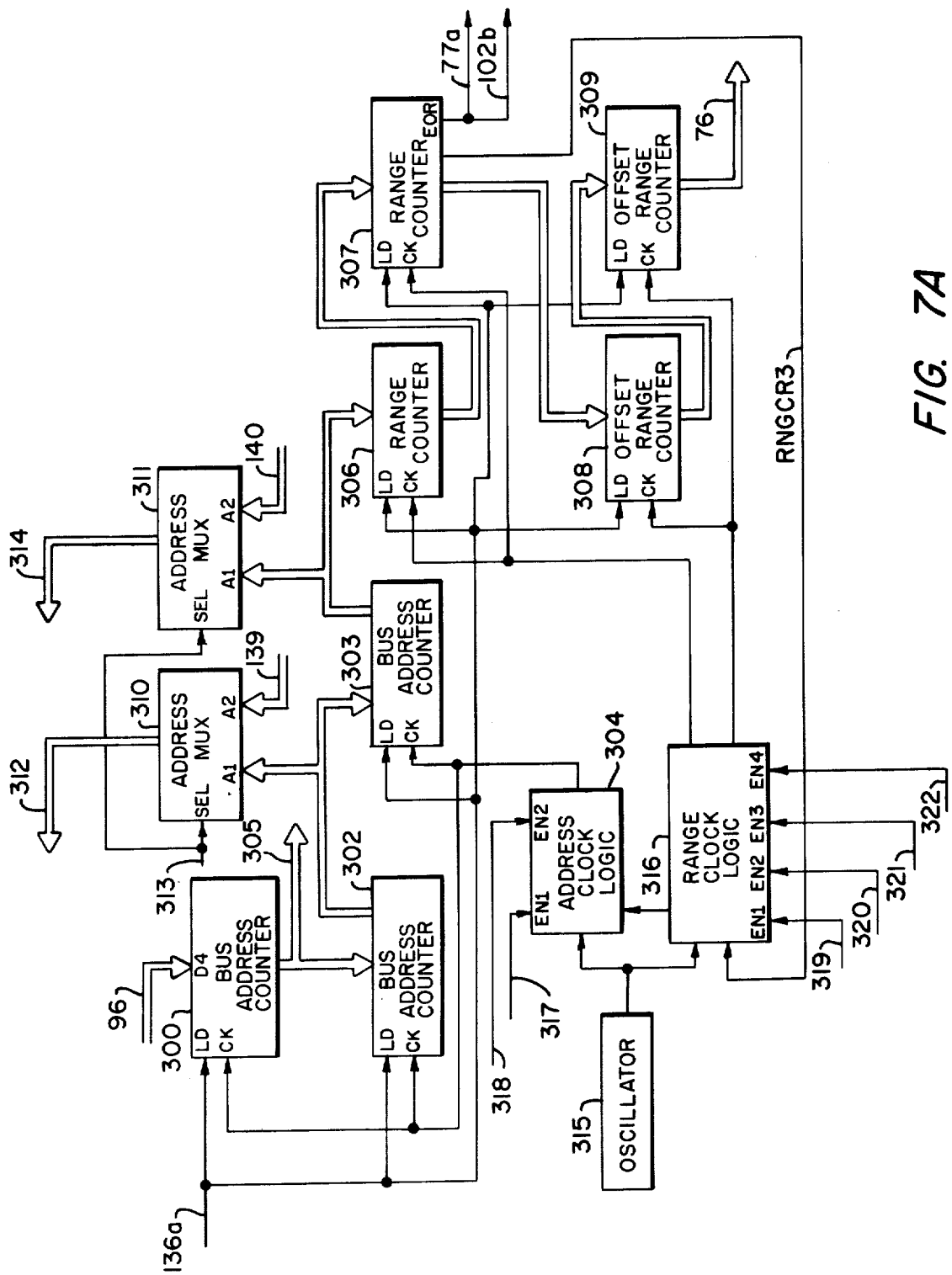
FIGS. 7A and 7B are a detailed functional block diagram of the range and offset range control unit of FIGS. 4 and 5.
Figure 7B:
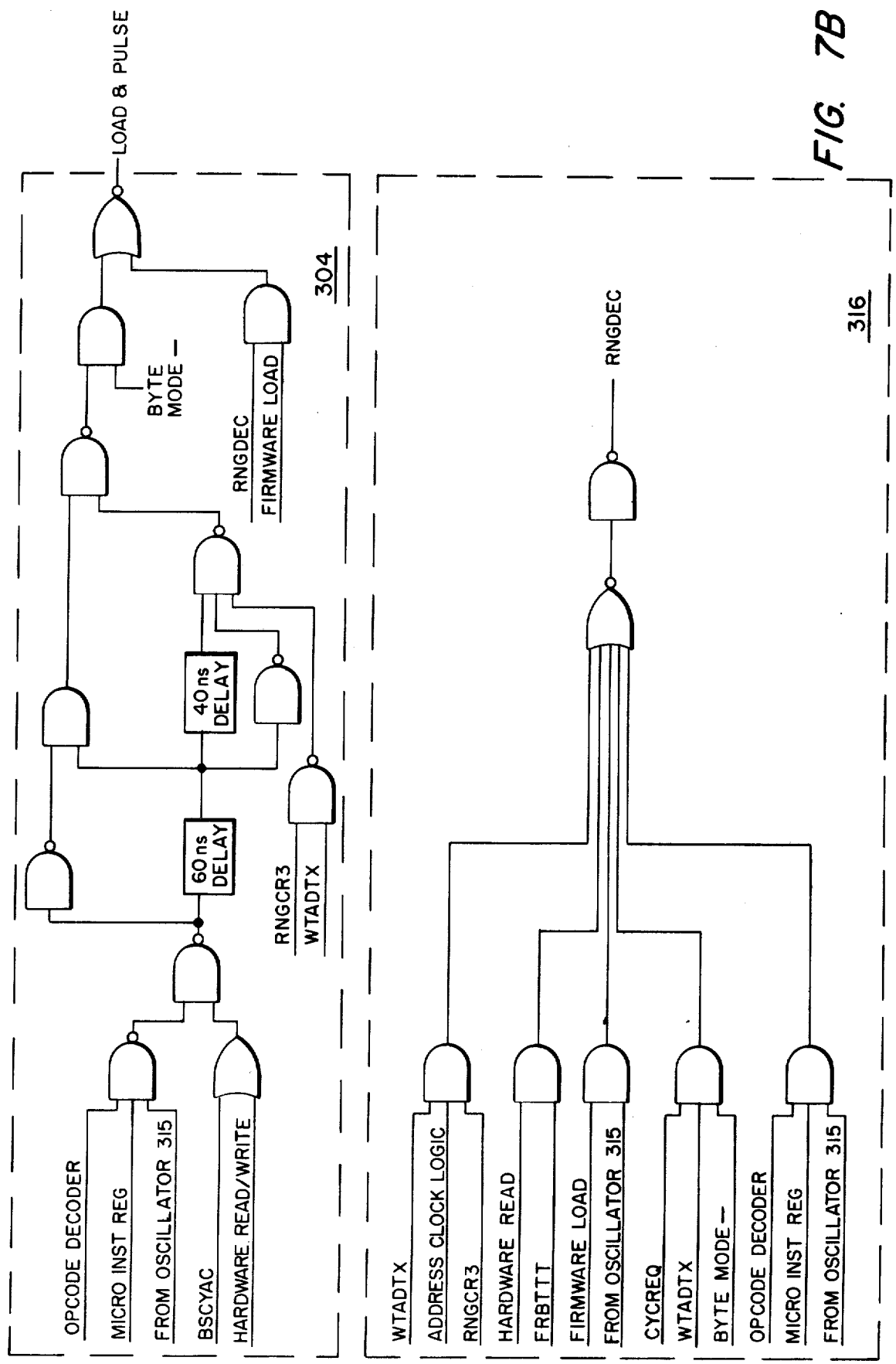

FIG. 7 illustrates in a more detailed functional block diagram form the range and offset range control unit 77, the address multiplexer 133 and the bus address register 136.

A bus address counter 300 receives data from AU 85 on an 8-bit data cable 96, and load commands from firmware on control line 136a. The clock input to counter 300 is connected to the clock input of a bus address counter 302, to the clock input of a bus address counter 303, and to the output of an address clock logic unit 304. The 8-bit output of the counter 300 is applied to the megabus 13 by way of a data cable 305, and to the data input of counter 302.

In the preferred embodiment described herein, address counters 300, 302 and 303 form a 24-bit memory address up counter.

The load input of counter 302 is connected to control line 136a and to the load inputs of counter 303, a range counter 306, a range counter 307, an offset range counter 308, and an offset range counter 309. The counters 306 and 307 form a 16-bit range down counter, and the counters 308 and 309 form a 16-bit offset range down counter. The 8-bit output of counter 302 is applied to the A1 input of an address multiplexer 310, and to the data input of counter 303. The 8-bit output of counter 303 is applied to the A1 input of an address multiplexer 311, and to the data input of range counter 306.

Address multiplexer 310 also receives at its A2 input data from data register 82 of FIG. 4 by way of cable 139. The 8-bit output of the multiplexer is applied to a data cable 312 leading to megabus 13. The select (SEL) input to multiplexer 310 is supplied by the bus logic unit 128 on a control line 313.

The address multiplexer 311 also receives data from the data register 82 by way of data cable 140, and supplies 8 bits of data to a data cable 314 leading to megabus 13. The SEL input to multiplexer 311 is connected to the SEL input of multiplexer 310.

The 8-bit output of range counter 306 is connected to the input of range counter 307. The output of counter 307 in turn is applied to the input of counter 308, and the 8-bit output of counter 308 is applied to the input of counter 309. The 8-bit output of counter 309 in turn is applied to control line 76 leading to the A3 input of AMUX 72.

The clock source for the system of FIG. 7 is a 4.0 MHz oscillator 315, which supplies clock signals to address clock logic unit 304 and a range clock logic unit 316. The logic unit 304 receives enable signals from bus logic unit 128 and from firmware on control lines 317 and 318, respectively. In response thereto, the logic unit 304 issues increment commands to counters 300, 302 and 303.

The range clock logic unit 316 receives enable signals from bus logic unit 128, the firmware and the data control unit 113 by way of control lines 319-321, respectively. Further, the control unit 113 supplies an offset range enable signal to the EN4 input of logic unit 316.

When enabled, the logic unit 316 supplies decrement commands to counters 306-307 or counters 308-309.

If data is to be read from or written onto a disk device controlled by the device adapter 14, the CPU 11 of FIG. 1 supplies a channel destination number and a function code to the address shift register 70 of FIG. 4 as before described. In addition, the CPU supplies configuration words A and B, a main memory address, a range count, an offset range count, a task and a status request to the data register 82. The firmware accesses the function code in register 70 to detect the address in scratchpad memory unit 81 in which the data of register 82 is to be stored.

The firmware then serially shifts seven bytes of data a byte at a time from scratchpad memory unit 81 into address counters 300, 302 and 303, range counters 306 and 307, and offset range counters 308 and 309. Upon completion of the load operation, a main memory address resides in address counters 300, 302 and 303, a range count in counters 306-307, and an offset range count in counters 308-309.

In a read operation wherein data is to read from the disk device and written into main memory unit 12, the megabus 13 is supplied both data and a 24-bit address in main memory in which the data is to be written. More particularly, the data resides in the bus data register 100. When a data word comprising two data bytes is to be transferred from the MPDC 10 to the megabus 13, the bus logic unit 128 selects the multiplexers 310 and 311 to the A1 inputs. The main memory module to which the data is to be transferred thereby is made available to the megabus 13. The main memory address in which the transferred data is to be written thereupon is supplied from address counters 300, 302 and 303 to cables 305, 312 and 314 respectively. Each time the main memory unit issues an acknowledgement signal and accepts data into the indicated address, the main memory address in counters 300, 302 and 303 is incremented by two.

During a data transfer from device adapter 14 to MPDC 10, the data control unit 113 of FIG. 5 issues a logic one signal to control line 322 each time a data byte is transferred. The range clock logic unit 316 is enabled thereby to decrement the offset range counters 308 and 309. The output of counter 309 is applied by way of cable 76 to the AMUX 72 and the AU 85 of FIG. 4. As long as the offset range count is greater than zero, the data bytes are ignored and are not transferred to megabus 13. When the offset range count is exhausted, however, data transfer control switches from the offset range counters to the range counters 306 and 307. More particularly, the data control unit 113 disables the EN4 input to logic unit 316, and thereafter issues enable signals to the EN3 input of the logic unit by way of control line 321. The logic unit 316 in response thereto decrements the range counters each time a data byte is transferred from the device adapter 14 to the MPDC 10. Each of the data bytes transferred after control switches to the range counters are transferred to megabus 13.

When the range count in counters 306 and 307 is exhausted, counter 307 issues an end-of-range (EOR) signal on lines 77a and 102b as before described.

A write operation wherein data is read from main memory and written onto a disk device is accomplished in a manner similar to that of the read operation. A channel destination number and a function code are loaded into the address shift register 70, and data including configuration words A and B, a main memory address, a range count, a task and a status request are loaded from data register 82 into scratchpad memory unit 81. An offset range count is not used in writing data onto a disk device.

After the device adapter 14 has positioned the write heads of the disk device, and issued a hardware service request signal on line 110 of FIG. 4, firmware loads two dummy bytes into the offset range counters 308 and 309, a range count into counters 306 and 307, and a main memory address into counters 300, 302 and 303. The firmware further transfers an MPDC channel number from scratchpad memory unit 81 to the bus data register 100, and thence through data multiplexer 122 to megabus 13. Under firmware control, the bus logic unit 128 issues a response-required data request to main memory, and selects the multiplexers 310 and 311 to their A2 inputs to supply the main memory channel number in address shift register 70 to megabus 13. The bus logic unit thereafter selects the multiplexers 310 and 311 to their A1 inputs to supply the main memory address to megabus 13.

Each time the bus logic unit 128 requests an additional data byte from main memory, the logic unit also issues a logic one signal to control line 319 to enable the range clock logic unit. The range counters 306 and 307 thereupon are decremented by one. Further, after a data request and a main memory address have been issued to megabus 13 and accepted by the main memory unit 12, the bus logic unit 128 enables the EN1 input of the address clock logic unit 304. In response thereto, the address counters 300, 302 and 303 are incremented by two.

When the range count has been exhausted, counter 307 issues an EOR signal to lines 77a and 102b as before described. The data transfer from main memory unit 12 to disk device 14 thereby is designated complete.

The system of FIG. 7 represents a significant improvement over prior firmware data transfer controls, which required too much time for bookkeeping. Previously, bookkeeping parameters were stored in memory, and had to be retrieved and restored when a parameter was updated. In the instant hardware/firmware invention, the bus address counters 300, 302 and 303, the range counters 306-307, and the offset range counters 308-309 may be loaded serially to substantially decrease the number of microinstructions required in a load operation. Further, during a data transfer, the counters may be incremented or decremented under hardware control to accommodate an increased data flow rate.

FIG. 8

Figure 8:
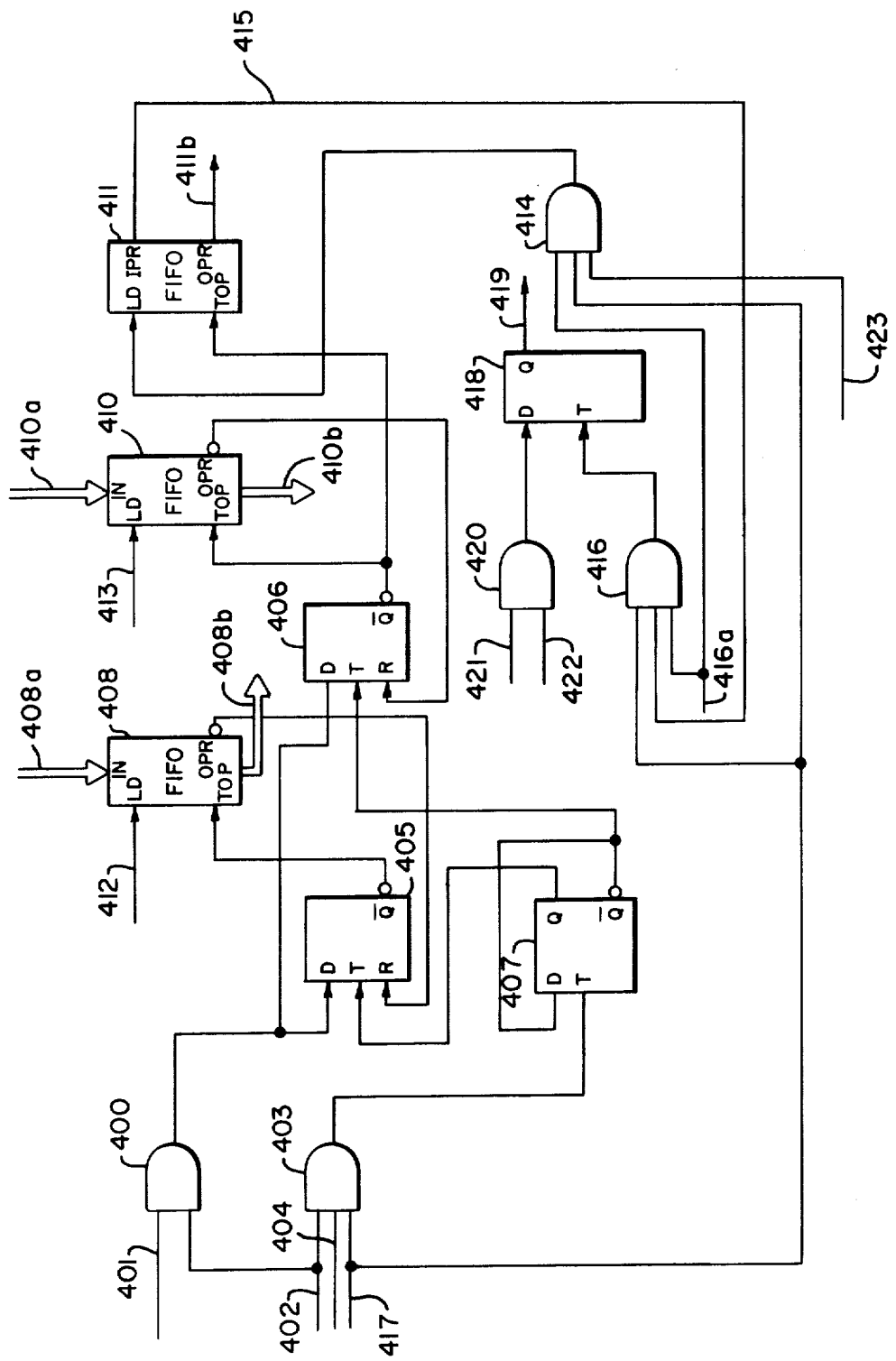
FIG. 8 is a detailed logic diagram of the data FIFO unit of FIG. 4.

FIG. 8 illustrates in detailed logic diagram form the FIFO unit 131 of FIG. 5.

In referring to the electrical schematics illustrated in the Figures, it is to be understood that the occurrence of a small circle at the input of a logic device indicates that the input is enabled by a logic zero. Further, a circle appearing at an output of a logic device indicates that when the logic conditions for that particular device are satisfied, the output will be a logic zero.

An AND gate 400 has one input connected to a control line 401, and a second input connected to both a control line 402 and one input of an AND gate 403. A second input to gate 403 is connected to a control line 404 leading to line 110 of FIG. 4, and a third input is connected to a control line 405.

The output of gate 400 is connected to the D input of a flip-flop 405, and to the D input of a flip-flop 406. The output of gate 403 is applied to the trigger (T) input of a flip-flop 407.

The trigger input to flip-flop 405 is connected to the Q output of flip-flop 407, and the reset input of flip-flop 405 is connected to the output register (OPR) output of a 16-word by eight bit FIFO 408. When the OPR output is at a logic 1 level, the output register is filled. Further, when the OPR output is at a logic zero level, the output register is empty. The $\overline{Q}$ of flip-flop 405 is applied to the transfer on parallel (TOP) input of FIFO 408.

The $\overline{Q}$ output of the flip-flop 407 is connected to its D input, and to the T input of flip-flop 406. The reset input to flip-flop 406 is connected to the OPR output of a 16-word by 8 bit FIFO 410. The $\overline{Q}$ output of the flip-flop 406 is connected to the TOP input of FIFO 410, and to the TOP input of a 16-word by 8 bit FIFO 411.

The load (LD) input to FIFO 408 is connected to a control line 412, and the data input to the FIFO is connected to a data cable 408a leading from data register 82 of FIG. 4. The parallel data output of FIFO 408 is connected to a data cable 408b leading to cable 94. The LD input to FIFO 410 is connected to a control line 413, and the data input to the FIFO is connected to a data cable 410a leading from data register 82. The parallel output of the FIFO is applied through a data cable 410b to cable 94.

The LD input to FIFO 411 is connected to the output of an AND gate 414. The input register (IPR) output of the FIFO 411 is connected by way of a control line 415 to one input of an AND gate 416. The IPR output is at a logic one level when the input register is empty, and at a logic zero level when the input register is filled. The OPR output of FIFO 411 is applied by way of a control line 411b to line 102b of FIG. 5.

A second input to gate 416 is connected to a third input to gate 403, and to a control line 417. A third input to gate 416 is connected to one input of gate 414, and to a control line 416a. The output of gate 416 is applied to the T input of a flip-flop 418, and Q output of which is applied to a control line 419 leading to the bus logic unit 128.

The D input to flip-flop 418 is connected to the output of an AND gate 420, one input of which is connected to a control line 421. A second input to gate 420 is connected to a control line 422.

A second input to gate 414 is connected to control line 417, and a third input to gate 414 is connected to a control line 423.

In a write operation wherein data is read from the main memory 12 of FIG. 1 and written into a disk device serviced by the device adapter 14, a problem may arise during the transfer of a sequence of data bytes. If a request for additional data is not issued by the MPDC 10 when a data byte is received from the main memory unit 12, other system devices may intercede to communicate with the memory unit. The MPDC thus would not be able to maintain a transfer rate to the disk device. If a request for data is made without regard for empty buffer locations, data stored in the data register 82 of FIG. 4 may be lost before the full range of data to be transferred from main memory has been written upon the disk device. The logic system of FIG. 8 provides a means for obviating such a problem.

In operation, when data is to be transferred from the main memory unit 12 to the MPDC 10, firmware issues a logic 1 signal to control line 417. If the megabus 13 is clear for a data transfer, the bus logic unit 128 of FIG.

5 issues a logic 1 signal to control line 422 to indicate that the megabus 13 is ready. Further, until the data transfer is completed, the control line 421 leading from the range and offset range control unit 77 remains at a logic 1 level to indicate that the range count has not been exhausted. The output of gate 420, therefore, is at a logic 1 level which is applied to the D input of the flip-flop 418.

Prior to any data being transferred to the MPDC 10, the FIFO's 408, 410 and 411 are empty. The IPR output of FIFO 411 thus is at a logic 1 level indicating that the input register is empty. Further, the bus logic unit 128 supplies a logic 1 signal to control line 416a during a time period when the MPDC 10 is not using the megabus 13 in servicing a bus cycle request. Thus, the output of the gate 416 is at a logic 1 level to toggle the flip-flop 418, thereby issuing a bus cycle request on line 419 leading to the bus logic unit 128.

In generating a bus cycle request for output on the megabus 13, the bus logic unit 128 issues a logic 1 signal to control line 423 to indicate that an MPDC 10 bus cycle request has been issued. The firmware control signal on control line 417 thereupon is applied through gate 414 to the load input of FIFO 411. A dummy byte thereby is loaded into the FIFO under firmware control, and the IPR output of the FIFO transitions to a logic zero level. It is thus seen that each time a cycle request is generated at the Q output of flip-flop 418 to request additional data from main memory unit 12, a dummy byte is loaded into the FIFO 411.

When the main memory unit responds to the bus cycle request, the bus logic unit 128 issues a logic zero signal to control line 423 and a logic 1 signal to control lines 412 and 413. Data bytes supplied by the main memory unit 12 to the megabus 13 thereby are loaded from data cables 408a and 410a into FIFO 408 and FIFO 410, respectively. The bus logic unit 128 thereupon transistions the control line 416a to a logic 1 level to indicate that the bus cycle request for data has become inactive. If the dummy data byte loaded into the FIFO 411 has dropped from the input register into the FIFO stack, the IPR output of the FIFO will transition to a logic 1 level to again trigger the flip-flop 418 to issue another cycle request on control line 419.

The above-described process continues until the FIFOs 408 and 410 are filled as indicated by the output register (OPR) outputs of the FIFOs. The FIFO 411 thus serves to indicate in advance that if a data word is loaded into the data FIFOs 408 and 410, the data word will pass into the FIFO stack before another data word can be requested of main memory unit 12. More particularly, each time a data request is made to main memory unit 12 a dummy byte is loaded into the FIFO 411. If the dummy byte has passed into the FIFO stack before a next data request is made to main memory, then the time delays are such that it is known that the data bytes in the FIFOs 408 and 410 shall pass into the respective FIFO stacks before additional data bytes are received from main memory.

When the FIFO units 408 and 410 are filled with data, the OPR outputs of the FIFO units are at a logic zero level indicating a filled condition. Further, the IPR output of FIFO 411 is at a logic zero level. The gate 416 thus is disabled, and the generation of cycle requests on control line 419 is terminated.

When the OPR output of FIFO 411 transitions to a logic 1 level to indicate that the data FIFOs 408 and 410 are filled, the hardware control unit 108 issues a strobe to the adapter logic unit 29. The logic unit 29 in turn issues a strobe to the device adapter 14 to indicate that the data FIFOs may be emptied. The device adapter 14 thereupon issues a logic 1 hardware service request signal to control line 404, and the firmware in response thereto issues a hardware enable signal to control line 402. The firmware further issues a logic 1 signal to control line 401 to indicate that a write on disk operation has been initiated.

The flip-flop 407 is triggered by the output of gate 403, and toggles between set and reset conditions. For example, if the flip-flop is in a set condition, it resets upon being triggered. Further, if the flip-flop is in a reset condition, it sets upon being triggered. The Q and $\bar{Q}$ outputs of the flip-flop thereby alternately trigger the flip-flops 405 and 406 respectively. If the flip-flop 405 is triggered, the $\bar{Q}$ output of the flip-flop is applied to the TOP input of the FIFO 408. In response thereto, the data byte in the output register of the FIFO is supplied to data cable 408b leading to the device adapter 14. When the output register is emptied, the OPR output of the FIFO 408 immediately resets the flip-flop 405. In like manner, when the flip-flop 406 is triggered, the $\bar{Q}$ output of the flip-flop supplies an unload signal to the FIFO 410. When the output register of the FIFO is emptied, the OPR output of the FIFO resets the flip-flop 406. It is apparent that the flip-flop 407 in combination with the flip-flops 405 and 406 alternately selects data bytes from FIFO 408 and FIFO 410. The data bytes transmitted to the device adapter 14 thus are comprised of a left byte from FIFO 408 and a right byte from FIFO 410.

Each time the FIFO 410 is unloaded, the FIFO 411 also is unloaded. As soon as the input register to the FIFO 411 is emptied, the IPR output of the FIFO transitions to a logic 1 level to generate a cycle requests as before described. As data bytes are loaded into the FIFOs 408 and 410, the FIFOs again are unloaded. Before a cycle request for a next data byte is requested from main memory unit 12, however, the input register to the FIFO 411 must be emptied.

Two conditions may occur which may prevent the generation of a cycle request on control line 419 when the input register to FIFO 411 is empty. When the range count indicating the total number of data bytes to be transferred from main memory unit 12 to the device adapter 14 is exhausted, line 421 transitions to a logic zero. Further, if an unsolicited bus request or other data occurs on the megabus 13 to cause the MPDC 10 to issue a NAK, the gate 420 is disabled. The Q output of the flip-flop 418 thus does not transition to a logic 1 level when triggered, and no further cycle requests may be made.

FIG. 9

Figure 9:
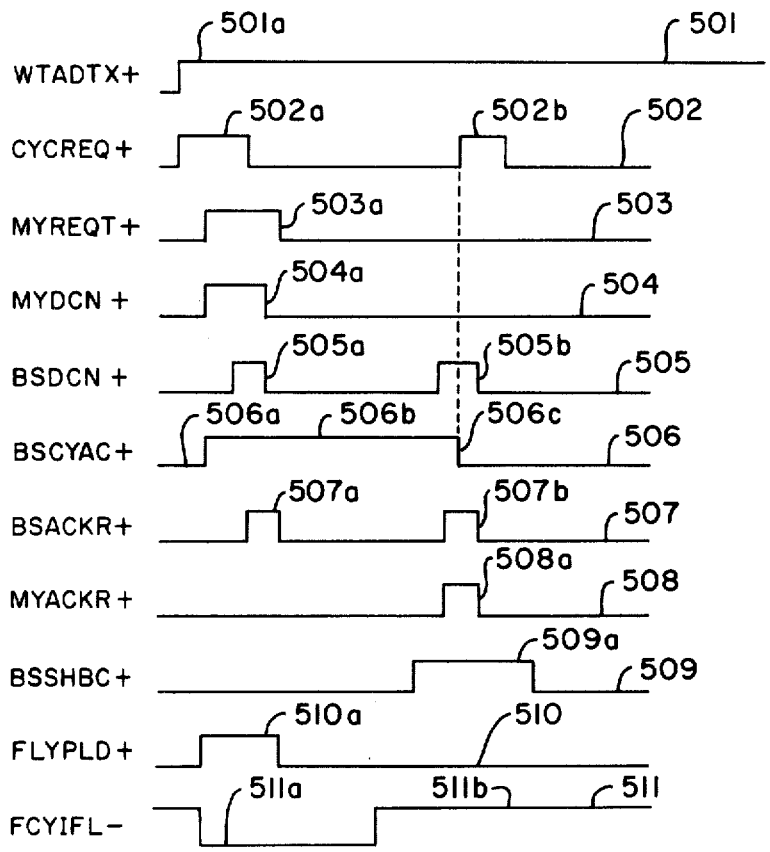
FIG. 9 is a timing diagram of the operation of the system of FIG. 8.

FIG. 9 is a timing diagram illustrating in graphic form the operation of the system of FIG. 8.

It is to be understood that the system disclosed herein is comprised of devices in intercommunication on an asynchronous bus. Thus, absolute time values are not disclosed in the description of the timing diagrams of FIGS. 9-11. It is the order of occurrence rather than the absolute time of occurrence which is of primary importance.

Referring to FIG. 9, a waveform 501 illustrates a signal issued by firmware to place the MPDC 10 into a write mode, and a waveform 502 illustrates a cycle request signal issued by the bus logic unit 128 of FIG. 5 in response to firmware commands. A waveform 503 illustrates a bus cycle request made by the MPDC 10 to the megabus 13, and a waveform 504 illustrates a strobe issued by the bus logic unit 128 to set the cycle request logic signals of waveform 502 onto the megabus 13 as indicated by waveform 503. A waveform 505 illustrates a logic signal formed on the megabus 13 in response to the logic signals of waveforms 503 and 504. A waveform 506 illustrates a waveform generated in the MPDC 10 to indicate that the MPDC is busy. A waveform 507 illustrates a logic signal issued by a slave to the megabus 13 in response to a bus request issued by a master device. A waveform 508 illustrates an acknowledgement logic signal issued by the MPDC 10 to the megabus 13 in response to a second-half bus cycle signal from the main memory unit 12 as illustrated by a waveform 509. A waveform 510 illustrates the load signal issued by the gate 414 to the FIFO 411 of FIG. 8, and a waveform 511 illustrates the logical inverse of the input register output of the FIFO 411. A waveform 512 illustrates the logic signal issued by the output register of the FIFO 411 when the data FIFOs 408 and 410 are filled.

In the mnemonics used to describe the waveforms 501-512 in FIG. 9, a plus sign (+) indicates that the condition signified by the mnemonic occurs when the associated waveform is at a logic 1 level. A negative sign (−) indicates that the designated condition occurs when the waveform is at a logic zero level.

Figure 11:
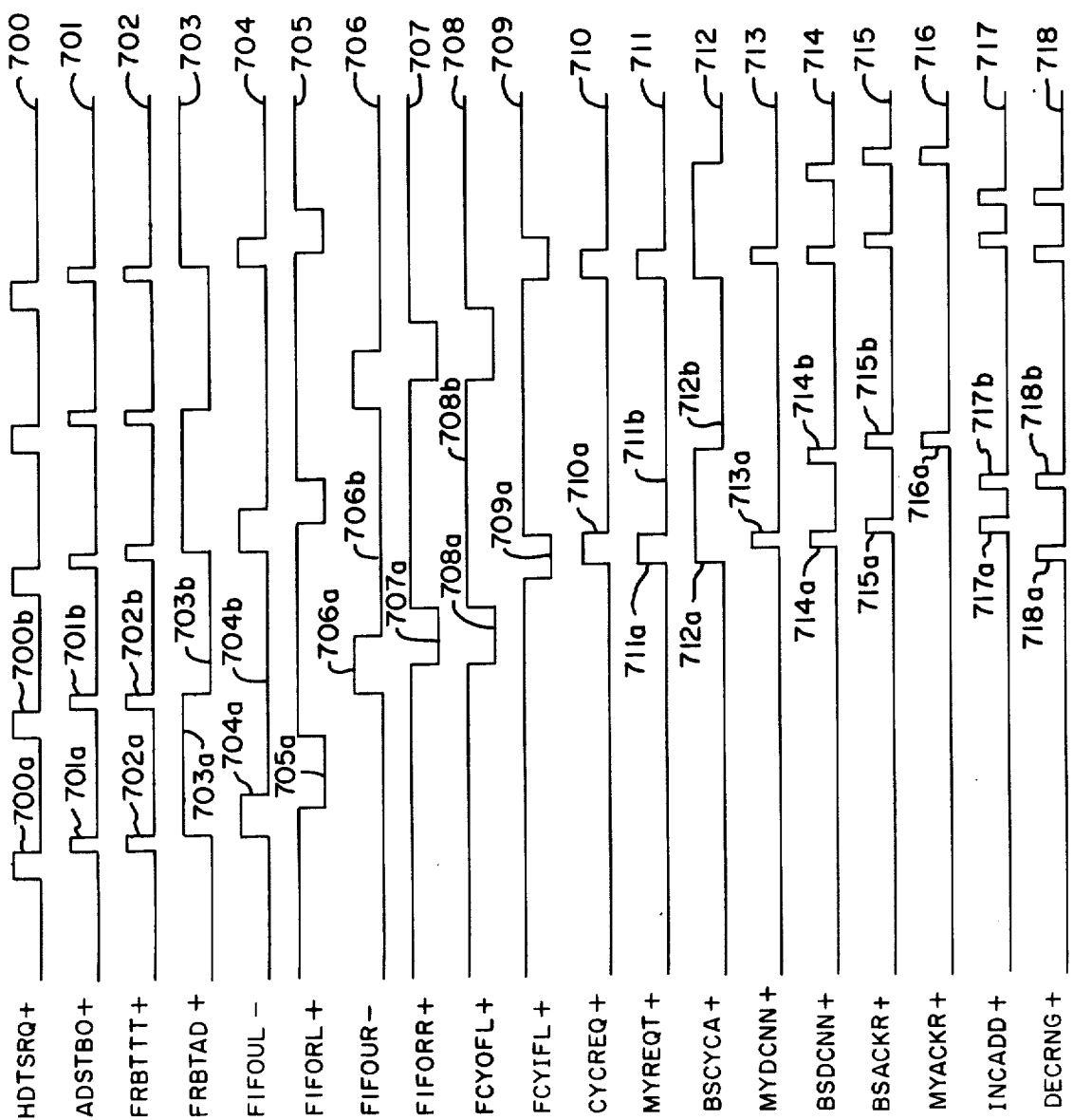
FIG. 11 is a timing diagram of the operation of the system of FIGS. 4–8 during a data transfer from the main memory unit to the disk adapter of FIG. 1.

When data is to be written from main memory unit 12 of FIG. 1 to a disk device serviced by the device adapter 14, firmware transitions the control line 417 of FIG. 8 to a logic 1 level as indicated at 501a of waveform 501. Since the bus cycle is not active as indicated at 506a of waveform 506, the MPDC 10 is not engaged in servicing a previous bus cycle request. Thus the control line 416a is at a logic 1 level, and a logic 1 signal issued by the input register FIFO 411 as illustrated at 511a of FIG. 11 is applied through the gate 416 to trigger the flip-flop 418. The Q output of flip-flop 418 thereupon transitions to a logic one level as illustrated at 502a. The cycle request 502a thereby is placed onto the megabus 13 as control line 419. When a cycle of the megabus 13 is available, the bus logic unit 128 of FIG. 5 will issue a logic 1 pulse 504a to place the cycle request 502a onto the megabus 13 as illustrated by the logic 1 pulse 503a. The signal appearing on the megabus 13 in response to the pulses 503a and 504a is illustrated by a logic 1 pulse 505a of waveform 505.

The bus logic unit 128 issues a logic 1 pulse 506b concurrently with pulse 504a to indicate that the bus cycle is active, i.e., the MPDC 10 is busy. In response thereto, the output of gate 414 transitions to a logic 1 level as illustrated by a logic 1 pulse 510a to load a dummy byte into the FIFO 411. Upon receiving the bus cycle request from the MPDC 10, the main memory unit 12 acknowledges its acceptance of the request by issuing a logic 1 pulse 507a of waveform 507.

When the dummy byte is loaded into the FIFO 411, the waveform 511 transitions to a logic zero level as indicated at 511a. Since gate 416 will be disabled during the time period that waveform 511 remains at a logic zero level, no further bus cycle requests may be made until the waveform again transitions to a logic 1 level.

When the main memory unit 12 has retrieved a requested data word and placed it on the megabus 13, the memory unit issues a logic 1 pulse 509a to indicate that the data is available. Further, the memory unit issues a logic 1 pulse 505b. Upon receiving the pulses 505b and 509a, the bus logic unit 128 issues an acknowledgement logic 1 pulse 508a which appears on the megabus 13 as logic 1 pulse 507b. Upon receiving the pulse 507b, the main memory unit releases the megabus 13 to accommodate another bus cycle request. Upon issuing the pulse 508a, the MPDC 10 is no longer in a bus cycle active state as indicated at 506c. Since the output of the input register of the FIFO 411 is again empty as indicated at 511b, a logic 1 pulse 502b is supplied at the Q output of flip-flop 418 to initiate a next bus cycle request operation.

FIG. 10

Figure 10:
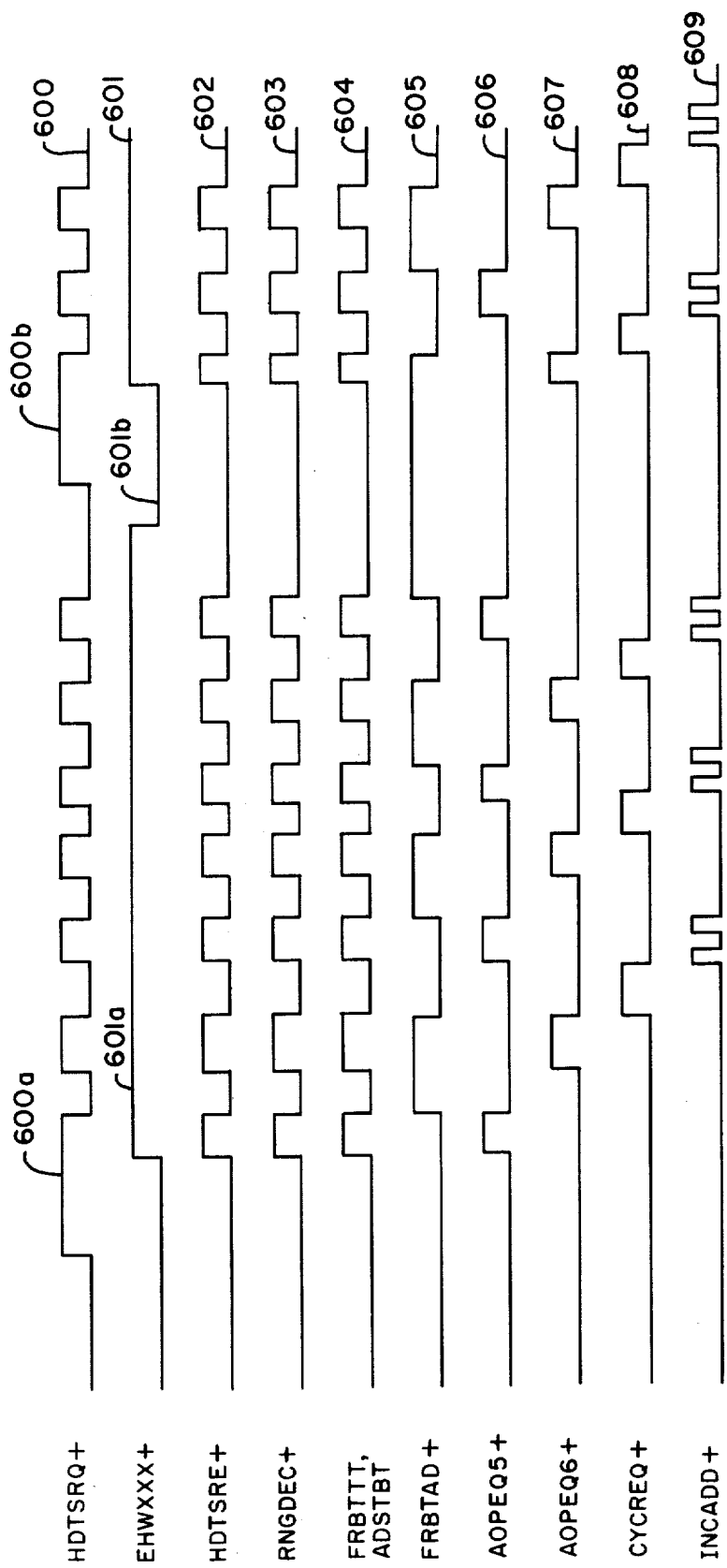
FIG. 10 is a timing diagram of the operation of the system of FIGS. 4–8 during a data transfer from a disk device to the common communication bus.

FIG. 10 is a timing diagram illustrating the operation of the system of FIGS. 4-8 during a data transfer from a disk device to megabus 13.

A waveform 600 illustrates the hardware data service request signal issued by the device adapter 14 to control line 110 of FIG. 4, and a waveform 601 illustrates the hardware enable signal issued by firmware in response to the waveform 600. A waveform 602 illustrates a hardware data service enable signal which is a logic AND of waveforms 600 and 601. Waveform 602 illustrates the enable signal applied by firmware to the EN2 enable input of range clock logic unit 316 of FIG. 7 during diagnostic tests.

A waveform 603 illustrates the output of range clock logic unit 316 in response to the enable signal illustrated by waveform 602. A waveform 604 illustrates the output of gate 403 of FIG. 8, and the output of the adapter logic unit 29 of FIG. 4. A waveform 605 illustrates the inverse to the $\overline{Q}$ output of flip-flop 407 of FIG. 8.

Waveforms 606 and 607 each are formed from waveforms 604 and 605, and indicate the output states of the flip-flop 407. A waveform 608 illustrates the bus cycle request signals issued at the Q output of flip-flop 418 of FIG. 8, and a waveform 609 illustrates the pulse pairs generated by the address clock logic unit 304 each time a cycle request is made as illustrated by waveform 608.

When data is to be read from a disk device, the device adapter 14 of FIG. 4 issues a logic 1 pulse 600a to control line 110 to indicate that a data byte is available for transfer to the MPDC 10. In response thereto, the firmware control system of FIG. 6 issues an enable hardware pulse 601a to the control line 109 of FIG. 4 leading to the hardware control unit 108. As the data byte is transferred from the device adapter 14 to the MPDC 10, the timing signal illustrated by waveform 602 is applied to the range clock logic unit 316 of FIG. 7. In response thereto, the offset range counters 308 and 309 are decremented until the offset range count is exhausted. The range counters 306 and 307 thereafter are decremented as illustrated by the logic 1 pulses of waveform 603.

Each time data bytes are transferred from the device adapter 14 to the MPDC 10, the output of gate 403 as illustrated by the waveform 604 triggers the flip-flop 407. When the Q output of flip-flop 407 is at a logic 1 level, flip-flop 405 is triggered to load a left byte in bus data register 100 for transfer to the megabus 13. This condition is illustrated by the logic 1 levels of waveform 605 and waveform 607. When the $\overline{Q}$ output of the flip-flop 407 transitions to a logic 1 level, the flip-flop 406 is triggered to load a right byte in register 100 for transfer to the megabus 13. This condition is illustrated by the logic zero levels of waveform 605 and the logic 1 levels of waveform 606.

When a data word comprising a left and a right data byte have been formed in the register 100, the bus logic unit 128 under firmware control issues a bus cycle active signal to control line 416a of FIG. 8 to trigger the flip-flop 418. A bus cycle request thereby is generated as illustrated by the logic 1 levels of waveform 608. Each time a busy cycle request is generated, the bus logic unit 128 enables the address clock logic unit 304 to issue logic 1 pulse pairs as illustrated by waveform 609. The main memory address stored in the bus address counters 300, 302 and 303 thereupon is incremented by two.

Should an interim condition arise wherein data is not available for transfer to the MPDC 10 before the range count has been exhausted, the device adapter issues an interrupt to line 125 of FIG. 4 to return control from the system hardware system to the firmware. In that event, the enable hardware signal of waveform 601 transitions to a logic zero level as indicated at 601b. No further MPDC activity occurs until the device adapter 14 indicates that data again is available for transfer by issuing a logic 1 pulse 600b to line 110 of FIG. 4. The data transfer thereafter continues as before described until the range counter is exhausted.

FIG. 11

FIG. 11 is a timing diagram illustrating the operation of the system of FIGS. 4–8 during a write operation.

A waveform 700 illustrates the hardware data service request signal issued by the device adapter 14 to the control line 110 of FIG. 4, and a waveform 701 illustrates a strobe signal issued by the adapter logic unit 29 to control lines 29a and 118b of FIG. 4. A waveform 702 illustrates the output of gate 403 of FIG. 8, and a waveform 703 illustrates the logic inverse of the $\overline{Q}$ output of the flip-flop 407. A waveform 704 illustrates the logic inverse of the $\overline{Q}$ of flip-flop 405, and a waveform 705 illustrates the output register (OPR) output of FIFO 408.

A waveform 706 illustrates the logic inverse of the $\overline{Q}$ output of flip-flop 406, and a waveform 707 illustrates the OPR output of flip-flop 410. A waveform 708 illustrates the OPR output of FIFO 411, and a waveform 709 illustrates the logic inverse of the IPR output of FIFO 411. A waveform 710 illustrates the Q output of flip-flop 418, and a waveform 711 illustrates a bus cycle request signal generated by the bus logic unit 128 in response to the waveform 710.

A waveform 712 illustrates a bus cycle active signal placing the MPDC 10 in a busy state in response to the bus cycle request pulses of waveform 711. A waveform 713 illustrates a data cycle signal issued by the bus logic unit 128 to indicate a time period in which the main memory unit 12 must acknowledge a data request from the MPDC 10. A waveform 714 illustrates the bus request and acknowledgement pulses occurring on the megabus 13 as a result of the handshaking between the MPDC and the main memory. A waveform 715 illustrates the bus acknowledgement pulses issued by a slave system device in response to a bus request from a master system device, and a waveform 716 illustrates MPDC acknowledgement pulses which are reflected in the pulses of waveform 715. A waveform 717 and a waveform 718 respectively illustrate address increment pulses and range decrement pulses generated during the transfer of data from main memory unit 12 to the device adapter 14.

Prior to the transfer of data from main memory, the device adapter 14 positions the write heads of a disk device at a designated record. After the disk device is prepared for a write operation, the adapter 14 issues a hardware service request signal as illustrated by pulse 700a to the control line 110. The bus logic unit 128 thereupon requests data from the main memory unit 12. The main memory unit 12 in response thereto, supplies data to the data register 82 of FIG. 4. Under control of the data control unit 113, the data is transferred from data register 82 into the data FIFOs 408 and 410. When the data FIFOs are filled, the hardware control unit 108 signals the adapter logic unit 29. The logic unit 29 in turn issues a strobe pulse 701a to the device adapter 14 to indicate that a data byte is being transferred. Concurrently, gate 403 of FIG. 8 issues a pulse 702a to select a data byte from one of the FIFOs 408 and 410 for transfer to the device adapter 14. In response to the gate 403 output, flip-flop 407 of FIG. 8 issues a pulse 703a to trigger the flip-flop 405. Flip-flop 405 in turn issues a pulse 704a to select a data byte from the FIFO 408.

When the data byte is taken from the output register of the FIFO 408, the OPR output of the FIFO transitions to a logic zero level as indicated at 705a. The OPR output further resets the FIFO 405 as indicated at 704b of waveform 704. When the data byte has been taken by the device adapter 14, the adapter issues a second hardware data service request pulse 700b. In response thereto, the adapter logic 29 pulse 701b and the gate 403 pulse 702b are generated as before described. Upon the occurrence of pulse 702b, the $\overline{Q}$ output of the flip-flop 407 triggers the flip-flop 406 as indicated at 703b of waveform 703. The $\overline{Q}$ output of flip-flop 406 thereupon issues a logic 1 pulse 706a to unload the output register of the FIFO 410. When the data byte is transferred out of the output register, the OPR output of the FIFO 410 transitions to a logic zero as indicated at 707a of waveform 707. In response to the logic transition of the OPR output, the flip-flop 406 is reset as indicated at 706b.

As before described, the FIFO 411 is unloaded at the same time the FIFO 410 is unloaded. Thus, when the OPR output of FIFO 410 transitions to a logic zero, the OPR output of FIFO 411 also transitions to a logic zero as indicated at 708a of waveform 708. When an additional dummy byte enters the output register of FIFO 411, the OPR output transitions to a logic 1 as indicated at 708b. In addition, the input register output IPR changes state as indicated at 709a. A bus cycle request on control line 419 thereby is initiated as indicated by logic one pulse 710a. In response to pulse 710a, the bus logic unit 128 of FIG. 5 issues a strobe pulse 713a to place the cycle request pulse 710a onto the megabus 13 as indicated by pulse 711a. Upon the occurrence of the strobe 713a and the pulse 711a, a pulse 714a is carried by the megabus 13 to the main memory unit 12.

When the cycle request pulse 710a is generated, the bus logic unit 128 places the MPDC 10 in a busy state as indicated by the logic 1 pulse 712a. During the time period of the pulse 712a, the MPDC 10 issues a data request to the main memory unit 12 as indicated by pulse 714a and awaits a response.

If the memory unit 12 accepts the bus cycle request and the main memory address supplied by MPDC 10, the main memory unit issues a pulse 715a. In response thereto, the bus logic unit 128 of FIG. 5 transitions the bus cycle request signal illustrated by waveform 711 to a logic zero level as indicated at 711b. During a time period not exceeding that indicated by the logic 1 pulse 712a, the main memory unit retrieves the contents at the indicated main memory address and supplies the data to the megabus 13. In addition, the main memory unit issues a pulse 714b to notify the MPDC 10 that data at the indicated main memory address is forthcoming. In response thereto, the bus logic unit 128 issues a strobe 716a to place an acknowledgement pulse 715b on the megabus 13. Concurrently therewith, the bus logic unit removes the MPDC 10 from the busy state as indicated by the logic zero level 712b of waveform 712.

The above-described process is repeated until the total number of data bytes indicated by the range count has been transferred from the main memory unit 12 to the device adapter 14.

During the data transfer process, the bus address counters 300, 302 and 303 are incremented and the range counters 306–309 are decremented. More particularly, the address counters are incremented twice as indicated by pulses 717a and 717b each time a data request is made to the main memory unit 12 as indicated by pulse 715a. Further, the range counters are decremented each time a data byte is requested by the MPDC 10 from the main memory unit 12. One decrement command as illustrated by pulse 718a is issued when a request 710a for a data word is issued. A second decrement command as illustrated by pulse 718b is issued by the main memory unit 12.

FIG. 12

Figure 12:
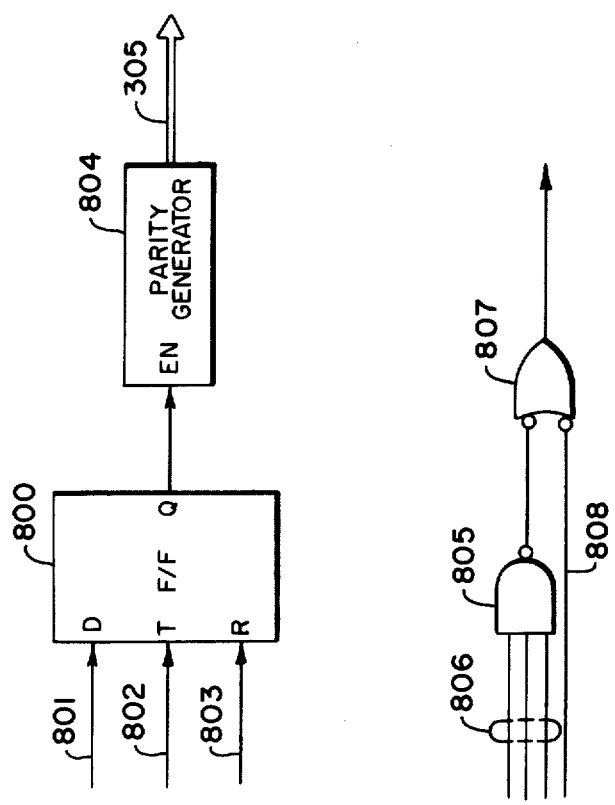
FIG. 12 is a logic diagram of the hardware used in combination with firmware to diagnostically test the interface logic of the system of FIG. 1.

FIG. 12 is a logic diagram of the bus diagnostic logic which is used in combination with firmware to test the interface logic between the megabus 13 and the MPDC 10.

Referring to FIG. 12, the D input of a flip-flop 800 is connected to a control line 801 leading from an output of the firmware distributor 206 of FIG. 6. The trigger (T) and reset (R) inputs to the flip-flop are connected to control lines 802 and 803, respectively, each leading from the firmware distributor. The Q output of the flip-flop is applied to the enable input of a parity generator 804 which supplies incorrect parity to the data cable 305 leading from the output of address counter 300 of FIG. 7 to the megabus 13.

The three inputs to a NAND gate 805 are connected by way of control lines 806 to outputs of the firmware distributor 206. The output of the NAND gate is applied to one input of a NOR gate 807, the second input of which is connected to a control line 808 leading from the bus logic unit 128 of FIG. 5. The output of gate 807 is applied to an acknowledgement line of megabus 13.

The logic of FIG. 12 works in combination with the diagnostic microprogram attached hereto as Appendix B. The microprogram is stored in the ROS 203 of FIG. 6, and controls the testing of the megabus logic. The step-by-step execution of the microprogram is provided in Table M where the function of each microinstruction identified by its HEX address is described.

TABLE M

| HEX ADDRESS | CODE FUNCTION |
|---|---|
| 11B | - Clear ACU 75. |
| 11C | - Load the scratchpad address counter 79 with zeros. |
| 11D | - Sets flip-flop 800 of Figure 12. This causes any bus cycle to main memory to be sent with a module address (bits 0–7 of a 24 bit memory address) having an incorrect parity. Since the parity is incorrect, no memory will respond to the bus cycle. |
| 11E | - Loads a return address into the return register unit 200 of Figure 6 to be used during a next subroutine call. |
| 11F | - Clears the bus status bits. |
| 120 | - Loads the bits 0–7 of bus data registor 100 from the ACU 75. |
| 121 | - Loads the bits 8–15 of bus data register 100 from the ACU 75. |
| 122 | - Loads the bits 16–23 of the bus address register 136 from the ACU 75. |
| 123 | - Loads the bits 8–15 of the bus address register 136 from the ACU 75. |
| 124 | - Loads the bits 0–7 of the bus address register 136 from the ACU 75. |
| 125 | - Loads a bus cycle constant into the ACU 75. |
| 126 | - Initiates a memory write bus cycle. Since the bad parity flop 800 is set, however, no memory response to the bus cycle will be generated. |
| 127,128 | - A combination of two microinstructions for sensing the MYDCN signal output of bus logic unit 128. If the output is set to indicate that the MPDC 10 hardware is sending a bus cycle request to memory, the microprogram will skip to the instruction at location 129. If the output is not set, the microprogram will execute the instruction at location 128- a GO to location 127. Thus, the two instructions cause a wait state to occur until the MYDCN output is set. |
| 129 | - The MPDC 10 hardware generates a bus ACK signal to its own bus cycle. This causes the data which was previously loaded in bits 0–15 of the data register 100 and bits 0–23 of the address register 136 to be strobed into bits 0–15 of the data register 82 and bits 0–23 of the shift register 70, respectively. Thus, known data is wrapped-around from the MPDC output registers onto the megabus, and back into the MPDC input registers. |
| 12A | - The MSB of the data register 82 (bits 0–7) are loaded into the ACU 75. |

TABLE M-continued

| HEX ADDRESS | CODE FUNCTION |
|---|---|
| 12B | - The microprogram branches to the previously loaded return address. |
| 12C | - A logical OR is executed on bits 8-15 of data register 82 and the ACU 75, and the result is stored in the ACU 75. |
| 12D | - A logical OR of bits 16-23 of the address shift register 70 and the ACU 75 is performed, and the result is stored in the ACU 75. |
| 13E | - A logical OR of the bits 8-15 of the address shift register 70 and the ACU 75 is performed, and the result is stored in the ACU 75. |
| 12F | - A logical OR of bits 0-7 of the address shift register 70 and the ACU 75 is performed, and the results are stored in the ACU 75. |
| 130 | - Transfers the ACU 75 through the AU 85 in order to set AU status flops. |
| 131 | - The firmware senses an AU 85 status flop called Equal to Zero. If the flop is set, it indicates that the data register 82 bits 0-15 and shift register 70 bits 0-23 which were logically ORed in the ACU 75 were zero. If the result is zero, the microprogram skips the next location, and continues to execute instructions beginning at location 133. If the result is non-zero, the microprogram continues to the next instruction. |
| 132 | - The MPDC system clock is halted. This indicates that there was a malfunction in the bus interface. The data which was sent to the megabus was not the data which was returned to the MPDC. <br> - The ACU 75 is loaded with a HEX FF. |
| 133 | - A return address is loaded in the return register |
| 134 | unit 200 to be used during a next subroutine call. |
| 135 | - The microprogram branches to the subroutine which loads the data register 100 and address register 136 from the ACU 75, and cycles the megabus to load the data into data register 82 and shift register 70, respectively. (This action results in the execution of instructions at locations 11F to 12B, and a return to location 136). |
| 136 | - A logical AND of the data register 82 bis 8-15 and the ACU 75 (which contains data bits 0-7 of the register 82 ) is performed, and the result is stored in the ACU 75. |
| 137 | - A logical AND of the address shift register 70 bits 16-23 and the ACU 75 is performed, and the result is stored in the ACU 75. |
| 138 | - A logical AND of the data register 100 bits 8-15 and the ACU 75 is performed, and the results are stored in the ACU 75. |
| 139 | - A logical AND of the data register 82 bits 0-7 and the ACU 75 is performed, and the results are stored in the ACU 75. |
| 13A | - Transfers the ACU 75 through the AU 85 in order to set the AU status flops. |
| 13B | - The firmware checks an AU 85 status flop called Equal to FF's. If the flop is set, it indicates that the bits 0-15 of data register 82 and bits 0-23 of shift register 70 are all ones. If the flop is set, the microprogram skips to the next location and continues to execute instructions at location 13D. If the flop is not set, the microprogram continues to the next instruction. |
| 13C | - The MPDC system clock is halted. This indicates that there is a malfunction in the megabus interface. The data which was sent to the megabus was not equal to the data which was returned to the MPDC. <br> - The ACU 75 is cleared. |
| 13D | - Clears the megabus status flops. |
| 13E | - Loads the bits 0-7 of bus data register 100 with |
| 13F | HEX FF. |
| 140 | - Loads the bits 8-15 of the bus data register 100 with HEX FF. |
| 141 | - Loads a return address in the return register unit 200 to be used during a next subroutine call. |
| 142 | - The microprogram branches to the subroutine which loads the data register 100 and address register 136 from the ACU 75, and cycles the megabus to load the data into the data register 82 and shit register 70, respectively. (This action results in the execution of the instructions at locations 122 to 12B, and a return to location 143). |

TABLE M-continued

| HEX ADDRESS | CODE FUNCTION |
|---|---|
| 143 | - Loads a return address in the return register unit 200 to be used during a next subroutine call. |
| 144 | - The ACU 75 is cleared. |
| 145 | - The address register 136 bits 16-23 are loaded from the ACU 75. |
| 146 | - Loads the address register 136 bits 8-15 from the ACU 75. |
| 147 | - Loads the address register 136 bits 0-7 from the ACU 75. |
| 148 | - Loads the data register 100 bits 0-7 from the ACU 75. |
| 149 | - Loads the data register 100 bits 8-15 from the ACU 75. |
| 14A | - Loads the Second- half read register 98 bits 0-7 from the negation of the data stored in the ACU 75. |
| 14B | - Loads the second-half read register 98 bits 8-15 with the negation of the data stored in the ACU 75. |
| 14C | - Loads a bus cycle constant into the ACU 75. |
| 14D | - Loads the ACU 75 into the megabus to initiate a memory write bus cycle using the Second-half read register 98. Since the bad parity flop 800 is set, no memory response to the bus cycle will be generated. |
| 14E 14 14F | - A combination of two microinstructions to sense the MYDCN bus cycle request. If the request line is set to indicate that the MPDC 10 is sending a bus cycle request to memory, the microprogram skips to the instructionat location 150. If the request Line is not set, the microprogram will execute the instruction at location 14F and branch to location 14E. Thus, the two instructions cause a wait condition to occur until the MYDCN line is set. |
| 150 | - The bus logic unit 128 generates a bus ACK signal to its own bus cycle. This causes the data which was previously loaded into the bits 0-15 of the Second-half read register 98, bits 0-7 of bus address register 136, bits 0-7 of data register 82, and bits 8-15 of data register 82 to be strobed into bits 0-15 of data register 82 and bits 0-24 around from the MPDC Second-half read registers, onto the megabus and back into the MPDC input registers. |
| 151 | - The MSB of the data register 82 (bits 0-7) is loaded into the ACU 75. |
| 152 | - The microprogram branches to the previously loaded return address. |
| 153 | - A logical AND of the data register 82 bits 8-15 and the ACU 75 (which contains bits 0-7 of data register 82) is performed, and the result is stored in the ACU 75. |
| 154 | - A logical AND of the address shift register 70 bits 16-23 and the ACU 75 is performed, and the |
| 155 | - A logical AND of the address shift register 70 bits 8-15 and the ACU 75 is performed, and the result is stored in the ACU 75. |
| 156 | - A logical Exclusive OR of the address shift register bits 0-7 and the ACU 75 is performed, and the result is stored in the ACU 75. |
| 157 | - Transfers the ACU 75 through the AU 85 in order to set the AU status flops. |
| 158 | - The firmware senses the AU 85 status flop called Equal to FF's. If the flop is set to indicate that the data which was sent out on the megabus is equal to the data which was received from the megabus wraparound, the microprogram skips to the next location and continues to execute instructions at location 15A. If the flop is not set, the microprogram continues to the next instruction. |
| 159 | - The MPDC system clock is halted. This indicates that there is a malfunction in the megabus interface. The data which was sent to the megabus was not equal to the data which was returned to the MPDC. |
| 15A | - The ACU 75 is loaded with HEX FF. |
| 15B | - Clears the megabus status flops. |
| 15C | - Loads a return address in the return register unit 200 to be used during the next subroutine call. |
| 15D | - Causes the microprogram to branch to the subroutine which loads the address register 136 and data register 100 from the ACU 75, and cycles the megabus to load the data into the shift register 70 and the data register 82, respectively. (This results in |

TABLE M-continued

| HEX ADDRESS | CODE FUNCTION |
|---|---|
| | the execution of the instructions at locations 145 to 152, and a return to location 15E). |
| 15E | - A logical OR of the data register 82 bits 8–15 and the ACU 75 (which contains bits 0–7 of register 82) is performed with the result being stored in the ACU 75. |
| 15F | - A logical OR of the address shift register 70 bits 16–23 and the ACU 75 is performed, and the results are stored in the ACU 75. |
| 160 | - A logical OR of the address shift register 70 bits 8–15 and the ACU 75 is performed, and the result is stored in the ACU 75. |
| 161 | - A logical Exclusive NOR of the address shift register 70 bits 0–7 and the ACU 75 is performed, and the result is stored in the ACU 75. |
| 162 | - Transfers the ACU 75 through the AU 85 in order to set the AU status flops. |
| 163 | - The firmware senses the AU 85 status flop called Equal to Zero. If the flop is set to indicate that the data which was sent to the megabus is equal to the data which was received from the megabus, the microprogram skips to the next location and continues to execute instructions at location 165 (end of test). If the flop is not set, the microprogram continues to the next instruction. |
| 164 | - The MPDC system clock is halted. This indicates that there is a malfunction in the megabus interface. The data which was sent to the megabus was not equal to the data which was returned to the MPDC. |

In operation, the firmware sets the flip-flop 800 to enable parity generator 804 thereby generating an incorrect parity. The eight high-order bits of the bus address counter 300 thereby are enabled to provide an incorrect parity. The firmware then issues control signals by way of control lines 318 and 136a of FIG. 7 to load the address counters 300, 302 and 303 will all logic zeros or all logic ones. In addition, the firmware loads the bus data register 100 of FIG. 4 with all logic zeros or all logic ones, and transfers control to hardware as before described to effect a data transfer. Upon executing the data transfer, the bus logic unit 128 issues a MYDCNN signal as illustrated by waveform 713 of FIG. 11.

In normal operation, the memory unit 12 would recognize the data cycle signal, and respond with an acknowledgement signal indicating acceptance of the main memory address which the MPDC 10 placed upon the megabus 13. Since an incorrect parity has been included in the address, however, the main memory unit does not respond.

The firmware of Appendix B acts in combination with NAND gate 805 and NOR gate 807 of FIG. 12 to simulate the response normally generated by the MPDC 10, and thereafter loads the data on megabus 13 into address shift register 70 and data register 82 of FIG. 4. If the megabus interface logic is functioning correctly, the main memory previously loaded into address counters 300, 302 and 303 is identical to that loaded into address shift register 70. Further, the data loaded by firmware into the bus data register 100 is identical to that loaded into the data register 82. Any differences signal the occurrence of a logic malfunction.

The hardware of FIG. 12 and the firmware of Appendix B further test the megabus interface logic by loading the second half read register 98 with all logic zeros or all logic ones. The data multiplexer 122 is selected to the SHRD register 98 output, and the bus cycle operation before described is repeated. The content of data register 82 then is compared with the known data loaded into the register 98 to detect interface logic errors.

```
MODEL: MPDC-REV3D                                HTL/6000 FILE EDIT            08/01/77    12,605  PAGE:    1
REVISION: 000.00                                 PARAMETER SECTION             DOC.#:

LINE #
   1000 PARAMETERS:
   2000 MODEL MPDC-REV3D;
   3000 SPACE 1                                                                 ;
   4000
   5000  \      **      **    *******    *****    *******
   6000         *  *    * *   *          *   *    *
   7000         *  *  * *     *          *   *    *   *
   8000         *     * *     *******    *   *    *
   9000         *       * *              *   *    *
  10000         *       * *              *   *    *
  11000         *       o *              *****    *******
  12000                                                                          \
  13000  \
  14000          THE MPDC IS A VERTICAL MICROPROCESSOR.  EACH WORD
  15000          IS SIXTEEN BITS WIDE WITH THE LEFTMOST THREE BITS
  16000          AN EFFECTIVE OP-CODE.  THE FIELD USAGE FOR THE
  17000          SEVERAL MICRO-INSTRUCTION TYPES IS-
  18000                                                                          \
  19000  \
  20000          COMMAND TYPE   OP-CODE
  21000          ------------   -------
  22000                                                                          \
  23000  \       MISCELLANEOUS  000       COMMAND 3-13                            \
  24000  \       HFU            001       COMMAND 3-13                            \
  25000  \       BUS LOGIC      010       COMMAND 3-13                            \
  26000  \       ALU            011       AOP 3-3,15-1,BOP 6-2,CMD 8-8            \
  27000  \       CONSTANT       100       AOP 3-3, COMMAND 11&13                  \
  28000  \       SCRATCHPAD     101       COMMAND 3-13                            \
  29000  \       TEST           110       COMMAND 6-4, CONDITION 10-6             \
  30000  \       BRANCH         111       COMMAND 3, ADDRESS 4-12                 \
  31000
  32000 SKIP HOF                                                                  ;
```

```
MODEL: MPDC-REV3D                                RTL/6000 FILE EDIT              08/01/77    12.605  PAGE:    2
REVISION: 000.00                                 PARAMETER SECTION               DOC.#:

LINE #
   33000
   34000
   35000   \ PARAMETERS                                                     \;
   36000
   37000
   38000 ROMDEF  MAIN,16,4096,0000#,$$UPCS                                    ;
   39000
   40000
   41000
   42000 BRCHFLD  BAD,ABS,4/12      \  BRANCH-ADDRESS FIELD DEFINITION  \;
   43000
   44000
   45000
   46000 CNSTFLD  OPC,0/3           \      OP-CODE FIELD DEFINITION      \;
   47000
   48000
   49000 CNSTFLD  COM,3/13          \  GENERAL COMMAND FIELD DEFINITION  \;
   50000
   51000
   52000 CNSTFLD  AOP,3/3           \     COMMON A-OP FIELD DEFINITION   \;
   53000
   54000
   55000 CNSTFLD  AOP0,15/1         \ AOP BIT 0                          \;
   56000
   57000
   58000 CNSTFLD  BOP,6/2           \ BOP FIELD DEFINITION FOR ALU U-OPS \;
   59000
   60000
   61000 CNSTFLD  CON,6/5,12/1,14/2   \    CONSTANT FIELD DEFINITION     \;
   62000
   63000
   64000 CNSTFLD  CSWORD,0/16       \  FULL WORD FIELD FOR HALTS FILL    \;
   65000
   66000
   67000 CNSTFLD  SCOM,6/8          \ SCRATCH-PAD COMMAND DEF. WITH A-OP \;
   68000
   69000
   70000 CNSTFLD  TCOM,10/5         \ TEST-SKIP-MUX INPUT SELECT FIELD   \;
   71000
   72000
   73000 CNSTFLD  TST,6/4           \     TEST-COMMAND TYPE SELECTOR     \;
   74000
   75000
   76000 CNSTFLD  XCOM,6/10         \ GENERAL COMMAND FIELD, A-OP CASE   \;
   77000
   78000
   79000 CNSTFLD  R,3/1             \ UPAC-SRAR LOAD CONTROL FOR GTO-LRA \;
   80000
   81000
   82000 CNSTFLD  W,8/1             \ COMMAND FIELD FOR ALU PREVIOUS C-O \;
   83000
   84000
   85000 CNSTFLD  L,9/1             \ COMMAND FIELD FOR A-OP DESTINATION \;
   86000
   87000
   88000 CNSTFLD  ALU,10/5          \ ALU MODE, CE#, AND CI# FOR ALU OPS \;

MODEL: MPDC-REV3D                                RTL/6000 FILE EDIT              08/01/77    12.605  PAGE:    3
REVISION: 000.00                                 PARAMETER SECTION               DOC.#:

LINE #
   89000
   90000
   91000 CNSTFLD  E,11/1            \  COMMAND BIT FOR CONSTANT MICRO    \;
   92000
   93000
   94000 CNSTFLD  T,13/1            \  COMMAND BIT FOR CONSTANT MICRO    \;
   95000
   96000 SKIP HOF                                                          ;

MODEL: MPDC-REV3D                                RTL/6000 FILE EDIT              08/01/77    12.605  PAGE:    4
REVISION: 000.00                                 PARAMETER SECTION               DOC.#:

LINE #
   97000
   98000
   99000 CNSTFLD  UPCS00,0/1        \ MICRO-PROGRAM CONTROL-STORE BIT 00 \;
  100000
  101000
  102000 CNSTFLD  UPCS01,1/1        \ MICRO-PROGRAM CONTROL-STORE BIT 01 \;
  103000
  104000
  105000 CNSTFLD  UPCS02,2/1        \ MICRO-PROGRAM CONTROL-STORE BIT 02 \;
  106000
  107000
  108000 CNSTFLD  UPCS03,3/1        \ MICRO-PROGRAM CONTROL-STORE BIT 03 \;
  109000
  110000
  111000 CNSTFLD  UPCS04,4/1        \ MICRO-PROGRAM CONTROL-STORE BIT 04 \;
  112000
  113000
  114000 CNSTFLD  UPCS05,5/1        \ MICRO-PROGRAM CONTROL-STORE BIT 05 \;
  115000
  116000
  117000 CNSTFLD  UPCS06,6/1        \ MICRO-PROGRAM CONTROL-STORE BIT 06 \;
  118000
  119000
  120000 CNSTFLD  UPCS07,7/1        \ MICRO-PROGRAM CONTROL-STORE BIT 07 \;
  121000
  122000
  123000 CNSTFLD  UPCS08,8/1        \ MICRO-PROGRAM CONTROL-STORE BIT 08 \;
  124000
  125000
  126000 CNSTFLD  UPCS09,9/1        \ MICRO-PROGRAM CONTROL-STORE BIT 09 \;
  127000
  128000
  129000 CNSTFLD  UPCS10,10/1       \ MICRO-PROGRAM CONTROL-STORE BIT 10 \;
  130000
  131000
```

```
MODEL: MPDC-REV3D                              RTL/6000 FILE EDIT              08/01/77    12.605  PAGE:   4
REVISION: 000.00                               PARAMETER SECTION               DOC.#:
LINE #                                              -continued
  132000 CNSTFLD  UPCS11,11/1       \ MICRO-PROGRAM CONTROL-STORE BIT 11 \;
  133000
  134000
  135000 CNSTFLD  UPCS12,12/1       \ MICRO-PROGRAM CONTROL-STORE BIT 12 \;
  136000
  137000
  138000 CNSTFLD  UPCS13,13/1       \ MICRO-PROGRAM CONTROL-STORE BIT 13 \;
  139000
  140000
  141000 CNSTFLD  UPCS14,14/1       \ MICRO-PROGRAM CONTROL-STORE BIT 14 \;
  142000
  143000
  144000 CNSTFLD  UPCS15,15/1       \ MICRO-PROGRAM CONTROL-STORE BIT 15 \;
  145000
  146000 SKIP HOF                                                         ;

MODEL: MPDC-REV3D                              RTL/6000 FILE EDIT              08/01/77    12.605  PAGE:   5
REVISION: 000.00                               PARAMETER SECTION               DOC.#:

LINE #
  147000
  148000
  149000  \ SCRATCH-PAD SYMBOLIC-ADDRESS TO RELATIVE-ADDRESS CONVER-    \;
  150000  \ SION TABLE (NOTE THAT INDICATED ADDRESSES ARE RELATIVE TO   \;
  151000  \ THE BASE ADDRESS OF THE SEGMENT SELECTED BY THE SPMIRI-     \;
  152000
  153000 ARGDEF SPA (6/5,12/1,14/2)
  154000     CWD1/00#    RNG2/0D#    ST53/1A#    DID2/27#    WL07/34#
  155000     CWD2/01#    OFR1/0E#    ST54/1B#    CHN1/28#    WL08/35#
  156000     ILC1/02#    OFR2/0F#                CHN2/29#    WL09/36#
  157000     ILC2/03#    CNF1/10#                CPC1/2A#    WL10/37#
  158000                 CNF2/11#                CPC2/2B#    WL11/38#
  159000     DATL/05#    CNF3/12#                IDF1/2C#    WL12/39#
  160000     TSK1/06#    CNF4/13#    DTA1/20#    IDF2/2D#    LSTRW/FD#
  161000     TSK2/07#                DTA2/21#    WL01/2E#    SKSTK/FE#
  162000     ADR1/08#                            WL02/2F#    RWSTK/FF#
  163000     ADR2/09#                            WL03/30#    FWRV/3D#
  164000                             MON1/24#    WL04/31#    DEVST/3E#
  165000     MOD1/0B#    STS1/18#    DMA1/25#    WL05/32#    UNSEL/3F#
  166000     RNG1/0C#    STS2/19#    DID1/26#    WL06/33#                 ;
  167000
  168000 SKIP HOF                                                         ;

MODEL: MPDC-REV3D                              RTL/6000 FILE EDIT              08/01/77    12.605  PAGE:   6
REVISION: 000.00                               DICTIONARY SECTION              DOC.#:

LINE #
  169000     DICTIONARY                                                   ;
  170000
  171000  \ FOLLOWING ARE THE MICRO DEFINITIONS. THESE ARE ARTIFIC-    \;
  172000  \ IALLY MAINTAINED IN ALPHABETICAL ORDER TO FACILITATE RE-   \;
  173000  \ TRIEVAL.                                                   \;
  174000
  175000
  176000
  177000 MICRO AACU (AOP/0#)               \ AOP= ACCUMULATOR (ACU) REG \;
  178000
  179000
  180000 MICRO AAD0 (AOP/4#)               \ AOP= ADAPTER DATA-REGISTER \;
  181000
  182000
  183000 MICRO AAD1 (AOP/5#)               \ AOP= ADAPTER IDENTITY BYTE \;
  184000
  185000
  186000 MICRO AAD2 (AOP/6#)               \ AOP= ADAPTER STATUS REG. 1 \;
  187000
  188000
  189000 MICRO AAD3 (AOP/7#)               \ AOP= ADAPTER STATUS REG. 2 \;
  190000
  191000
  192000 MICRO AAD4 (AOP/4#,AOPO/1#)       \ AOP= ADAPTER STROBE         \;
  193000
  194000
  195000 MICRO AAD5 (AOP/5#,AOPO/1#)       \ AOP= ADAPTER STROBE         \;
  196000
  197000
  198000 MICRO AAD6 (AOP/6#,AOPO/1#)       \AOP= ADAPTER STROBE          \;
  199000
  200000
  201000 MICRO AAD7 (AOP/7#,AOPO/1#)       \AOP= ADAPTER STROBE          \;
  202000
  203000
  204000 SKIP HOF                                                         ;

MODEL: MPDC-REV3D                              RTL/6000 FILE EDIT              08/01/77    12.605  PAGE:   7
REVISION: 000.00                               DICTIONARY SECTION              DOC.#:

LINE #
  205000
  206000   \ THE FOLLOWING COMMANDS ARE USED FOR TRANSFERING DATA
  207000     EITHER TO OR FROM THE BUS INTERFACE LOGIC.
  208000     THE MEANING OF EACH CODE IS AS FOLLOWS-
  209000
  210000        SRIA BIT NOT SET         SRIA BIT SET
  211000     ABUS1=BUS ADD OUT        ABUS1=BUS DATA REG
  212000     ABUS2=BUS DATA OUT 1     ABUS2=BUS DATA IN 1
  213000     ABUS3=BUS DATA OUT 2     ABUS3=BUS DATA IN 2
  214000     ABUS4=BUS RANGE OUT      ABUS4=BUS ADD IN                    \;
  215000
  216000
  217000 MICRO ABUS1 (AOP/0#,AOPO/1#)      \AOP= BUS 1                    \;
  218000
  219000
  220000 MICRO ABUS2 (AOP/1#,AOPO/1#)      \AOP=BUS 2                     \;
  221000
  222000
  223000 MICRO ABUS3 (AOP/2#,AOPO/1#)      \AOP=BUS 3                     \;
  224000
  225000
  226000 MICRO ABUS4 (AOP/3#,AOPO/1#)      \AOP=BUS 4                     \;
  227000
  228000
```

```
MODEL: MPDC-REV3D                            RTL/6000 FILE EDIT         08/01/77   12.605  PAGE:  7
REVISION: 000.00                             DICTIONARY SECTION         DOC.#:

LINE #                                       -continued
 229000 MICRO ACN   (OPC/4#,E/0#,T/1#)   \   AOP = AOP AND CONSTANT   \;
 230000
 231000
 232000 MICRO ADD   (OPC/3#,ALU/12#)     \   ALU = AOP/ADD/BOP        \;
 233000
 234000
 235000 MICRO AIDX  (AOP/3#)             \ AOP = INDEX REG            \;
 236000
 237000
 238000 MICRO AND   (OPC/3#,ALU/17#)     \   ALU = AOP/AND/BOP        \;
 239000
 240000
 241000 MICRO ANT   (OPC/3#,ALU/01#)     \ XFER A-OP* TO ALU OUTPUTS  \;
 242000
 243000
 244000 MICRO ASPA  (AOP/2#)             \ AOP = SCRATCH-PAD ADD-REG. \;
 245000
 246000
 247000 MICRO ASPAI (AOP/3#)             \AOP= S.P. ADD REG INDEXED   \;
 248000
 249000
 250000 MICRO ASPM  (AOP/1#)             \ AOP = SCRATCH-PAD CONTENTS \;
 251000
 252000
 253000 SKIP HOF                                                      ;

MODEL: MPDC-REV3D                            RTL/6000 FILE EDIT         08/01/77   12.605  PAGE:  8
REVISION: 000.00                             DICTIONARY SECTION         DOC.#:

LINE #
 254000
 255000 MICRO BACU  (BOP/0#)             \ BOP= ACCUMULATOR (ACU) REG \;
 256000
 257000
 258000 MICRO BUT   (OPC/3#,ALU/0B#)     \ XFER B-OP* TO ALU OUTPUTS  \;
 259000
 260000
 261000 MICRO BBST  (BOP/2#)             \ BOP = BUS STATUS           \;
 262000
 263000
 264000       \   THE FOLLOWING BITS ARE STORED WHEN BOP=2 IS SPECIFIED
 265000                   BIT 0 - 0
 266000                   BIT 1 - 0
 267000                   BIT 2 - 0
 268000                   BIT 3 - 0
 269000                   BIT 4 - BUS YELLOW INDICATOR
 270000                   BIT 5 - BUS NAK
 271000                   BIT 6 - BUS PARITY ERROR
 272000                   BIT 7 - BUS RED INDICATOR
 273000                                                                \;
 274000
 275000 MICRO BSPM  (BOP/1#)             \ BOP = SCRATCH-PAD CONTENTS \;
 276000
 277000
 278000 MICRO CLR   (OPC/0#,COM/1000#)   \ CLEAR, INITIATES PROM SCAN \;
 279000
 280000
 281000 MICRO CLB   (OPC/2#,COM/0086#)   \CLEAR BUS                   \;
 282000
 283000
 284000 MICRO CNST  (CON)                \ FIELD FOR CONSTANT IN UPIR \;
 285000
 286000
 287000 MICRO COTI  (W/1#)               \    ALU CI = PREVIOUS CO    \;
 288000
 289000
 290000 MICRO CRF   (OPC/0#,COM/0010#)   \   CLEAR REGISTERS, FLOPS   \;
 291000
 292000
 293000 MICRO CSHF  (CSWORD/0040#)       \ CONTROL-STORE HALTS FILLER \;
 294000
 295000
 296000 MICRO CSNF  (CSWORD/0000#)       \CONTROL STORE NOOP FILLER   \;
 297000
 298000
 299000 SKIP HOF                                                      ;

MODEL: MPDC-REV3D                            RTL/6000 FILE EDIT         08/01/77   12.605  PAGE:  9
REVISION: 000.00                             DICTIONARY SECTION         DOC.#:

LINE #
 300000
 301000 MICRO CYC   (OPC/2#,XCOM/020#)   \ CYCLE BUS AS AOP DEFINES   \;
 302000
 303000
 304000    \    NOTE THAT THE "CYC" U-INSTRUCTION USES BITS
 305000         OF A SPECIFIED AOP FOR CONTROL OF THE BUS AS
 306000         FOLLOWS-
 307000                   BIT 0   CYCLE
 308000                   BIT 1   MEMORY REFERENCE
 309000                   BIT 2   RESPONSE REQUIRED
 310000                   BIT 3   SECOND HALF READ
 311000                   BIT 4   BYTE MODE
 312000                   BIT 5   READ
 313000                   BIT 6   WRITE
 314000                   BIT 7   RFU
 315000                                                                \;
 316000
 317000 MICRO DEC   (OPC/3#,ALU/1E#)     \    ALU = AOP/MINUS/ONE     \;
 318000
 319000
 320000 MICRO DHP   (OPC/0#,COM/0200#)   \ DISABLE HARD DATA PATH     \;
 321000
 322000
 323000 MICRO DMA   (OPC/5#,COM/0008#)   \DECREMENT S. P. ADDRESS     \;
 324000
 325000
 326000 MICRO DRC   (OPC/2#,XCOM/040#)   \DECREMENT RANGE COUNTER     \;
 327000
 328000
 329000 MICRO ERP   (OPC/0#,COM/0600#)   \ ENABLE HARD DATA PATH READS\;
```

```
MODEL: MPDC-REV3D                              RTL/6000 FILE EDIT
REVISION: 000.00                               DICTIONARY SECTION
LINE #                                             -continued
  330000
  331000
  332000 MICRO EWP  (OPC/0#,COM/0601#)   \ENABLE WRITE HARD PATH      \;
  333000
  334000
  335000 MICRO GTO  (BAD) (OPC/7#,R/1#)  \    UNCONDITIONAL BRANCH    \;
  336000
  337000
  338000 MICRO HLT  (OPC/0#,COM/0040#)   \    HALT MICROPROCESSOR     \;
  339000
  340000
  341000 MICRO IAC  (OPC/2#,XCOM/100#)   \ INCREMENT ADD BUS COUNTER  \;
  342000
  343000
  344000 MICRO IIA  (OPC/5#,COM/0100#)   \ SPAC INCREMENT BY +1       \;
  345000
  346000
  347000 MICRO INC  (OPC/3#,ALU/0#)      \      ALU = AOP/PLUS/ONE    \;
  348000
  349000
  350000 MICRO INI  (OPC/0#,COM/0098#)   \ INITIALIZE, ALL BUT UPAC   \;
  351000
  352000
  353000 MICRO LCN  (OPC/4#,E/0#,T/0#)   \    LOAD CONSTANT TO A-OP   \;
  354000
  355000

MODEL: MPDC-REV3D                              RTL/6000 FILE EDIT
REVISION: 000.00                               DICTIONARY SECTION

LINE #
  356000 MICRO LIR  (OPC/5#,SCOM/0C#)    \LOAD INDEX REG FROM AOP     \;
  357000
  358000
  359000 MICRO LOC  (SPA)                \ SPA LOAD VIA SYMBOLIC-REF. \;
  360000
  361000
  362000 MICRO LRA  (BAD) (OPC/7#,R/0#)  \    LOAD RETURN REGISTER    \;
  363000
  364000
  365000 MICRO LRC  (OPC/5#,COM/0020#)   \    LOAD REQUESTING CHANNEL \;
  366000
  367000
  368000 MICRO LSH  (OPC/3#,ALU/18#)     \    ALU = AOP LEFT-SHIFTED  \;
  369000
  370000
  371000 MICRO MBP  (OPC/5#,COM/0024#)   \ SET MODULE BAD PARITY      \;
  372000
  373000
  374000 MICRO M=T  (OPC/5#,SCOM/80#)    \ SCRATCH-PAD WRITE FROM AOP \;
  375000
  376000
  377000 MICRO NND  (OPC/3#,ALU/09#)     \      ALU = (AOP/AND/BOP)*  \;
  378000
  379000
  380000 MICRO NOP  (OPC/0#,COM/0000#)   \         NO-OPERATION       \;
  381000
  382000
  383000 MICRO NOR  (OPC/3#,ALU/03#)     \      ALU = AOP/NOR/BOP     \;
  384000
  385000
  386000 MICRO OCN  (OPC/4#,E/1#,T/0#)   \    AOP = AOP/OR/CONSTANT   \;
  387000
  388000
  389000 MICRO ORR  (OPC/3#,ALU/1D#)     \      ALU = AOP/OR/BOP      \;
  390000
  391000
  392000 MICRO QLT  (OPC/0#,COM/0004#)   \ SET THE QLT FLOP (READY)   \;
  393000
  394000
  395000 MICRO RCR  (OPC/2#,XCOM/010#)   \ RESET CHANNEL-READY FLOP   \;
  396000
  397000
  398000 MICRO RDA  (OPC/0#,COM/0088#)   \ RESET DEVICE ADAPTER       \;
  399000
  400000
  401000 MICRO RIL  (OPC/2#,XCOM/001#)   \    RESET INTERRUPT LATCH   \;
  402000
  403000
  404000 MICRO RPC  (OPC/5#,XCOM/002#)   \    READ-ONLY PARITY CHECK  \;
  405000
  406000
  407000 MICRO RRB  (OPC/2#,XCOM/002#)   \    RESET REGISTER BUSY     \;
  408000
  409000
  410000 MICRO RSD  (OPC/0#,COM/0080#)   \    RESET DIAGNOSTIC MODE   \;
  411000

MODEL: MPDC-REV3D                              RTL/6000 FILE EDIT
REVISION: 000.00                               DICTIONARY SECTION

LINE #
  412000
  413000 MICRO RST  (OPC/2#,XCOM/084#)   \ RESET BUS STATUS           \;
  414000
  415000
  416000 MICRO RTN  (OPC/6#,TST/8#)      \ GO TO RETURN REGISTER      \;
  417000
  418000
  419000 MICRO SBA  (OPC/0#,COM/0002#)   \ SET BUS ACK                \;
  420000
  421000
  422000 MICRO SCR  (OPC/2#,COM/0018#)   \   SET CHANNEL READY FLOP   \;
  423000
  424000
  425000 MICRO SEF  (OPC/0#,COM/0800#)   \ SET ERROR AND STATUS FLOPS \;
  426000
  427000
  428000 MICRO SPT  (OPC/5#,COM/0080#)   \SET S. P. TEST MODE         \;
  429000
  430000
  431000 MICRO SRB  (OPC/2#,XCOM/004#)   \   SET REGISTER-BUSY FLOP   \;
  432000
  433000
```

MODEL: MPDC-REV3U
REVISION: 000.00
LINE #
RTL/6000 FILE EDIT
DICTIONARY SECTION
-continued

```
 434000 MICRO SRIA  (L/1#)                     \ DELIVER ALU RESULT TO A-OP \#
 435000
 436000
 437000 MICRO SSPA  (OPC/4#,AOP/2#,E/0#,T/0#)    \ SET S-P ADDRESS OP \#
 438000
 439000
 440000 MICRO SSPAI (OPC/4#,AOP/3#,E/0#,T/0#)    \SET INDEXED S.P. ADD \#
 441000
 442000
 443000 MICRO STD   (OPC/0#,COM/0180#)     \    SET DIAGNOSTIC MODE        \#
 444000
 445000
 446000 MICRO SUB   (OPC/3#,ALU/0C#)       \       ALU = AOP MINUS BOP     \#
 447000
 448000
 449000 MICRO TACK  (TCOM/07#)      \ TEST ACKRSP+00, BUS ACK RESPONSE    \#
 450000
 451000
 452000 MICRO TADB  (TCOM/14#)      \TEST BUSYXX+00,ADAPTER BUSY          \#
 453000
 454000
 455000 MICRO TAHR  (TCOM/00#)      \TEST HDTSRQ+00,ADAP HARD REQ         \#
 456000
 457000
 458000 MICRO TAX0  (TCOM/08#)      \ TEST ALUAX0-00, A-OP MUX BIT 0 OUT \#
 459000
 460000
 461000 MICRO TAX1  (TCOM/09#)      \ TEST ALUAX1-00, A-OP MUX BIT 1 OUT \#
 462000
 463000
 464000 MICRO TAX2  (TCOM/0A#)      \ TEST ALUAX2-00, A-OP MUX BIT 2 OUT \#
 465000
 466000
 467000 MICRO TAX3  (TCOM/0B#)      \ TEST ALUAX3-00, A-OP MUX BIT 3 OUT \#
```

MODEL: MPDC-REV3U
REVISION: 000.00
LINE #
RTL/6000 FILE EDIT
DICTIONARY SECTION

```
 468000
 469000
 470000 MICRO TAX4  (TCOM/0C#)      \ TEST ALUAX4-00, A-OP MUX BIT 4 OUT \#
 471000
 472000
 473000 MICRO TAX5  (TCOM/0D#)      \ TEST ALUAX5-00, A-OP MUX BIT 5 OUT \#
 474000
 475000
 476000 MICRO TAX6  (TCOM/0E#)      \ TEST ALUAX6-00, A-OP MUX BIT 6 OUT \#
 477000
 478000
 479000 MICRO TAX7  (TCOM/0F#)      \ TEST ALUAX7-00, A-OP MUX BIT 7 OUT \#
 480000
 481000
 482000 MICRO TBCA  (TCOM/01#)      \TEST SHRCOM+00,BUS CYCLE ACTIVE      \#
 483000
 484000
 485000 MICRO TBSY  (TCOM/18#)      \ TEST BDRBSY+00, BDR BUSY INDICATOR \#
 486000
 487000
 488000 MICRO TBYT  (TCOM/1C#)      \TEST BBAD23+00,BYTE MODE             \#
 489000
 490000
 491000 MICRO TCOT  (TCOM/05#)      \ TEST ALUCOT+00, ALU CARRY-OUT LINE \#
 492000
 493000
 494000 MICRO TDCN  (TCOM/17#)      \TEST MYDCNN+00, MY DCN               \#
 495000
 496000
 497000 MICRO TEQF  (TCOM/04#)      \ TEST ALUEQF+00, ALU OUTPUTS ARE FF \#
 498000
 499000
 500000 MICRO TEQZ  (TCOM/03#)      \TEST ALUEQZ+00, ALU EQUALS 00        \#
 501000
 502000
 503000 MICRO TERR  (TCOM/16#)      \ TEST MEMERR-00, DMA-CYCLE ERR FLAG \#
 504000
 505000
 506000 MICRO TFO   (OPC/6#,TST/2#)       \ IF TEST=1, SKIP NEXT WORD     \#
 507000
 508000
 509000 MICRO TFZ   (OPC/6#,TST/1#)       \ IF TEST=0, SKIP NEXT WORD     \#
 510000
 511000
 512000 MICRO TINT  (TCOM/1A#)      \ TEST RESINT+00, RESUME INTERRUPT   \#
 513000
 514000
 515000 MICRO TNAK  (TCOM/1B#)      \ TEST NAKRSP+00, NAK INDICATOR LINE \#
 516000
 517000
 518000 MICRO TNDR  (TCOM/15#)      \TEST NDTSRQ+00,NON-DATA REQUEST      \#
 519000
 520000
 521000 MICRO TNBR  (TCOM/1E#)      \ TEST NORQT3+00, NO BUFFER REQUEST  \#
 522000
 523000
```

MODEL: MPDC-REV3U
REVISION: 000.00
LINE #
RTL/6000 FILE EDIT
DICTIONARY SECTION

```
 524000 MICRO TORH  (TCOM/16#)      \TEST OFRNGZ-00, OFFSET RANGE HISTORY\#
 525000
 526000
 527000 MICRO TORZ  (TCOM/10#)      \ TEST OFRGVL-00, OFFSET RANGE ZERO  \#
 528000
 529000
 530000 MICRO TPTY  (TCOM/1D#)      \ TEST BSPYCK+00, BUS PARITY CHECK   \#
 531000
 532000
 533000 MICRO TULT  (TCOM/17#)      \ TEST BSQLT0-00, ULT OUTPUT LINE    \#
 534000
 535000
 536000 MICRO TREQ  (TCOM/06#)      \ TEST CREREQ+00, CHANNEL REQUEST    \#
 537000
```

```
LINE #
 538000
 539000 MICRO THGZ  (TCOM/11#)      \ TEST EORXXX+00, RANGE EQUALS ZERO  \;
 540000
 541000
 542000 MICRO TRSP  (TCOM/02#)      \ TEST BSRSVP+30, BUS RESPONSE REQD.  \;
 543000
 544000
 545000 MICRO TSAW  (TCOM/13#)      \TEST SPAWRP+00,SPA WRAPAROUND       \;
 546000
 547000
 548000 MICRO TSBS  (TCOM/12#)      \ TEST SBSOBS+00, SING BYTE STORED   \;
 549000
 550000
 551000 MICRO TUBR  (TCOM/19#)      \ TEST UBRQXX+00, UNSOLICTED BUS REQ \;
 552000
 553000
 554000 MICRO UPIR00   (UPCS00/1#)  \  SET UPCS WORD BIT 00 FOR LRC   \;
 555000
 556000
 557000 MICRO UPIR01   (UPCS01/1#)  \  SET UPCS WORD BIT 01 FOR LRC   \;
 558000
 559000
 560000 MICRO UPIR02   (UPCS02/1#)  \  SET UPCS WORD BIT 02 FOR LRC   \;
 561000
 562000
 563000 MICRO UPIR03   (UPCS03/1#)  \  SET UPCS WORD BIT 03 FOR LRC   \;
 564000
 565000
 566000 MICRO UPIR04   (UPCS04/1#)  \  SET UPCS WORD BIT 04 FOR LRC   \;
 567000
 568000
 569000 MICRO UPIR05   (UPCS05/1#)  \  SET UPCS WORD BIT 05 FOR LRC   \;
 570000
 571000
 572000 MICRO UPIR06   (UPCS06/1#)  \  SET UPCS WORD BIT 06 FOR LRC   \;
 573000
 574000
 575000 MICRO UPIR07   (UPCS07/1#)  \  SET UPCS WORD BIT 07 FOR LRC   \;
 576000
 577000
 578000 MICRO UPIR08   (UPCS08/1#)  \  SET UPCS WORD BIT 08 FOR LRC   \;
 579000

LINE #
 580000
 581000 MICRO UPIR09   (UPCS09/1#)  \  SET UPCS WORD BIT 09 FOR LRC   \;
 582000
 583000
 584000 MICRO UPIR10   (UPCS10/1#)  \  SET UPCS WORD BIT 10 FOR LRC   \;
 585000
 586000
 587000 MICRO UPIR11   (UPCS11/1#)  \  SET UPCS WORD BIT 11 FOR LRC   \;
 588000
 589000
 590000 MICRO UPIR12   (UPCS12/1#)  \  SET UPCS WORD BIT 12 FOR LRC   \;
 591000
 592000
 593000 MICRO UPIR13   (UPCS13/1#)  \  SET UPCS WORD BIT 13 FOR LRC   \;
 594000
 595000
 596000 MICRO UPIR14   (UPCS14/1#)  \  SET UPCS WORD BIT 14 FOR LRC   \;
 597000
 598000
 599000 MICRO UPIR15   (UPCS15/1#)  \  SET UPCS WORD BIT 15 FOR LRC   \;
 600000
 601000
 602000 MICRO WDA   (OPC/5#,SCOM/82#)    \COMBINED MWT & DMA DELAYED     \;
 603000
 604000
 605000 MICRO WIA   (OPC/5#,SCOM/C0#)    \ COMBINED MWT & IMA DELAYED \;
 606000
 607000
 608000 MICRO XFA   (OPC/3#,ALU/1F#)     \ XFER A-OP TO ALU OUTPUTS   \;
 609000
 610000
 611000 MICRO XFB   (OPC/3#,ALU/15#)     \ XFER B-OP TO ALU OUTPUTS   \;
 612000
 613000
 614000 MICRO XNR   (OPC/3#,ALU/13#)     \      ALU = AOP/XNOR/BOP    \;
 615000
 616000
 617000 MICRO XOR   (OPC/3#,ALU/0D#)     \      ALU = AOP/XOR/BOP     \;
 618000
 619000
 620000 MICRO ZER   (OPC/3#,ALU/07#)     \         ALU = ZERO         \;
 621000
 622000 SKIP HOF                                                       ;

LINE #
 623000
 624000
 625000   \                    HARDWARE TEST POINTS                    \
 626000   \                                                            \
 627000   \    THE FOLLOWING LIST GIVES TEST POINTS FOR SIGNIFICANT    \
 628000   \    REGISTER OUTPUTS=                                       \
 629000   \                                                            \
 630000   \                                                            \
 631000   \                         ACUMULATOR                         \
 632000   \                                                            \
 633000   \                         ALUAC0+00                          \
 634000   \                         ALUAC1+00                          \
 635000   \                         ALUAC2+00                          \
 636000   \                         ALUAC3+00                          \
 637000   \                         ALUAC4+00                          \
 638000   \                         ALUAC5+00                          \
 639000   \                         ALUAC6+00                          \
 640000   \                         ALUAC7+00                          \
```

```
MODEL: MPDC-REV3.)                      RTL/6000 FILE EDIT              08/01/77    12.605  PAGE: 15
REVISION: 000.00                        DICTIONARY SECTION              DOC.#:

LINE #                                    -continued
  641000   \
  642000   \
  643000   \              SCRATCH PAD MEMORY                             \
  644000   \                                                             \
  645000   \   (INDEX MODE)    SPMICF+00                                 \
  646000   \                                                             \
  647000   \   (ADDRESS        SPMAS0+00                                 \
  648000   \    SELECTOR)      SPMAS1+00                                 \
  649000   \                                                             \
  650000   \   (ADDRESS        SPMAC0+00                                 \
  651000   \    COUNTER)       SPMAC1+00                                 \
  652000   \                   SPMAC2+00                                 \
  653000   \                   SPMAC3+00                                 \
  654000   \                   SPMAC4+00                                 \
  655000   \                   SPMAC5+00                                 \
  656000   \                   SPMAC6+00                                 \
  657000   \                   SPMAC7+00                                 \
  658000   \                                                             \
  659000   \                                                             \
  660000   \   (MEMORY         SPMOT0+10                                 \
  661000   \    OUTPUT)        SPMOT1+10                                 \
  662000   \                   SPMOT2+10                                 \
  663000   \                   SPMOT3+10                                 \
  664000   \                   SPMOT4+10                                 \
  665000   \                   SPMOT5+10                                 \
  666000   \                   SPMOT6+10                                 \
  667000   \                   SPMOT7+10                                 \
  668000   \                                                             \
  669000   \
  670000
  671000 SKIP HOF                                                        ;

MODEL: MPDC-REV3D                       RTL/6000 FILE EDIT              08/01/77    12.605  PAGE: 16
REVISION: 000.00                        DICTIONARY SECTION              DOC.#:

LINE #
  672000
  673000
  674000   \              HARDWARE TEST POINTS (CONT.)                   \
  675000
  676000   \              BUS DATA REGISTER                              \
  677000
  678000   \                   MYAD16+00                                 \
  679000   \                   MYAD17+00                                 \
  680000   \                   MYAD18+00                                 \
  681000   \                   MYAD19+00                                 \
  682000   \                   MYAD20+00                                 \
  683000   \                   MYAD21+00                                 \
  684000   \                   MYAD22+00                                 \
  685000   \                   MYAD23+00                                 \
  686000
  687000
  688000
  689000
  690000
  691000
  692000   \              BDC CHANNEL NUMBER                             \
  693000   \              --------------------                           \
  694000
  695000   \ BUS ADDRESS BIT                                             \
  696000
  697000   \         08       BSASW1+00  HEX ROTARY SWITCH               \
  698000   \         09       BSASW2+00  HEX ROTARY SWITCH               \
  699000   \         10       BSASW3+00  HEX ROTARY SWITCH               \
  700000   \         11       BSASW4+00  HEX ROTARY SWITCH               \
  701000   \         12       BSASW5+00  HEX ROTARY SWITCH               \
  702000   \         13       BSASW6+00  HEX ROTARY SWITCH               \
  703000   \         14       BSASW7+00  HEX ROTARY SWITCH               \
  704000   \         15       MSB OF ADAPTER PORT NUMBER                 \
  705000   \         16       LSB OF ADAPTER PORT NUMBER                 \
  706000   \         17       DIRECTION OF DATA TRANSFER, 0 = INPUT      \
  707000
  708000 SKIP HOF                                                        ;

MODEL: MPDC-REV3.)                      RTL/6000 FILE EDIT              08/01/77    12.605  PAGE: 17
REVISION: 000.00                        DICTIONARY SECTION              DOC.#:

LINE #
  709000
  710000
  711000
  712000   \  DEFINITION OF CONTROL-BYTES MAINTAINED FOR EACH OF         \
  713000   \  THE ACTIVE CHANNELS.                                       \
  714000   \                                                             \
  715000   \                                                             \
  716000   \                                                             \
  717000   \              DMA FLAG BYTE                                  \
  718000   \                  (DMA1)                                     \
  719000   \                                                             \
  720000
  721000   \DEFINITON-                                                   \
  722000
  723000   \   BIT 0 - RESPONSE REQUIRED , IS SET OR RESET BY THE        \
  724000   \           BUS REQUEST ROUTINE ACCORDING TO THE              \
  725000   \           DIRECTION BIT.                                    \
  726000
  727000   \   BIT 1 - UNUSED                                            \
  728000
  729000   \   BIT 2 - IMPLIED SEEK BIT. SET WHEN PERFORMING A           \
  730000   \           TRACK OR CYLINDER LINK ON A SEARCH OPERATION      \
  731000
  732000   \   BIT 3 - IGNORE READ ERRORS. THIS BIT IS SET IN ORDER      \
  733000   \           TO READ PACKS FORMATED WITH THE H-716 FORMAT      \
  734000
  735000   \   BIT 4 - UNUSED                                            \
  736000
  737000   \   BIT 5 - UNUSED                                            \
  738000
  739000   \   BIT 6 - UNUSED                                            \
  740000
  741000   \   BIT 7 - UNUSED                                            \
  742000
  743000 SKIP HOF                                                        ;
```

```
LINE #
744000
745000
746000
747000       \                    CHANNEL MONITOR FLAGS              \
748000       \                          (MON1)                        \
749000
750000       \DEFINITION-                                              \
751000
752000       \      BIT 0 - INTERRUPT PENDING. IS SET BY THE INTERRUPT \
753000       \              SUBROUTINE WHEN AN INTERRUPT IS NAK'D.     \
754000
755000       \              THIS BIT IS RESET BY THE RESUME INTERRUPT  \
756000       \              SUBROUTINE WHEN THE INTERRUPT IS ACK'D     \
757000
758000       \              THIS BIT IS ALSO  RESET WHEN EXECUTING A STOP \
759000       \              I/O OR WHEN INITIALIZING.                  \
760000
761000       \      BIT 1 - CHANNEL BUSY. IS SET BY THE BUS REQUEST    \
762000       \              ROUTINE WHEN A START-UP FUNCTION CODE      \
763000       \              (TASK) IS DETECTED.                        \
764000
765000       \              THIS BIT IS RESET BY THE INTERRUPT OR RESUME \
766000       \              INTERRUPT SUBROUTINES.                     \
767000
768000       \              THIS BIT IS ALSO RESET WHEN EXECUTING A STOP \
769000       \              I/O OR WHEN INITIALIZING.                  \
770000
771000       \      BIT 2 - STOP I/O. IS SET BY THE BUS REQUEST ROUTINE \
772000       \              WHEN A STOP I/O COMMAND IS DETECTED.       \
773000
774000       \              THIS BIT IS RESET BY THE INTERRUPT ROUTINE \
775000       \              OR BY THE RESUME INTERRUPT SUBROUTINE WHEN \
776000       \              THE INTERRUPT IS ACK'D. IT IS RESET BY THE \
777000       \              INTERRUPT ROUTINE IF THE INTERRUPT LEVEL IS \
778000       \              ZERO.                                      \
779000
780000       \              THIS BIT IS ALSO RESET WHEN INITIALIZING   \
781000
782000 SKIP HOF                                                        ;
```

```
LINE #
783000
784000
785000
786000       \   CHANNEL MONITOR (MON1) DEFINITION (CON'T.)-            \
787000       \                                                         \
788000       \                                                         \
789000       \      BIT 3 - SEEK ACTIVE BIT. IT IS SET BY THE SEEK
790000              ROUTINE AND IS USED BY THE POLLING LOOP
791000              IN ORDER TO DETERMINE WHEN TO SEND AN
792000              INTERRUPT AT THE COMPLETION OF A SEEK.             \
793000
794000       \      BIT 4 - INTERRUPT STORED. IS SET WHEN AN INTERRUPT
795000              CAN NOT BE SENT BECAUSE THE INTERFACE LOGIC
796000              IS LOADED TO EXECUTE A READ OR WRITE OPER-
797000              ATION . THE BIT IS RESET WHEN THE INTERRUPT
798000              IS SENT AFTER THE INTERFACE BECOMES NON BUSY       \
799000
800000       \      BIT 5 - RECALIBRATE OPERATION. IS SET IN ORDER TO  \
801000       \              SELECT PLATTER ZERO TRACK ZERO AT THE      \
802000       \              COMPLETION OF A RECALIBRATE OPERATION      \
803000
804000       \      BIT 6 - UNUSED                                     \
805000
806000       \      BIT 7 - UNUSED                                     \
807000
808000 SKIP HOF                                                        ;
```

```
LINE #
809000       \   AOPS
810000           ----
811000
812000       A0 A1 A2 A3    SRIA*         NMN         SRIA             NMN
813000
814000       0  0  0  0  ACCUMULATOR      AACU   - ACCUMULATOR         AACU
815000       0  0  0  1  S.P. MEMORY      ASPM   - S.P.MEMORY          ASPM
816000       0  0  1  0  S.P. ADDRESS     ASPA   - S.P.ADRS(INDEXED)*  ASPA
817000       0  0  1  1  INDEX REG.       AIDX   - S.P.ADRS(INDEXED)   ASPAI
818000       0  1  0  0  ADAP DATA REG    AAD0   - ADAP DATA REG.      AAD0
819000       0  1  0  1  ADAP DEV. ID     AAD1   - ADAP DATA CNTR      AAD1
820000       0  1  1  0  ADAP STATS I     AAD2   - ADAP COMMAND REG.   AAD2
821000     \ 0  1  1  1  ADAP STATS II    AAD3   - ADAP UNIT SELECT    AAD3
822000       1  0  0  0  BUS ADRS OUT     ABUS1  - BUS REG. IN         ABUS1
823000       1  0  0  1  BUS DATA OUT1    ABUS2  - BUS DATA IN 1       ABUS2
824000       1  0  1  0  BUS DATA OUT2    ABUS3  - BUS DATA IN 2       ABUS3
825000       1  0  1  1  BUS RNG OUT      ABUS4  - BUS ADDRESS IN      ABUS4
826000       1  1  0  0  ADAPTER RFU      AAD4   - ADAPTER RFU         AAD4
827000       1  1  0  1  ADAPTER RFU      AAD5   - ADAP STS*FIFO CLR   AAD5
828000       1  1  1  0  ADAPTER RFU      AAD6   - ADAP SEEK PULSE     AAD6
829000       1  1  1  1  ADAPTER RFU      AAD7   - ADAP DATA BYTE TKN  AAD7 \
830000
831000
832000     \   BOPS
833000         ----
834000
835000       B0 B1
836000
837000       0  0  ACCUMULATOR                    BACU
838000       0  1  S.P. MEMORY                    BSPM
839000       1  0  BUS STATUS                     BBST
840000       1  1  USED TO DEFINE A CONSTANT FOR BOP                   \
841000
842000
843000     \ CYCLE                              EOR READ    INPUT RNG
844000       BYTE            WRT  WRT  READ READ W/SINGLE   ADD
845000       DEFINITION      FLD1 FLD0 FLD1 FLD0 BYTE STORD ETC.
846000
```

```
MODEL: MPDC-REV3D                              RTL/6000 FILE EDIT                08/01/77    12.605  PAGE:  20
REVISION: 000.00                               DICTIONARY SECTION                DOC.#:

LINE #                                              -continued
 847000    0 - CYCLE            0   0   0   0     1      1
 848000    1 - MEMORY REF.      1   1   1   0     1      0
 849000    2 - RESPONSE REQ.    1   1   0   0     0      0
 850000    3 - 2ND HALF READ    0   0   0   0     0      1
 851000    4 - BYTE MODE        X   0   X   0     1      0
 852000    5 - READ             0   0   1   1     0      0
 853000    6 - WRITE            1   1   0   0     0      0
 854000    7 - RFU              0   0   0   0     0      0     \
 855000
 856000
 857000 SKIP HOF                                                         ;

MODEL: MPDC-REV3D                              RTL/6000 FILE EDIT                08/01/77    12.605  PAGE:  21
REVISION: 000.00                               DICTIONARY SECTION                DOC.#:

LINE #
 858000    \    0 - MISCELLANEOUS
 859000
 860000         OPERATION                 UPIR, BITS 00 - 15
 861000
 862000                           0 1 2 3 4 5 6 7 8 9 10 11 12 13 14 15 NMN
 863000
 864000
 865000  NO OPERATION            0 0 0 0 0 0 0 0 0  0  0  0  0  0  0 NOP
 866000  CLEAR COMMAND           0 0 0 1 0 0 0 0 0  0  0  0  0  0  0 CLR
 867000  SET ERROR FLOPS         0 0 0 0 1 0 0 0 0  0  0  0  0  0  0 SEF
 868000  ENABLE READ PATH        0 0 0 0 0 1 1 0 0  0  0  0  0  0  0 ERF
 869000  ENABLE WRT PATH         0 0 0 0 0 1 1 0 0  0  0  0  0  0  1 EWF
 870000  DSBL HDWR DATA PATH     0 0 0 0 0 0 1 0 0  0  0  0  0  0  0 DHF
 871000  RESET DIAG. MODE        0 0 0 0 0 0 0 1 0  0  0  0  0  0  0 RSC
 872000  SET DIAG. MODE          0 0 0 0 0 0 1 1 0  0  0  0  0  0  0 STC
 873000  HALT                    0 0 0 0 0 0 0 0 1  0  0  0  0  0  0 HLT \
 874000   \
 875000                          0 0 0 0 0 0 0 0 0  1  0  0  0  0  0
 876000  CLEAR FLOP + REG.       0 0 0 0 0 0 0 0 0  0  1  0  0  0  0 CRF
 877000  RESET DEV. ADAP         0 0 0 0 0 0 0 0 0  0  1  0  0  0  0 RDA
 878000  SET OLT(BLT)DONE        0 0 0 0 0 0 0 0 0  0  0  1  0  0  0 OLT
 879000  SFT BUS ACK             0 0 0 0 0 0 0 0 0  0  0  0  1  0  0 SBA
 880000                          0 0 0 0 0 0 0 0 0  0  0  0  0  1  0
 881000  INITIALIZE              0 0 0 0 0 0 0 1 0  0  1  1  0  0  0 INI \
 882000
 883000
 884000   \   1 - RESERVED                                                    \
 885000
 886000
 887000   \   2 - BUS LOGIC                                                   \
 888000   \
 889000       OPERATION                   UPIR, BITS 00 - 15
 890000                          0 1 2 3 4 5 6 7 8 9 10 11 12 13 14 15 NMN
 891000
 892000  INC.ADDR CNTR           0 1 0 0 0 0 0 1 0 0  0  0  0  0  0 IAC
 893000  RFSET STATUS            0 1 0 0 0 0 0 0 1 0  0  0  0  0  0 RST
 894000  DECR. RNG CNTR          0 1 0 0 0 0 0 0 1 0  0  0  0  0  0 DRC
 895000  CYCLE                   0 1 0 0 0 0 0 0 0 1  0  0  0  0  0 CYC
 896000  SET CHNL RDY            0 1 0 0 0 0 0 0 0 0  1  1  0  0  0 SCH
 897000  RESET CHNL RDY          0 1 0 0 0 0 0 0 0 0  1  0  0  0  0 RCH
 898000  SET REG. BUSY           0 1 0 0 0 0 0 0 0 0  0  0  1  0  0 SRB
 899000  RESET REG BSY           0 1 0 0 0 0 0 0 0 0  0  0  0  1  0 RRB
 900000  RST INTRPT LTCH         0 1 0 0 0 0 0 0 0 0  0  0  0  0  1 RIL
 901000  CLEAR BUS               0 1 0 0 0 0 0 1 0 0  0  0  1  1  0 CLB \
 902000
 903000 SKIP HOF                                                         ;

MODEL: MPDC-REV3D                              RTL/6000 FILE EDIT                08/01/77    12.605  PAGE:  22
REVISION: 000.00                               DICTIONARY SECTION                DOC.#:

LINE #
 904000   \                                                              \
 905000   \   3 - ALU
 906000
 907000       OPERATION                   UPIR, BITS 00 - 15
 908000                          0 1 2 3 4 5 6 7 8 9 10 11 12 13 14 15 NMN
 909000
 910000  AOP NOT         0 1 1 A1 A2 A3 B0 B1 C 5 0 0 0 0 1 A0 ANT
 911000  BOP NOT         0 1 1 A1 A2 A3 B0 B1 C 5 0 1 0 0 1 A0 BNT
 912000  ZERO            0 1 1 A1 A2 A3 B0 B1 C 5 0 0 1 0 1 A0 ZER
 913000  AOP             0 1 1 A1 A2 A3 B0 B1 C 5 1 1 1 1 1 A0 XFA
 914000  BOP             0 1 1 A1 A2 A3 B0 B1 C 5 1 0 1 0 1 A0 XFB
 915000  NOR             0 1 1 A1 A2 A3 B0 B1 C 5 0 0 0 1 1 A0 NOR
 916000  NAND            0 1 1 A1 A2 A3 B0 B1 C 5 0 1 0 1 1 A0 NND
 917000  EX OR           0 1 1 A1 A2 A3 B0 B1 C 5 0 1 1 0 1 A0 XOR
 918000  EX NOR          0 1 1 A1 A2 A3 B0 B1 C 5 1 0 0 1 1 A0 XNR \
 919000   \
 920000  AND             0 1 1 A1 A2 A3 B0 B1 C 5 1 0 1 1 1 A0 AND
 921000  OR              0 1 1 A1 A2 A3 B0 B1 C 5 1 1 1 0 1 A0 ORR
 922000  INCR AOP        0 1 1 A1 A2 A3 B0 B1 C 5 0 0 0 0 0 A0 INC
 923000  DECR AOP        0 1 1 A1 A2 A3 B0 B1 C 5 1 1 1 1 0 A0 DEC
 924000  AOP MIN BOP     0 1 1 A1 A2 A3 B0 B1 C 5 0 1 1 0 0 A0 SUB
 925000  AOP PLS BOP     0 1 1 A1 A2 A3 B0 B1 C 5 1 0 0 1 0 A0 ADD
 926000  LFT SHIFT AOP   0 1 1 A1 A2 A3 B0 B1 C 5 1 1 0 0 0 A0 LSH
 927000  CARRY OUT IN    0 1 1 A1 A2 A3 B0 B1 1 5 X X X X X A0 COTI
 928000  STR RSLT AOP    0 1 1 A1 A2 A3 B0 B1 C 1 X X X X X A0 SRIA
 929000   \
 930000
 931000 SKIP HOF                                                         ;

MODEL: MPDC-REV3D                              RTL/6000 FILE EDIT                08/01/77    12.605  PAGE:  23
REVISION: 000.00                               DICTIONARY SECTION                DOC.#:

LINE #
 932000
 933000   \   4 - CONSTANT
 934000
 935000       OPERATION                   UPIR, BITS 00 - 15
 936000                          0 1 2 3 4 5 6 7 8 9 10 11 12 13 14 15 NMN
 937000
 938000  LOAD CONSTANT   1 0 0 A1 A2 A3 C C C C C 0 C 0 C C LCN
 939000  AND CONSTANT    1 0 0 A1 A2 A3 C C C C C 0 C 1 C C ACN
 940000  OR CONSTANT     1 0 0 A1 A2 A3 C C C C C 1 C 0 C C OCN \
 941000
```

```
MODEL: MPDC-REV3D                              RTL/6000 FILE EDIT
REVISION: 000.00                               DICTIONARY SECTION
                                                  -continued
LINE #
 942000
 943000    \  5 - MEMORY
 944000
 945000      OPERATION                UPIR, BITS 00 - 15
 946000                     0 1 2  3  4  5 6 7 8 9 10 11 12 13 14 15 NMM
 947000
 948000  MEMORY WRITE       1 0 1 A1 A2 A3 1 0 0 0  0  0  0  0 AO MWT
 949000  INCR SP ADDR       1 0 1  0  0  0 0 1 0 0  0  0  0  0  0 IMA
 950000  DECR SP ADDR       1 0 1  0  0  0 0 0 0 0  0  1  0  0  0 DMA
 951000  MEM WRT & INCR     1 0 1 A1 A2 A3 1 1 0 0  0  0  0  0 AO WIA
 952000  MEM WRT & DECR     1 0 1 A1 A2 A3 1 0 0 0  0  1  0  0 AO WDA
 953000  SET SP TST MODE    1 0 1  0  0  0 0 0 1 0  0  0  0  0  0 SPT \
 954000    \
 955000                     1 0 1  0  0  0 0 0 0 1  0  0  0  0  0  0
 956000  LD REQ'G CHNL      1 0 1  0  0  0 0 0 0 0  1  0  0  0  0  0 LRC
 957000  LD IR W/AOP        1 0 1 A1 A2 A3 0 0 0 0  1  1  0  0  0 AO LIR
 958000  SET MOD BAD PAR    1 0 1  0  0  0 0 0 0 0  1  0  0  1  0  0 MBP
 959000                     1 0 1  0  0  0 0 0 0 0  0  0  0  1  0   \
 960000
 961000 SKIP HOF                                                      !

MODEL: MPDC-REV3D                              RTL/6000 FILE EDIT
REVISION: 000.00                               DICTIONARY SECTION

LINE #
 962000
 963000    \  6 - TEST
 964000
 965000      OPERATION                UPIR, BITS 00 - 15
 966000                     0 1 2  3  4  5 6 7 8 9 10 11 12 13 14 15 NMM
 967000
 968000  TEST FOR ZERO      1 1 0 A1 A2 A3 0 0 0 1  T  T  T  T  T AO TFZ
 969000  TEST FOR ONE       1 1 0 A1 A2 A3 0 0 1 0  T  T  T  T  T AO TFC
 970000  RETURN             1 1 0  0  0  0 0 1 0 0  0  0  0  0  0  0 RTN \
 971000
 972000
 973000    \  TEST CONDITIONS
 974000       ---------------
 975000
 976000      MNEMONIC  HEX  DESCRIPTION
 977000
 978000       TAHR     00   ADAPTER HARDWARE REQUEST
 979000       TBCA     01   BUS CYCLE ACTIVE
 980000       TRSP     02   BUS REQUEST REQUIRED
 981000       TEQZ     03   ALU OUTPUT EQUALS 00
 982000       TEQF     04   ALU OUTPUT EQUALS FF
 983000       TCOT     05   ALU CARRY OUT
 984000       TREQ     06   CHANNEL REQUEST
 985000       TACK     07   BUS ACK RESPONSE                        \
 986000   \   TAX0     08   AOP MULTIPLEXOR, BIT 0
 987000       TAX1     09   AOP MULTIPLEXOR, BIT 1
 988000       TAX2     0A   AOP MULTIPLEXOR, BIT 2
 989000       TAX3     0B   AOP MULTIPLEXOR, BIT 3
 990000       TAX4     0C   AOP MULTIPLEXOR, BIT 4
 991000       TAX5     0D   AOP MULTIPLEXOR, BIT 5
 992000       TAX6     0E   AOP MULTIPLEXOR, BIT 6
 993000       TAX7     0F   AOP MULTIPLEXOR, BIT 7
 994000       TORZ     10   OFFSET RANGE ZERO
 995000       TRGZ     11   RANGE ZERO
 996000       TSBS     12   SINGLE BYTE STORED
 997000       TSAW     13   S. P. ADDRESS WRAPAROUND
 998000       TADB     14   ADAPTER BUSY                            \
 999000   \   TNDR     15   NON-DATA SERVICE REQUEST
1000000       TORH     16   OFFSET RANGE HISTORY
1001000       TDCN     17   MYDCNN=00
1002000       TBSY     18   BUS DATA REGISTER BUSY
1003000       TUBR     19   UNSOLICITED BUS REQUEST
1004000       TINT     1A   RESUME INTERRUPT
1005000       TNAK     1B   NAK RESPONSE
1006000       TBYT     1C   BYTE MODE
1007000       TPTY     1D   BUS PARITY CHECK
1008000       TNBR     1E   NO BUFFER REQUEST
1009000       TFDR     1F   FIRMWARE DATA SERVICE REQUEST           \
1010000 SKIP HOF                                                      !

MODEL: MPDC-REV3D                              RTL/6000 FILE EDIT
REVISION: 000.00                               DICTIONARY SECTION

LINE #
1011000    \  7 - BRANCH
1012000
1013000      OPERATION                UPIR, BITS 00 - 15
1014000                     0 1 2  3  4  5 6 7 8 9 10 11 12 13 14 15 NMM
1015000
1016000  GO TO              1 1 1 1 A A A A A A A  A  A  A  A  A GTO
1017000  LOAD RETURN        1 1 1 0 A A A A A A A  A  A  A  A  A LRA \
1018000
1019000 SKIP HOF                                                      !

MODEL: MPDC-REV3D                              RTL/6000 FILE EDIT              08/01/77   12.605  PAGE: 26
REVISION: 000.00                               MICROPROGRAM SECTION            DOC.#:
                                                                     ADDRESS  IMAGE
LINE #                           SEQUENCE: $$UPCS              !     (HEX)    (HEX)
1020000 MICROPROGRAM
1021000
1022000 $$UPCS                                                 !
1023000
1024000  $          \ NOP FOR PROM SCAN RECOVERY               \       000    0000
1025000             NOP                                        !
1026000
1027000
1028000 $START-BLT  \START OF BASIC LOGIC TEST                  \       001    0098
1029000             INI                                        !
1030000
1031000  $          \CLEAR BUS                                  \       002    4086
1032000             CLB                                        !
1033000
1034000
1035000
1036000      \ BLT BRANCH TEST EXERCISES THE FOLLOWING COMMANDS \
1037000      \   - TEST AND SKIP                                \
```

| MODEL: MPDC-REV3D | | | RTL/6000 FILE EDIT | | 08/01/77 | 12.605 PAGE: 26 |
| --- | --- | --- | --- | --- | --- | --- |
| REVISION: 000.00 | | | MICROPROGRAM SECTION | | DOC.#: | |
| LINE # | | | SEQUENCE: SSUPCS | | ADDRESS (HEX) | IMAGE (HEX) |
| | | | -continued | | | |
| 1038000 | \ | - GO TO COMMAND | | \ | | |
| 1039000 | | | | \ | | |
| 1040000 | | | | | | |
| 1041000 | SBLT-NEXT01 | | \SKIP IF CARRY OUT IS 1 | \ | 003 | C08A |
| 1042000 | | TFO TCOT | | ; | | |
| 1043000 | | | | | | |
| 1044000 | s | | \SKIP IF CARRY OUT IS 0 | \ | 004 | C04A |
| 1045000 | | TFZ TCOT | | ; | | |
| 1046000 | | | | | | |
| 1047000 | | | | | | |
| 1048000 | SBLT-HALT01 | HLT | \HALT IF TEST FAILS | \; | 005 | 0040 |
| 1049000 | | | | | | |
| 1050000 | s | | \GO TO START OF TEST | \ | 006 | F009 |
| 1051000 | | GTO (SBLT-NEXT02) | | ; | | |
| 1052000 | | | | | | |
| 1053000 | s | HLT | \HALT IF GO TO FAILS | \; | 007 | 0040 |
| 1054000 | | | | | | |
| 1055000 | s | HLT | \HALT IF GO TO ONLY NOPS | \; | 008 | 0040 |
| 1056000 | | | | | | |
| 1057000 | \ END OF BRANCH TEST | | | \ | | |
| 1058000 | | | | | | |
| 1059000 | SKIP HOF | | | ; | | |

| MODEL: MPDC-REV3D | | | RTL/6000 FILE EDIT | | 08/01/77 | 12.605 PAGE: 27 |
| --- | --- | --- | --- | --- | --- | --- |
| REVISION: 000.00 | | | MICROPROGRAM SECTION | | DOC.#: | |
| LINE # | | | SEQUENCE: SSUPCS | | ADDRESS (HEX) | IMAGE (HEX) |
| 1060000 | | | | | | |
| 1061000 | | | | | | |
| 1062000 | \ BLT STATUS TEST ASSURES THAT CERTAIN STATUS FLOPS ARE | | | \; | | |
| 1063000 | \NOT STUCK AT ONE OR STUCK AT ZERO. | | | \; | | |
| 1064000 | | | | | | |
| 1065000 | SBLT-NEXT02 | TFO TEQZ | \SKIP IF EQZ SET | \; | 009 | C086 |
| 1066000 | | | | | | |
| 1067000 | s | TFZ TEQF | \SKIP IF EQF RESET | \; | 00A | C048 |
| 1068000 | | | | | | |
| 1069000 | s | HLT | \HALT- EQZ OR EQF FAILURE | \; | 00B | 0040 |
| 1070000 | | | | | | |
| 1071000 | s | TFO TCOT | \SKIP IF CARRY OUT SET | \; | 00C | C08A |
| 1072000 | | | | | | |
| 1073000 | s | TFZ TACK | \SKIP IF ACK RESET | \; | 00D | C04E |
| 1074000 | | | | | | |
| 1075000 | s | HLT | \HALT- CARRY OUT OR ACK FAIL | \; | 00E | 0040 |
| 1076000 | | | | | | |
| 1077000 | s | TFZ TNAK | \SKIP IF NAK RESET | \; | 00F | C076 |
| 1078000 | | | | | | |
| 1079000 | s | HLT | \HALT- NAK FAILURE | \; | 010 | 0040 |
| 1080000 | | | | | | |
| 1081000 | | | | | | |
| 1082000 | SKIP HOF | | | ; | | |

| MODEL: MPDC-REV3D | | | RTL/6000 FILE EDIT | | 08/01/77 | 12.605 PAGE: 28 |
| --- | --- | --- | --- | --- | --- | --- |
| REVISION: 000.00 | | | MICROPROGRAM SECTION | | DOC.#: | |
| LINE # | | | SEQUENCE: SSUPCS | | ADDRESS (HEX) | IMAGE (HEX) |
| 1083000 | | | | | | |
| 1084000 | s | SEF | \SET STATUS FLOPS | \; | 011 | 0800 |
| 1085000 | | | | | | |
| 1086000 | s | TFZ TEQZ | \SKIP IF EQZ RESET | \; | 012 | C046 |
| 1087000 | | | | | | |
| 1088000 | s | TFO TEQF | \SKIP IF EQF SET | \; | 013 | C088 |
| 1089000 | | | | | | |
| 1090000 | s | HLT | \HALT- EQZ OR EQF FAILURE | \; | 014 | 0040 |
| 1091000 | | | | | | |
| 1092000 | s | TFZ TCOT | \SKIP IF CARRY OUT RESET | \; | 015 | C04A |
| 1093000 | | | | | | |
| 1094000 | s | TFO TACK | \SKIP IF ACK SET | \; | 016 | C08E |
| 1095000 | | | | | | |
| 1096000 | s | HLT | \HALT- CARRY OUT OR ACK FAIL | \; | 017 | 0040 |
| 1097000 | | | | | | |
| 1098000 | s | TFZ TNAK | \SKIP IF NAK RESET | \; | 018 | C076 |
| 1099000 | | | | | | |
| 1100000 | s | TFO TBSY | \SKIP IF BUSY SET | \; | 019 | C0B0 |
| 1101000 | | | | | | |
| 1102000 | s | HLT | \HALT- NAK OR BUSY FAILURE | \; | 01A | 0040 |
| 1103000 | | | | | | |
| 1104000 | s | CRF | \ CLEAR ALL STATUS FLOPS | \; | 01B | 0010 |
| 1105000 | | | | | | |
| 1106000 | s | CLB | \CLEAR BUS | \; | 01C | 4086 |
| 1107000 | | | | | | |
| 1108000 | \ END OF STATUS TEST | | | \; | | |
| 1109000 | | | | | | |
| 1110000 | SKIP HOF | | | ; | | |

| MODEL: MPDC-REV3D | | | RTL/6000 FILE EDIT | | 08/01/77 | 12.605 PAGE: 29 |
| --- | --- | --- | --- | --- | --- | --- |
| REVISION: 000.00 | | | MICROPROGRAM SECTION | | DOC.#: | |
| LINE # | | | SEQUENCE: SSUPCS | | ADDRESS (HEX) | IMAGE (HEX) |
| 1111000 | | | | | | |
| 1112000 | | | | | | |
| 1113000 | \BLT ALU TEST PERFORMS BASIC OPERATIONS ON THE ACUMULATOR | | | \; | | |
| 1114000 | \TO TEST THE ALU MODE BITS FOR STUCK AT ONE OR STUCK AT | | | \; | | |
| 1115000 | \ZERO CONDITIONS. | | | \; | | |
| 1116000 | | | | | | |
| 1117000 | SBLT-NEXT03 | SRB | \INHIBIT CLEAR TO BIR | \; | 01D | 4004 |
| 1118000 | | | | | | |
| 1119000 | s | XFA AACU BACU | \ M0,M3, CE STUCK AT 0 | \; | 01E | 603E |
| 1120000 | | | | | | |
| 1121000 | s | TFO TEQZ | \SKIP IF ACU=00 | \; | 01F | C086 |
| 1122000 | | | | | | |
| 1123000 | s | HLT | \ALU MODE FAILURE | \; | 020 | 0040 |
| 1124000 | | | | | | |
| 1125000 | s | ANT AACU BACU | \ M0,M3 STUCK AT ONE | \; | 021 | 6002 |
| 1126000 | | | | | | |
| 1127000 | s | TFO TEQF | \SKIP IF ACU NEQ FF | \; | 022 | C088 |
| 1128000 | | | | | | |
| 1129000 | s | HLT | \ALU MODE FAILURE | \; | 023 | 0040 |
| 1130000 | | | | | | |
| 1131000 | s | INC AACU BACU | \ M0,M3,CE,CI STUCK AT 0 | \; | 024 | 6000 |
| 1132000 | | | | | | |
| 1133000 | s | TFZ TEQZ | \SKIP IF ACU NEQ 00 | \; | 025 | C046 |

MODEL: MPDC-REV3D  
REVISION: 000.00

RTL/6000 FILE EDIT  
MICROPROGRAM SECTION

SEQUENCE: SSUPCS  
-continued

| LINE # | | | | | ADDRESS (HEX) | IMAGE (HEX) |
|---|---|---|---|---|---|---|
| 1134000 | | | | | | |
| 1135000 | S | | TFO TCOT | \SKIP IF CARRY \! | 026 | C08A |
| 1136000 | | | | | | |
| 1137000 | S | | HLT | \ALU MODE FAILURE \! | 027 | 0040 |
| 1138000 | | | | | | |
| 1139000 | S | | AACU DEC BACU | \M0.M3.CI STUCK AT 0 \! | 028 | 603C |
| 1140000 | | | | | | |
| 1141000 | S | | TFO TEQF | \SKIP IF ACU NEQ FF \! | 029 | C088 |
| 1142000 | | | | | | |
| 1143000 | S | | HLT | \ALU MODE FAILURE \! | 02A | 0040 |
| 1144000 | | | | | | |
| 1145000 | \END OF ALU TEST | | | \! | | |
| 1146000 | | | | | | |
| 1147000 | SKIP HOF | | | ! | | |

MODEL: MPDC-REV3D  
REVISION: 000.00

RTL/6000 FILE EDIT  
MICROPROGRAM SECTION

SEQUENCE: SSUPCS

| LINE # | | | | | ADDRESS (HEX) | IMAGE (HEX) |
|---|---|---|---|---|---|---|
| 1148000 | | | | | | |
| 1149000 | | | | | | |
| 1150000 | \ BLT REGISTER TEST USES A SHIFTED ONES PATTERN TO TEST \ | | | | | |
| 1151000 | \THE ACUMULATOR, BUS INTERFACE REGISTER, AND SCRATCH PAD \ | | | | | |
| 1152000 | \ADDRESS COUNTER FOR STORAGE AND SELECTION CAPABILITY. \ | | | | | |
| 1153000 | | | | | | |
| 1154000 | SBLT-NEXT04 | | \SET SPA TO ZERO | \ | 02B | 8800 |
| 1155000 | | | LCN ASPA CNST (00#) | ! | | |
| 1156000 | | | | | | |
| 1157000 | S | | \LOAD STARTING DATA PATTERN IN ACU | \ | 02C | 8001 |
| 1158000 | | | LCN AACU CNST (01#) | ! | | |
| 1159000 | | | | | | |
| 1160000 | SBLT-REGTST | | \SFT BUS REG 7 TIMES TO LOAD DATA PATTERN | \ | 02D | 6C6B |
| 1161000 | | | XFB ABUS4 BACU SRIA | ! | | |
| 1162000 | | | | | | |
| 1163000 | S | | XFB ABUS4 BACU SRIA | ! | 02E | 6C6B |
| 1164000 | | | | | | |
| 1165000 | S | | XFB ABUS4 BACU SRIA | ! | 02F | 6C6B |
| 1166000 | | | | | | |
| 1167000 | S | | XFB ABUS4 BACU SRIA | ! | 030 | 6C6B |
| 1168000 | | | | | | |
| 1169000 | S | | XFB ABUS4 BACU SRIA | ! | 031 | 6C6B |
| 1170000 | | | | | | |
| 1171000 | S | | XFB ABUS4 BACU SRIA | ! | 032 | 6C6B |
| 1172000 | | | | | | |
| 1173000 | S | | XFB ABUS4 BACU SRIA | ! | 033 | 6C6B |
| 1174000 | | | | | | |
| 1175000 | S | | \XFER SPA THRU ALU TO VALIDATE EQZ | \ | 034 | 687E |
| 1176000 | | | XFA ASPA SRIA | ! | | |
| 1177000 | | | | | | |
| 1178000 | S | | \SKIP IF EQZ FLOP SET ON PREVIOUS TRANSFER | \ | 035 | C086 |
| 1179000 | | | TFO TEQZ | ! | | |
| 1180000 | | | | | | |
| 1181000 | S | | \HALT- SPA FAILURE | \ | 036 | 0040 |
| 1182000 | | | HLT | ! | | |
| 1183000 | | | | | | |
| 1184000 | S | | \MOVE ACU TO SPA | \ | 037 | 686A |
| 1185000 | | | XFB ASPA BACU SRIA | ! | | |
| 1186000 | | | | | | |
| 1187000 | S | | \NO OP FOR TIMING | \ | 038 | 0000 |
| 1188000 | | | NOP | ! | | |
| 1189000 | | | | | | |
| 1190000 | SKIP HOF | | | | | |

MODEL: MPDC-REV3D  
REVISION: 000.00

RTL/6000 FILE EDIT  
MICROPROGRAM SECTION

SEQUENCE: SSUPCS

| LINE # | | | | | ADDRESS (HEX) | IMAGE (HEX) |
|---|---|---|---|---|---|---|
| 1191000 | S | | \CLEAR ACU | \ | 039 | 681A |
| 1192000 | | | ASPA XOR BACU | ! | | |
| 1193000 | | | | | | |
| 1194000 | S | | \XFER ACU THRU ALU TO ACU TO VALIDATE EQZ | \ | 03A | 602A |
| 1195000 | | | XFB BACU | ! | | |
| 1196000 | | | | | | |
| 1197000 | S | | \SKIP IF EQZ FLOP SET ON PREVIOUS TRANSFER | \ | 03B | C086 |
| 1198000 | | | TFO TEQZ | ! | | |
| 1199000 | | | | | | |
| 1200000 | S | | \HALT- ACU FAILURE | \ | 03C | 0040 |
| 1201000 | | | HLT | ! | | |
| 1202000 | | | | | | |
| 1203000 | S | | \MOVE SPA TO ACU | \ | 03D | 683E |
| 1204000 | | | ASPA XFA BACU | ! | | |
| 1205000 | | | | | | |
| 1206000 | S | | \SET SPA EQUAL TO FF | \ | 03E | 6866 |
| 1207000 | | | XNR ASPA BACU SRIA | ! | | |
| 1208000 | | | | | | |
| 1209000 | S | | \NO OP FOR TIMING | \ | 03F | 0000 |
| 1210000 | | | NOP | ! | | |
| 1211000 | | | | | | |
| 1212000 | S | | \XFER SPA THRU ALU TO SPA TO VALIDATE EQF | \ | 040 | 687E |
| 1213000 | | | XFA ASPA BACU SRIA | ! | | |
| 1214000 | | | | | | |
| 1215000 | S | | \SKIP IF SPA EQUAL FF | \ | 041 | C088 |
| 1216000 | | | TFO TEQF | ! | | |
| 1217000 | | | | | | |
| 1218000 | S | | \HALT- SPA FAILURE | \ | 042 | 0040 |
| 1219000 | | | HLT | ! | | |
| 1220000 | | | | | | |
| 1221000 | S | | \SET SPA EQUAL TO DATA PATTERN | \ | 043 | 686A |
| 1222000 | | | XFB ASPA BACU SRIA | ! | | |
| 1223000 | | | | | | |
| 1224000 | S | | \NO OP FOR TIMING | \ | 044 | 0000 |
| 1225000 | | | NOP | ! | | |
| 1226000 | | | | | | |
| 1227000 | S | | \SET ACU EQUAL TO FF | \ | 045 | 6826 |
| 1228000 | | | ASPA XNR BACU | ! | | |
| 1229000 | | | | | | |
| 1230000 | S | | \XFER ACU THRU ALU TO ACU TO VALIDATE EQF | \ | 046 | 602A |
| 1231000 | | | XFB BACU | ! | | |
| 1232000 | | | | | | |
| 1233000 | S | | \SKIP IF ACU EQUAL FF | \ | 047 | C088 |
| 1234000 | | | TFO TEQF | ! | | |
| 1235000 | | | | | | |
| 1236000 | SKIP HOF | | | | | |

MODEL: MPDC-REV3D  
REVISION: 000.00

RTL/6000 FILE EDIT  
MICROPROGRAM SECTION

08/01/77   12.605   PAGE: 32  
DOC.#:

```
LINE #                          SEQUENCE: SSUPCS                    ADDRESS   IMAGE
                                                                    (HEX)     (HEX)
1237000
1238000  S      \HALT- ACU FAILURE                          \
1239000         HLT                                         ;        048      0040
1240000
1241000  S      \SET ACU EQUAL TO DATA PATTERN              \
1242000         ASPA XFA BACU                               ;        049      683E
1243000
1244000  S      \SET SPA TO 00                              \
1245000         XOR ASPA BACU SRIA                          ;        04A      665A
1246000
1247000  S      \COMPARE ACU WITH STORED DATA PATTERN       \
1248000         ABUS4 XOR BACU SRIA                         ;        04B      6C5B
1249000
1250000  S      \SKIP IF DATA IS THE SAME                   \
1251000         TFO TEQZ                                    ;        04C      C086
1252000
1253000  S      \HALT- BUS REG FAILURE                      \
1254000         HLT                                         ;        04D      0040
1255000
1256000  S      \SHIFT ACU TO NEXT DATA PATTERN             \
1257000         LSH AACU BACU                               ;        04E      6030
1258000
1259000  S      \SKIP IF DATA PATTERN IS NOW ZERO           \
1260000         TFO TEQZ                                    ;        04F      C086
1261000
1262000  S      GTO (SBLT-REGTST)                           ;        050      F02D
1263000
1264000  S      \SKIP IF TEST IS REALLY OVER                \
1265000         TFO TAX0 ABUS4                              ;        051      CC91
1266000
1267000  S      \HALT- BUS REG FAILURE                      \
1268000         HLT                                         ;        052      0040
1269000
1270000    \ END OF REGISTER TEST                           \
1271000
1272000 SKIP HOF                                            ;
```

MODEL: MPDC-REV3D  
REVISION: 000.00

RTL/6000 FILE EDIT  
MICROPROGRAM SECTION

08/01/77   12.605   PAGE: 33  
DOC.#:

```
LINE #                          SEQUENCE: SSUPCS                    ADDRESS   IMAGE
1273000                                                             (HEX)     (HEX)
1274000    \ THE FOLLOWING TEST IS USED TO VERIFY THE ABILITY TO    \
1275000    \LOAD A RETURN ADDRESS AS WELL AS PROPERLY RETURN.       \
1276000
1277000  SBLT-NEXT05   \LOAD STARTING COUNT                \
1278000                LCN AACU CNST (07#)                 ;        053      800B
1279000
1280000  S      \SET RETURN ADDRESS                         \
1281000         LRA (SBLT-LRA005)                           ;        054      E05B
1282000
1283000  S      \SET RETURN ADDRESS                         \
1284000         LRA (SBLT-LRA004)                           ;        055      E5FD
1285000
1286000  S      \SET RETURN ADDRESS                         \
1287000         LRA (SBLT-LRA003)                           ;        056      E5FC
1288000
1289000  S      \SET RETURN ADDRESS                         \
1290000         LRA (SBLT-LRA002)                           ;        057      E5FB
1291000
1292000  SBLT-LRA001   \RETURN VIA RETURN STACK            \
1293000                RTN                                 ;        058      C200
1294000
1295000  S      \HALT IF RETURN FAILS                       \
1296000         HLT                                         ;        059      0040
1297000
1298000  S      \HALT IF RETURN ONLY NOPS                   \
1299000         HLT                                         ;        05A      0040
1300000
1301000  SBLT-LRA005   \DECREMENT ACU                       \
1302000                DEC AACU SRIA                        ;        05B      607C
1303000
1304000  S      \SKIP IF ACU = 0                            \
1305000         TFO TEQZ                                    ;        05C      C086
1306000
1307000  S      \HALT IF RET. REG. ADD FAILURE              \
1308000         HLT                                         ;        05D      0040
1309000
1310000    \ END OF RETURN REGISTER TEST.                   \
1311000
1312000 SKIP HOF                                            ;
```

MODEL: MPDC-REV3D  
REVISION: 000.00

RTL/6000 FILE EDIT  
MICROPROGRAM SECTION

08/01/77   12.605   PAGE: 34  
DOC.#:

```
LINE #                          SEQUENCE: SSUPCS                    ADDRESS   IMAGE
1313000                                                             (HEX)     (HEX)
1314000    \ THE FOLLOWING TEST IS USED TO VERIFY THE PROPER        \
1315000    \OPERATION OF THE OFFSET RANGE COUNTER, RANGE COUNTER    \
1316000    \AND ADDRESS COUNTER. THIS TEST ALSO CHECKS FOR          \
1317000    \PROPER RESETTING OF THE OFFSET RANGE FLOP AND THE       \
1318000    \CORRECT OPERATION OF THE BYTE FLOP .                    \
1319000
1320000  SBLT-NEXT06   \HEX FF TO ACU                       \
1321000                LCN AACU CNST (FF#)                  ;        05E      83EB
1322000
1323000  S      \LOAD OFF RANGE LOW                         \
1324000         XFB ABUS4 BACU SRIA                         ;        05F      6C6B
1325000
1326000  S      \LOAD OFF RANGE HI                          \
1327000         XFB ABUS4 BACU SRIA                         ;        060      6C6B
1328000
1329000  S      \LOAD RANGE LOW                             \
1330000         XFB ABUS4 BACU SRIA                         ;        061      6C6B
1331000
1332000  S      \LOAD RANGE HI                              \
1333000         XFB ABUS4 BACU SRIA                         ;        062      6C6B
1334000
1335000  S      \HEX FD TO ACU                              \
1336000         LCN AACU CNST (FD#)                         ;        063      83E9
1337000
1338000  S      \LOAD ADDRESS LOW                           \
1339000         XFB ABUS4 BACU SRIA                         ;        064      6C6B
```

```
MODEL: MPDC-REV3J                              RTL/6000 FILE EDIT                      08/01/77    12.605 PAGE: 34
REVISION: 000.00                               MICROPROGRAM SECTION                    DOC.#:
                                                                           ADDRESS  IMAGE
LINE #                                         SEQUENCE: SSUPCS            (HEX)    (HEX)
                                                    -continued 1340000
1341000   S          \HEX FF TO ACU                              \
1342000              LCN AACU CNST (FF#)                         !         065    83EB
1343000
1344000   S          \LOAD ADDRESS MID                           \
1345000              XFB ABUS4 BACU SRIA                         !         066    6C6B
1346000
1347000   S          \LOAD ADDRESS HI                            \
1348000              XFB ABUS4 BACU SRIA                         !         067    6C6B
1349000
1350000   S          \SET OFFSET RNG CONST AND BYTE MODE         \
1351000              LCN AACU CNST (08#)                         !         068    8020
1352000
1353000   S          \LOAD CYCLE ON BUS INTERFACE                \
1354000              CYC                                         !         069    4020
1355000
1356000   S          \HEX FD TO SPA                              \
1357000              LCN ASPA CNST (FD#)                         !         06A    8BE9
1358000
1359000   S          \HEX FF TO ACU                              \
1360000              LCN CNST (FF#)                              !         06B    83EB
1361000
1362000   SKIP HOF                                               !

MODEL: MPDC-REV3D                              RTL/6000 FILE EDIT                      08/01/77    12.605 PAGE: 35
REVISION: 000.00                               MICROPROGRAM SECTION                    DOC.#:
                                                                           ADDRESS  IMAGE
LINE #                                         SEQUENCE: SSUPCS            (HEX)    (HEX)
1363000
1364000   SBLT-RANGO1  \DECREMENT OFFSET RANGE                   \
1365000                DRC                                       !         06C    4040
1366000
1367000   S          \DECREMENT FIRMWARE COUNT                   \
1368000              DEC ASPA SRIA                               !         06D    687C
1369000
1370000   S          \PROPAGATE CARRY                            \
1371000              DEC AACU SRIA COTI                          !         06E    60FC
1372000
1373000   S          \SKIP IF FIRMWARE COUNT ZERO                \
1374000              TFZ TCOT                                    !         06F    C04A
1375000
1376000   S          GTO (SBLT-RANGO1)                           !         070    F06C
1377000
1378000   S          \SKIP IF OFFSET RANGE NON-ZERO              \
1379000              TFZ TORZ                                    !         071    C060
1380000
1381000   S          \HALT-OFF RANGE COUNT INCORRECT             \
1382000              HLT                                         !         072    0040
1383000
1384000   S          \DECREMENT OFFSET RANGE                     \
1385000              DRC                                         !         073    4040
1386000
1387000   S          \SKIP IF OFFSET RANGE ZERO                  \
1388000              TFO TORZ                                    !         074    C0A0
1389000
1390000   S          \HALT - OFF RANGE COUNT INCORRECT           \
1391000              HLT                                         !         075    0040
1392000
1393000   SKIP HOF                                               !

MODEL: MPDC-REV3D                              RTL/6000 FILE EDIT                      08/01/77    12.605 PAGE: 36
REVISION: 000.00                               MICROPROGRAM SECTION                    DOC.#:
                                                                           ADDRESS  IMAGE
LINE #                                         SEQUENCE: SSUPCS            (HEX)    (HEX)
1394000
1395000   S          \HEX FF TO ACU                              \
1396000              LCN AACU CNST (FF#)                         !         076    83EB
1397000
1398000   S          \HEX FD TO SPA                              \
1399000              LCN ASPA CNST (FD#)                         !         077    8BE9
1400000
1401000   SBLT-RANGO2  \DECREMENT RANGE                          \
1402000                DRC                                       !         078    4040
1403000
1404000   S          \DECREMENT FIRMWARE COUNT                   \
1405000              DEC ASPA SRIA                               !         079    687C
1406000
1407000   S          \PROPAGATE CARRY                            \
1408000              DEC AACU SRIA COTI                          !         07A    60FC
1409000
1410000   S          \SKIP IF RANGE NON-ZERO                     \
1411000              TFZ TRGZ                                    !         07B    C062
1412000
1413000   S          \HALT - RANGE COUNT INCORRECT               \
1414000              HLT                                         !         07C    0040
1415000
1416000   S          \SKIP IF FIRMWARE COUNT ZERO                \
1417000              TFZ TCOT                                    !         07D    C04A
1418000
1419000   S          GTO (SBLT-RANGO2)                           !         07E    F078
1420000
1421000   S          \DECREMENT RANGE                            \
1422000              DRC                                         !         07F    4040
1423000
1424000   S          \NO OP FOR TIMING                           \
1425000              NOP                                         !         080    0000
1426000
1427000   S          \SKIP IF RANGE ZERO                         \
1428000              TFO TRGZ                                    !         081    C0A2
1429000
1430000   S          \HALT - RANGE COUNT INCORRECT               \
1431000              HLT                                         !         082    0040
1432000
1433000   SKIP HOF                                               !
```

```
MODEL: MPDC-REV3D                           RTL/6000 FILE EDIT                    08/01/77    12.605  PAGE:  37
REVISION: 000.00                           MICROPROGRAM SECTION                   DOC.#:
                                                                          ADDRESS   IMAGE
LINE #                              SEQUENCE: $$UPCS                      (HEX)    (HEX)
1434000
1435000  $      \INCREMENT ADDRESS COUNTER                    \            083    4100
1436000         IAC                                           ;
1437000
1438000  $      \ NOOP FOR TIMING                             \            084    0000
1439000         NOP                                           ;
1440000
1441000  $      \SKIP IF BYTE MODE RESET                      \            085    C078
1442000         TFZ TBYT                                      ;
1443000
1444000  $      \HALT - BYTE MODE NOT WORKING                 \            086    0040
1445000         HLT                                           ;
1446000
1447000  $      \INCREMENT ADDRESS COUNTER                    \            087    4100
1448000         IAC                                           ;
1449000
1450000  $      \ NO OP FOR TIMING                            \            088    0000
1451000         NOP                                           ;
1452000
1453000  $      \SHIFT ADDRESS                                \            089    6C3F
1454000         XFA ABUS4 BACU                                ;
1455000
1456000  $      \SHIFT ADDRESS                                \            08A    6C3F
1457000         XFA ABUS4 BACU                                ;
1458000
1459000  $      \SHIFT ADDRESS                                \            08B    6C3F
1460000         XFA ABUS4 BACU                                ;
1461000
1462000  $      \SHIFT ADDRESS                                \            08C    6C3F
1463000         XFA ABUS4 BACU                                ;
1464000
1465000  $      \LOW ADDRESS BYTE TO ACU                      \            08D    6C3F
1466000         XFA ABUS4 BACU                                ;
1467000
1468000  $      \OR MID ADDR BYTE WITH ACU                    \            08E    6C3B
1469000         ORR ABUS4 BACU                                ;
1470000
1471000  $      \OR HI ADDR BYTE WITH ACU                     \            08F    6C3B
1472000         ORR ABUS4 BACU                                ;
1473000
1474000  $      \SKIP IF ACU EQUAL TO 00                      \            090    C086
1475000         TFO TEQZ                                      ;
1476000
1477000  $      \HALT ADDRESS COUNTER NOT WORKING             \            091    0040
1478000         HLT                                           ;
1479000
1480000     \END OF BUS INTERFACE REGISTER TEST               \
1481000
1482000 SKIP HOF                                              ;

MODEL: MPDC-REV3D                           RTL/6000 FILE EDIT                    08/01/77    12.605  PAGE:  38
REVISION: 000.00                           MICROPROGRAM SECTION                   DOC.#:
                                                                          ADDRESS   IMAGE
LINE #                              SEQUENCE: $$UPCS                      (HEX)    (HEX)
1483000
1484000     \THE FOLLOWING TEST VERIFIES THE OPERATION OF THE \
1485000     \INDEX REGISTER.                                  \
1486000
1487000 $BLT-NEXT07  \HEX 00 TO SPA                           \            092    8800
1488000         LCN ASPA CNST (00#)                           ;
1489000
1490000  $      \HEX 00 TO ACU                                \            093    8000
1491000         LCN AACU CNST (00#)                           ;
1492000
1493000 $BLT-INDEX   \SET INDEX REG FOR LCN                   \            094    A030
1494000         LIR AACU                                      ;
1495000
1496000  $      \COMPARE ACU WITH INDEX REGISTER              \            095    6C5A
1497000         XOR AIDX BACU SRIA                            ;
1498000
1499000  $      \SKIP IF ACU EQUALS INDEXED SPA               \            096    C086
1500000         TFO TEQZ                                      ;
1501000
1502000  $      \HALT - INDEX REG. BITS STUCK                 \            097    0040
1503000         HLT                                           ;
1504000
1505000  $      \INCREMENT ACU                                \            098    6000
1506000         INC                                           ;
1507000
1508000  $      \SKIP IF ALL CHANNELS CHECKED                 \            099    C09A
1509000         TFO TAX5 AACU                                 ;
1510000
1511000  $      \GO TO CHECK NEXT CHANNEL                     \            09A    F094
1512000         GTO ($BLT-INDEX)                              ;
1513000
1514000 SKIP HOF                                              ;

MODEL: MPDC-REV3D                           RTL/6000 FILE EDIT                    08/01/77    12.605  PAGE:  39
REVISION: 000.00                           MICROPROGRAM SECTION                   DOC.#:
                                                                          ADDRESS   IMAGE
LINE #                              SEQUENCE: $$UPCS                      (HEX)    (HEX)
1515000 \THE FOLLOWING PORTION OF THE INDEX REGISTER TEST CHECKS
1516000 THE ABILITY TO CORRECTLY ADDRESS INDEXED SPM.         \
1517000
1518000  $      \CLEAR ACU                                    \            09B    0010
1519000         CRF                                           ;
1520000
1521000  $      \CLEAR SPA                                    \            09C    8800
1522000         LCN ASPA CNST (00#)                           ;
1523000
1524000  $      \LOAD INDEX REGISTER                          \            09D    A030
1525000         LIR                                           ;
1526000
1527000  $      \SET SPA FOR INDEXED MODE                     \            09E    8C00
1528000         LCN ASPAI CNST (00#)                          ;
1529000
1530000 $BLT-IDX1  \WRITE MEMORY FROM INDEX REGISTER          \            09F    AE00
1531000         MWT AIDX                                      ;
1532000
1533000  $      \INCREMENT INDEX REGISTER                     \            0A0    6C00
1534000         INC AIDX                                      ;
1535000
```

MODEL: MPDC-REV3D  
REVISION: 000.00  
RTL/6000 FILE EDIT  
MICROPROGRAM SECTION  
08/01/77  12.605  PAGE: 39  
DOC.#:

| LINE # | | | SEQUENCE: $SUPCS -continued | | ADDRESS (HEX) | IMAGE (HEX) |
|---|---|---|---|---|---|---|
| 1536000 | S | | \LOAD INDEX REGISTER | \ | 0A1 | A030 |
| 1537000 | | | LIR | ; | | |
| 1538000 | | | | | | |
| 1539000 | S | | \SKIP IF ALL CHANNELS DONE | \ | 0A2 | C09A |
| 1540000 | | | TFO TAX5 | ; | | |
| 1541000 | | | | | | |
| 1542000 | S | | GTO ($BLT-IDX1) | ; | 0A3 | F09F |
| 1543000 | | | | | | |
| 1544000 | | SBLT-IDX2 | \COMPARE INDEX REG WITH SPM | \ | 0A4 | 6D1A |
| 1545000 | | | XOR AIDX BSPM | ; | | |
| 1546000 | | | | | | |
| 1547000 | S | | \SKIP IF EQUAL | \ | 0A5 | C0B6 |
| 1548000 | | | TFO TEQZ | ; | | |
| 1549000 | | | | | | |
| 1550000 | S | | \INDEX REG OR SPM FAILURE | \ | 0A6 | 0040 |
| 1551000 | | | HLT | ; | | |
| 1552000 | | | | | | |
| 1553000 | S | | \DECREMENT INDEX REG | \ | 0A7 | 6C3C |
| 1554000 | | | DEC AIDX | ; | | |
| 1555000 | | | | | | |
| 1556000 | S | | \LOAD INDEX REG | \ | 0A8 | A030 |
| 1557000 | | | LIR | ; | | |
| 1558000 | | | | | | |
| 1559000 | S | | \SKIP IF ALL CHANNELS CHECKED | \ | 0A9 | C09A |
| 1560000 | | | TFO TAX5 | ; | | |
| 1561000 | | | | | | |
| 1562000 | S | | GTO ($BLT-IDX2) | ; | 0AA | F0A4 |
| 1563000 | | | | | | |
| 1564000 | \END OF INDEX REGISTER TEST. | | | \ | | |
| 1565000 | SKIP HOF | | | ; | | |

MODEL: MPDC-REV3D  
REVISION: 000.00  
RTL/6000 FILE EDIT  
MICROPROGRAM SECTION  
08/01/77  12.605  PAGE: 40  
DOC.#:

| LINE # | | | SEQUENCE: $SUPCS | | ADDRESS (HEX) | IMAGE (HEX) |
|---|---|---|---|---|---|---|
| 1566000 | \ BLT SCRATCH PAD ROW TEST USES ALL ONES DATA PATTERN TO | | | \ | | |
| 1567000 | \CHECK SCRATCH PAD MEMORY FOR ADJACENT ROW INTERFERENCE. | | | \ | | |
| 1568000 | | | | | | |
| 1569000 | | | | | | |
| 1570000 | | SBLT-NEXT08 | \LOAD RETURN ADDRESS | \ | 0AB | E0AD |
| 1571000 | | | LRA ($BLT-SPMROW) | ; | | |
| 1572000 | | | | | | |
| 1573000 | S | | \GO TO CLEAR SCRATCH PAD | \ | 0AC | F1F1 |
| 1574000 | | | GTO ($CLEARSPM00) | ; | | |
| 1575000 | | | | | | |
| 1576000 | | SBLT-SPMROW | \CLEAR ACU | \ | 0AD | 0010 |
| 1577000 | | | CRF | ; | | |
| 1578000 | | | | | | |
| 1579000 | S | | \CLEAR SPA | \ | 0AE | 8800 |
| 1580000 | | | LCN ASPA CNST (00#) | ; | | |
| 1581000 | | | | | | |
| 1582000 | S | | \SET S. P. TEST MODE | \ | 0AF | A080 |
| 1583000 | | | SPT | ; | | |
| 1584000 | | | | | | |
| 1585000 | S | | \SET RETURN REG. FOR TEST DONE | \ | 0B0 | E0C6 |
| 1586000 | | | LRA ($BLT-SPDONE) | ; | | |
| 1587000 | | | | | | |
| 1588000 | S | | \SET RETURN REG. FOR TESTING 256 LOCATIONS | \ | 0B1 | E0B4 |
| 1589000 | | | LRA ($BLT-ROWWRT) | ; | | |
| 1590000 | | | | | | |
| 1591000 | S | | \SET RETURN REG. FOR TESTING 256 LOCATIONS | \ | 0B2 | E0B4 |
| 1592000 | | | LRA ($BLT-ROWWRT) | ; | | |
| 1593000 | | | | | | |
| 1594000 | S | | \SET RETURN REG. FOR TESTING 256 LOCATIONS | \ | 0B3 | E0B4 |
| 1595000 | | | LRA ($BLT-ROWWRT) | ; | | |
| 1596000 | | | | | | |
| 1597000 | | SBLT-ROWWRT | \LOAD ACU WITH ALL ONES | \ | 0B4 | 83EB |
| 1598000 | | | LCN AACU  CNST(FF#) | ; | | |
| 1599000 | | | | | | |
| 1600000 | S | | \STORE ALL ONES | \ | 0B5 | A200 |
| 1601000 | | | MWT AACU | ; | | |
| 1602000 | | | | | | |
| 1603000 | S | | \COPY SCRATCH PAD ADDRESS | \ | 0B6 | 6B3E |
| 1604000 | | | ASPA XFA BACU | ; | | |
| 1605000 | | | | | | |
| 1606000 | SKIP HOF | | | ; | | |

MODEL: MPDC-REV3D  
REVISION: 000.00  
RTL/6000 FILE EDIT  
MICROPROGRAM SECTION  
08/01/77  12.605  PAGE: 41  
DOC.#:

| LINE # | | | SEQUENCE: $SUPCS | | ADDRESS (HEX) | IMAGE (HEX) |
|---|---|---|---|---|---|---|
| 1607000 | | | | | | |
| 1608000 | | SBLT-ROWADD | \INCREMENT ADDRESS | \ | 0B7 | A100 |
| 1609000 | | | IMA | ; | | |
| 1610000 | | | | | | |
| 1611000 | S | | \ XFER S.P CONTENTS THRU ALU TO VALIDATE EQZ | \ | 0B8 | 612A |
| 1612000 | | | XFB BSPM | ; | | |
| 1613000 | | | | | | |
| 1614000 | S | | \SKIP IF SCRATCH PAD NOT ALL ZERO | \ | 0B9 | C046 |
| 1615000 | | | TFZ TEQZ | ; | | |
| 1616000 | | | | | | |
| 1617000 | S | | \GO TEST NEXT ADDRESS | \ | 0BA | F0B7 |
| 1618000 | | | GTO ($BLT-ROWADD) | ; | | |
| 1619000 | | | | | | |
| 1620000 | S | | \SKIP IF SCRATCH PAD IS ALL ONES | \ | 0BB | C0B8 |
| 1621000 | | | TFO TEQF | ; | | |
| 1622000 | | | | | | |
| 1623000 | S | | HLT   \HALT- SPM FAILURE | \; | 0BC | 0040 |
| 1624000 | | | | | | |
| 1625000 | S | | \CHECK IF RIGHT ADDRESS | \ | 0BD | 681A |
| 1626000 | | | ASPA XOR BACU | ; | | |
| 1627000 | | | | | | |
| 1628000 | S | | \SKIP IF RIGHT ADDRESS | \ | 0BE | C0B6 |
| 1629000 | | | TFO TEQZ | ; | | |
| 1630000 | | | | | | |
| 1631000 | S | | HLT   \HALT- SPM FAILURE | \; | 0BF | 0040 |
| 1632000 | | | | | | |
| 1633000 | S | | \REPLACE ALL ONES WITH ALL ZEROS | \ | 0C0 | A300 |
| 1634000 | | | WIA AACU | ; | | |
| 1635000 | | | | | | |
| 1636000 | S | | \ NO OP FOR TIMING | \ | 0C1 | 0000 |

```
MODEL: MPDC-REV3D                                    RTL/6000 FILE EDIT                            08/01/77    12.605  PAGE:  41
REVISION: 000.00                                     MICROPROGRAM SECTION                          DOC.#:
                                                                                    ADDRESS  IMAGE
LINE #                                       SEQUENCE: SSUPCS                       (HEX)    (HEX)
                                                    -continued
1637000                   NOP                                              ;
1638000
1639000   S               \CHECK FOR 256 BOUNDARY                          \          0C2    687E
1640000                   XFA ASPA SRIA                                    ;
1641000
1642000   S               \SKIP IF ADDRESS IS ZERO                         \          0C3    C086
1643000                   TFO TEQZ                                         ;
1644000
1645000   S               \GO TO TEST NEXT ROW                             \          0C4    F0B4
1646000                   GTO (SBLT-ROWWRT)                                ;
1647000
1648000   S               \256 BOUNDARY COMPLETE                           \          0C5    C200
1649000                   RTN                                              ;
1650000
1651000   SBLT-SPDONE     \RESET S. P. TEST MODE                           \          0C6    0010
1652000                   CRF                                              ;
1653000
1654000       \END OF SCRATCH PAD MEMORY ROW CHECK                         \
1655000  SKIP HOF                                                          ;

MODEL: MPDC-REV3D                                    RTL/6000 FILE EDIT                            08/01/77    12.605  PAGE:  42
REVISION: 000.00                                     MICROPROGRAM SECTION                          DOC.#:
                                                                                    ADDRESS  IMAGE
LINE #                                       SEQUENCE: SSUPCS                       (HEX)    (HEX)
1656000       \THE FOLLOWING ROUTINE IS USED TO TEST THE SCRATCH           \
1657000       \PAD ADDRESS REGISTER AND MEMORY. THE TEST WRITES            \
1658000       \LOC 00=00#, LOC 01=01#, LOC 02=02#, LOC 03=03#, ETC         \
1659000       \THEN EACH LOC IS VERIFIED FOR THE PROPER CONTENTS.          \
1660000       \NOTE- FURTHER TESTS USE SPM BASED ON THESE CONTENTS.        \
1661000
1662000   SBLT-NEXT09     \CLEAR ACU                                       \          0C7    0010
1663000                   CRF                                              ;
1664000
1665000   S               \CLEAR SPA                                       \          0C8    8800
1666000                   LCN ASPA CNST (00#)                              ;
1667000
1668000   S               \SET S. P. TEST MODE                             \          0C9    A080
1669000                   SPT                                              ;
1670000
1671000   SBLT-SPM101     \WRITE SPM FROM SPA                              \          0CA    AA00
1672000                   MWT ASPA                                         ;
1673000
1674000   S               \COMPARE ACU TO SPM                              \          0CB    611A
1675000                   XOR AACU BSPM                                    ;
1676000
1677000   S               \ SKIP IF VALID COMPARISON                       \          0CC    C086
1678000                   TFO TEQZ                                         ;
1679000
1680000   S               \HALT - SPA OR SPM ERROR                         \          0CD    0040
1681000                   HLT                                              ;
1682000
1683000   S               \INCREMENT SPA                                   \          0CE    A100
1684000                   IMA                                              ;
1685000
1686000   S               \INCREMENT ACU                                   \          0CF    6040
1687000                   INC AACU SRIA                                    ;
1688000
1689000   S               \SKIP IF LAST ADDRESS CHECKED                    \          0D0    C0A6
1690000                   TFO TSAW                                         ;
1691000
1692000   S               GTO (SBLT-SPM101)                                ;          0D1    F0CA
1693000
1694000  SKIP HOF                                                          ;

MODEL: MPDC-REV3D                                    RTL/6000 FILE EDIT                            08/01/77    12.605  PAGE:  43
REVISION: 000.00                                     MICROPROGRAM SECTION                          DOC.#:
                                                                                    ADDRESS  IMAGE
LINE #                                       SEQUENCE: SSUPCS                       (HEX)    (HEX)
1695000       \ THE FOLLOWING TEST IS USED TO TEST THE SPA REG. IT
1696000         STARTS WITH THE SPA = 400# AND DECREMENTS UNTIL ALL
1697000         ZEROS ARE REACHED.                                         \
1698000
1699000   SBLT-SPMD01     \DECREMENT SPA                                   \          0D2    A008
1700000                   DMA                                              ;
1701000
1702000   S               \DECREMENT ACU                                   \          0D3    603C
1703000                   DEC                                              ;
1704000
1705000   S               \COMPARE ACU TO SPM                              \          0D4    611A
1706000                   XOR AACU BSPM                                    ;
1707000
1708000   S               \SKIP IF VALID COMPARISON                        \          0D5    C086
1709000                   TFO TEQZ                                         ;
1710000
1711000   S               \HALT - SPA OR SPM ERROR                         \          0D6    0040
1712000                   HLT                                              ;
1713000
1714000   S               \SKIP IF LAST ADDRESS CHECKED                    \          0D7    C0A6
1715000                   TFO TSAW                                         ;
1716000
1717000   S               GTO (SBLT-SPMD01)                                ;          0D8    F0D2
1718000
1719000       \END OF SPA AND SPM TEST                                     \
1720000
1721000  SKIP HOF                                                          ;

MODEL: MPDC-REV3D                                    RTL/6000 FILE EDIT                            08/01/77    12.605  PAGE:  44
REVISION: 000.00                                     MICROPROGRAM SECTION                          DOC.#:
                                                                                    ADDRESS  IMAGE
LINE #                                       SEQUENCE: SSUPCS                       (HEX)    (HEX)
1722000       \THE FOLLOWING TEST IS USED TO VERIFY THE LOAD CAPABILITY
1723000        OF THE BUS INTERFACE SHIFT REGISTER. THE TEST LOADS THE
1724000        BUS REG FROM SPM WHICH WAS PREVIOUSLY LOADED BY THE
1725000        SBLT-NEXT09 ROUTINE.                                        \
1726000
1727000   SBLT-NEXT10     \CLEAR ACU                                       \          0D9    0010
1728000                   CRF                                              ;
1729000
1730000   S               \CLEAR SPA                                       \          0DA    8800
1731000                   LCN ASPA CNST (00#)                              ;
```

MODEL: MPDC-REV30  
REVISION: 000.00

RTL/6000 FILE EDIT  
MICROPROGRAM SECTION

SEQUENCE: $$UPCS  
-continued

| LINE # | | | | ADDRESS (HEX) | IMAGE (HEX) |
|---|---|---|---|---|---|
| 1732000 | | | | | |
| 1733000 | S | \SET S.P. TEST MODE | \ | 0DB | A080 |
| 1734000 | | SPT | ; | | |
| 1735000 | | | | | |
| 1736000 | S | \HEX FF TO ACU | \ | 0DC | 83EB |
| 1737000 | | LCN CNST (FF#) | ; | | |
| 1738000 | | | | | |
| 1739000 | S | \ACU TO SPA | \ | 0DD | 686A |
| 1740000 | | XFB ASPA SRIA | ; | | |
| 1741000 | | | | | |
| 1742000 | $BL1-BUSSR1 | \SPM TO BUS INTERFACE REGISTER | \ | 0DE | 6D6B |
| 1743000 | | XFB ABUS4 BSPM SRIA | ; | | |
| 1744000 | | | | | |
| 1745000 | S | \DECREMENT SPA | \ | 0DF | A008 |
| 1746000 | | DMA | ; | | |
| 1747000 | | | | | |
| 1748000 | S | \SPM TO BUS INTERFACE REGISTER | \ | 0E0 | 6D6B |
| 1749000 | | XFB ABUS4 BSPM SRIA | ; | | |
| 1750000 | | | | | |
| 1751000 | S | \DECREMENT SPA | \ | 0E1 | A008 |
| 1752000 | | DMA | ; | | |
| 1753000 | | | | | |
| 1754000 | S | \SPM TO BUS INTERFACE REGISTER | \ | 0E2 | 6D6B |
| 1755000 | | XFB ABUS4 BSPM SRIA | ; | | |
| 1756000 | | | | | |
| 1757000 | S | \DECREMENT SPA | \ | 0E3 | A008 |
| 1758000 | | DMA | ; | | |
| 1759000 | | | | | |
| 1760000 | S | \SPM TO BUS INTERFACE REGISTER | \ | 0E4 | 6D6B |
| 1761000 | | XFB ABUS4 BSPM SRIA | ; | | |
| 1762000 | | | | | |
| 1763000 | S | \DECREMENT SPA | \ | 0E5 | A008 |
| 1764000 | | DMA | ; | | |
| 1765000 | | | | | |
| 1766000 | SKIP HOF | | ; | | |

MODEL: MPDC-REV30  
REVISION: 000.00

RTL/6000 FILE EDIT  
MICROPROGRAM SECTION

SEQUENCE: $$UPCS

| LINE # | | | | ADDRESS (HEX) | IMAGE (HEX) |
|---|---|---|---|---|---|
| 1767000 | S | \SPM TO BUS INTERFACE REGISTER | \ | 0E6 | 6D6B |
| 1768000 | | XFB ABUS4 BSPM SRIA | ; | | |
| 1769000 | | | | | |
| 1770000 | S | \DECREMENT SPA | \ | 0E7 | A008 |
| 1771000 | | DMA | ; | | |
| 1772000 | | | | | |
| 1773000 | S | \SPM TO BUS INTERFACE REGISTER | \ | 0E8 | 6D6B |
| 1774000 | | XFB ABUS4 BSPM SRIA | ; | | |
| 1775000 | | | | | |
| 1776000 | S | \DECREMENT SPA | \ | 0E9 | A008 |
| 1777000 | | DMA | ; | | |
| 1778000 | | | | | |
| 1779000 | S | \SPM TO BUS INTERFACE REGISTER | \ | 0EA | 6D6B |
| 1780000 | | XFB ABUS4 BSPM SRIA | ; | | |
| 1781000 | | | | | |
| 1782000 | S | \DECREMENT SPA | \ | 0EB | A008 |
| 1783000 | | DMA | ; | | |
| 1784000 | | | | | |
| 1785000 | $BLT-BUSSR2 | \COMPARE ACU TO BUS INTERFACE REG | \ | 0EC | 6C5B |
| 1786000 | | XOR ABUS4 BACU SRIA | ; | | |
| 1787000 | | | | | |
| 1788000 | S | \SKIP IF EQUAL | \ | 0ED | C086 |
| 1789000 | | TFO TEQZ | ; | | |
| 1790000 | | | | | |
| 1791000 | S | \HALT- BUS INTERFACE REG FAILURE | \ | 0EE | 0040 |
| 1792000 | | HLT | ; | | |
| 1793000 | | | | | |
| 1794000 | S | \DECREMENT ACU | \ | 0EF | 603C |
| 1795000 | | DEC | ; | | |
| 1796000 | | | | | |
| 1797000 | S | \COMPARE ACU TO SPM | \ | 0F0 | 611A |
| 1798000 | | XOR AACU BSPM | ; | | |
| 1799000 | | | | | |
| 1800000 | S | \SKIP IF EQUAL | \ | 0F1 | C086 |
| 1801000 | | TFO TEQZ | ; | | |
| 1802000 | | | | | |
| 1803000 | S | GTO ($BLT-BUSSR2) | ; | 0F2 | F0EC |
| 1804000 | | | | | |
| 1805000 | S | \SKIP IF SPA WRAPAROUND(TEST DONE) | \ | 0F3 | C0A6 |
| 1806000 | | TFO TSAW | ; | | |
| 1807000 | | | | | |
| 1808000 | S | GTO ($BLT-BUSSR1) | ; | 0F4 | F0DE |
| 1809000 | | | | | |
| 1810000 | | \END OF BUS INTERFACE REGISTER TEST | \ | | |
| 1811000 | | | | | |
| 1812000 | SKIP HOF | | ; | | |

MODEL: MPDC-REV30  
REVISION: 000.00

RTL/6000 FILE EDIT  
MICROPROGRAM SECTION

SEQUENCE: $$UPCS

| LINE # | | | | ADDRESS (HEX) | IMAGE (HEX) |
|---|---|---|---|---|---|
| 1813000 | | \THE FOLLOWING TEST IS USED TO VERIFY THE LOAD CAPABILITY | | | |
| 1814000 | | OF THE ADAPTER FIFO. THE TEST LOADS THE ADAPTER FIFO | | | |
| 1815000 | | FROM SPM WHICH WAS PREVIOUSLY LOADED BY THE $BLT-NEXT09 | | | |
| 1816000 | | ROUTINE. | \ | | |
| 1817000 | | | | | |
| 1818000 | $BLT-NEXT11 | \CLEAR ACU | \ | 0F5 | 0010 |
| 1819000 | | CRF | ; | | |
| 1820000 | | | | | |
| 1821000 | S | \RESET ENABLE HARDWARE | \ | 0F6 | C050 |
| 1822000 | | TFZ TAXO AACU | ; | | |
| 1823000 | | | | | |
| 1824000 | S | TFO TAXO AACU | ; | 0F7 | C090 |
| 1825000 | | | | | |
| 1826000 | S | \NO OP | \ | 0F8 | 0000 |
| 1827000 | | NOP | ; | | |
| 1828000 | | | | | |
| 1829000 | S | \CLEAR SPA | \ | 0F9 | 8800 |
| 1830000 | | LCN ASPA CNST (00#) | ; | | |
| 1831000 | | | | | |
| 1832000 | S | \CLEAR ADAPTER COMMAND REGISTER | \ | 0FA | 9800 |
| 1833000 | | LCN AAD2 CNST (00#) | ; | | |

| | | | | | |
|---|---|---|---|---|---|
MODEL: MPDC-REV3D  
REVISION: 000.00

RTL/6000 FILE EDIT  
MICROPROGRAM SECTION

08/01/77  DOC.#:  12,605  PAGE: 46

| LINE # | | | SEQUENCE: SSUPCS -continued | | ADDRESS (HEX) | IMAGE (HEX) |
|---|---|---|---|---|---|---|
| 1834000 | | | | | | |
| 1835000 | S | | \CLEAR ADAPTER FIFO | \ | OFB | 746B |
| 1836000 | | | XFB AAD5 SRIA | ; | | |
| 1837000 | | | | | | |
| 1838000 | S | | \SET S.P. TEST MODE | \ | OFC | A080 |
| 1839000 | | | SPT | ; | | |
| 1840000 | | | | | | |
| 1841000 | S | | \RESET ADAPTER | \ | OFD | 0088 |
| 1842000 | | | RDA | ; | | |
| 1843000 | | | | | | |
| 1844000 | S | | \SET RANGE COUNTER TO NON ZERO | \ | OFE | 4040 |
| 1845000 | | | DRC | ; | | |
| 1846000 | | | | | | |
| 1847000 | S | | \HEX FF TO ACU | \ | OFF | 83EB |
| 1848000 | | | LCN CNST (FF#) | ; | | |
| 1849000 | | | | | | |
| 1850000 | S | | \ACU TO SPA | \ | 100 | 686A |
| 1851000 | | | XFB ASPA SRIA | ; | | |
| 1852000 | | | | | | |
| 1853000 | SKIP HOF | | | ; | | |

MODEL: MPDC-REV3D  
REVISION: 000.00

RTL/6000 FILE EDIT  
MICROPROGRAM SECTION

08/01/77  DOC.#:  12,605  PAGE: 47

| LINE # | | | SEQUENCE: SSUPCS | | ADDRESS (HEX) | IMAGE (HEX) |
|---|---|---|---|---|---|---|
| 1854000 | SBLT-ADFIFO | | \SPM TO ADAPTER FIFO | \ | 101 | 716A |
| 1855000 | | | XFB AAD0 BSPM SRIA | ; | | |
| 1856000 | | | | | | |
| 1857000 | S | | \DECREMENT SPA | \ | 102 | A008 |
| 1858000 | | | DMA | ; | | |
| 1859000 | | | | | | |
| 1860000 | S | | \SPM TO ADAPTER FIFO | \ | 103 | 716A |
| 1861000 | | | XFB AAD0 BSPM SRIA | ; | | |
| 1862000 | | | | | | |
| 1863000 | S | | \INCREMENT SPA | \ | 104 | A100 |
| 1864000 | | | IMA | ; | | |
| 1865000 | | | | | | |
| 1866000 | S | | \LOAD ADAPTER COMMAND | \ | 105 | 9B02 |
| 1867000 | | | LCN AAD2 CNST (C2#) | ; | | |
| 1868000 | | | | | | |
| 1869000 | S | | \ENABLE READ HARDWARE PATH | \ | 106 | 0600 |
| 1870000 | | | ERP | ; | | |
| 1871000 | | | | | | |
| 1872000 | S | | \TRANSFER ADAPTER FIFO TO ACU | \ | 107 | 603E |
| 1873000 | | | XFA | ; | | |
| 1874000 | | | | | | |
| 1875000 | S | | \UNLOAD BYTE FROM ADAPTER FIFO | \ | 108 | 7C7F |
| 1876000 | | | XFA AAD7 SRIA | ; | | |
| 1877000 | | | | | | |
| 1878000 | SKIP HOF | | | ; | | |

MODEL: MPDC-REV3D  
REVISION: 000.00

RTL/6000 FILE EDIT  
MICROPROGRAM SECTION

08/01/77  DOC.#:  12,605  PAGE: 48

| LINE # | | | SEQUENCE: SSUPCS | | ADDRESS (HEX) | IMAGE (HEX) |
|---|---|---|---|---|---|---|
| 1879000 | S | | \NO OP FOR TIMING | \ | 109 | 0000 |
| 1880000 | | | NOP | ; | | |
| 1881000 | | | | | | |
| 1882000 | S | | \SKIP IF ADAPTER HARDWARE REQUEST | \ | 10A | C080 |
| 1883000 | | | TFO TAHR | ; | | |
| 1884000 | | | | | | |
| 1885000 | S | | \HALT- ADAPTER FAILURE | \ | 10B | 0040 |
| 1886000 | | | HLT | ; | | |
| 1887000 | | | | | | |
| 1888000 | S | | \COMPARE ACU TO SPA | \ | 10C | 681A |
| 1889000 | | | XOR ASPA | ; | | |
| 1890000 | | | | | | |
| 1891000 | S | | \SKIP IF EQUAL | \ | 10D | C086 |
| 1892000 | | | TFO TEQZ | ; | | |
| 1893000 | | | | | | |
| 1894000 | S | | \HALT- ADAPTER FIFO ERROR | \ | 10E | 0040 |
| 1895000 | | | HLT | ; | | |
| 1896000 | | | | | | |
| 1897000 | S | | \DECREMENT SPA | \ | 10F | A008 |
| 1898000 | | | DMA | ; | | |
| 1899000 | | | | | | |
| 1900000 | S | | \LOAD ADAPTER COMMAND | \ | 110 | 9B02 |
| 1901000 | | | LCN AAD2 CNST (C2#) | ; | | |
| 1902000 | | | | | | |
| 1903000 | S | | \ENABLE READ HARDWARE PATH | \ | 111 | 0600 |
| 1904000 | | | ERP | ; | | |
| 1905000 | | | | | | |
| 1906000 | S | | \TRANSFER ADAPTER FIFO TO ACU | \ | 112 | 603E |
| 1907000 | | | XFA | ; | | |
| 1908000 | | | | | | |
| 1909000 | S | | \UNLOAD BYTE FROM ADAPTER FIFO | \ | 113 | 7C7F |
| 1910000 | | | XFA AAD7 SRIA | ; | | |
| 1911000 | | | | | | |
| 1912000 | S | | \NO OP FOR TIMING | \ | 114 | 0000 |
| 1913000 | | | NOP | ; | | |
| 1914000 | | | | | | |
| 1915000 | S | | \SKIP IF ADAPTER HARDWARE REQ RESET | \ | 115 | C040 |
| 1916000 | | | TFZ TAHR | ; | | |
| 1917000 | | | | | | |
| 1918000 | S | | \HALT- ADAPTER FAILURE | \ | 116 | 0040 |
| 1919000 | | | HLT | ; | | |
| 1920000 | | | | | | |
| 1921000 | SKIP HOF | | | ; | | |

MODEL: MPDC-REV3D  
REVISION: 000.00

RTL/6000 FILE EDIT  
MICROPROGRAM SECTION

08/01/77  DOC.#:  12,605  PAGE: 49

| LINE # | | | SEQUENCE: SSUPCS | | ADDRESS (HEX) | IMAGE (HEX) |
|---|---|---|---|---|---|---|
| 1922000 | S | | \COMPARE ACU TO SPA | \ | 117 | 681A |
| 1923000 | | | XOR ASPA | ; | | |
| 1924000 | | | | | | |
| 1925000 | S | | \SKIP IF EQUAL | \ | 118 | C086 |
| 1926000 | | | TFO TEQZ | ; | | |
| 1927000 | | | | | | |

| MODEL: MPDC-REV3D | | | RTL/6000 FILE EDIT | | 08/01/77 12.605 PAGE: 49 |
|---|---|---|---|---|---|
| REVISION: 000.00 | | | MICROPROGRAM SECTION | | DOC.#: |
| | | | | ADDRESS | IMAGE |
| LINE # | | | SEQUENCE: SSUPCS | (HEX) | (HEX) |
| | | | -continued | | |
| 1928000 | S | \HALT- ADAPTER FIFO ERROR | \ | 119 | 0040 |
| 1929000 | | HLT | ; | | |
| 1930000 | | | | | |
| 1931000 | S | \DECREMENT SPA | \ | 11A | A008 |
| 1932000 | | DMA | ; | | |
| 1933000 | | | | | |
| 1934000 | S | \CLEAR ADAPTER COMMAND | \ | 11B | 784E |
| 1935000 | | ZER AAD2 SRIA | ; | | |
| 1936000 | | | | | |
| 1937000 | S | \SKIP IF TEST DONE | \ | 11C | C0A6 |
| 1938000 | | TFO TSAW | ; | | |
| 1939000 | | | | | |
| 1940000 | S | GTO (SBLT-ADFIFO) | ; | 11D | F101 |
| 1941000 | | | | | |
| 1942000 | S | \CLEAR ADAPTER COMMAND | \ | 11E | 9800 |
| 1943000 | | LCN AAD2 CNST (00#) | ; | | |
| 1944000 | | | | | |
| 1945000 | \END OF ADAPTER WRAPAROUND TEST | | \ | | |
| 1946000 | | | | | |
| 1947000 | SKIP HOF | | ; | | |

| MODEL: MPDC-REV3D | | | RTL/6000 FILE EDIT | | 08/01/77 12.605 PAGE: 50 |
|---|---|---|---|---|---|
| REVISION: 000.00 | | | MICROPROGRAM SECTION | | DOC.#: |
| | | | | ADDRESS | IMAGE |
| LINE # | | | SEQUENCE: SSUPCS | (HEX) | (HEX) |
| 1948000 | \THE FOLLOWING ROUTINE IS USED TO WRAP THE BUS LOGIC TO | | | | |
| 1949000 | VERIFY THE DRIVERS AND RECEIVERS AS WELL AS THE BUS | | | | |
| 1950000 | ADDRESS AND DATA REGISTERS. THE TEST SENDS BAD MODULE | | | | |
| 1951000 | ADDRESS PARITY IN ORDER TO CYCLE THE BUS WITHOUT A | | | | |
| 1952000 | RESPONSE FROM MEMORY. THERE ARE FOUR PORTIONS OF THIS | | | | |
| 1953000 | TEST DEFINED AS FOLLOWS- | | | | |
| 1954000 | | | | | |
| 1955000 | 1. CYCLE THE BUS WITH ALL ZEROS PATTERN USING THE | | | | |
| 1956000 | HARDWARE DATA TRANSFER REGISTERS. | | | | |
| 1957000 | 2. CYCLE THE BUS WITH ALL ONES PATTERN USING THE | | | | |
| 1958000 | HARDWARE DATA TRANSFER REGISTERS. | | | | |
| 1959000 | 3. CYCLE THE BUS WITH ALL ZEROS PATTERN USING THE | | | | |
| 1960000 | SECOND HALF READ REGISTERS. | | | | |
| 1961000 | 4. CYCLE THE BUS WITH ALL ONES PATTERN USING THE | | | | |
| 1962000 | SECOND HALF READ REGISTERS. | | \ | | |
| 1963000 | | | | | |
| 1964000 | SBLT-NEXT12 | \CLEAR ACU | \ | 11F | 0010 |
| 1965000 | | CRF | ; | | |
| 1966000 | | | | | |
| 1967000 | S | \CLEAR CYCLE BYTE | \ | 120 | 4020 |
| 1968000 | | CYC | ; | | |
| 1969000 | | | | | |
| 1970000 | S | \CLEAR SPA | \ | 121 | 8800 |
| 1971000 | | LCN ASPA CNST (00#) | ; | | |
| 1972000 | | | | | |
| 1973000 | S | \SET MODULE BAD PARITY | \ | 122 | A024 |
| 1974000 | | MBP | ; | | |
| 1975000 | | | | | |
| 1976000 | S | \SET RETURN FROM BUS LOAD | \ | 123 | E131 |
| 1977000 | | LRA (SBLTBUSWR1) | ; | | |
| 1978000 | | | | | |
| 1979000 | SBLTBUSLD1 | \RESET BUS | \ | 124 | 4084 |
| 1980000 | | RST | ; | | |
| 1981000 | | | | | |
| 1982000 | S | \LOAD MSB DATA | \ | 125 | 646B |
| 1983000 | | XFB ABUS2 SRIA | ; | | |
| 1984000 | | | | | |
| 1985000 | S | \LOAD LSB DATA | \ | 126 | 686B |
| 1986000 | | XFB ABUS3 SRIA | ; | | |
| 1987000 | | | | | |
| 1988000 | SKIP HOF | | ; | | |

| MODEL: MPDC-REV3D | | | RTL/6000 FILE EDIT | | 08/01/77 12.605 PAGE: 51 |
|---|---|---|---|---|---|
| REVISION: 000.00 | | | MICROPROGRAM SECTION | | DOC.#: |
| | | | | ADDRESS | IMAGE |
| LINE # | | | SEQUENCE: SSUPCS | (HEX) | (HEX) |
| 1989000 | SBLTBUSLD1A | \LOAD ADDRESS LOW | \ | 127 | 6C6B |
| 1990000 | | XFB ABUS4 SRIA | ; | | |
| 1991000 | | | | | |
| 1992000 | S | \LOAD ADDRESS MID | \ | 128 | 6C6B |
| 1993000 | | XFB ABUS4 SRIA | ; | | |
| 1994000 | | | | | |
| 1995000 | S | \LOAD ADDRESS HI | \ | 129 | 6C6B |
| 1996000 | | XFB ABUS4 SRIA | ; | | |
| 1997000 | | | | | |
| 1998000 | S | \CYCLE CONSTANT TO ACU | \ | 12A | 8300 |
| 1999000 | | LCN CNST (C0#) | ; | | |
| 2000000 | | | | | |
| 2001000 | S | \SET BUS CYCLE | \ | 12B | 4020 |
| 2002000 | | CYC | ; | | |
| 2003000 | | | | | |
| 2004000 | SBLTBUSLD2 | \SKIP IF MYDCNN SET | \ | 12C | C0AE |
| 2005000 | | TFO TDCN | ; | | |
| 2006000 | | | | | |
| 2007000 | S | GTO (SBLTBUSLD2) | ; | 12D | F12C |
| 2008000 | | | | | |
| 2009000 | S | \SET FIRMWARE BUS ACK | \ | 12E | 0002 |
| 2010000 | | SBA | ; | | |
| 2011000 | | | | | |
| 2012000 | S | \MSB OF DATA REG TO ACU | \ | 12F | 643F |
| 2013000 | | XFA ABUS2 | ; | | |
| 2014000 | | | | | |
| 2015000 | S | RTN | ; | 130 | C200 |
| 2016000 | | | | | |
| 2017000 | SKIP HOF | | ; | | |

| MODEL: MPDC-REV3D | | | RTL/6000 FILE EDIT | | 08/01/77 12.605 PAGE: 52 |
|---|---|---|---|---|---|
| REVISION: 000.00 | | | MICROPROGRAM SECTION | | DOC.#: |
| | | | | ADDRESS | IMAGE |
| LINE # | | | SEQUENCE: SSUPCS | (HEX) | (HEX) |
| 2018000 | SBLTBUSWR1 | \OR LSB OF DATA WITH ACU | \ | 131 | 6838 |
| 2019000 | | ORR ABUS3 | ; | | |
| 2020000 | | | | | |
| 2021000 | S | \OR LOW ADDRESS WITH ACU | \ | 132 | 6038 |
| 2022000 | | ORR ABUS1 | ; | | |

MODEL: MPDC-REV3D  
REVISION: 000.00  
RTL/6000 FILE EDIT  
MICROPROGRAM SECTION  
08/01/77  12.605  PAGE: 52  
DOC.#:

| LINE # | | SEQUENCE: $$UPCS -continued | | ADDRESS (HEX) | IMAGE (HEX) |
|---|---|---|---|---|---|
| 2023000 | | | | | |
| 2024000 | S | \OR MID ADDRESS WITH ACJ | \ | 133 | 603B |
| 2025000 | | ORR ABUS1 | ; | | |
| 2026000 | | | | | |
| 2027000 | S | \OR HI ADDRESS WITH ACU | \ | 134 | 603B |
| 2028000 | | ORR ABUS1 | ; | | |
| 2029000 | | | | | |
| 2030000 | S | \CHECK ACU FOR ALL ZEROS | \ | 135 | 602A |
| 2031000 | | XFB BACU | ; | | |
| 2032000 | | | | | |
| 2033000 | S | \SKIP IF ACU EQUAL TO ZERO | \ | 136 | C086 |
| 2034000 | | TFO TEQZ | ; | | |
| 2035000 | | | | | |
| 2036000 | S | \HALT- BUS WRAPAROUND FAILURE | \ | 137 | 0040 |
| 2037000 | | HLT | ; | | |
| 2038000 | | | | | |
| 2039000 | S | \HEX FF TO ACU | \ | 138 | 83EB |
| 2040000 | | LCN CNST (FF#) | ; | | |
| 2041000 | | | | | |
| 2042000 | S | \SET RETURN FROM BUS LOAD | \ | 139 | E138 |
| 2043000 | | LRA ($BLTBUSWR2) | ; | | |
| 2044000 | | | | | |
| 2045000 | S | GTO ($BLTBUSLD1) | ; | 13A | F124 |
| 2046000 | | | | | |
| 2047000 | SKIP HOF | | ; | | |

MODEL: MPDC-REV3D  
REVISION: 000.00  
RTL/6000 FILE EDIT  
MICROPROGRAM SECTION  
08/01/77  12.605  PAGE: 53  
DOC.#:

| LINE # | | SEQUENCE: $$UPCS | | ADDRESS (HEX) | IMAGE (HEX) |
|---|---|---|---|---|---|
| 2048000 | $BLTBUSWR2 | \AND LSB OF DATA WITH ACU | \ | 13B | 682F |
| 2049000 | | AND ABUS3 | ; | | |
| 2050000 | | | | | |
| 2051000 | S | \AND LOW ADDRESS WITH ACU | \ | 13C | 602F |
| 2052000 | | AND ABUS1 | ; | | |
| 2053000 | | | | | |
| 2054000 | S | \AND MID ADDRESS WITH ACU | \ | 13D | 602F |
| 2055000 | | AND ABUS1 | ; | | |
| 2056000 | | | | | |
| 2057000 | S | \AND HI ADDRESS WITH ACJ | \ | 13E | 602F |
| 2058000 | | AND ABUS1 | ; | | |
| 2059000 | | | | | |
| 2060000 | S | \CHECK ACU FOR ALL ONES | \ | 13F | 602A |
| 2061000 | | XFB BACU | ; | | |
| 2062000 | | | | | |
| 2063000 | S | \SKIP IF ACU EQUAL TO ONES | \ | 140 | C088 |
| 2064000 | | TFO TEQF | ; | | |
| 2065000 | | | | | |
| 2066000 | S | \HALT- BUS WRAPAROUND FAILURE | \ | 141 | 0040 |
| 2067000 | | HLT | ; | | |
| 2068000 | | | | | |
| 2069000 | S | \CLEAR ACU | \ | 142 | 600E |
| 2070000 | | ZER | ; | | |
| 2071000 | | | | | |
| 2072000 | S | \RESET BUS | \ | 143 | 4084 |
| 2073000 | | RST | ; | | |
| 2074000 | | | | | |
| 2075000 | S | \ONES TO MSB OF DATA | \ | 144 | 6457 |
| 2076000 | | BNT ABUS2 SRIA | ; | | |
| 2077000 | | | | | |
| 2078000 | S | \ONES TO LSB OF DATA | \ | 145 | 6857 |
| 2079000 | | BNT ABUS3 SRIA | ; | | |
| 2080000 | | | | | |
| 2081000 | S | \SET RETURN | \ | 146 | E148 |
| 2082000 | | LRA ($BLTBUSWR2A) | ; | | |
| 2083000 | | | | | |
| 2084000 | S | GTO ($BLTBUSLD1A) | ; | 147 | F127 |
| 2085000 | | | | | |
| 2086000 | $BLTBUSWR2A | \SET RETURN FROM BUS LOAD | \ | 148 | E158 |
| 2087000 | | LRA ($BLTBUSWR3) | ; | | |
| 2088000 | | | | | |
| 2089000 | S | \CLEAR ACU | \ | 149 | 600E |
| 2090000 | | ZER | ; | | |
| 2091000 | | | | | |
| 2092000 | SKIP HOF | | ; | | |

MODEL: MPDC-REV3D  
REVISION: 000.00  
RTL/6000 FILE EDIT  
MICROPROGRAM SECTION  
08/01/77  12.605  PAGE: 54  
DOC.#:

| LINE # | | SEQUENCE: $$UPCS | | ADDRESS (HEX) | IMAGE (HEX) |
|---|---|---|---|---|---|
| 2093000 | $BLTBUSLD3 | \ LOAD H.W. ADDRESS REG LOW | \ | 14A | 6C6B |
| 2094000 | | XFB ABUS4 SRIA | ; | | |
| 2095000 | | | | | |
| 2096000 | S | \ LOAD H.W. ADDRESS REG MID | \ | 14B | 6C6B |
| 2097000 | | XFB ABUS4 SRIA | ; | | |
| 2098000 | | | | | |
| 2099000 | S | \ LOAD H.W. ADDRESS HI | \ | 14C | 6C6B |
| 2100000 | | XFB ABUS4 SRIA | ; | | |
| 2101000 | | | | | |
| 2102000 | S | \LOAD MSB OF DATA REG | \ | 14D | 646B |
| 2103000 | | XFB ABUS2 SRIA | ; | | |
| 2104000 | | | | | |
| 2105000 | S | \LOAD LSB OF DATA REG | \ | 14E | 686B |
| 2106000 | | XFB ABUS3 SRIA | ; | | |
| 2107000 | | | | | |
| 2108000 | S | \LOAD MSB OF SHR REG | \ | 14F | 6057 |
| 2109000 | | BNT ABUS1 SRIA | ; | | |
| 2110000 | | | | | |
| 2111000 | S | \LOAD LSB OF SHR REG | \ | 150 | 6057 |
| 2112000 | | BNT ABUS1 SRIA | ; | | |
| 2113000 | | | | | |
| 2114000 | S | \CYCLE CONSTANT TO ACU | \ | 151 | 8340 |
| 2115000 | | LCN CNST (DD#) | ; | | |
| 2116000 | | | | | |
| 2117000 | S | \SET BUS CYCLE | \ | 152 | 4020 |
| 2118000 | | CYC | ; | | |
| 2119000 | | | | | |
| 2120000 | $BLTBUSLD4 | \SKIP IF MYDCNN SET | \ | 153 | C0AE |
| 2121000 | | TFO TDCN | ; | | |
| 2122000 | | | | | |
| 2123000 | S | GTO ($BLTBUSLD4) | ; | 154 | F153 |

| MODEL: MPDC-REV3D | | | RTL/6000 FILE EDIT | | 08/01/77 | 12.605 PAGE: 54 |
|---|---|---|---|---|---|---|
| REVISION: 000.00 | | | MICROPROGRAM SECTION | | DOC.#: | |
| LINE # | | | SEQUENCE: SSUPCS | | ADDRESS (HEX) | IMAGE (HEX) |
| | | | -continued | | | |
| 2124000 | | | | | | |
| 2125000 | S | \SET FIRMWARE BUS ACK | | \ | 155 | 0002 |
| 2126000 | | SBA | | ; | | |
| 2127000 | | | | | | |
| 2128000 | S | \MSB OF DATA REG TO ACU | | \ | 156 | 643F |
| 2129000 | | XFA ABUS2 | | ; | | |
| 2130000 | | | | | | |
| 2131000 | S | RTN | | ; | 157 | C200 |
| 2132000 | | | | | | |
| 2133000 | SKIP HOF | | | ; | | |

| MODEL: MPDC-REV3D | | | RTL/6000 FILE EDIT | | 08/01/77 | 12.605 PAGE: 55 |
|---|---|---|---|---|---|---|
| REVISION: 000.00 | | | MICROPROGRAM SECTION | | DOC.#: | |
| LINE # | | | SEQUENCE: SSUPCS | | ADDRESS (HEX) | IMAGE (HEX) |
| 2134000 | SBLTBUSWR3 | \NOR LSB OF DATA WITH ACU | | \ | 158 | 682F |
| 2135000 | | AND ABUS3 | | ; | | |
| 2136000 | | | | | | |
| 2137000 | S | \AND LOW ADDRESS WITH ACU | | \ | 159 | 602F |
| 2138000 | | AND ABUS1 | | ; | | |
| 2139000 | | | | | | |
| 2140000 | S | \AND MID ADDRESS WITH ACU | | \ | 15A | 602F |
| 2141000 | | AND ABUS1 | | ; | | |
| 2142000 | | | | | | |
| 2143000 | S | \AND HI ADDRESS WITH ACU | | \ | 15B | 601B |
| 2144000 | | XOR ABUS1 | | ; | | |
| 2145000 | | | | | | |
| 2146000 | S | \CHECK ACU FOR ALL ONES | | \ | 15C | 602A |
| 2147000 | | XFB BACU | | ; | | |
| 2148000 | | | | | | |
| 2149000 | S | \SKIP IF ACU EQUAL TO ONES | | \ | 15D | C088 |
| 2150000 | | TFO TEQF | | ; | | |
| 2151000 | | | | | | |
| 2152000 | S | \HALT- BUS SHR WRAPAROUND FAILURE | | \ | 15E | 0040 |
| 2153000 | | HLT | | ; | | |
| 2154000 | | | | | | |
| 2155000 | S | \HEX FF TO ACU | | \ | 15F | 83EB |
| 2156000 | | LCN CNST (FF#) | | ; | | |
| 2157000 | | | | | | |
| 2158000 | S | \RESET BUS | | \ | 160 | 4084 |
| 2159000 | | RST | | ; | | |
| 2160000 | | | | | | |
| 2161000 | S | \SET RETURN FROM BUS LOAD | | \ | 161 | E163 |
| 2162000 | | LRA ($BLTBUSWR4) | | ; | | |
| 2163000 | | | | | | |
| 2164000 | S | GTO ($BLTBUSLD3) | | ; | 162 | F14A |
| 2165000 | | | | | | |
| 2166000 | SKIP HOF | | | ; | | |

| MODEL: MPDC-REV3D | | | RTL/6000 FILE EDIT | | 08/01/77 | 12.605 PAGE: 56 |
|---|---|---|---|---|---|---|
| REVISION: 000.00 | | | MICROPROGRAM SECTION | | DOC.#: | |
| LINE # | | | SEQUENCE: SSUPCS | | ADDRESS (HEX) | IMAGE (HEX) |
| 2167000 | SBLTBUSWR4 | \NAND LSB OF DATA WITH ACU | | \ | 163 | 683B |
| 2168000 | | ORR ABUS3 | | ; | | |
| 2169000 | | | | | | |
| 2170000 | S | \OR LOW ADDRESS WITH ACU | | \ | 164 | 603B |
| 2171000 | | ORR ABUS1 | | ; | | |
| 2172000 | | | | | | |
| 2173000 | S | \OR MID ADDRESS WITH ACU | | \ | 165 | 603B |
| 2174000 | | ORR ABUS1 | | ; | | |
| 2175000 | | | | | | |
| 2176000 | S | \OR HI ADDRESS WITH ACU | | \ | 166 | 6027 |
| 2177000 | | XNR ABUS1 | | ; | | |
| 2178000 | | | | | | |
| 2179000 | S | \CHECK ACU FOR ALL ZEROS | | \ | 167 | 602A |
| 2180000 | | XFB BACU | | ; | | |
| 2181000 | | | | | | |
| 2182000 | S | \SKIP IF ACU EQUAL TO ZERO | | \ | 168 | C086 |
| 2183000 | | TFO TEQZ | | ; | | |
| 2184000 | | | | | | |
| 2185000 | S | \HALT- BUS SHR WRAPAROUND FAILURE | | \ | 169 | 0040 |
| 2186000 | | HLT | | ; | | |
| 2187000 | | | | | | |
| 2188000 | SKIP HOF | | | ; | | |

| MODEL: MPDC-REV3D | | | RTL/6000 FILE EDIT | | 08/01/77 | 12.605 PAGE: 57 |
|---|---|---|---|---|---|---|
| REVISION: 000.00 | | | MICROPROGRAM SECTION | | DOC.#: | |
| LINE # | | | SEQUENCE: SSUPCS | | ADDRESS (HEX) | IMAGE (HEX) |
| 2189000 | \THE FOLLOWING ROUTINE IS USED TO WRAP THE MOTHER BOARD | | | | | |
| 2190000 | FIFO THRU THE ADAPTER TO CHECK THE READ AND WRITE CYCLE | | | | | |
| 2191000 | LOGIC. | | | \ | | |
| 2192000 | | | | | | |
| 2193000 | SBLT-NEXT13 | \CLEAR ACU | | \ | 16A | 0010 |
| 2194000 | | CRF | | ; | | |
| 2195000 | | | | | | |
| 2196000 | S | \RESET ENABLE HARDWARE | | \ | 16B | C050 |
| 2197000 | | TFZ TAX0 AACU | | ; | | |
| 2198000 | | | | | | |
| 2199000 | S | TFO TAX0 AACU | | ; | 16C | C090 |
| 2200000 | | | | | | |
| 2201000 | S | NOP | | ; | 16D | 0000 |
| 2202000 | | | | | | |
| 2203000 | S | \CLEAR CYCLE REGISTER | | \ | 16E | 4020 |
| 2204000 | | CYC | | ; | | |
| 2205000 | | | | | | |
| 2206000 | S | \CLEAR ADAPTER COMMAND | | \ | 16F | 9800 |
| 2207000 | | LCN AAD2 CNST (00#) | | ; | | |
| 2208000 | | | | | | |
| 2209000 | S | \RESET BUS STATUS | | \ | 170 | 4084 |
| 2210000 | | RST | | ; | | |
| 2211000 | | | | | | |
| 2212000 | S | \CLEAR SPA | | \ | 171 | 8800 |
| 2213000 | | LCN ASPA CNST (00#) | | ; | | |
| 2214000 | | | | | | |
| 2215000 | S | \CLEAR MOTHER BOARD FIFO | | \ | 172 | 0088 |
| 2216000 | | RDA | | ; | | |
| 2217000 | | | | | | |
| 2218000 | S | \CLEAR ADAPTER FIFO | | \ | 173 | 744F |

| | | | | |
|---|---|---|---|---|
| MODEL: MPDC-REV3D | | RTL/6000 FILE EDIT | 08/01/77 | 12.605 PAGE: 57 |
| REVISION: 000.00 | | MICROPROGRAM SECTION | DOC.#: | |
| LINE # | | SEQUENCE: $SUPCS | ADDRESS IMAGE | |
| | | -continued | (HEX) (HEX) | |
| 2219000 | | ZER AAD5 SRIA | ; | |
| 2220000 | | | | |
| 2221000 $ | | \SET MODULE BAD PARITY | \ | 174 A024 |
| 2222000 | | MBP | ; | |
| 2223000 | | | | |
| 2224000 $ | | \SET S.P. TEST MODE | \ | 175 A080 |
| 2225000 | | SPT | ; | |
| 2226000 | | | | |
| 2227000 SKIP HOF | | | ; | |

| | | | | |
|---|---|---|---|---|
| MODEL: MPDC-REV3D | | RTL/6000 FILE EDIT | 08/01/77 | 12.605 PAGE: 58 |
| REVISION: 000.00 | | MICROPROGRAM SECTION | DOC.#: | |
| LINE # | | SEQUENCE: $SUPCS | ADDRESS IMAGE | |
| | | | (HEX) (HEX) | |
| 2228000 $ | | \HEX FF TO SPA | \ | 176 8BEB |
| 2229000 | | LCN ASPA CNST (FF#) | ; | |
| 2230000 | | | | |
| 2231000 $ | | \CLEAR OFFSET RANGE LOWER | \ | 177 6C6B |
| 2232000 | | XFB ABUS4 SRIA | ; | |
| 2233000 | | | | |
| 2234000 $ | | \CLEAR OFFSET RANGE HI | \ | 178 6C6B |
| 2235000 | | XFB ABUS4 SRIA | ; | |
| 2236000 | | | | |
| 2237000 $ | | \CLEAR RANGE LOW | \ | 179 6C6B |
| 2238000 | | XFB ABUS4 SRIA | ; | |
| 2239000 | | | | |
| 2240000 $ | | \CLEAR RANGE HI | \ | 17A 6C6B |
| 2241000 | | XFB ABUS4 SRIA | ; | |
| 2242000 | | | | |
| 2243000 $ | | \CLEAR ADDRESS LOW | \ | 17B 6C6B |
| 2244000 | | XFB ABUS4 SRIA | ; | |
| 2245000 | | | | |
| 2246000 $ | | \CLEAR ADDRESS MID | \ | 17C 6C6B |
| 2247000 | | XFB ABUS4 SRIA | ; | |
| 2248000 | | | | |
| 2249000 $ | | \CLEAR ADDRESS HI | \ | 17D 6C6B |
| 2250000 | | XFB ABUS4 SRIA | ; | |
| 2251000 | | | | |
| 2252000 $ | | \SET RANGE TO NON ZERO | \ | 17E 4040 |
| 2253000 | | DRC | ; | |
| 2254000 | | | | |
| 2255000 SKIP HOF | | | ; | |

| | | | | |
|---|---|---|---|---|
| MODEL: MPDC-REV3D | | RTL/6000 FILE EDIT | 08/01/77 | 12.605 PAGE: 59 |
| REVISION: 000.00 | | MICROPROGRAM SECTION | DOC.#: | |
| LINE # | | SEQUENCE: $SUPCS | ADDRESS IMAGE | |
| | | | (HEX) (HEX) | |
| 2256000 $BUSCYWRT1 | | \CYCLE CONSTANT TO ACU | \ | 17F 8182 |
| 2257000 | | LCN CNST (62#) | ; | |
| 2258000 | | | | |
| 2259000 $ | | \RESET BUS | \ | 180 4084 |
| 2260000 | | RST | ; | |
| 2261000 | | | | |
| 2262000 $ | | \SET BUS CYCLE | \ | 181 4020 |
| 2263000 | | CYC | ; | |
| 2264000 | | | | |
| 2265000 $BUSCYWRT2 | | \SKIP IF MYDCNN SET | \ | 182 C0AE |
| 2266000 | | TFO TDCN | ; | |
| 2267000 | | | | |
| 2268000 $ | | GTO ($BUSCYWRT2) | ; | 183 F182 |
| 2269000 | | | | |
| 2270000 $ | | \SET BUS ACK | \ | 184 0002 |
| 2271000 | | SBA | ; | |
| 2272000 | | | | |
| 2273000 $ | | \LOAD DATA HI | \ | 185 656B |
| 2274000 | | XFB ABUS2 BSPM SRIA | ; | |
| 2275000 | | | | |
| 2276000 $ | | \DECREMENT SPA | \ | 186 A008 |
| 2277000 | | DMA | ; | |
| 2278000 | | | | |
| 2279000 $ | | \LOAD DATA LOW | \ | 187 696B |
| 2280000 | | XFB ABUS3 BSPM SRIA | ; | |
| 2281000 | | | | |
| 2282000 $ | | \DECREMENT SPA | \ | 188 A008 |
| 2283000 | | DMA | ; | |
| 2284000 | | | | |
| 2285000 SKIP HOF | | | ; | |

| | | | | |
|---|---|---|---|---|
| MODEL: MPDC-REV3D | | RTL/6000 FILE EDIT | 08/01/77 | 12.605 PAGE: 60 |
| REVISION: 000.00 | | MICROPROGRAM SECTION | DOC.#: | |
| LINE # | | SEQUENCE: $SUPCS | ADDRESS IMAGE | |
| | | | (HEX) (HEX) | |
| 2286000 $BUSCYWRT3 | | \SKIP IF MYDCNN SET | \ | 189 C0AE |
| 2287000 | | TFO TDCN | ; | |
| 2288000 | | | | |
| 2289000 $ | | GTO ($BUSCYWRT3) | ; | 18A F189 |
| 2290000 | | | | |
| 2291000 $ | | \SET FIRMWARE BUS ACK | \ | 18B 0002 |
| 2292000 | | SBA | ; | |
| 2293000 | | | | |
| 2294000 $ | | \CLEAR ACU | \ | 18C 600E |
| 2295000 | | ZER | ; | |
| 2296000 | | | | |
| 2297000 $ | | \SKIP IF MOTHER BOARD FIFO FULL | \ | 18D C042 |
| 2298000 | | TFZ TBCA | ; | |
| 2299000 | | | | |
| 2300000 $ | | GTO ($BUSCYWRT2) | ; | 18E F182 |
| 2301000 | | | | |
| 2302000 $ | | \CLEAR ADAPTER FIFO | \ | 18F 746B |
| 2303000 | | XFB AAD5 SRIA | ; | |
| 2304000 | | | | |
| 2305000 $ | | \CLEAR CYCLE BYTE | \ | 190 4020 |
| 2306000 | | CYC | ; | |
| 2307000 | | | | |
| 2308000 $ | | \SET DATA COUNTER TO 16 | \ | 191 940B |
| 2309000 | | LCN AAD1 CNST (04#) | ; | |
| 2310000 | | | | |
| 2311000 $ | | \LOAD ADAPTER COMMAND | \ | 192 9B08 |
| 2312000 | | LCN AAD2 CNST (C4#) | ; | |
| 2313000 | | | | |

MODEL: MPDC-REV3J
REVISION: 000.00

RTL/6000 FILE EDIT
MICROPROGRAM SECTION

08/01/77    12.605  PAGE:  60
DOC.#:

| LINE # | | | SEQUENCE: SSUPCS -continued | | ADDRESS (HEX) | IMAGE (HEX) |
|---|---|---|---|---|---|---|
| 2314000 | S | | \CYCLE CONSTANT TO ACU | \ | 193 | 8182 |
| 2315000 | | | LCN CNST (62#) | ; | | |
| 2316000 | | | | | | |
| 2317000 | S | | \ENABLE WRITE HARDWARE PATH | \ | 194 | 0601 |
| 2318000 | | | EWP | ; | | |
| 2319000 | | | | | | |
| 2320000 | S | | \SET CYCLE | \ | 195 | 4020 |
| 2321000 | | | CYC | ; | | |
| 2322000 | | | | | | |
| 2323000 | SKIP HOF | | | ; | | |

MODEL: MPDC-REV3D
REVISION: 000.00

RTL/6000 FILE EDIT
MICROPROGRAM SECTION

08/01/77    12.605  PAGE:  61
DOC.#:

| LINE # | | | SEQUENCE: SSUPCS | | ADDRESS (HEX) | IMAGE (HEX) |
|---|---|---|---|---|---|---|
| 2324000 | SBUSCYWRTA1 | | \SKIP IF NO BUFFER REQUEST | \ | 196 | C08C |
| 2325000 | | | TFO TNBR | ; | | |
| 2326000 | | | | | | |
| 2327000 | S | | GTO (SBUSCYWRTA1) | ; | 197 | F196 |
| 2328000 | | | | | | |
| 2329000 | SBUSCYWRTA2 | | \WAIT FOR BUS NAK | \ | 198 | C086 |
| 2330000 | | | TFO TNAK | ; | | |
| 2331000 | | | | | | |
| 2332000 | S | | GTO (SBUSCYWRTA2) | ; | 199 | F198 |
| 2333000 | | | | | | |
| 2334000 | S | | \CLEAR ACU | \ | 19A | 600E |
| 2335000 | | | ZER | ; | | |
| 2336000 | | | | | | |
| 2337000 | S | | \CLEAR ADAPTER COMMAND | \ | 19B | 784E |
| 2338000 | | | ZER AAD2 SRIA | ; | | |
| 2339000 | | | | | | |
| 2340000 | S | | \RESET BUS | \ | 19C | 4084 |
| 2341000 | | | RST | ; | | |
| 2342000 | | | | | | |
| 2343000 | S | | \RESET CYCLE BYTE | \ | 19D | 4020 |
| 2344000 | | | CYC | ; | | |
| 2345000 | | | | | | |
| 2346000 | S | | \16 TO ACU | \ | 19E | 8040 |
| 2347000 | | | LCN CNST (10#) | ; | | |
| 2348000 | | | | | | |
| 2349000 | S | | \SET SPA FOR STARTING ADDRESS OF COMPARE | \ | 19F | 6864 |
| 2350000 | | | ADD ASPA BACU SRIA | ; | | |
| 2351000 | | | | | | |
| 2352000 | S | | \SET DATA COUNT TO 16 | \ | 1A0 | 9420 |
| 2353000 | | | LCN AAD1 CNST (08#) | ; | | |
| 2354000 | | | | | | |
| 2355000 | S | | \LOAD ADAPTER COMMAND | \ | 1A1 | 9802 |
| 2356000 | | | LCN AAD2 CNST (C2#) | ; | | |
| 2357000 | | | | | | |
| 2358000 | SKIP HOF | | | ; | | |

MODEL: MPDC-REV3D
REVISION: 000.00

RTL/6000 FILE EDIT
MICROPROGRAM SECTION

08/01/77    12.605  PAGE:  62
DOC.#:

| LINE # | | | SEQUENCE: SSUPCS | | ADDRESS (HEX) | IMAGE (HEX) |
|---|---|---|---|---|---|---|
| 2359000 | SBUSCYRDA1 | | \CYCLE CONSTANT TO ACU | \ | 1A2 | 8108 |
| 2360000 | | | LCN CNST (44#) | ; | | |
| 2361000 | | | | | | |
| 2362000 | S | | \ENABLE READ HARDWARE PATH | \ | 1A3 | 0600 |
| 2363000 | | | ERP | ; | | |
| 2364000 | | | | | | |
| 2365000 | S | | \SET CYCLE | \ | 1A4 | 4020 |
| 2366000 | | | CYC | ; | | |
| 2367000 | | | | | | |
| 2368000 | SBUSCYRDA2 | | \SKIP IF MYDCNN SET | \ | 1A5 | C0AE |
| 2369000 | | | TFO TDCN | ; | | |
| 2370000 | | | | | | |
| 2371000 | S | | GTO (SBUSCYRDA2) | ; | 1A6 | F1A5 |
| 2372000 | | | | | | |
| 2373000 | S | | \SET FIRMWARE BUS ACK | \ | 1A7 | 0002 |
| 2374000 | | | SBA | ; | | |
| 2375000 | | | | | | |
| 2376000 | S | | \COMPARE DATA HI TO SPM | \ | 1A8 | 651B |
| 2377000 | | | XOR ABUS2 BSPM | ; | | |
| 2378000 | | | | | | |
| 2379000 | S | | \SKIP IF EQUAL | \ | 1A9 | C086 |
| 2380000 | | | TFO TEQZ | ; | | |
| 2381000 | | | | | | |
| 2382000 | S | | \HALT- FIFO BUS WRAPAROUND FAILURE | \ | 1AA | 0040 |
| 2383000 | | | HLT | ; | | |
| 2384000 | | | | | | |
| 2385000 | S | | \DECREMENT SPA | \ | 1AB | A008 |
| 2386000 | | | DMA | ; | | |
| 2387000 | | | | | | |
| 2388000 | S | | \COMPARE DATA LOW TO SPM | \ | 1AC | 691B |
| 2389000 | | | XOR ABUS3 BSPM | ; | | |
| 2390000 | | | | | | |
| 2391000 | S | | \SKIP IF EQUAL | \ | 1AD | C086 |
| 2392000 | | | TFO TEQZ | ; | | |
| 2393000 | | | | | | |
| 2394000 | S | | \HALT- FIFO BUS WRAPAROUND FAILURE | \ | 1AE | 0040 |
| 2395000 | | | HLT | ; | | |
| 2396000 | | | | | | |
| 2397000 | SKIP HOF | | | ; | | |

MODEL: MPDC-REV3D
REVISION: 000.00

RTL/6000 FILE EDIT
MICROPROGRAM SECTION

08/01/77    12.605  PAGE:  63
DOC.#:

| LINE # | | | SEQUENCE: SSUPCS | | ADDRESS (HEX) | IMAGE (HEX) |
|---|---|---|---|---|---|---|
| 2398000 | S | | \DECREMENT SPA | \ | 1AF | A008 |
| 2399000 | | | DMA | ; | | |
| 2400000 | | | | | | |
| 2401000 | S | | \CLEAR ACU | \ | 1B0 | 600E |
| 2402000 | | | ZER | ; | | |
| 2403000 | | | | | | |
| 2404000 | S | | \CLEAR CYCLE REGISTER | \ | 1B1 | 4020 |
| 2405000 | | | CYC | ; | | |
| 2406000 | | | | | | |
| 2407000 | S | | \SKIP IF NO ADAPTER HARDWARE REQUEST | \ | 1B2 | C040 |
| 2408000 | | | TFZ TAHR | ; | | |

```
MODEL: MPDC-REV30                        RTL/6000 FILE EDIT                      08/01/77   12.605  PAGE:  63
REVISION: 000.00                         MICROPROGRAM SECTION                    DOC.#:
                                                                        ADDRESS   IMAGE
LINE #                              SEQUENCE: SSUPCS                    (HEX)    (HEX)
                                       -continued
2409000
2410000   S         GTO (SBUSCYRDA1)                       \             1B3     F1A2
2411000
2412000   S         \CLEAR ADAPTER COMMAND                 \             1B4     9800
2413000             LCN AAD2 CNST (00#)                    ;
2414000
2415000   S         \CLEAR MOTHER BOARD FIFO               \             1B5     0088
2416000             RDA                                    ;
2417000
2418000   S         \SKIP IF TEST DONE                     \             1B6     C0A6
2419000             TFO TSAW                               ;
2420000
2421000   S         GTO (SBUSCYWRT1)                       ;             1B7     F17F
2422000
2423000   S         \CLEAR MODULE BAD PARITY               \             1B8     A020
2424000             LRC                                    ;
2425000
2426000   S         \RESET BUS                             \             1B9     4084
2427000             RST                                    ;
2428000
2429000      \END OF BUS WRAPAROUND TEST                   \
2430000
2431000 SKIP HOF                                           ;

MODEL: MPDC-REV30                        RTL/6000 FILE EDIT                      08/01/77   12.605  PAGE:  64
REVISION: 000.00                         MICROPROGRAM SECTION                    DOC.#:
                                                                        ADDRESS   IMAGE
LINE #                              SEQUENCE: SSUPCS                    (HEX)    (HEX)
2432000   \THE FOLLOWING ROUTINE IS USED TO READ MEMORY LOC. 3E#
2433000   (MEMORY YELLOW COUNTER). THE TEST CYCLES USING ALL CHANNEL
2434000   NUMBERS. WHEN MY CHANNEL IS USED. THE MPDC WILL RESPOND
2435000   WITH AN ACK VERIFYING THE CHANNEL COMPARE LOGIC AS WELL AS
2436000   THE BUS ACK LOGIC.                               \
2437000
2438000 SBLT-NEXT14  \CLEAR                                \             1BA     0010
2439000              CRF                                   ;
2440000
2441000   S          \CLEAR CYCLE REGISTER                 \             1BB     4020
2442000              CYC                                   ;
2443000
2444000   S          \RESET BUS STATUS                     \             1BC     4084
2445000              RST                                   ;
2446000
2447000   S          \RESET MOTHER BOARD FIFO              \             1BD     0088
2448000              RDA                                   ;
2449000
2450000   S          \MEMORY YELLOW ADDRESS TO ACU         \             1BE     80EA
2451000              LCN CNST (3E#)                        ;
2452000
2453000   S          \ACU TO ADDRESS REG LOW               \             1BF     6C6B
2454000              XFB ABUS4 SRIA                        ;
2455000
2456000   S          \CLEAR ACU                            \             1C0     600E
2457000              ZER                                   ;
2458000
2459000   S          \LOAD ADDRESS MID                     \             1C1     6C6B
2460000              XFB ABUS4 SRIA                        ;
2461000
2462000   S          \LOAD ADDRESS HI                      \             1C2     6C6B
2463000              XFB ABUS4 SRIA                        ;
2464000
2465000   S          \SET SPA WORK LOC                     \             1C3     8800
2466000              LCN ASPA CNST (00#)                   ;
2467000
2468000   S          \SET STARTING CHANNEL NUMBER          \             1C4     8008
2469000              LCN CNST (04#)                        ;
2470000
2471000   S          \WRITE IN SPM                         \             1C5     A300
2472000              WIA                                   ;
2473000
2474000   S          \SET LSB OF STARTING CHANNEL NUMBER   \             1C6     600E
2475000              ZER                                   ;
2476000
2477000   S          \WRITE IN SPM                         \             1C7     A200
2478000              WWT                                   ;
2479000
2480000 SKIP HOF                                           ;

MODEL: MPDC-REV30                        RTL/6000 FILE EDIT                      08/01/77   12.605  PAGE:  65
REVISION: 000.00                         MICROPROGRAM SECTION                    DOC.#:
                                                                        ADDRESS   IMAGE
LINE #                              SEQUENCE: SSUPCS                    (HEX)    (HEX)
2481000 SBUS-MEM1   \SET SPA FOR CHANNEL NUMBER            \             1C8     8800
2482000             LCN ASPA CNST (00#)                    ;
2483000
2484000   S         \LOAD DATA MSB                         \             1C9     656B
2485000             XFB ABUS2 SRIA BSPM                    ;
2486000
2487000   S         \INCREMENT SPA                         \             1CA     A100
2488000             IMA                                    ;
2489000
2490000   S         \LOAD DATA LSB                         \             1CB     696B
2491000             XFB ABUS3 SRIA BSPM                    ;
2492000
2493000   S         \RESET BUS                             \             1CC     4084
2494000             RST                                    ;
2495000
2496000   S         \CYCLE CONSTANT TO ACU                 \             1CD     8380
2497000             LCN CNST (E0#)                         ;
2498000
2499000   S         \CYCLE BUS                             \             1CE     4020
2500000             CYC                                    ;
2501000
2502000   S         \NO OP FOR TIMING                      \             1CF     0000
2503000             NOP                                    ;
2504000
2505000 SBUS-MEM2   \SKIP IF NO BUS CYCLE ACTIVE           \             1D0     C042
2506000             TFZ TBCA                               ;
2507000
2508000   S         GTO (SBUS-MEM2)                        ;             1D1     F1D0
2509000
2510000   S         \TIME OUT CONSTANT TO ACU              \             1D2     8028
```

MODEL: MPDC-REV3D
REVISION: 000.00

RTL/6000 FILE EDIT
MICROPROGRAM SECTION

08/01/77  12.605  PAGE: 65
DOC.#:

| LINE # | | | SEQUENCE: SSUPCS | | ADDRESS (HEX) | IMAGE (HEX) |
|---|---|---|---|---|---|---|
| | | | -continued | | | |
| 2511000 | | LCN CNST (0C#) | | ; | | |
| 2512000 | | | | | | |
| 2513000 | SBUS-MEM2A | \DECREMENT ACU | | \ | 1D3 | 603C |
| 2514000 | | DEC | | ; | | |
| 2515000 | | | | | | |
| 2516000 | S | \SKIP IF TIME OUT | | \ | 1D4 | C086 |
| 2517000 | | TFO TEQZ | | ; | | |
| 2518000 | | | | | | |
| 2519000 | S | GTO (SBUS-MEM2A) | | ; | 1D5 | F1D3 |
| 2520000 | | | | | | |
| 2521000 | SKIP HOF | | | ; | | |

MODEL: MPDC-REV3D
REVISION: 000.00

RTL/6000 FILE EDIT
MICROPROGRAM SECTION

08/01/77  12.605  PAGE: 66
DOC.#:

| LINE # | | | SEQUENCE: SSUPCS | | ADDRESS (HEX) | IMAGE (HEX) |
|---|---|---|---|---|---|---|
| 2522000 | S | \SHIFT LOW ADDRESS BYTE | | \ | 1D6 | 603F |
| 2523000 | | XFA ABUS1 | | ; | | |
| 2524000 | | | | | | |
| 2525000 | S | \MASK UNUSED BITS | | \ | 1C7 | 8204 |
| 2526000 | | ACN CNST (80#) | | ; | | |
| 2527000 | | | | | | |
| 2528000 | S | \COMPARE CHANNEL NUMBER WITH SPM | | \ | 1D8 | 611A |
| 2529000 | | XOR AACU BSPM | | ; | | |
| 2530000 | | | | | | |
| 2531000 | S | \SKIP IF EQUAL COMPARE | | \ | 1D9 | C086 |
| 2532000 | | TFO TEQZ | | ; | | |
| 2533000 | | | | | | |
| 2534000 | S | GTO (SBUS-MEM2B) | | ; | 1DA | F1E0 |
| 2535000 | | | | | | |
| 2536000 | S | \DECREMENT MEMORY ADDRESS | | \ | 1DB | A008 |
| 2537000 | | DMA | | ; | | |
| 2538000 | | | | | | |
| 2539000 | S | \CHANNEL NUMBER TO ACU | | \ | 1DC | 603F |
| 2540000 | | XFA ABUS1 | | ; | | |
| 2541000 | | | | | | |
| 2542000 | S | \COMPARE CHANNEL NUMBER WITH SPM | | \ | 1DD | 611A |
| 2543000 | | XOR AACU BSPM | | ; | | |
| 2544000 | | | | | | |
| 2545000 | S | \SKIP IF NOT MY CHANNEL NUMBER | | \ | 1DE | C046 |
| 2546000 | | TFZ TEQZ | | ; | | |
| 2547000 | | | | | | |
| 2548000 | S | GTO (SBUS-MEM3) | | ; | 1DF | F1E9 |
| 2549000 | | | | | | |
| 2550000 | SBUS-MEM2B | \SET SPA FOR CHANNEL NUMBER | | \ | 1E0 | 8801 |
| 2551000 | | LCN ASPA CNST (01#) | | ; | | |
| 2552000 | | | | | | |
| 2553000 | S | \INCREMENT CONSTANT TO ACU | | \ | 1E1 | 8200 |
| 2554000 | | LCN CNST (80#) | | ; | | |
| 2555000 | | | | | | |
| 2556000 | S | \INCREMENT CHANNEL NUMBER | | \ | 1E2 | 6164 |
| 2557000 | | ADD AACU BSPM SRIA | | ; | | |
| 2558000 | | | | | | |
| 2559000 | S | \WRITE AND DECREMENT SPA | | \ | 1E3 | A208 |
| 2560000 | | WDA | | ; | | |
| 2561000 | | | | | | |
| 2562000 | S | \PROPAGATE CARRY | | \ | 1E4 | 6480 |
| 2563000 | | INC ASPM COTI | | ; | | |
| 2564000 | | | | | | |
| 2565000 | S | \WRITE IN SPM | | \ | 1E5 | A200 |
| 2566000 | | MWT | | ; | | |
| 2567000 | | | | | | |
| 2568000 | SKIP HOF | | | ; | | |

MODEL: MPDC-REV3D
REVISION: 000.00

RTL/6000 FILE EDIT
MICROPROGRAM SECTION

08/01/77  12.605  PAGE: 67
DOC.#:

| LINE # | | | SEQUENCE: SSUPCS | | ADDRESS (HEX) | IMAGE (HEX) |
|---|---|---|---|---|---|---|
| 2569000 | S | \SKIP IF NOT ALL CHANNELS CHECKED | | \ | 1E6 | C046 |
| 2570000 | | TFZ TEQZ | | ; | | |
| 2571000 | | | | | | |
| 2572000 | S | \HALT- NO SUCESSFUL MEMORY READ | | \ | 1E7 | 0040 |
| 2573000 | | HLT | | ; | | |
| 2574000 | | | | | | |
| 2575000 | S | GTO (SBUS-MEM1) | | ; | 1E8 | F1C8 |
| 2576000 | | | | | | |
| 2577000 | SBUS-MEM3 | \CLEAR ACU | | \ | 1E9 | 0010 |
| 2578000 | | CRF | | ; | | |
| 2579000 | | | | | | |
| 2580000 | S | \CLEAR CYCLE REG | | \ | 1EA | 4020 |
| 2581000 | | CYC | | ; | | |
| 2582000 | | | | | | |
| 2583000 | S | \RESET BUS | | \ | 1EB | 4084 |
| 2584000 | | RST | | ; | | |
| 2585000 | | | | | | |
| 2586000 | S | \CLEAR MOTHER BOARD FIFO | | \ | 1EC | 0088 |
| 2587000 | | RDA | | ; | | |
| 2588000 | | | | | | |
| 2589000 | \END OF MEMORY READ TEST | | | \ | | |
| 2590000 | | | | | | |
| 2591000 | SKIP HOF | | | ; | | |

MODEL: MPDC-REV3D
REVISION: 000.00

RTL/6000 FILE EDIT
MICROPROGRAM SECTION

08/01/77  12.605  PAGE: 68
DOC.#:

| LINE # | | | SEQUENCE: SSUPCS | | ADDRESS (HEX) | IMAGE (HEX) |
|---|---|---|---|---|---|---|
| 2592000 | | | | | | |
| 2593000 | S | \RESET S. P. TEST MODE | | \ | 1ED | 0010 |
| 2594000 | | CRF | | ; | | |
| 2595000 | | | | | | |
| 2596000 | S | \CLEAR REGISTERS | | \ | 1EE | 0098 |
| 2597000 | | INI | | ; | | |
| 2598000 | | | | | | |
| 2599000 | | | | | | |
| 2600000 | | | | | | |
| 2601000 | | | | | | |
| 2602000 | | | | | | |
| 2603000 | | \END OF BASIC LOGIC TEST | | \ | | |
| 2604000 | | | | | | |
| 2605000 | | | | | | |
| 2606000 | | | | | | |

```
MODEL: MPDC-REV3D                         RTL/6000 FILE EDIT                          08/01/77    12.605  PAGE: 68
REVISION: 000.00                          MICROPROGRAM SECTION                        DOC.#:
                                                                        ADDRESS  IMAGE
  LINE #                                  SEQUENCE: $SUPCS                (HEX)   (HEX)
                                              -continued
2607000
2608000
2609000
2610000
2611000   \ BASIC LOGIC TEST HAS BEEN SUCCESSFULLY COMPLETED. SET   \
2612000   \ THE BLT DONE FLOP WHICH WILL EXTINGUISH THE LED.        \
2613000
2614000
2615000   $BLTSETDONE     \SET QLT DONE FLOP                        \      1EF    0004
2616000                   QLT                                       ;
2617000
2618000   $               \SET RETURN FOR CLEAR SPM                 \      1F0    E1FA
2619000                   LRA ($SETUNITSEL)                         ;
2620000
2621000 SKIP HOF                                                    ;

MODEL: MPDC-REV3D                         RTL/6000 FILE EDIT                          08/01/77    12.605  PAGE: 69
REVISION: 000.00                          MICROPROGRAM SECTION                        DOC.#:
                                                                        ADDRESS  IMAGE
  LINE #                                  SEQUENCE: $SUPCS                (HEX)   (HEX)
2622000
2623000
2624000   \ THE FOLLOWING SUBROUTINE IS USED FOR CLEARING           \
2625000   \ SCRATCH PAD MEMORY TO ZERO.                             \
2626000
2627000   $CLEARSPM00     \CLEAR ACU                                \      1F1    0010
2628000                   CRF                                       ;
2629000
2630000   $               \CLEAR SPA                                \      1F2    8800
2631000                   LCN ASPA CNST (00#)                       ;
2632000
2633000   $               \SET SCRATCH PAD TEST MODE                \      1F3    A080
2634000                   SPT                                       ;
2635000
2636000   $CLEARSPM01     \WRITE MEMORY                             \      1F4    A300
2637000                   WIA AACU                                  ;
2638000
2639000   $               \NO OP FOR TIMING                         \      1F5    0000
2640000                   NOP                                       ;
2641000
2642000   $               \SKIP IF SPA WRAPAROUND                   \      1F6    C0A6
2643000                   TFO TSAW                                  ;
2644000
2645000   $               \CLEAR NEXT LOCATION                      \      1F7    F1F4
2646000                   GTO ($CLEARSPM01)                         ;
2647000
2648000   $               \RESET S. P. TEST MODE                    \      1F8    0010
2649000                   CRF                                       ;
2650000
2651000   $               \RETURN TO CALLER                         \      1F9    C200
2652000                   RTN                                       ;
2653000
2654000 SKIP HOF                                                    ;

MODEL: MPDC-REV3D                         RTL/6000 FILE EDIT                          08/01/77    12.605  PAGE: 70
REVISION: 000.00                          MICROPROGRAM SECTION                        DOC.#:
                                                                        ADDRESS  IMAGE
  LINE #                                  SEQUENCE: $SUPCS                (HEX)   (HEX)
2655000
2656000   \     THE FOLLOWING ROUTINE IS USED TO LOAD THE
2657000         INITIALIZED UNIT SELECTION BYTES INTO SCRATCH
2658000         PAD MEMORY. ON ENTERING THIS ROUTINE BOTH THE
2659000         SCRATCH PAD MEMORY AND THE ACU HAVE BEEN
2660000         PREVIOUSLY CLEARED BY THE $CLEARSPM ROUTINE.        \
2661000
2662000
2663000   $SETUNITSEL     \ ACU TO INDEX REGISTER                   \      1FA    A030
2664000                   LIR                                       ;
2665000
2666000   $               \SET SPA FOR UNIT SELECT LOCATION         \      1FB    8CEB
2667000                   SSPAI LOC (UNSEL)                         ;
2668000
2669000   $               \INITIALIZE LOCATION - ACU TO SPM         \      1FC    A200
2670000                   MWT                                       ;
2671000
2672000   $               \INCREMENT ACU                            \      1FD    6000
2673000                   INC AACU                                  ;
2674000
2675000   $               \SKIP IF ALL CHANNELS INITIALIZED         \      1FE    C09A
2676000                   TFO TAX5                                  ;
2677000
2678000   $               \INITIALIZE NEXT CHANNEL                  \      1FF    F1FA
2679000                   GTO ($SETUNITSEL)                         ;
2680000
2681000 SKIP HOF                                                    ;

MODEL: MPDC-REV3D                         RTL/6000 FILE EDIT                          08/01/77    12.605  PAGE: 71
REVISION: 000.00                          MICROPROGRAM SECTION                        DOC.#:
                                                                        ADDRESS  IMAGE
  LINE #                                  SEQUENCE: $SUPCS                (HEX)   (HEX)
2682000
2683000   \ THIS ROUTINE IS USED TO PERFORM THE FOLLOWING FUNCTIONS-
2684000     . INITIALIZE THE DEVICE ADAPTER
2685000     . LOG THE DEVICE I.D. CODE IN SCRATCH PAD.
2686000     . SET THE INITIALIZE FLAG IN THE CHANNEL MONITOR BYTE.
2687000     . LOAD THE START UP FUNCTION CODE IN SCRATCH PAD.
2688000     . LOG THE STATE (READY OR NONREADY) IN SCRATCH PAD.
2689000     . LOG THE CURRENT FIRMWARE REVISION.
2690000     . LOAD WORKING PARAMETERS IN SCRATCH PAD.
2691000     . UPDATE STATUS.
2692000     . RECALIBRATES THE DEVICE.
2693000     . GOES TO THE INTERRUPT SUBROUTINE.                     \
2694000
2695000
2696000   $SETUP-ADP      \CLEAR ACU                                \       200   600E
2697000                   ZER                                       ;
2698000
2699000   $               \GO TO SET UP CURRENT CHANNEL             \       201   F205
2700000                   GTO ($SETUP-DEV)                          ;
2701000
```

| MODEL: MPDC-REV3D | | RTL/6000 FILE EDIT | 08/01/77 | 12.605 PAGE: 71 |
|---|---|---|---|---|
| REVISION: 000.00 | | MICROPROGRAM SECTION | DOC.#: | |
| LINE # | | SEQUENCE: $SUPCS | ADDRESS (HEX) | IMAGE (HEX) |
| | | -continued | | |
| 2702000 | $SETUP-LOOP | \INCREMENTED INDEX REGISTER TO ACU | 202 | 6C00 |
| 2703000 | | INC AIDX | | |
| 2704000 | | | | |
| 2705000 | $ | \SKIP IF NOT ALL CHANNELS INITIALIZED | 203 | C05A |
| 2706000 | | TFZ TAX5 AACU | | |
| 2707000 | | | | |
| 2708000 | $ | \SET UP DONE. START POLLING | 204 | F21D |
| 2709000 | | GTO ($START-WAIT) | | |
| 2710000 | | | | |
| 2711000 | SKIP HOF | | | |

| MODEL: MPDC-REV3D | | RTL/6000 FILE EDIT | 08/01/77 | 12.605 PAGE: 72 |
|---|---|---|---|---|
| REVISION: 000.00 | | MICROPROGRAM SECTION | DOC.#: | |
| LINE # | | SEQUENCE: $SUPCS | ADDRESS (HEX) | IMAGE (HEX) |
| 2712000 | | | | |
| 2713000 | $SETUP-DEV | \ACU TO INDEX REGISTER | 205 | A030 |
| 2714000 | | LIR | | |
| 2715000 | | | | |
| 2716000 | $ | \RESET DEVICE ADAPTER | 206 | 008B |
| 2717000 | | RDA | | |
| 2718000 | | | | |
| 2719000 | $ | \CLEAR ADAPTER STATUS | 207 | 746B |
| 2720000 | | XFB AAD5 SRIA | | |
| 2721000 | | | | |
| 2722000 | $ | \CLEAR ADAPTER HARDWARE REQUEST | 208 | 7C4F |
| 2723000 | | ZER AAD7 SRIA | | |
| 2724000 | | | | |
| 2725000 | $ | \SET SPA FOR UNIT SELECT BYTE | 209 | 8CEB |
| 2726000 | | SSPAI LOC (UNSEL) | | |
| 2727000 | | | | |
| 2728000 | $ | \SELECT DEVICE | 20A | 706A |
| 2729000 | | XFB AAD3 BSPM SRIA | | |
| 2730000 | | | | |
| 2731000 | $ | \SET SPA FOR DEVICE I. D. | 20B | 8C8A |
| 2732000 | | SSPAI LOC (DID1) | | |
| 2733000 | | | | |
| 2734000 | $ | \LOAD ACU WITH MSB OF DEV. I. D. | 20C | 8083 |
| 2735000 | | LCN AACU CNST (23#) | | |
| 2736000 | | | | |
| 2737000 | $ | \STORE MSB OF DEVICE I. D. | 20D | A300 |
| 2738000 | | WIA | | |
| 2739000 | | | | |
| 2740000 | SKIP HOF | | | |

| MODEL: MPDC-REV3D | | RTL/6000 FILE EDIT | 08/01/77 | 12.605 PAGE: 73 |
|---|---|---|---|---|
| REVISION: 000.00 | | MICROPROGRAM SECTION | DOC.#: | |
| LINE # | | SEQUENCE: $SUPCS | ADDRESS (HEX) | IMAGE (HEX) |
| 2741000 | | | | |
| 2742000 | $ | \STORE LSB OF DEVICE I. D. | 20E | B600 |
| 2743000 | | MWT AAD1 | | |
| 2744000 | | | | |
| 2745000 | $ | \SET SPA FOR FIRMWARE REV | 20F | 8CE9 |
| 2746000 | | SSPAI LOC (FWRV) | | |
| 2747000 | | | | |
| 2748000 | $ | \SET FIRMWARE REVISION IN ACU | 210 | 80E9 |
| 2749000 | | LCN AACU CNST (3D#) | | |
| 2750000 | | | | |
| 2751000 | $ | \ STORE FIRMWARE REV FOR SOFTWARE USE | 211 | A200 |
| 2752000 | | MWT | | |
| 2753000 | | | | |
| 2754000 | $ | \SET SPA FOR DEVICE STATUS | 212 | 8CEA |
| 2755000 | | SSPAI LOC (DEVST) | | |
| 2756000 | | | | |
| 2757000 | $ | \ WRITE CURRENT DEVICE STATUS | 213 | BA00 |
| 2758000 | | MWT AAD2 | | |
| 2759000 | | | | |
| 2760000 | $ | \SKIP IF DEVICE READY | 214 | C490 |
| 2761000 | | TFO TAX0 ASPM | | |
| 2762000 | | | | |
| 2763000 | $ | \GO TO NEXT CHANNEL | 215 | F21B |
| 2764000 | | GTO ($SETUP-DEV1) | | |
| 2765000 | | | | |
| 2766000 | $ | \SET SPA FOR STS1 | 216 | 8C60 |
| 2767000 | | SSPAI LOC (STS1) | | |
| 2768000 | | | | |
| 2769000 | $ | \SET READY CONSTANT IN ACU | 217 | 8200 |
| 2770000 | | LCN CNST (80#) | | |
| 2771000 | | | | |
| 2772000 | $ | \UPDATE STS1 | 218 | A200 |
| 2773000 | | MWT | | |
| 2774000 | | | | |
| 2775000 | $ | \SET RETURN FOR RECALIBRATE | 219 | E202 |
| 2776000 | | LRA ($SETUP-LOOP) | | |
| 2777000 | | | | |
| 2778000 | $ | \GO TO RECALIBRATE | 21A | F3F1 |
| 2779000 | | GTO ($RECAL) | | |
| 2780000 | | | | |
| 2781000 | $SETUP-DEV1 | \SET CHANNEL READY | 21B | 401B |
| 2782000 | | SCR | | |
| 2783000 | | | | |
| 2784000 | $ | \INITIALIZE NEXT CHANNEL | 21C | F202 |
| 2785000 | | GTO ($SETUP-LOOP) | | |
| 2786000 | | | | |
| 2787000 | | | | |
| 2788000 | SKIP HOF | | | |

| MODEL: MPDC-REV3D | RTL/6000 FILE EDIT | 08/01/77 | 12.605 PAGE: 74 |
|---|---|---|---|
| REVISION: 000.00 | MICROPROGRAM SECTION | DOC.#: | |
| LINE # | SEQUENCE: $SUPCS | ADDRESS (HEX) | IMAGE (HEX) |

```
2789000
2790000    \ THE WAIT ROUTINE PRIORITIZES THE EXECUTION OF CHANNEL
2791000      ACTIVITIES IN THE FOLLOWING ORDER-
2792000
2793000      1. UNSOLICITED BUS TRANSFERS, INDICATING A TRANSFER
2794000         FROM THE CP WITH THE DATA STORED IN THE BUS
2795000         INTERFACE REGISTER.
2796000
```

MODEL: MPDC-REV3D
REVISION: 000.00

RTL/6000 FILE EDIT
MICROPROGRAM SECTION

08/01/77   12.605  PAGE: 74
DOC.#:

LINE #                                          SEQUENCE: $$UPCS              ADDRESS   IMAGE
                                                                              (HEX)     (HEX)
                                                  -continued

```
2797000         2. DEVICE REQUESTS, INDICATING THAT THE ADAPTER HAS
2798000            COMPLETED SEARCHING A FIELD AND REQUIRES SERVICING
2799000            (RELOAD SEARCH ARGUMENT, A HIT ON A SEARCH,
2800000            OR AN ERROR.)                                       \
2801000
2802000
2803000    \   THE FOLLOWING ACTIVITIES ARE CHECKED FOR ONLY WHEN
2804000        THE ADAPTER IS NOT BUSY, SINCE ONLY ONE CHANNEL
2805000        CAN BE READ/WRITE/SEARCHING AT A TIME.
2806000
2807000        3. RESUME INTERRUPT, INDICATING THAT THE CP HAS
2808000           RAISED THE RESUME INTERRUPT LINE.
2809000
2810000        4. SEEKS STACKED, INDICATING THAT A PREVIOUS SEEK
2811000           OPERATION WAS STACKED.                               \
2812000
2813000    \  5. POLL DEVICES, WHICH CHECKS FOR ANY PREVIOUSLY
2814000           INITIATED SEEKS BECOMING DONE OR ANY ASYNCHRONOUS
2815000           DEVICE STATE TRANSITIONS (OFF LINE TO READY,
2816000           READY TO OFF LINE) WHICH MAY HAVE TAKEN PLACE.
2817000
2818000        6. READ/WRITES STACKED, INDICATING THAT A PREVIOUS
2819000           READ OR WRITE OPERATION WAS STACKED.                 \
2820000
2821000
2822000 SKIP HOF                                                       ;
```

MODEL: MPDC-REV3D
REVISION: 000.00

RTL/6000 FILE EDIT
MICROPROGRAM SECTION

08/01/77   12.605  PAGE: 75
DOC.#:

LINE #                                          SEQUENCE: $$UPCS              ADDRESS   IMAGE
                                                                              (HEX)     (HEX)
```
2823000
2824000
2825000  $START-WAIT   \RESET BUS REGISTER BUSY           \            21D      4002
2826000                RRB                                ;
2827000
2828000  $WAIT-LOOP    \SKIP IF REQUEST IS ON             \            21E      C08C
2829000                TFO TREQ                           ;
2830000
2831000  $            \GO TO STACKED CHECK                \            21F      F227
2832000               GTO ($WAIT-BUSY)                    ;
2833000
2834000  $WAIT-LOOP1   \SET REGISTER BUSY                 \            220      4004
2835000                SRB                                ;
2836000
2837000  $            \LOAD REQUESTING CHANNEL            \            221      A020
2838000               LRC                                 ;
2839000
2840000  $            \SKIP IF NOT A BUS REQUEST          \            222      C072
2841000               TFZ TUBR                            ;
2842000
2843000  $            \GO TO SERVICE UNSOLICITED BUS REQUEST \          223      F2B7
2844000               GTO ($$STARTBUSRQ)                  ;
2845000
2846000  $            \SET SPA FOR CURRENTLY ACTIVE R/W CHANNEL \       224      84E9
2847000               SSPA LOC(LSTRW)                     ;
2848000
2849000  $            \LOAD INDEX REGISTER                \            225      A430
2850000               LIR ASPM                            ;
2851000
2852000  $            \GO TO DEVICE SUPPORT ROUTINE       \            226      C200
2853000               RTN                                 ;
2854000
2855000  \    THE FOLLOWING IS A LIST OF POSSIBLE RETURNS
2856000       DEPENDING ON THE OPERATION BEING PERFORMED-
2857000              FMT-RET  = FORMAT WRITE ID
2858000              SCH-RET  = SEARCH ID
2859000              WRT-RET  = DATA XFER DURING WRITES
2860000              READ-RET = DATA XFER DURING READS
2861000              READ-AMK = FIRST TIME ON ALL READS
2862000              FMT-READ = FORMAT READ ID ONLY AFTER
2863000                         SPACING DATA FIELD
2864000              DIAG-AMK = DIAGNOSTIC READ (FIRST RET ONLY)  \
2865000
2866000 SKIP HOF                                                       ;
```

MODEL: MPDC-REV3D
REVISION: 000.00

RTL/6000 FILE EDIT
MICROPROGRAM SECTION

08/01/77   12.605  PAGE: 76
DOC.#:

LINE #                                          SEQUENCE: $$UPCS              ADDRESS   IMAGE
                                                                              (HEX)     (HEX)
```
2867000
2868000  $WAIT-BUSY    \SKIP IF NO ADAPTER HARDWARE REQUEST \          227      C040
2869000                TAHR TFZ                            ;
2870000
2871000  $            \GO TO RETURN TO ADAPTER             \           228      F220
2872000               GTO ($WAIT-LOOP1)                    ;
2873000
2874000  $            \SKIP IF ADAPTER NOT BUSY            \           229      C068
2875000               TFZ TADB                             ;
2876000
2877000  $            \GO TO WAIT FOR A REQUEST            \           22A      F21D
2878000               GTO ($$START-WAIT)                   ;
2879000
2880000  $POLL-PEND   \SKIP IF RESUME INTERRUPT NOT SET    \           22B      C074
2881000               TINT TFZ                             ;
2882000
2883000  $            \GO TO RESUME INTERRUPT              \           22C      F25A
2884000               GTO ($$STARTRESUM)                   ;
2885000
2886000  $POLLDEVST   \SET BUS REGISTER BUSY               \           22D      4004
2887000               SRB                                  ;
2888000
2889000  $            \CLEAR ACU                           \           22E      8000
2890000               LCN CNST (00#)                       ;
2891000
2892000  $            \SKIP IF NO UNSOLICITED BUS REQUESTS \           22F      C072
2893000               TUBR TFZ                             ;
2894000
2895000  $            \GO TO SERVICE UNSOLICITED BUS REQUEST \         230      F21E
2896000               GTO ($WAIT-LOOP)                     ;
2897000
```

| MODEL: MPDC-REV3D | | | RTL/6000 FILE EDIT | | 08/01/77 | 12.605 PAGE: 76 |
|---|---|---|---|---|---|---|
| REVISION: 000.00 | | | MICROPROGRAM SECTION | | DOC.#: | |
| LINE # | | SEQUENCE: $SUPCS | | | ADDRESS (HEX) | IMAGE (HEX) |
| | | -continued | | | | |
| 2898000 | $SEEKSTACK | \SET SPA TO SEEK STACKED COUNT | | \ | 231 | 8BEA |
| 2899000 | | SSPA LOC (SKSTK) | | ; | | |
| 2900000 | | | | | | |
| 2901000 | $ | \SEEK COUNT TO ACU | | \ | 232 | 643E |
| 2902000 | | XFA ASPM BACU | | ; | | |
| 2903000 | | | | | | |
| 2904000 | $ | \SKIP IF NO SEEK STACKED | | \ | 233 | C086 |
| 2905000 | | TFO TEQZ | | ; | | |
| 2906000 | | | | | | |
| 2907000 | $ | \GO TO UNSTACK SEEK | | \ | 234 | F27D |
| 2908000 | | GTO ($SEEKUNSTK1) | | ; | | |
| 2909000 | | | | | | |
| 2910000 | SKIP HOF | | | ; | | |

| MODEL: MPDC-REV3D | | | RTL/6000 FILE EDIT | | 08/01/77 | 12.605 PAGE: 77 |
|---|---|---|---|---|---|---|
| REVISION: 000.00 | | | MICROPROGRAM SECTION | | DOC.#: | |
| LINE # | | SEQUENCE: $SUPCS | | | ADDRESS (HEX) | IMAGE (HEX) |
| 2911000 | | | | | | |
| 2912000 | $POLL-LOOP | \LOAD INDEX REGISTER FROM ACU | | \ | 235 | A030 |
| 2913000 | | LIR AACU | | ; | | |
| 2914000 | | | | | | |
| 2915000 | $ | \SET SPA FOR UNIT SELECT BYTE | | \ | 236 | 8CEB |
| 2916000 | | SSPAI LOC(UNSEL) | | ; | | |
| 2917000 | | | | | | |
| 2918000 | $ | \SELECT DEVICE | | \ | 237 | 706A |
| 2919000 | | XFB AAD3 BSPM SRIA | | ; | | |
| 2920000 | | | | | | |
| 2921000 | $ | \SET SPA FOR DEVICE STATUS | | \ | 238 | 8CEA |
| 2922000 | | SSPAI LOC (DEVST) | | ; | | |
| 2923000 | | | | | | |
| 2924000 | $ | \SAVE ONLY READY BIT | | \ | 239 | 8604 |
| 2925000 | | ACN ASPM CNST (80#) | | ; | | |
| 2926000 | | | | | | |
| 2927000 | $ | \SET SPA FOR STS1 | | \ | 23A | 8C60 |
| 2928000 | | SSPAI LOC (STS1) | | ; | | |
| 2929000 | | | | | | |
| 2930000 | $ | \ADD READY BIT | | \ | 23B | 643A |
| 2931000 | | ORR ASPM BACU | | ; | | |
| 2932000 | | | | | | |
| 2933000 | $ | \RE-WRITE STS1 | | \ | 23C | A200 |
| 2934000 | | MWT | | ; | | |
| 2935000 | | | | | | |
| 2936000 | $ | \SET SPA FOR PREVIOUS DEVICE STATUS | | \ | 23D | 8CEA |
| 2937000 | | SSPAI LOC(DEVST) | | ; | | |
| 2938000 | | | | | | |
| 2939000 | $ | \PREVIOUS DEVICE STATUS TO ACU | | \ | 23E | 643E |
| 2940000 | | XFA ASPM BACU | | ; | | |
| 2941000 | | | | | | |
| 2942000 | $ | \UPDATE DEVICE STATUS | | \ | 23F | 8A00 |
| 2943000 | | MWT AAD2 | | ; | | |
| 2944000 | | | | | | |
| 2945000 | $ | \COMPARE OLD STATUS TO NEW STATUS | | \ | 240 | 611A |
| 2946000 | | XOR AACU BSPM | | ; | | |
| 2947000 | | | | | | |
| 2948000 | $ | \SKIP IF STATUS EQUAL | | \ | 241 | C086 |
| 2949000 | | TFO TEQZ | | ; | | |
| 2950000 | | | | | | |
| 2951000 | $ | \GO TO ANALYZE STATUS CHANGE | | \ | 242 | F28A |
| 2952000 | | GTO ($POLLSEEK) | | ; | | |
| 2953000 | | | | | | |
| 2954000 | SKIP HOF | | | ; | | |

| MODEL: MPDC-REV3D | | | RTL/6000 FILE EDIT | | 08/01/77 | 12.605 PAGE: 78 |
|---|---|---|---|---|---|---|
| REVISION: 000.00 | | | MICROPROGRAM SECTION | | DOC.#: | |
| LINE # | | SEQUENCE: $SUPCS | | | ADDRESS (HEX) | IMAGE (HEX) |
| 2955000 | $POLLNEXT | \INCREMENT INDEX REGISTER | | \ | 243 | 6C00 |
| 2956000 | | INC AIDX BACU | | ; | | |
| 2957000 | | | | | | |
| 2958000 | $ | \SKIP IF ALL CHANNELS POLLED | | \ | 244 | C09A |
| 2959000 | | TFO TAX5 AACU | | ; | | |
| 2960000 | | | | | | |
| 2961000 | $ | \POLL NEXT CHANNEL | | \ | 245 | F235 |
| 2962000 | | GTO ($POLL-LOOP) | | ; | | |
| 2963000 | | | | | | |
| 2964000 | $RDWRTSTACK | \SET SPA TO R/W STACKED COUNT | | \ | 246 | 8BEB |
| 2965000 | | SSPA LOC (RWSTK) | | ; | | |
| 2966000 | | | | | | |
| 2967000 | $ | \R/W STACK COUNT TO ACU | | \ | 247 | 643E |
| 2968000 | | XFA ASPM BACU | | ; | | |
| 2969000 | | | | | | |
| 2970000 | $ | \SKIP IF NO R/W COMMANDS STACKED | | \ | 248 | C086 |
| 2971000 | | TFO TEQZ | | ; | | |
| 2972000 | | | | | | |
| 2973000 | $ | \GO TO UNSTACK R/W COMMAND | | \ | 249 | F2AC |
| 2974000 | | GTO ($RDWTUNSTK1) | | ; | | |
| 2975000 | | | | | | |
| 2976000 | SKIP HOF | | | ; | | |

| MODEL: MPDC-REV3D | | | RTL/6000 FILE EDIT | | 08/01/77 | 12.605 PAGE: 79 |
|---|---|---|---|---|---|---|
| REVISION: 000.00 | | | MICROPROGRAM SECTION | | DOC.#: | |
| LINE # | | SEQUENCE: $SUPCS | | | ADDRESS (HEX) | IMAGE (HEX) |
| 2977000 | | \ THE FOLLOWING ROUTINE IS USED TO CHECK FOR AN | | | | |
| 2978000 | | INTERRUPT STORED. THE INTERRUPT COULD BE STORED | | | | |
| 2979000 | | FOR THE FOLLOWING REASONS- | | | | |
| 2980000 | | . A BUS PARITY ERROR DURING AN UNSOLICITED | | | | |
| 2981000 | | BUS REQUEST WHILE THE ADAPTER IS BUSY ON | | | | |
| 2982000 | | ANOTHER CHANNEL | | | | |
| 2983000 | | . A STOP I/O CONTROL WORD TO A NON-BUSY | | | | |
| 2984000 | | CHANNEL WHILE EXECUTING A TASK TO A | | | | |
| 2985000 | | SECOND CHANNEL | | \ | | |
| 2986000 | | | | | | |
| 2987000 | $POLLINTST | \CLEAR ACU | | \ | 24A | 600E |
| 2988000 | | ZER | | ; | | |
| 2989000 | | | | | | |
| 2990000 | $ | \SET SPA TO CHANNEL MONITOR | | \ | 24B | 8C88 |
| 2991000 | | SSPAI LOC (MON1) | | ; | | |

MODEL: MPDC-REV3L  
REVISION: 000.00

RTL/6000 FILE EDIT  
MICROPROGRAM SECTION

08/01/77   12.005   PAGE: 79  
DOC.#:

| LINE # | | SEQUENCE: $$UPCS | | ADDRESS (HEX) | IMAGE (HEX) |
|---|---|---|---|---|---|
| 2992000 | | -continued | | | |
| 2993000 | $POLLINTST1 | \ACU TO INDEX REGISTER | \ | 24C | A030 |
| 2994000 | | LIR | ; | | |
| 2995000 | | | | | |
| 2996000 | $ | \SKIP IF NO INTERRUPT STORED | \ | 24D | C458 |
| 2997000 | | TFZ TAX4 ASPM | ; | | |
| 2998000 | | | | | |
| 2999000 | $ | \GO TO SEND INTERRUPT | \ | 24E | F33F |
| 3000000 | | GTO ($STARTINTPT) | ; | | |
| 3001000 | | | | | |
| 3002000 | SKIP HOF | | ; | | |

MODEL: MPDC-REV3D  
REVISION: 000.00

RTL/6000 FILE EDIT  
MICROPROGRAM SECTION

08/01/77   12.005   PAGE: 80  
DOC.#:

| LINE # | | SEQUENCE: $$UPCS | | ADDRESS (HEX) | IMAGE (HEX) |
|---|---|---|---|---|---|
| 3003000 | $ | \INCREMENT INDEX REGISTER | \ | 24F | 6C00 |
| 3004000 | | INC AIDX BACU | ; | | |
| 3005000 | | | | | |
| 3006000 | $ | \SKIP IF ALL CHANNELS CHECKED | \ | 250 | C09A |
| 3007000 | | TFO TAX5 AACU | ; | | |
| 3008000 | | | | | |
| 3009000 | $ | \CHECK NEXT CHANNEL | \ | 251 | F24C |
| 3010000 | | GTO ($POLLINTST1) | ; | | |
| 3011000 | | | | | |
| 3012000 | $ | \GO TO POLL INTERRUPTS PENDING | \ | 252 | F21D |
| 3013000 | | GTO ($START-WAIT) | ; | | |
| 3014000 | | | | | |
| 3015000 | | | | | |
| 3016000 | $WAIT-CONTD | \SKIP IF NO ADAP HARDWARE REQUEST | \ | 253 | C040 |
| 3017000 | | TAHR TFZ | ; | | |
| 3018000 | | | | | |
| 3019000 | $ | \RETURN TO ADAPTER DATA TRANSFER | \ | 254 | F257 |
| 3020000 | | GTO ($WAIT-CONT1) | ; | | |
| 3021000 | | | | | |
| 3022000 | $ | \SKIP IF DEVICE REQUEST | \ | 255 | C08C |
| 3023000 | | TFO TREQ | ; | | |
| 3024000 | | | | | |
| 3025000 | $ | \GO TO START WAIT | \ | 256 | F21D |
| 3026000 | | GTO ($START-WAIT) | ; | | |
| 3027000 | | | | | |
| 3028000 | $WAIT-CONT1 | \SET SPA FOR CURRENTLY ACTIVE R/W CHANNEL | \ | 257 | 8BE9 |
| 3029000 | | SSPA LOC (LSTRW) | ; | | |
| 3030000 | | | | | |
| 3031000 | $ | \LOAD INDEX REGISTER | \ | 258 | A430 |
| 3032000 | | LIR ASPM | ; | | |
| 3033000 | | | | | |
| 3034000 | $ | \GO TO DEVICE SUPPORT ROUTINE | \ | 259 | C200 |
| 3035000 | | RTN | ; | | |
| 3036000 | | | | | |
| 3037000 | \ | THE FOLLOWING IS A LIST OF POSSIBLE RETURNS | | | |
| 3038000 | | DEPENDING ON THE OPERATION BEING PERFORMED- | | | |
| 3039000 | | FWT-RET  - FORMAT WRITE ID | | | |
| 3040000 | | SCH-RET  - SEARCH ID | | | |
| 3041000 | | WRT-RET  - DATA XFER DURING WRITES | | | |
| 3042000 | | READ-RET - DATA XFER DURING READS | | | |
| 3043000 | | READ-AMK - FIRST TIME ON ALL READS | | | |
| 3044000 | | FMT-READ - FORMAT HEAD ID ONLY AFTER | | | |
| 3045000 | | SPACING DATA FIELD | | | |
| 3046000 | | DIAG-AMK - DIAGNOSTIC READ (FIRST RET ONLY) | \ | | |
| 3047000 | | | | | |
| 3048000 | SKIP HOF | | ; | | |

MODEL: MPDC-REV3D  
REVISION: 000.00

RTL/6000 FILE EDIT  
MICROPROGRAM SECTION

08/01/77   12.005   PAGE: 81  
DOC.#:

| LINE # | | SEQUENCE: $$UPCS | | ADDRESS (HEX) | IMAGE (HEX) |
|---|---|---|---|---|---|
| 3049000 | | | | | |
| 3050000 | \ | THE RESUME INTERRUPT ROUTINE IS CALLED BY THE WAIT | | | |
| 3051000 | | ROUTINE WHEN THE RESUME INTERRUPT LATCH IS FOUND | | | |
| 3052000 | | SET AND A PREVIOUS INTERRUPT WAS STACKED. | | | |
| 3053000 | | THE RESUME INTERRUPT ROUTINE WILL | | | |
| 3054000 | | UNSTACK ALL INTERRUPTS WHICH ARE PENDING. I.E. | | | |
| 3055000 | | INTERRUPTS WHICH WERE PREVIOUSLY NAK'D WILL BE | | | |
| 3056000 | | REATTEMPTED. TO DO THIS THE ROUTINE WILL | | | |
| 3057000 | | SEQUENTIALLY EXAMINE ALL CHANNELS, STARTING WITH | \ | | |
| 3058000 | \ | CHANNEL ZERO. THE CHANNEL MONITOR BYTE (MON1) WILL | | | |
| 3059000 | | BE CHECKED FOR INTERRUPT PENDING (BIT 0). IF SET, | | | |
| 3060000 | | AN INTERRUPT BUS CYCLE IS ATTEMPTED. IF THE | | | |
| 3061000 | | INTERRUPT IS ACK'D BY THE CP, THE INTERRUPT | | | |
| 3062000 | | PENDING BIT IS RESET. OTHERWISE THE INTERRUPT | | | |
| 3063000 | | PENDING BIT REMAINS SET AND THE INTERRUPT WILL | | | |
| 3064000 | | HAVE TO AGAIN BE ATTEMPTED ON DETECTION OF ANOTHER | | | |
| 3065000 | | RESUME INTERRUPT PULSE. | \ | | |
| 3066000 | | | | | |
| 3067000 | | | | | |
| 3068000 | $STARTRESUM | \SET BUS REGISTER BUSY | \ | 25A | 4004 |
| 3069000 | | SRB | ; | | |
| 3070000 | | | | | |
| 3071000 | $ | \CLEAR ACU | \ | 25B | 8000 |
| 3072000 | | LCN CNST(00#) | ; | | |
| 3073000 | | | | | |
| 3074000 | $ | \SKIP IF NO UNSOLICITED BUS REQUESTS | \ | 25C | C072 |
| 3075000 | | TUBR TFZ | ; | | |
| 3076000 | | | | | |
| 3077000 | $ | \GO TO SERVICE UNSOLICITED BUS REQUEST | \ | 25D | F21E |
| 3078000 | | GTO ($WAIT-LOOP) | ; | | |
| 3079000 | | | | | |
| 3080000 | $ | \RESET RESUME INTERRUPT LATCH | \ | 25E | 4001 |
| 3081000 | | RIL | ; | | |
| 3082000 | | | | | |
| 3083000 | $RESUM-LOOP | \LOAD INDEX REGISTER | \ | 25F | A030 |
| 3084000 | | LIR AACU | ; | | |
| 3085000 | | | | | |
| 3086000 | $ | \SET SPA FOR CHANNEL MONITOR BYTE | \ | 260 | 8C8B |
| 3087000 | | SSPAI LOC(MON1) | ; | | |
| 3088000 | | | | | |
| 3089000 | SKIP HOF | | ; | | |

MODEL: MPDC-REV3D  
REVISION: 000.00

RTL/6000 FILE EDIT  
MICROPROGRAM SECTION

08/01/77  12.605  PAGE: 82  
DOC.#:

| LINE # | | SEQUENCE: $SUPCS | | ADDRESS (HEX) | IMAGE (HEX) |
|---|---|---|---|---|---|
| 3090000 | $ | \SKIP IF INTERRUPT PENDING | \ | 261 | C490 |
| 3091000 | | TFO TAX0 ASPM | ; | | |
| 3092000 | | | | | |
| 3093000 | $ | \NO INTERRUPT PENDING-GO TO NEXT CHANNEL | \ | 262 | F279 |
| 3094000 | | GTO ($RESUM-NEXT) | ; | | |
| 3095000 | | | | | |
| 3096000 | $ | \SET SPA FOR FIRST BYTE CP CHANNEL NUMBER | \ | 263 | 8C03 |
| 3097000 | | SSPAI LOC(ILC2) | ; | | |
| 3098000 | | | | | |
| 3099000 | $ | \CLEAR LOW ORDER BITS | \ | 264 | 8704 |
| 3100000 | | ACN CNST (C0#) ASPM | ; | | |
| 3101000 | | | | | |
| 3102000 | $ | \LOAD LSB OF BUS ADDRESS | \ | 265 | 6C6B |
| 3103000 | | XFB ABUS4 BACU SRIA | ; | | |
| 3104000 | | | | | |
| 3105000 | $ | \SET SPA FOR 2ND BYTE CP CHANNEL NUMBER | \ | 266 | 8C02 |
| 3106000 | | SSPAI LOC(ILC1) | ; | | |
| 3107000 | | | | | |
| 3108000 | $ | \LOAD MID OF BUS ADDRESS | \ | 267 | 6D6B |
| 3109000 | | XFB ABUS4 BSPM SRIA | ; | | |
| 3110000 | | | | | |
| 3111000 | $ | \LOAD MSB OF BUS ADDRESS | \ | 268 | 6C4F |
| 3112000 | | ZER ABUS4 SRIA | ; | | |
| 3113000 | | | | | |
| 3114000 | $ | \SET SPA FOR INTERRUPT VECTOR | \ | 269 | 8CA8 |
| 3115000 | | SSPAI LOC(IDF1) | ; | | |
| 3116000 | | | | | |
| 3117000 | $ | \LOAD LSB OF DATA BUS | \ | 26A | 696B |
| 3118000 | | XFB ABUS3 BSPM SRIA | ; | | |
| 3119000 | | | | | |
| 3120000 | SKIP HOF | | ; | | |

MODEL: MPDC-REV3D  
REVISION: 000.00

RTL/6000 FILE EDIT  
MICROPROGRAM SECTION

08/01/77  12.605  PAGE: 83  
DOC.#:

| LINE # | | SEQUENCE: $SUPCS | | ADDRESS (HEX) | IMAGE (HEX) |
|---|---|---|---|---|---|
| 3121000 | $ | \SET SPA FOR REST OF INTERRUPT VECTOR | \ | 26B | 8CA0 |
| 3122000 | | SSPAI LOC (CHN1) | ; | | |
| 3123000 | | | | | |
| 3124000 | $ | \LOAD MSB OF DATA BUS | \ | 26C | 656B |
| 3125000 | | XFB ABUS2 BSPM SRIA | ; | | |
| 3126000 | | | | | |
| 3127000 | $ | \CLEAR BUS STATUS | \ | 26D | 4084 |
| 3128000 | | RST | ; | | |
| 3129000 | | | | | |
| 3130000 | $ | \LOAD CYCLE BYTE IN ACU | \ | 26E | 8200 |
| 3131000 | | LCN AACU CNST(80#) | ; | | |
| 3132000 | | | | | |
| 3133000 | $ | \INITIATE BUS CYCLE | \ | 26F | 4020 |
| 3134000 | | CYC AACU | ; | | |
| 3135000 | | | | | |
| 3136000 | $RESUM-TNAK | \SKIP IF NO NAK | \ | 270 | C076 |
| 3137000 | | TFZ TNAK | ; | | |
| 3138000 | | | | | |
| 3139000 | $ | \NAK RECEIVED-LEAVE INTERRUPT STACKED | \ | 271 | F278 |
| 3140000 | | GTO ($RESUM-CBS) | ; | | |
| 3141000 | | | | | |
| 3142000 | SKIP HOF | | ; | | |

MODEL: MPDC-REV3D  
REVISION: 000.00

RTL/6000 FILE EDIT  
MICROPROGRAM SECTION

08/01/77  12.605  PAGE: 84  
DOC.#:

| LINE # | | SEQUENCE: $SUPCS | | ADDRESS (HEX) | IMAGE (HEX) |
|---|---|---|---|---|---|
| 3143000 | | | | | |
| 3144000 | $RESUM-TACK | \SKIP IF ACK IS SET | \ | 272 | C08E |
| 3145000 | | TFO TACK | ; | | |
| 3146000 | | | | | |
| 3147000 | $ | \NO RESPONSE - WAIT | \ | 273 | F270 |
| 3148000 | | GTO ($RESUM-TNAK) | ; | | |
| 3149000 | | | | | |
| 3150000 | $ | \SET SPA FOR CHANNEL MONITOR | \ | 274 | 8C88 |
| 3151000 | | SSPAI LOC(MON1) | ; | | |
| 3152000 | | | | | |
| 3153000 | $ | \CLEAR ACU | \ | 275 | 600E |
| 3154000 | | ZER BACU | ; | | |
| 3155000 | | | | | |
| 3156000 | $ | \CLEAR MONITOR | \ | 276 | A200 |
| 3157000 | | MWT AACU | ; | | |
| 3158000 | | | | | |
| 3159000 | $ | \SET CHANNEL READY | \ | 277 | 4018 |
| 3160000 | | SCR | ; | | |
| 3161000 | | | | | |
| 3162000 | $RESUM-CBS | \CLEAR BUS STATUS | \ | 278 | 4084 |
| 3163000 | | RST | ; | | |
| 3164000 | | | | | |
| 3165000 | $RESUM-NEXT | \INCREMENT INDEX REGISTER | \ | 279 | 6C00 |
| 3166000 | | INC AIDX BACU | ; | | |
| 3167000 | | | | | |
| 3168000 | $ | \SKIP IF ALL CHANNELS CHECKED | \ | 27A | C09A |
| 3169000 | | TFO TAX5 AACU | ; | | |
| 3170000 | | | | | |
| 3171000 | $ | \CHECK NEXT CHANNEL | \ | 27B | F25F |
| 3172000 | | GTO ($RESUM-LOOP) | ; | | |
| 3173000 | | | | | |
| 3174000 | $ | \GO TO CHECK FOR SEEKS STACKED | \ | 27C | F231 |
| 3175000 | | GTO ($SEEKSTACK) | ; | | |
| 3176000 | | | | | |
| 3177000 | SKIP HOF | | ; | | |

MODEL: MPDC-REV3D  
REVISION: 000.00

RTL/6000 FILE EDIT  
MICROPROGRAM SECTION

08/01/77  12.605  PAGE: 85  
DOC.#:

| LINE # | | SEQUENCE: $SUPCS | ADDRESS (HEX) | IMAGE (HEX) |
|---|---|---|---|---|
| 3178000 | \ | THE SEEK UNSTACK ROUTINE IS CALLED BY THE WAIT | | |
| 3179000 | | ROUTINE WHEN A SEEK OPERATION IS FOUND TO BE | | |
| 3180000 | | STACKED (S.P. LOCATION SKSTK). | | |
| 3181000 | | | | |
| 3182000 | | THE ROUTINE WILL SEQUENTIALLY EXAMINE ALL CHANNELS | | |
| 3183000 | | STARTING WITH THE ONE AFTER THE LAST R/W. IF A | | |
| 3184000 | | CHANNEL IS FOUND TO HAVE A SEEK STACKED THE | | |
| 3185000 | | ROUTINE WILL UNSTACK THE TASK (SEEK) AND BRANCH | | |
| 3186000 | | TO COMMAND DECODE. \ | | |

```
MODEL: MPDC-REV3                              RTL/6000 FILE EDIT                      08/01/77    12.605  PAGE:  85
REVISION: 000.00                              MICROPROGRAM SECTION                    DOC.#:
                                                                          ADDRESS   IMAGE
LINE #                               SEQUENCE: SSUPCS                      (HEX)    (HEX)
                                            -continued
3187000
3188000
3189000 $SEEKUNSTK1    \DECREMENT SEEKS STACK                       \       27D     603C
3190000                DEC AACU BACU                                ;
3191000
3192000 S              \RE-WRITE UPDATED SEEKS INDICATOR            \       27E     A200
3193000                MWT AACU                                     ;
3194000
3195000 S              \LAST R/W CHANNEL TO SPA                     \       27F     BBE9
3196000                SSPA LOC(LSTRW)                              ;
3197000
3198000 S              \LAST R/W CHANNEL TO SPA                     \       280     696A
3199000                XFB ASPA BSPM SRIA                           ;
3200000
3201000 $SEEKUNSTK2    \INCREMENT LAST R/W CHANNEL                  \       281     A100
3202000                IMA                                          ;
3203000
3204000 S              \NO OP FOR TIMING                            \       282     0000
3205000                NOP                                          ;
3206000
3207000 S              \MASK HIGH ORDER BITS                        \       283     8807
3208000                ACN CNST(03#) ASPA                           ;
3209000
3210000 S              \SKIP IF SEEK STACKED                        \       284     C490
3211000                TFO TAX0 ASPM                                ;
3212000
3213000 S              \GO TO CHECK NEXT CHANNEL                    \       285     F281
3214000                GTO ($SEEKUNSTK2)                            ;
3215000
3216000 S              \CLEAR SEEK STACKED INDICATOR                \       286     85EF
3217000                ACN CNST(7F#) ASPM                           ;
3218000
3219000 $SEEKUNSTK3    \RE-WRITE UPDATED INDICATOR                  \       287     A200
3220000                MWT AACU                                     ;
3221000
3222000 S              \LOAD INDEX REGISTER                         \       288     A830
3223000                LIR ASPA                                     ;
3224000
3225000 S              \GO TO INITIATE TASK                         \       289     F366
3226000                GTO ($CMDEC-E1)                              ;
3227000
3228000 SKIP HOF                                                    ;

MODEL: MPDC-REV3D                             RTL/6000 FILE EDIT                      08/01/77    12.605  PAGE:  86
REVISION: 000.00                              MICROPROGRAM SECTION                    DOC.#:
                                                                          ADDRESS   IMAGE
LINE #                               SEQUENCE: SSUPCS                      (HEX)    (HEX)
3229000
3230000         \      THE POLLING ROUTINE IS CALLED WHEN THE WAIT
3231000                ROUTINE DETECTS A CHANGE IN DEVICE STATUS. THE
3232000                ROUTINE ANALYZES THE STATUS CHANGE TO DETERMINE
3233000                IF ANY SEEKS HAVE BECOME DONE OR IF ANY DEVICES
3234000                HAVE MADE A STATE TRANSITION (OFF LINE TO
3235000                READY OR READY TO OFF LINE).                 \
3236000
3237000 $POLLSEEK      \SKIP IF PREVIOUS SEEK ACTIVE                \       28A     C052
3238000                TFZ TAX1 AACU                                ;
3239000
3240000 S              \GO TO CHECK FOR STATE TRANSITION            \       28B     F2A4
3241000                GTO ($POLLREADY)                             ;
3242000
3243000 S              \SKIP IF NO SEEK ERROR                       \       28C     C454
3244000                TFZ TAX2 ASPM                                ;
3245000
3246000 S              \SET SEEK ERROR STATUS                       \       28D     F29E
3247000                GTO ($POLLSEEKER)                            ;
3248000
3249000 S              \SKIP IF SEEK COMPLETE                       \       28E     C492
3250000                TFO TAX1 ASPM                                ;
3251000
3252000 S              \GO TO CHECK FOR STATE TRANSITION            \       28F     F2A4
3253000                GTO ($POLLREADY)                             ;
3254000
3255000 S              \SET SPA FOR CHANNEL MONITOR                 \       290     BC88
3256000                SSPAI LOC (MON1)                             ;
3257000
3258000 S              \SKIP IF NOT A RECALIBRATE                   \       291     C45A
3259000                TFZ TAX5 ASPM                                ;
3260000
3261000 S              \GO TO SELECT PLATTER ZERO, TRACK ZERO       \       292     F3E7
3262000                GTO ($RECALPLSEL)                            ;
3263000
3264000 S              \SKIP IF SEEK ACTIVE BIT SET                 \       293     C496
3265000                TFO TAX3 ASPM                                ;
3266000
3267000 S              \CHECK FOR STATE TRANSITION                  \       294     F2A2
3268000                GTO ($POLLSEEK1)                             ;
3269000
3270000 S              \RESET SEEK BIT IN MONITOR                   \       295     87AF
3271000                ACN ASPM CNST (EF#)                          ;
3272000
3273000 S              \RE-WRITE MONITOR                            \       296     A200
3274000                MWT                                          ;
3275000
3276000 SKIP HOF                                                    ;

MODEL: MPDC-REV3D                             RTL/6000 FILE EDIT                      08/01/77    12.605  PAGE:  87
REVISION: 000.00                              MICROPROGRAM SECTION                    DOC.#:
                                                                          ADDRESS   IMAGE
LINE #                               SEQUENCE: SSUPCS                      (HEX)    (HEX)
3277000 S              \SET SPA FOR TASK                            \       297     BC0A
3278000                SSPAI LOC(TSK1)                              ;
3279000
3280000 S              \SKIP IF NOT IMPLIED SEEK                    \       298     C454
3281000                TFZ TAX2 ASPM                                ;
3282000
3283000 S              \GO TO INITIATE R/W                          \       299     F382
3284000                GTO ($CMDEC-E2)                              ;
3285000
3286000 S              \SET SPA FOR DMA BYTE                        \       29A     BC89
3287000                SSPAI LOC (DMA1)                             ;
3288000
```

MODEL: MPDC-REV3D
REVISION: 000.00

RTL/6000 FILE EDIT
MICROPROGRAM SECTION

08/01/77  12.605  PAGE: 87
DOC.#:

SEQUENCE: $SUPC5
-continued

| LINE # | Label | Comment / Instruction | ADDRESS (HEX) | IMAGE (HEX) |
|---|---|---|---|---|
| 3289000 | $ | \SKIP IF NOT AN IMPLIED SEEK \ TFZ TAX2 ASPM ; | 29B | C454 |
| 3292000 | $ | \GO TO CONTINUE READ/WRITE \ GTO ($CMDEC-E2) ; | 29C | F382 |
| 3295000 | $ | \GO TO SEND INTERRUPT \ GTO ($STARTINTPT) ; | 29D | F33F |
| 3298000 | $POLLSEEKER | \ADDRESS CHANNEL MONITOR \ SSPAI LOC (MON1) ; | 29E | BC88 |
| 3301000 | $ | \SKIP IF SEEK ACTIVE SET \ TFO TAX3 ASPM ; | 29F | C496 |
| 3304000 | $ | \SKIP IF NOT A RECALIBRATE \ TFZ TAX5 ASPM ; | 2A0 | C45A |
| 3307000 | $ | GTO ($SEEK-ERR) ; | 2A1 | F5A4 |
| 3309000 | $POLLSEEK1 | \SET CHANNEL READY \ SCR ; | 2A2 | 401B |
| 3312000 | $ | \SET SPA FOR UPDATED DEVICE STATUS \ SSPAI LOC (DEVST) ; | 2A3 | 8CEA |
| 3315000 | SKIP HOF | | | |

MODEL: MPDC-REV3D
REVISION: 000.00

RTL/6000 FILE EDIT
MICROPROGRAM SECTION

08/01/77  12.605  PAGE: 88
DOC.#:

SEQUENCE: $SUPC5

| LINE # | Label | Comment / Instruction | ADDRESS (HEX) | IMAGE (HEX) |
|---|---|---|---|---|
| 3317000 | $POLLREADY | \SKIP IF PREVIOUSLY NOT READY \ TFZ TAX0 AACU ; | 2A4 | C050 |
| 3320000 | $ | \GO TO CHECK FOR OFF LINE TRANSITION \ GTO ($POLLOFFLIN) ; | 2A5 | F2A9 |
| 3323000 | $ | \SKIP IF STILL NOT READY \ TFZ TAX0 ASPM ; | 2A6 | C450 |
| 3326000 | $ | \GO TO SEND ATTENTION ON LINE TRANSITION \ GTO ($TERM-ATT) ; | 2A7 | F596 |
| 3329000 | $ | \GO TO POLL NEXT CHANNEL \ GTO ($POLLNEXT) ; | 2A8 | F243 |
| 3332000 | $POLLOFFLIN | \SKIP IF NOT READY \ TFZ TAX0 ASPM ; | 2A9 | C450 |
| 3335000 | $ | \GO TO POLL NEXT CHANNEL \ GTO ($POLLNEXT) ; | 2AA | F243 |
| 3338000 | $ | \GO TO SEND ATTENTION OFF LINE TRANSITION \ GTO ($TERM-ATT) ; | 2AB | F596 |
| 3342000 | SKIP HOF | | | |

MODEL: MPDC-REV3D
REVISION: 000.00

RTL/6000 FILE EDIT
MICROPROGRAM SECTION

08/01/77  12.605  PAGE: 89
DOC.#:

SEQUENCE: $SUPC5

```
         \  THE READ/WRITE UNSTACK ROUTINE IS CALLED BY THE
            WAIT ROUTINE WHEN A READ/WRITE OPERATION IS FOUND
            TO BE STACKED (S.P. LOCATION RWSTK).

THE ROUTINE WILL SEQUENTIALLY EXAMINE ALL CHANNELS
            STARTING WITH THE ONE AFTER THE LAST R/W. IF A
            CHANNEL IS FOUND TO HAVE READ/WRITE STACKED, THE
            ROUTINE WILL UNSTACK THE TASK (READ OR WRITE)
            AND BRANCH TO COMMAND DECODE.                    \
```

| LINE # | Label | Comment / Instruction | ADDRESS (HEX) | IMAGE (HEX) |
|---|---|---|---|---|
| 3355000 | $RDWTUNSTK1 | \DECREMENT R/W STACK \ DEC AACU BACU ; | 2AC | 603C |
| 3358000 | $ | \RE-WRITE UPDATED R/W INDICATOR \ MWT AACU ; | 2AD | A200 |
| 3361000 | $ | \SET SPA FOR LAST R/W CHANNEL \ SSPA LOC(LSTRW) ; | 2AE | 8BE9 |
| 3364000 | $ | \LAST R/W CHANNEL TO SPA \ XFB ASPA BSPM SRIA ; | 2AF | 696A |
| 3367000 | $RDWTUNSTK2 | \INCREMENT LAST R/W CHANNEL \ IMA ; | 2B0 | A100 |
| 3370000 | $ | \NO OP FOR TIMING \ NOP ; | 2B1 | 0000 |
| 3373000 | $ | \MASK HIGH ORDER BITS \ ACN CNST(03#) ASPA ; | 2B2 | 8807 |
| 3376000 | $ | \SKIP IF R/W COMMAND STACKED \ TFO TAX1 ASPM ; | 2B3 | C492 |
| 3379000 | $ | \GO TO CHECK NEXT CHANNEL \ GTO ($RDWTUNSTK2) ; | 2B4 | F2B0 |
| 3382000 | $ | \CLEAR R/W STACKED INDICATOR \ ACN CNST(BF#) ASPM ; | 2B5 | 86EF |
| 3385000 | $ | \GO TO LOAD INDEX REG. & INITIATE TASK \ GTO ($SEEKUNSTK3) ; | 2B6 | F2B7 |
| 3388000 | SKIP HOF | | | |

```
MODEL: MPDC-REV3D                          RTL/6000 FILE EDIT                    08/01/77      12.605  PAGE:   90
REVISION: 000.00                          MICROPROGRAM SECTION                    DOC.#:
                                                                      ADDRESS  IMAGE
       LINE #                      SEQUENCE: $SUPCS                    (HEX)   (HEX)
     3389000     \ THE BUS REQUEST ROUTINE IS CALLED BY THE WAIT
     3390000       ROUTINE WHENEVER AN UNSOLICITED BUS TRANSFER IS
     3391000       DETECTED. THE PURPOSE OF THE BUS REQUEST ROUTINE IS TO
     3392000       EXECUTE THE I/O REQUIREMENTS OF THE BUS CYCLE AND TO
     3393000       INITIATE ANY DEVICE SUPPORT THAT IS REQUIRED.        \
     3394000
     3395000
     3396000 $STARTBUSRQ    \SKIP IF RESPONSE NOT REQUIRED       \       287   C044
     3397000               TFZ TRSP                              ;
     3398000
     3399000 $              \RESPONSE IS REQUIRED GO TO RESPONSE SEG \   288   F326
     3400000               GTO ($BUSRQ-RSVP)                     ;
     3401000
     3402000 $              \SET SPA FOR CH2 (LSB OF CHANNEL NUMBER) \   289   8CA1
     3403000               SSPAI LOC(CHN2)                       ;
     3404000
     3405000 $              \STORE BDC CHANNEL NUMBER (LSB)       \      28A   A201
     3406000               MWT ABUS1                             ;
     3407000
     3408000 $              \FUNCTION CODE TO ACU                 \      28B   84EE
     3409000               ACN ASPM CNST(3E#)                    ;
     3410000
     3411000 $              \SET SPA FOR CH1 (MSB OF CHANNEL NUMBER) \   2BC   8CA0
     3412000               SSPAI LOC(CHN1)                       ;
     3413000
     3414000 $              \STORE BDC CHANNEL NUMBER (MSB)       \      2BD   A201
     3415000               MWT ABUS1                             ;
     3416000
     3417000
     3418000     \ ADDRESS SCRATCH PAD MEMORY WITH FUNCTION CODE
     3419000       INDEXED BY CHANNEL NUMBER.                    \
     3420000
     3421000
     3422000 $              \ADDRESS SCRATCH PAD WITH FUNCTION CODE \    2BE   6C6A
     3423000               XFB ASPAI BACU SRIA                   ;
     3424000
     3425000 $              \STORE MSB OF DATA                    \      2BF   A701
     3426000               WIA ABUS2                             ;
     3427000
     3428000 $              \ STORE LSB OF DATA                   \      2C0   AA01
     3429000               MWT ABUS3                             ;
     3430000
     3431000
     3432000 SKIP HOF                                            ;

MODEL: MPDC-REV3D                          RTL/6000 FILE EDIT                    08/01/77      12.605  PAGE:   91
REVISION: 000.00                          MICROPROGRAM SECTION                    DOC.#:
                                                                      ADDRESS  IMAGE
       LINE #                      SEQUENCE: $SUPCS                    (HEX)   (HEX)
     3433000     \ IF FUNCTION CODE IS OUTPUT ADDRESS
     3434000       . POST DIRECTION BIT IN DMA CONTROL (DMA1, BIT0)
     3435000       . STORE MAIN MEMORY'S MODULE NUMBER AT MOD1
     3436000       ELSE GO TO CHECK FOR BUS PARITY ERROR.
     3437000       FUNCTION CODE1                                \
     3438000
     3439000 $              \ SET ACU FOR OUTPUT ADDRESS COMPARE  \      2C1   8021
     3440000               LCN AACU CNST(09#)                    ;
     3441000
     3442000 $              \ COMPARE FUNCTION CODE WITH HEX 09   \      2C2   681A
     3443000               XOR ASPA BACU                         ;
     3444000
     3445000 $              \ SKIP IF FUNCTION CODE OUTPUT ADDRESS \     2C3   C086
     3446000               TFO TEQZ                              ;
     3447000
     3448000 $              \ GO TO TEST FOR BUS PARITY ERROR     \      2C4   F2D0
     3449000               GTO ($BUSRQPTYCK)                     ;
     3450000
     3451000 $              \ SET SPA FOR DIRECTION BIT           \      2C5   8CA1
     3452000               SSPAI LOC(CHN2)                       ;
     3453000
     3454000 $              \ CLEAR ACU                           \      2C6   8000
     3455000               LCN AACU CNST(00#)                    ;
     3456000
     3457000 $              \ SKIP IF DIRECTION IS ZERO (READ)    \      2C7   C452
     3458000               TFZ TAX1 ASPM                         ;
     3459000
     3460000 $              \ SET DIRECTION BIT IN ACU            \      2C8   8200
     3461000               LCN AACU CNST(80#)                    ;
     3462000
     3463000 $              \ SET SPA FOR DMA BYTE                \      2C9   8C89
     3464000               SSPAI LOC(DMA1)                       ;
     3465000
     3466000 $              \ STORE DMA BYTE                      \      2CA   A200
     3467000               MWT                                   ;
     3468000
     3469000 SKIP HOF                                            ;

MODEL: MPDC-REV3D                          RTL/6000 FILE EDIT                    08/01/77      12.605  PAGE:   92
REVISION: 000.00                          MICROPROGRAM SECTION                    DOC.#:
                                                                      ADDRESS  IMAGE
       LINE #                      SEQUENCE: $SUPCS                    (HEX)   (HEX)
     3470000 $              \ SET SPA FOR MODULE NUMBER           \      2CB   8C23
     3471000               SSPAI LOC(MOD1)                       ;
     3472000
     3473000 $              \ STORE MODULE NUMBER                 \      2CC   A201
     3474000               MWT ABUS1                             ;
     3475000
     3476000 $              \ SKIP IF PARITY ERROR                \      2CD   C0BA
     3477000               TFO TPTY                              ;
     3478000
     3479000 $              \ GO TO RELEASE BUS                   \      2CE   F33D
     3480000               GTO ($BUSRQ-DONE)                     ;
     3481000
     3482000 $              \ GO TO SET PARITY ERROR              \      2CF   F2D8
     3483000               GTO ($BUSRQSETER)                     ;
     3484000
     3485000 SKIP HOF                                            ;
```

```
MODEL: MPDC-REV3D                           RTL/6000 FILE EDIT                       08/01/77    12.605  PAGE:  93
REVISION: 000.00                           MICROPROGRAM SECTION                      DOC.#:
                                                                           ADDRESS  IMAGE
LINE #                                  SEQUENCE: SSUPC5                   (HEX)    (HEX)
3486000
3487000  $BUSRQPTYCK    \ SKIP IF PARITY ERROR                     \         2D0    C08A
3488000                 TFO TPTY                                   ;
3489000
3490000  $              \ GO TO TEST FOR FUNCTION CODE 1           \         2D1    F2DC
3491000                 GTO ($BUSRQCODE1)                          ;
3492000
3493000  $              \ SET ACU FOR INTERRUPT FUNCTION CODE      \         2D2    8003
3494000                 LCN AACU CNST(03#)                         ;
3495000
3496000  $              \ COMPARE FOR OUTPUT INTERRUPT LEVEL       \         2D3    681A
3497000                 XOR ASPA BACU                              ;
3498000
3499000  $              \ SKIP IF INTERRUPT CODE                   \         2D4    C086
3500000                 TFO TEQZ                                   ;
3501000
3502000  $              \ GO TO SET PARITY ERROR                   \         2D5    F2DB
3503000                 GTO ($BUSRQSETER)                          ;
3504000
3505000  $              \ CLEAR INTERRUPT LEVEL                    \         2D6    A20B
3506000                 WDA                                        ;
3507000
3508000  $              \ CLEAR INTERRUPT LEVEL                    \         2D7    A200
3509000                 MWT                                        ;
3510000
3511000  $BUSRQSETER    \ SET SPA FOR STATUS BYTE                  \         2D8    8C61
3512000                 SSPAI LOC(STS2)                            ;
3513000
3514000  $              \ SET PARITY ERROR                         \         2D9    8412
3515000                 OCN ASPM CNST(02#)                         ;
3516000
3517000  $              \ RESTORE STATUS BYTE                      \         2DA    A200
3518000                 MWT                                        ;
3519000
3520000  $              \ GO TO SET INTERRUPT                      \         2DB    F321
3521000                 GTO ($BUSRQ-STP4)                          ;
3522000
3523000
3524000         \ IF FUNCTION CODE EQUALS 1 THEN
3525000           . GO TO BLT IF INITIALIZE
3526000           . GO TO STOP SEGMENT IF STOP I/O
3527000           . ENTER TEST MODE IF TEST IS SET
3528000                                                            \
3529000
3530000 SKIP HOF                                                   ;

MODEL: MPDC-REV3D                           RTL/6000 FILE EDIT                       08/01/77    12.605  PAGE:  94
REVISION: 000.00                           MICROPROGRAM SECTION                      DOC.#:
                                                                           ADDRESS  IMAGE
LINE #                                  SEQUENCE: SSUPC5                   (HEX)    (HEX)
3531000
3532000  $BUSRQCODE1    \ LOAD ACU WITH OUTPUT CONTROL FUNCTION CODE \       2DC    8001
3533000                 LCN AACU CNST(01#)                         ;
3534000
3535000  $              \ COMPARE FUNCTION CODE EQUAL TO 01         \        2DD    681A
3536000                 XOR ASPA BACU                              ;
3537000
3538000  $              \ SKIP IF FUNCTION CODE OUTPUT CONTROL      \        2DE    C086
3539000                 TFO TEQZ                                   ;
3540000
3541000  $              \ GO TO TEST FOR GO COMMAND                \         2DF    F2E6
3542000                 GTO ($BUSRQTSTGO)                          ;
3543000
3544000  $              \DECREMENT SPA                             \         2E0    A008
3545000                 DMA                                        ;
3546000
3547000  $              \ SKIP IF NOT AN INITIALIZE                \         2E1    C450
3548000                 TFZ TAX0 ASPM                              ;
3549000
3550000  $              \ INITIALIZE                               \         2E2    1000
3551000                 CLR                                        ;
3552000
3553000  $              \ SKIP IF NOT STOP I/O                     \         2E3    C452
3554000                 TFZ TAX1 ASPM                              ;
3555000
3556000  $              \ STOP I/O                                 \         2E4    F309
3557000                 GTO ($BUSRQ-STOP)                          ;
3558000
3559000  $              \ GO TO RELEASE BUS                        \         2E5    F33D
3560000                 GTO ($BUSRQ-DONE)                          ;
3561000
3562000
3563000         \ IF THE FUNCTION CODE IS EQUAL TO A TASK FUNCTION
3564000           CODE, THEN
3565000           . RESET CHANNEL READY FLOP
3566000           . CLEAR DEVICE STATUS
3567000           . ENQUEUE TASK                                   \
3568000
3569000
3570000  $BUSRQTSTGO    \ TASK FUNCTION CODE TO ACU                \         2E6    8006
3571000                 LCN AACU CNST(07#)                         ;
3572000
3573000  $              \ COMPARE FUNCTION CODE TO 07#             \         2E7    681A
3574000                 XOR ASPA BACU                              ;
3575000
3576000  $              \ SKIP IF OUTPUT TASK FUNCTION CODE        \         2E8    C086
3577000                 TFO TEQZ                                   ;
3578000
3579000 SKIP HOF

MODEL: MPDC-REV3D                           RTL/6000 FILE EDIT                       08/01/77    12.605  PAGE:  95
REVISION: 000.00                           MICROPROGRAM SECTION                      DOC.#:
                                                                           ADDRESS  IMAGE
LINE #                                  SEQUENCE: SSUPC5                   (HEX)    (HEX)
3580000
3581000  $              \ GO TO DONE                               \         2E9    F33D
3582000                 GTO ($BUSRQ-DONE)                          ;
3583000
3584000  $              \ RESET CHANNEL READY                      \         2EA    4010
3585000                 RCR                                        ;
3586000
3587000  $              \ SET SPA FOR CHANNEL MONITOR              \         2EB    8CB8
3588000                 SSPAI LOC(MON)                             ;
```

MODEL: MPDC-REV30  
REVISION: 000.00

RTL/6000 FILE EDIT  
MICROPROGRAM SECTION

08/01/77  12.605  PAGE: 95  
DOC.#:

| LINE # | | | SEQUENCE: $$UPC5 -continued | | ADDRESS (HEX) | IMAGE (HEX) |
|---|---|---|---|---|---|---|
| 3589000 | | | | | | |
| 3590000 | S | | \ SET BUSY FLAG | \ | 2EC | 8100 |
| 3591000 | | | LCN AACU CNST(40#) | ; | | |
| 3592000 | | | | | | |
| 3593000 | S | | \ STORE CHANNEL MONITOR | \ | 2ED | A200 |
| 3594000 | | | MWT | ; | | |
| 3595000 | | | | | | |
| 3596000 | S | | \ SET SPA FOR STATUS BYTE | \ | 2EE | 8C61 |
| 3597000 | | | SSPAI LOC(STS2) | ; | | |
| 3598000 | | | | | | |
| 3599000 | S | | \ SKIP IF NO PARITY ERROR | \ | 2EF | C45C |
| 3600000 | | | TFZ TAX6 ASPM | ; | | |
| 3601000 | | | | | | |
| 3602000 | S | | \ PARITY ERROR-SEND INTERRUPT | \ | 2F0 | F208 |
| 3603000 | | | GTO ($BUSRQSETER) | ; | | |
| 3604000 | | | | | | |
| 3605000 | S | | \ CLEAR BUS STATUS | \ | 2F1 | 4084 |
| 3606000 | | | RST | ; | | |
| 3607000 | | | | | | |
| 3608000 | S | | \ CLEAR ACU | \ | 2F2 | 600E |
| 3609000 | | | ZER BACU | ; | | |
| 3610000 | | | | | | |
| 3611000 | S | | \ CLEAR LSB OF STATUS | \ | 2F3 | A208 |
| 3612000 | | | WDA | ; | | |
| 3613000 | | | | | | |
| 3614000 | S | | \ CLEAR MSB OF STATUS | \ | 2F4 | A200 |
| 3615000 | | | MWT | ; | | |
| 3616000 | | | | | | |
| 3617000 | S | | \ SET SPA FOR COMMAND CODE | \ | 2F5 | 8C0A |
| 3618000 | | | SSPAI LOC(TSK1) | ; | | |
| 3619000 | | | | | | |
| 3620000 | S | | \ SKIP IF SEEK COMMAND | \ | 2F6 | C450 |
| 3621000 | | | TFZ TAX0 ASPM | ; | | |
| 3622000 | | | | | | |
| 3623000 | S | | \ SKIP IF NOT AN IMPLIED SEEK | \ | 2F7 | C454 |
| 3624000 | | | TFZ TAX2 ASPM | ; | | |
| 3625000 | | | | | | |
| 3626000 | S | | \ GO TO SET SEEK STACKED | \ | 2F8 | F301 |
| 3627000 | | | GTO ($BUSRQ-SEEK) | ; | | |
| 3628000 | | | | | | |
| 3629000 | SKIP HOF | | | ; | | |

MODEL: MPDC-REV30  
REVISION: 000.00

RTL/6000 FILE EDIT  
MICROPROGRAM SECTION

08/01/77  12.605  PAGE: 96  
DOC.#:

| LINE # | | | SEQUENCE: $$UPC5 | | ADDRESS (HEX) | IMAGE (HEX) |
|---|---|---|---|---|---|---|
| 3630000 | | | | | | |
| 3631000 | $BUSRQ-RW | | \ SET SPA FOR R/W STACKED INDICATOR | \ | 2F9 | 8BE8 |
| 3632000 | | | SSPA LOC(RWSTK) | ; | | |
| 3633000 | | | | | | |
| 3634000 | S | | \ INCREMENT COUNT | \ | 2FA | 6400 |
| 3635000 | | | INC ASPM BACU | ; | | |
| 3636000 | | | | | | |
| 3637000 | S | | \ RESTORE COUNT | \ | 2FB | A200 |
| 3638000 | | | MWT | ; | | |
| 3639000 | | | | | | |
| 3640000 | S | | \ INDEX REG TO ACU | \ | 2FC | 6C3E |
| 3641000 | | | XFA AIDX BACU | ; | | |
| 3642000 | | | | | | |
| 3643000 | S | | \ACU TO SPA | \ | 2FD | 686A |
| 3644000 | | | XFB ASPA BACU SRIA | ; | | |
| 3645000 | | | | | | |
| 3646000 | S | | \ SET R/W STACKED INDICATOR | \ | 2FE | 8510 |
| 3647000 | | | OCN ASPM CNST(40#) | ; | | |
| 3648000 | | | | | | |
| 3649000 | S | | \ RESTORE INDICATOR | \ | 2FF | A200 |
| 3650000 | | | MWT | ; | | |
| 3651000 | | | | | | |
| 3652000 | S | | \ RETURN TO WAIT LOOP | \ | 300 | F330 |
| 3653000 | | | GTO ($BUSRQ-DONE) | ; | | |
| 3654000 | | | | | | |
| 3655000 | $BUSRQ-SEEK | | \ SET SPA FOR SEEK STACKED INDICATOR | \ | 301 | 8BEA |
| 3656000 | | | SSPA LOC(SKSTK) | ; | | |
| 3657000 | | | | | | |
| 3658000 | S | | \ INCREMENT COUNT | \ | 302 | 6400 |
| 3659000 | | | INC ASPM BACU | ; | | |
| 3660000 | | | | | | |
| 3661000 | S | | \ RESTORE COUNT | \ | 303 | A200 |
| 3662000 | | | MWT | ; | | |
| 3663000 | | | | | | |
| 3664000 | S | | \ INDEX REG TO ACU | \ | 304 | 6C3E |
| 3665000 | | | XFA AIDX BACU | ; | | |
| 3666000 | | | | | | |
| 3667000 | S | | \ACU TO SPA | \ | 305 | 686A |
| 3668000 | | | XFB ASPA BACU SRIA | ; | | |
| 3669000 | | | | | | |
| 3670000 | S | | \ SET SEEK STACKED INDICATOR | \ | 306 | 8610 |
| 3671000 | | | OCN ASPM CNST(80#) | ; | | |
| 3672000 | | | | | | |
| 3673000 | S | | \ RESTORE INDICATOR | \ | 307 | A200 |
| 3674000 | | | MWT | ; | | |
| 3675000 | | | | | | |
| 3676000 | S | | \ RETURN TO WAIT LOOP | \ | 308 | F330 |
| 3677000 | | | GTO ($BUSRQ-DONE) | ; | | |
| 3678000 | | | | | | |
| 3679000 | | | | | | |
| 3680000 | SKIP HOF | | | ; | | |

MODEL: MPDC-REV30  
REVISION: 000.00

RTL/6000 FILE EDIT  
MICROPROGRAM SECTION

08/01/77  12.605  PAGE: 97  
DOC.#:

| LINE # | | | SEQUENCE: $$UPC5 | | ADDRESS (HEX) | IMAGE (HEX) |
|---|---|---|---|---|---|---|
| 3681000 | | | \ FUNCTION CODE, WITH STOP I/O SET HAS BEEN DETECTED. | | | |
| 3682000 | | | . STOP ANY READ OR WRITE WHICH IS IN PROGRESS | | | |
| 3683000 | | | . INITIALIZE CHANNEL MONITOR BYTE | | | |
| 3684000 | | | . INITIATE INTERRUPT | \ | | |
| 3685000 | | | | | | |
| 3686000 | $BUSRQ-STOP | | \ SET SPA FOR LAST R/W CHANNEL | \ | 309 | 8BE9 |
| 3687000 | | | SSPA LOC(LSTRW) | ; | | |
| 3688000 | | | | | | |
| 3689000 | S | | \ SKIP IF ADAPTER BUSY | \ | 30A | C0A8 |
| 3690000 | | | TFO TADB | ; | | |
| 3691000 | | | | | | |

```
MODEL: MPDC-REV30                        RTL/6000 FILE EDIT                  08/01/77      12.605  PAGE:  97
REVISION: 000.00                         MICROPROGRAM SECTION                DOC.#:
                                                                    ADDRESS  IMAGE
LINE #                              SEQUENCE: $$UPCS                (HEX)    (HEX)
                                       -continued
3692000  $        \ GO TO STOP TASK                          \       30B     F310
3693000           GTO ($BUSRQ-STP1)                          ;
3694000
3695000  $        \ IS STOP I/O FOR ACTIVE CHANNEL           \       30C     601A
3696000           XOR AIDX BSPM                              ;
3697000
3698000  $        \ SKIP IF STOP I/O IS FOR ACTIVE CHANNEL   \       30D     C086
3699000           TFO TEQZ                                   ;
3700000
3701000  $        \ STOP I/O FOR NON-ACTIVE CHANNEL-DEQUE TASK \     30E     F310
3702000           GTO ($BUSRQ-STP1)                          ;
3703000
3704000  $        \ GO TO STOP READ OR WRITE OPERATION       \       30F     F59C
3705000           GTO ($TERM-NOR)                            ;
3706000
3707000  $BUSRQ-STP1  \ INDEX REGISTER TO ACU                \       310     6C3E
3708000           XFA AIDX                                   ;
3709000
3710000  $        \ ACU TO SPA                               \       311     686A
3711000           XFB ASPA BACU SRIA                         ;
3712000
3713000  $        \ CLEAR ACU                                \       312     600E
3714000           ZER                                        ;
3715000
3716000  $        \ SKIP IF NO SEEK STACKED                  \       313     C450
3717000           TFZ TAX0 ASPM                              ;
3718000
3719000  $        \ GO TO CLEAR SEEK STACKED                 \       314     F318
3720000           GTO ($BUSRQ-STP2)                          ;
3721000
3722000  $        \ SKIP IF NO R/W STACKED                   \       315     C452
3723000           TFZ TAX1 ASPM                              ;
3724000
3725000  $        \ GO TO CLEAR R/W STACKED                  \       316     F31D
3726000           GTO ($BUSRQ-STP3)                          ;
3727000
3728000  $        \ GO TO SEND INTERRUPT                     \       317     F321
3729000           GTO ($BUSRQ-STP4)                          ;
3730000
3731000 SKIP HOF MODEL: MPDC-REV30                        RTL/6000 FILE EDIT                  08/01/77      12.605  PAGE:  98
REVISION: 000.00                         MICROPROGRAM SECTION                DOC.#:
                                                                    ADDRESS  IMAGE
LINE #                              SEQUENCE: $$UPCS                (HEX)    (HEX)
3732000
3733000  $BUSRQ-STP2  \ CLEAR SEEK STACKED INDICATOR         \       318     A200
3734000           MWT                                        ;
3735000
3736000  $        \ SET SPA FOR SEEK STACK INDICATOR         \       319     8BEA
3737000           SSPA LOC(SKSTK)                            ;
3738000
3739000  $        \ DECREMENT INDICATOR                      \       31A     643C
3740000           DEC ASPM                                   ;
3741000
3742000  $        \ RE-WRITE INDICATOR                       \       31B     A200
3743000           MWT                                        ;
3744000
3745000  $        \ GO TO SEND INTERRUPT                     \       31C     F321
3746000           GTO ($BUSRQ-STP4)                          ;
3747000
3748000  $BUSRQ-STP3  \ CLEAR R/W STACKED INDICATOR          \       31D     A200
3749000           MWT                                        ;
3750000
3751000  $        \ SET SPA FOR R/W STACK INDICATOR          \       31E     8BEB
3752000           SSPA LOC(RWSTK)                            ;
3753000
3754000  $        \ DECREMENT INDICATOR                      \       31F     643C
3755000           DEC ASPM                                   ;
3756000
3757000  $        \ RE-WRITE INDICATOR                       \       320     A200
3758000           MWT                                        ;
3759000
3760000  $BUSRQ-STP4  \ RESET BUS STATUS                     \       321     4084
3761000           RST                                        ;
3762000
3763000  $        \ SET SPA FOR CHANNEL MONITOR              \       322     8C8B
3764000           SSPAI LOC(MON1)                            ;
3765000
3766000  $        \ SET INTERRUPT STORED                     \       323     8430
3767000           OCN ASPM CNST(08#)                         ;
3768000
3769000  $        \ RE-WRITE MONITOR                         \       324     A200
3770000           MWT                                        ;
3771000
3772000  $        \ GO TO WAIT LOOP                          \       325     F253
3773000           GTO ($WAIT-CONTD)                          ;
3774000
3775000
3776000 SKIP HOF MODEL: MPDC-REV30                        RTL/6000 FILE EDIT                  08/01/77      12.605  PAGE:  99
REVISION: 000.00                         MICROPROGRAM SECTION                DOC.#:
                                                                    ADDRESS  IMAGE
LINE #                              SEQUENCE: $$UPCS                (HEX)    (HEX)
3777000           \ RESPONSE IS REQUIRED. LOAD BUS DATA REGISTER WITH 2
3778000           BYTES FROM SCRATCH PAD USING THE FUNCTION CODE AS THE
3779000           STARTING ADDRESS.                          \
3780000
3781000  $BUSRQ-RSVP  \ FUNCTION CODE TO ACU                 \       326     603F
3782000           XFA ABUS1 BACU                             ;
3783000
3784000  $        \ MASK UNUSED BITS                         \       327     80EE
3785000           ACN AACU CNST(3E#)                         ;
3786000
3787000  $        \ ADDRESS S.P. WITH FUNCTION CODE          \       328     6C6A
3788000           XFB ASPAI BACU SRIA                        ;
3789000
3790000  $        \ LOAD MSB OF DATA IN BUS DATA REGISTER    \       329     616B
3791000           XFB ABUS1 BSPM SRIA                        ;
3792000
3793000  $        \ INCREMENT SPA                            \       32A     A100
```

```
MODEL: MPDC-REV3D                           RTL/6000 FILE EDIT                    08/01/77    12.605  PAGE:  99
REVISION: 000.00                            MICROPROGRAM SECTION                  DOC.#:
                                                                          ADDRESS   IMAGE
LINE #                               SEQUENCE: $SUPCS                     (HEX)    (HEX)
                                              -continued
3794000                   IMA                                       ;
3795000
3796000    $             \ LOAD LSB OF DATA IN BUS DATA REGISTER    \    32B      616B
3797000                   XFB ABUS1 BSPM SRIA                       ;
3798000
3799000    $             \ SET CYCLE PARAMETERS                     \    32C      8240
3800000                   LCN AACU CNST(90#)                        ;
3801000
3802000    $             \ INITIATE BUS CYCLE                       \    32D      4020
3803000                   CYC AACU                                  ;
3804000
3805000 SKIP HOF                                                    ;

MODEL: MPDC-REV3D                           RTL/6000 FILE EDIT                    08/01/77    12.605  PAGE: 100
REVISION: 000.00                            MICROPROGRAM SECTION                  DOC.#:
                                                                          ADDRESS   IMAGE
LINE #                               SEQUENCE: $SUPCS                     (HEX)    (HEX)
3806000    $             \ HEX 19 TO ACU                            \    32E      8061
3807000                   LCN AACU CNST(19#)                        ;
3808000
3809000    $             \ COMPARE FOR INPUT STATUS FUNCTION CODE   \    32F      681A
3810000                   XOR ASPA BACU                             ;
3811000
3812000    $             \ SKIP IF INPUT STATUS FUNCTION CODE       \    330      C086
3813000                   TFO TEQZ                                  ;
3814000
3815000    $             \ DO NOT CLEAR ATTENTION                   \    331      F336
3816000                   GTO ($BUSRQ-SHR)                          ;
3817000
3818000    $             \ RESET STATUS 13 AND 14                   \    332      87E5
3819000                   ACN ASPM CNST(F9#)                        ;
3820000
3821000    $             \ RESTORE STATUS BYTE 2                    \    333      A208
3822000                   WDA AACU                                  ;
3823000
3824000    $             \ RESET ATTENTION BIT                      \    334      86EF
3825000                   ACN ASPM CNST(BF#)                        ;
3826000
3827000    $             \ RESTORE STATUS BYTE 1                    \    335      A200
3828000                   MWT                                       ;
3829000
3830000 SKIP HOF                                                    ;

MODEL: MPDC-REV3D                           RTL/6000 FILE EDIT                    08/01/77    12.605  PAGE: 101
REVISION: 000.00                            MICROPROGRAM SECTION                  DOC.#:
                                                                          ADDRESS   IMAGE
LINE #                               SEQUENCE: $SUPCS                     (HEX)    (HEX)
3831000
3832000 $BUSRQ-SHR       \ SKIP IF ACK NOT RECEIVED                 \    336      C04E
3833000                   TFZ TACK                                  ;
3834000
3835000    $             \ ACK WAS RECEIVED GO TO DONE              \    337      F33D
3836000                   GTO ($BUSRQ-DONE)                         ;
3837000
3838000    $             \ SKIP IF NAK WAS RECEIVED                 \    338      C086
3839000                   TFO TNAK                                  ;
3840000
3841000    $             \ NO RESPONSE LOOP                         \    339      F336
3842000                   GTO ($BUSRQ-SHR)                          ;
3843000
3844000    $             \ NAK RECEIVED - SET SPA FOR STS2          \    33A      8C61
3845000                   SSPAI LOC(STS2)                           ;
3846000
3847000    $             \ SET NON-EXISTANT RESOURCE ERROR          \    33B      8418
3848000                   OCN ASPM CNST(04#)                        ;
3849000
3850000    $             \ RESTORE STS2                             \    33C      A200
3851000                   MWT                                       ;
3852000
3853000 $BUSRQ-DONE      \ CLEAR BUS STATUS                         \    33D      4084
3854000                   RST                                       ;
3855000
3856000    $             \ GO TO WAIT                               \    33E      F253
3857000                   GTO ($WAIT-CONTD)                         ;
3858000
3859000 SKIP HOF                                                    ;

MODEL: MPDC-REV3D                           RTL/6000 FILE EDIT                    08/01/77    12.605  PAGE: 102
REVISION: 000.00                            MICROPROGRAM SECTION                  DOC.#:
                                                                          ADDRESS   IMAGE
LINE #                               SEQUENCE: $SUPCS                     (HEX)    (HEX)
3860000    \            THE INTERRUPT ROUTINE IS ENTERED UPON DETECTION
3861000                 OF A DEVICE STATE TRANSITION, OR AFTER THE EXECUTION
3862000                 OF A DATA TRANSFER, OR AFTER THE EXECUTION OF AN
3863000                 OUTPUT CONTROL WORD                         \
3864000
3865000
3866000 $STARTINTPT     \ SET SPA FOR INTERRUPT LEVEL               \    33F      8C03
3867000                  SSPAI LOC(ILC2)                            ;
3868000
3869000    $            \ STRIP 2 HIGH ORDER BITS                   \    340      84EF
3870000                  ACN ASPM CNST (3F#)                        ;
3871000
3872000    $            \ CHECK FOR INTERRUPT LEVEL ZERO            \    341      602A
3873000                  XFB BACU                                   ;
3874000
3875000    $            \ SKIP IF INTERRUPT LEVEL NOT ZERO          \    342      C046
3876000                  TFZ TEQZ                                   ;
3877000
3878000    $            \ INTERRUPT LEVEL ZERO-RESET MONITOR        \    343      F360
3879000                  GTO ($INTPT-ACK)                           ;
3880000
3881000    $            \ SET SPA FOR INTERRUPT VECTOR              \    344      8CA8
3882000                  SSPAI LOC(IDF1)                            ;
3883000
3884000    $            \ STORE INTERRUPT VECTOR                    \    345      A200
3885000                  MWT AACU                                   ;
3886000
3887000    $            \SET SPA FOR LSB OF CP CHANNAL NUMBER       \    346      8C03
3888000                  SSPAI LOC(ILC2)                            ;
3889000
3890000 SKIP HOF                                                    ;
```

MODEL: MPDC-REV3D  
REVISION: 000.00  
RTL/6000 FILE EDIT  
MICROPROGRAM SECTION  
08/01/77  12.605  PAGE: 103  
DOC.#:

| LINE # | | SEQUENCE: $SUPCS | | ADDRESS (HEX) | IMAGE (HEX) |
|---|---|---|---|---|---|
| 3891000 | | | | | |
| 3892000 | $ | \ CLEAR LOW ORDER BITS | \ | 347 | 8704 |
| 3893000 | | ACN ASPM CNST (C0#) | ; | | |
| 3894000 | | | | | |
| 3895000 | $ | \ LOAD LSB OF BUS ADDRESS | \ | 348 | 6C6B |
| 3896000 | | XFB ABUS4 BACU SRIA | ; | | |
| 3897000 | | | | | |
| 3898000 | $ | \SET SPA FOR 2ND BYTE OF CP CHANNEL NUMBER | \ | 349 | 8C02 |
| 3899000 | | SSPAI LOC(ILC1) | ; | | |
| 3900000 | | | | | |
| 3901000 | $ | \ LOAD MID OF BUS ADDRESS | \ | 34A | 6D6B |
| 3902000 | | XFB ABUS4 BSPM SRIA | ; | | |
| 3903000 | | | | | |
| 3904000 | $ | \ LOAD MSB OF BUS ADDRESS | \ | 34B | 6C4F |
| 3905000 | | ZER ABUS4 SRIA | ; | | |
| 3906000 | | | | | |
| 3907000 | $ | \ SET SPA FOR LSB OF MPDC CHANNEL NUMBER | \ | 34C | 8CA1 |
| 3908000 | | SSPAI LOC(CHN2) | ; | | |
| 3909000 | | | | | |
| 3910000 | $ | \ SAVE ONLY ADDRESS BITS | \ | 34D | 8704 |
| 3911000 | | ACN ASPM CNST (C0#) | ; | | |
| 3912000 | | | | | |
| 3913000 | $ | \ SET SPA FOR INTERRUPT VECTOR | \ | 34E | 8CA8 |
| 3914000 | | SSPAI LOC(IDF1) | ; | | |
| 3915000 | | | | | |
| 3916000 | $ | \ GENERATE LSB OF INTERRUPT VECTOR | \ | 34F | 643A |
| 3917000 | | ORR ASPM BACU | ; | | |
| 3918000 | | | | | |
| 3919000 | $ | \ STORE INTERRUPT VECTOR | \ | 350 | A200 |
| 3920000 | | MWT AACU | ; | | |
| 3921000 | | | | | |
| 3922000 | $ | \ LOAD LSB OF INTERRUPT VECTOR IN BUS REG | \ | 351 | 686B |
| 3923000 | | XFB ABUS3 BACU SRIA | ; | | |
| 3924000 | | | | | |
| 3925000 | $ | \ SET SPA FOR MSB OF INTERRUPT VECTOR | \ | 352 | 8CA0 |
| 3926000 | | SSPAI LOC(CHN1) | ; | | |
| 3927000 | | | | | |
| 3928000 | $ | \ LOAD MSB OF INTERRUPT VECTOR IN BUS REG. | \ | 353 | 656B |
| 3929000 | | XFB ABUS2 BSPM SRIA | ; | | |
| 3930000 | | | | | |
| 3931000 | $ | \CLEAR BUS STATUS | \ | 354 | 4084 |
| 3932000 | | RST | ; | | |
| 3933000 | | | | | |
| 3934000 | $ | \ SET CYCLE PARAMETERS | \ | 355 | 8200 |
| 3935000 | | LCN AACU CNST (80#) | ; | | |
| 3936000 | | | | | |
| 3937000 | $ | \ SET CYCLE | \ | 356 | 4020 |
| 3938000 | | CYC | ; | | |
| 3939000 | | | | | |
| 3940000 | SKIP HOF | | ; | | |

MODEL: MPDC-REV3D  
REVISION: 000.00  
RTL/6000 FILE EDIT  
MICROPROGRAM SECTION  
08/01/77  12.605  PAGE: 104  
DOC.#:

| LINE # | | SEQUENCE: $SUPCS | | ADDRESS (HEX) | IMAGE (HEX) |
|---|---|---|---|---|---|
| 3941000 | | | | | |
| 3942000 | $INTPT-TACK | \ SKIP IF NO ACK RESPONSE | \ | 357 | C04E |
| 3943000 | | TFZ TACK | ; | | |
| 3944000 | | | | | |
| 3945000 | $ | \ GO TO SET CHANNEL READY | \ | 358 | F360 |
| 3946000 | | GTO ($INTPT-ACK) | ; | | |
| 3947000 | | | | | |
| 3948000 | $ | \ SKIP IF NAK RESPONSE | \ | 359 | C06B |
| 3949000 | | TFO TNAK | ; | | |
| 3950000 | | | | | |
| 3951000 | $ | \ NO NAK GO TO TEST ACK | \ | 35A | F357 |
| 3952000 | | GTO ($INTPT-TACK) | ; | | |
| 3953000 | | | | | |
| 3954000 | $INTPT-NAK | \ NAK RECEIVED-SET SPA FOR CHANNEL MONITOR | \ | 35B | 8C88 |
| 3955000 | | SSPAI LOC (MON1) | ; | | |
| 3956000 | | | | | |
| 3957000 | $ | \ SET INTERRUPT PENDING | \ | 35C | 8610 |
| 3958000 | | OCN ASPM CNST (80#) | ; | | |
| 3959000 | | | | | |
| 3960000 | $ | \ RESTORE MONITOR CHANNEL | \ | 35D | A200 |
| 3961000 | | MWT AACU | ; | | |
| 3962000 | | | | | |
| 3963000 | $ | \ RESET CHANNEL READY | \ | 35E | 4010 |
| 3964000 | | RCR | ; | | |
| 3965000 | | | | | |
| 3966000 | $ | \ CLEAR BUS STATUS AND RETURN TO WAIT | \ | 35F | F364 |
| 3967000 | | GTO ($INTPT-EXIT) | ; | | |
| 3968000 | | | | | |
| 3969000 | $INTPT-ACK | \ SET SPA FOR CHANNEL MONITOR | \ | 360 | 8C88 |
| 3970000 | | SSPAI LOC(MON1) | ; | | |
| 3971000 | | | | | |
| 3972000 | $ | \ RESET MONITOR | \ | 361 | 600E |
| 3973000 | | ZER | ; | | |
| 3974000 | | | | | |
| 3975000 | $ | \ RESTORE MONITOR | \ | 362 | A200 |
| 3976000 | | MWT AACU | ; | | |
| 3977000 | | | | | |
| 3978000 | $ | \ SET CHANNEL READY | \ | 363 | 4018 |
| 3979000 | | SCR | ; | | |
| 3980000 | | | | | |
| 3981000 | $INTPT-EXIT | \ RESET BUS STATUS | \ | 364 | 4084 |
| 3982000 | | RST | ; | | |
| 3983000 | | | | | |
| 3984000 | $ | \ GO TO WAIT | \ | 365 | F21D |
| 3985000 | | GTO ($START-WAIT) | ; | | |
| 3986000 | | | | | |
| 3987000 | | | | | |
| 3988000 | SKIP HOF | | ; | | |

MODEL: MPDC-REV3D  
REVISION: 000.00  
RTL/6000 FILE EDIT  
MICROPROGRAM SECTION  
08/01/77  12.605  PAGE: 105  
DOC.#:

| LINE # | SEQUENCE: $SUPCS | ADDRESS (HEX) | IMAGE (HEX) |
|---|---|---|---|
| 3989000 | \ THE FOLLOWING FIRMWARE IS THE BEGINNING OF THE DEVICE | | |
| 3990000 | SPECIFIC ROUTINES DEDICATED TO THE SUPPORT OF THE | | |
| 3991000 | CAELUS CARTRIDGE DISK. | | |
| 3992000 | SIGNIFICANT STATUS AND WORK REGISTERS ARE DEFINED AS | | |
| 3993000 | FOLLOWS \ | | |

MODEL: MPDC-REV3D  
REVISION: 000.00

RTL/6000 FILE EDIT  
MICROPROGRAM SECTION

08/01/77  12.605  PAGE: 105  
DOC.#:

LINE #                       SEQUENCE: $SUPCS                     ADDRESS  IMAGE
                             -continued                            (HEX)    (HEX)

```
3994000
3995000    \ ADAPTER DEVICE I.D.          ADAPTER COMMAND (AAD2)
3996000      BIT                            BIT
3997000        0 = 0                          0 = ADAPTER BUSY
3998000        1 = 0                          1 = DATA TRANSFER
3999000        2 = 1                          2 = RECALIBRATE
4000000        3 = 1                          3 = DIAGNOSTIC MODE
4001000        4 = 0                          4 = SEARCH
4002000        5 = 0                          5 = WRITE
4003000        6 = 200 T.P.I.                 6 = READ
4004000        7 = FIXED VOLUME PRESENT       7 = FORMAT              \
4005000
4006000
4007000    \ ADAPTER STATUS I (AAD2)      ADAPTER STATUS II (AAD3)
4008000      BIT                            BIT
4009000        0 = DRIVE READY                0 = READ/WRITE ERROR
4010000        1 = SEEK COMPLETE              1 = SECTOR PLUSE ERROR
4011000        2 = SEEK TIMEOUT               2 = UNDERRUN/OVERRUN
4012000        3 = 0                          3 = WRITE PROTECT
4013000        4 = 0                          4 = CRC ERROR
4014000        5 = 0                          5 = SEARCH MISCOMPARE
4015000        6 = 0                          6 = ADDRESS MARK ERROR
4016000        7 = 0                          7 = SECOND INDEX DETECTED \
4017000
4018000
4019000    \ CHANNEL MONITOR BYTE         DMA BYTE
4020000      BIT                            BIT
4021000        0 = INTERRUPT PENDING          0 = READ=0, WRITE=1
4022000        1 = CHANNEL BUSY               1 = UNUSED
4023000        2 = STOP I/O                   2 = IMPLIED SEEK
4024000        3 = SEEK ACTIVE                3 = IGNORE READ ERRORS
4025000        4 = INTERRUPT STORED           4 = UNUSED
4026000        5 = RECALIBRATE OPERATION      5 = UNUSED
4027000        6 = UNUSED                     6 = UNUSED
4028000        7 = UNUSED                     7 = UNUSED              \
4029000
4030000 SKIP HOF                                                      ;
```

MODEL: MPDC-REV3D  
REVISION: 000.00

RTL/6000 FILE EDIT  
MICROPROGRAM SECTION

08/01/77  12.605  PAGE: 106  
DOC.#:

LINE #                       SEQUENCE: $SUPCS                     ADDRESS  IMAGE
                                                                   (HEX)    (HEX)
```
4031000 \ THIS PORTION OF COMMAND DECODE PERFORMS THE FOLLOWING
4032000   OPERATIONS
4033000      1. SELECTS THE DEVICE
4034000      2. PARTIAL COMMAND DECODE                           \
4035000
4036000
4037000  SCMDEC-E1      \ADDRESS DMA BYTE                         \    366   8C89
4038000                 SSPAI LOC (DMA1)                          ;
4039000
4040000  $              \RESET ALL BUT DIRECTION BIT              \    367   8804
4041000                 ACN ASPM CNST (80#)                       ;
4042000
4043000  $              \RESTORE DMA BYTE                         \    368   A200
4044000                 MWT                                       ;
4045000
4046000  $              \ ADDRESS UNIT SELECT                     \    369   8CEB
4047000                 SSPAI LOC(UNSEL)                          ;
4048000
4049000  $              \ SEND TO ADAPTER                         \    36A   7D6A
4050000                 XFB AAD3 BSPM SRIA                        ;
4051000
4052000  $              \ RETURN FROM SEEK OR RECALIBRATE         \    36B   E21D
4053000                 LRA ($START-WAIT)                         ;
4054000
4055000  $              \ ADDRESS TASK                            \    36C   8C0A
4056000                 SSPAI LOC(TSK1)                           ;
4057000
4058000  $              \ SKIP IF NOT WRAP TEST                   \    36D   C452
4059000                 TFZ ASPM TAX1                             ;
4060000
4061000  $              GTO ($CMDEC-E2)                           ;    36E   F382
4062000
4063000  $              \ SKIP IF DEVICE READY                    \    36F   D890
4064000                 TFO AAD2 TAX0                             ;
4065000
4066000  $              GTO ($START1NTPT)                         ;    370   F33F
4067000
4068000  $              \ SKIP IF R/W                             \    371   C490
4069000                 TFO ASPM TAX0                             ;
4070000
4071000  $              GTO ($SK-RCB)                             ;    372   F3B3
4072000
4073000 SKIP HOF                                                  ;
```

MODEL: MPDC-REV3D  
REVISION: 000.00

RTL/6000 FILE EDIT  
MICROPROGRAM SECTION

08/01/77  12.605  PAGE: 107  
DOC.#:

LINE #                       SEQUENCE: $SUPCS                     ADDRESS  IMAGE
                                                                   (HEX)    (HEX)
```
4074000  $              \SET SPA FOR UNIT SELECT BYTE             \    373   8CEB
4075000                 SSPAI LOC (UNSEL)                         ;
4076000
4077000  $              \CLEAR TRACK BIT                          \    374   87E7
4078000                 ACN ASPM CNST (FB#)                       ;
4079000
4080000  $              \RESTORE                                  \    375   A200
4081000                 MWT                                       ;
4082000
4083000  $              \ ADDRESS CONF B UPPER                    \    376   8C42
4084000                 SSPAI LOC(CNF3)                           ;
4085000
4086000  $              \ SHIFT TRACK BIT                         \    377   6430
4087000                 LSH ASPM                                  ;
4088000
4089000  $              \ SHIFT TRACK BIT                         \    378   6030
4090000                 LSH                                       ;
4091000
4092000  $              \ ADDRESS UNIT SELECT                     \    379   8CEB
4093000                 SSPAI LOC(UNSEL)                          ;
4094000
```

| LINE # | | | SEQUENCE: $SUPCS -continued | | ADDRESS (HEX) | IMAGE (HEX) |
|---|---|---|---|---|---|---|
| 4095000 | S | | \ SUPERIMPOSE UNIT SELECT BITS | \ | 37A | 643A |
| 4096000 | | | ORR ASPM | ; | | |
| 4097000 | | | | | | |
| 4098000 | S | | \ SEND TO ADAPTER | \ | 37B | 7C6A |
| 4099000 | | | XFB AAD3 SRIA | ; | | |
| 4100000 | | | | | | |
| 4101000 | S | | \ RESTORE UNSEL WITH NEW TRACK | \ | 37C | A200 |
| 4102000 | | | MWT | ; | | |
| 4103000 | | | | | | |
| 4104000 | S | | \ ADDRESS TASK | \ | 37D | 8C0A |
| 4105000 | | | SSPAI LOC(TSK1) | ; | | |
| 4106000 | | | | | | |
| 4107000 | S | | \ SKIP IF NO SEEK IMPLIED | \ | 37E | C454 |
| 4108000 | | | TFZ ASPM TAX2 | ; | | |
| 4109000 | | | | | | |
| 4110000 | S | | GTO ($SEEK-IMPL) | ; | 37F | F3B0 |
| 4111000 | | | | | | |
| 4112000 | S | | \ SKIP IF NO SEEK ERROR | \ | 380 | D854 |
| 4113000 | | | TFZ AAD2 TAX2 | ; | | |
| 4114000 | | | | | | |
| 4115000 | S | | GTO ($SEEK-ERR) | ; | 381 | F5A4 |
| 4116000 | | | | | | |
| 4117000 | SKIP HOF | | | ; | | |
| 4118000 | | | SEQUENCE: $SUPCS | | | |
| 4119000 | | \ THIS PORTION OF COMMAND DECODE- | | | | |
| 4120000 | | 1. STORES THE CURRENTLY ACTIVE CHANNEL FOR FUTURE | | | | |
| 4121000 | | USE BY THE WAIT LOOP. | | | | |
| 4122000 | | 2. LOADS THE BUS INTERFACE COUNTERS (MEMORY ADDRESS, | | | | |
| 4123000 | | RANGE, AND OFFSET RANGE) FOR USE DURING THE | | | | |
| 4124000 | | PENDING READ/WRITE OPERATION. | \ | | | |
| 4125000 | | | | | | |
| 4126000 | $CMDEC-E2 | | \ ADDRESS LAST R/W | \ | 382 | 8BE9 |
| 4127000 | | | SSPA LOC(LSTRW) | ; | | |
| 4128000 | | | | | | |
| 4129000 | S | | \ STORE CH # | \ | 383 | AE00 |
| 4130000 | | | MWT AIDX | ; | | |
| 4131000 | | | | | | |
| 4132000 | S | | \ ADDRESS DMA BYTE | \ | 384 | 8C89 |
| 4133000 | | | SSPAI LOC(DMA1) | ; | | |
| 4134000 | | | | | | |
| 4135000 | S | | \SKIP IF WRITE MODE | \ | 385 | C490 |
| 4136000 | | | TFO ASPM TAX0 | ; | | |
| 4137000 | | | | | | |
| 4138000 | S | | GTO ($CMDEC-LDOF) | ; | 386 | F3B8 |
| 4139000 | | | | | | |
| 4140000 | $ZER-OSR | | \ CLEAR OFFSET LOWER | \ | 387 | 6C4F |
| 4141000 | | | ZER ABUS4 SRIA | ; | | |
| 4142000 | | | | | | |
| 4143000 | S | | \ CLEAR OFFSET UPPER | \ | 388 | 6C4F |
| 4144000 | | | ZER ABUS4 SRIA | ; | | |
| 4145000 | | | | | | |
| 4146000 | S | | \ ADDRESS RANGE LOWER | \ | 389 | 8C29 |
| 4147000 | | | SSPAI LOC(RNG2) | ; | | |
| 4148000 | | | | | | |
| 4149000 | S | | GTO ($CMDEC-LD) | ; | 38A | F38C |
| 4150000 | | | | | | |
| 4151000 | $CMDEC-LDOF | | \ ADDRESS OFFSET LOWER | \ | 38B | 8C2B |
| 4152000 | | | SSPAI LOC(OFR2) | ; | | |
| 4153000 | | | | | | |
| 4154000 | $CMDEC-LD | | \ LOAD OFFSET RANGE AND RANGE | \ | 38C | 6D6B |
| 4155000 | | | XFB ABUS4 BSPM SRIA | ; | | |
| 4156000 | | | | | | |
| 4157000 | S | | \ DECREMENT S.P. ADDRESS | \ | 38D | A008 |
| 4158000 | | | DMA | ; | | |
| 4159000 | | | | | | |
| 4160000 | S | | \NO OP FOR TIMING | \ | 38E | 0000 |
| 4161000 | | | NOP | ; | | |
| 4162000 | | | | | | |
| 4163000 | S | | \ SKIP IF OFFSET AND RANGE LOADED | \ | 38F | C85A |
| 4164000 | | | TFZ ASPA TAX5 | ; | | |
| 4165000 | | | | | | |
| 4166000 | S | | GTO ($CMDEC-LD) | ; | 390 | F38C |
| 4167000 | | | | | | |
| 4168000 | SKIP HOF | | | ; | | |
| 4169000 | S | \ ADDRESS LOWER | \ | 391 | 8C21 |
| 4170000 | | SSPAI LOC(ADR2) | ; | | |
| 4171000 | | | | | |
| 4172000 | S | \ LOAD | \ | 392 | 6D6B |
| 4173000 | | XFB ABUS4 BSPM SRIA | ; | | |
| 4174000 | | | | | |
| 4175000 | S | \ DECRCMENT SPA | \ | 393 | A008 |
| 4176000 | | DMA | ; | | |
| 4177000 | | | | | |
| 4178000 | S | \ LOAD ADDRESS MIDDLE | \ | 394 | 6D6B |
| 4179000 | | XFB ABUS4 BSPM SRIA | ; | | |
| 4180000 | | | | | |
| 4181000 | S | \ ADDRESS UPPER | \ | 395 | 8C23 |
| 4182000 | | SSPAI LOC(MOD1) | ; | | |
| 4183000 | | | | | |
| 4184000 | S | \ LOAD | \ | 396 | 6D6B |
| 4185000 | | XFB ABUS4 BSPM SRIA | ; | | |
| 4186000 | | | | | |
| 4187000 | S | \SET SPA FOR MSB OF CHANNEL NUMBER | \ | 397 | 8CA0 |
| 4188000 | | SSPAI LOC(CHN1) | ; | | |
| 4189000 | | | | | |
| 4190000 | S | \LOAD MSB OF CHANNEL NUMBER IN BUS REG | \ | 398 | 656B |
| 4191000 | | XFB ABUS2 BSPM SRIA | ; | | |
| 4192000 | | | | | |
| 4193000 | S | \SET SPA FOR LSB OF CHANNEL NUMBER | \ | 399 | 8CA1 |
| 4194000 | | SSPAI LOC(CHN2) | ; | | |
| 4195000 | | | | | |

MODEL: MPDC-REV3D  
REVISION: 000.00  
RTL/6000 FILE EDIT  
MICROPROGRAM SECTION  
08/01/77  12.605  PAGE: 109  
DOC.#:

| LINE # | | SEQUENCE: $$UPCS -continued | | ADDRESS (HEX) | IMAGE (HEX) |
|---|---|---|---|---|---|
| 4196000 | S | \SAVE ONLY ADDRESS BITS | \ | 39A | 8704 |
| 4197000 | | ACN ASPM CNST (C0#) | ; | | |
| 4198000 | | | | | |
| 4199000 | S | \LOAD LSB OF CHANNEL NUMBER IN BUS REG | \ | 39B | 6868 |
| 4200000 | | XFB ABUS3 BACU SRIA | ; | | |
| 4201000 | | | | | |
| 4202000 | S | \SKIP IF RANGE EQUAL ZERO | \ | 39C | C0A2 |
| 4203000 | | TFO TRGZ | ; | | |
| 4204000 | | | | | |
| 4205000 | S | GTO ($CMDEC-CT) | ; | 39D | F3A0 |
| 4206000 | | | | | |
| 4207000 | S | \SKIP IF OFFSET RANGE NON-ZERO | \ | 39E | C060 |
| 4208000 | | TFZ TORZ | ; | | |
| 4209000 | | | | | |
| 4210000 | S | GTO ($TERM-NOR) | ; | 39F | F59C |
| 4211000 | | | | | |
| 4212000 | SKIP HOF | | ; | | |

MODEL: MPDC-REV3D  
REVISION: 000.00  
RTL/6000 FILE EDIT  
MICROPROGRAM SECTION  
08/01/77  12.605  PAGE: 110  
DOC.#:

| LINE # | | SEQUENCE: $$UPCS | | ADDRESS (HEX) | IMAGE (HEX) |
|---|---|---|---|---|---|
| 4213000 | | | | | |
| 4214000 | $CMDEC-CT | \ ADDRESS TASK | \ | 3A0 | 8C0A |
| 4215000 | | SSPAI LOC(TSK1) | ; | | |
| 4216000 | | | | | |
| 4217000 | S | \ SKIP IF NOT WRAP AROUND | \ | 3A1 | C452 |
| 4218000 | | TFZ ASPM TAX1 | ; | | |
| 4219000 | | | | | |
| 4220000 | S | GTO ($WRAP) | ; | 3A2 | F49F |
| 4221000 | | | | | |
| 4222000 | S | \ SETUP FOR 256 BYTE DATA FIELDS | \ | 3A3 | 8100 |
| 4223000 | | LCN CNST(40#) | ; | | |
| 4224000 | | | | | |
| 4225000 | S | \ SKIP IF DATA FIELDS ARE 256 BYTES | \ | 3A4 | C456 |
| 4226000 | | TFZ ASPM TAX3 | ; | | |
| 4227000 | | | | | |
| 4228000 | S | \ SETUP FOR 576 BYTE DATA FIELDS | \ | 3A5 | 8240 |
| 4229000 | | LCN CNST(90#) | ; | | |
| 4230000 | | | | | |
| 4231000 | S | \ ADDRESS DATA LENGTH (LOC #5) | \ | 3A6 | 8C09 |
| 4232000 | | SSPAI LOC(DATL) | ; | | |
| 4233000 | | | | | |
| 4234000 | S | \ STORE DATA FIELD SIZE + ADDRESS TASK | \ | 3A7 | A300 |
| 4235000 | | WIA | ; | | |
| 4236000 | | | | | |
| 4237000 | S | \ SKIP IF NOT FORMAT | \ | 3A8 | C49E |
| 4238000 | | TFO ASPM TAX7 | ; | | |
| 4239000 | | | | | |
| 4240000 | S | GTO ($FORMAT) | ; | 3A9 | F3FC |
| 4241000 | | | | | |
| 4242000 | S | \ SKIP IF DIAGNOSTIC | \ | 3AA | C49C |
| 4243000 | | TFO ASPM TAX6 | ; | | |
| 4244000 | | | | | |
| 4245000 | S | GTO ($SCH-SET) | ; | 3AB | F420 |
| 4246000 | | | | | |
| 4247000 | S | \ ADDRESS DMA BYTE | \ | 3AC | 8C89 |
| 4248000 | | SSPAI LOC(DMA1) | ; | | |
| 4249000 | | | | | |
| 4250000 | S | \ SKIP IF WRITE | \ | 3AD | C490 |
| 4251000 | | TFO ASPM TAX0 | ; | | |
| 4252000 | | | | | |
| 4253000 | S | GTO ($DIAG-READ) | ; | 3AE | F561 |
| 4254000 | | | | | |
| 4255000 | S | GTO($SCH-SET) | ; | 3AF | F420 |
| 4256000 | | | | | |
| 4257000 | SKIP HOF | | ; | | |

MODEL: MPDC-REV3D  
REVISION: 000.00  
RTL/6000 FILE EDIT  
MICROPROGRAM SECTION  
08/01/77  12.605  PAGE: 111  
DOC.#:

| LINE # | | SEQUENCE: $$UPCS | | ADDRESS (HEX) | IMAGE (HEX) |
|---|---|---|---|---|---|
| 4258000 | | \ THE IMPLIED SEEK IS USED DURING AN EXTENDED SEARCH | | | |
| 4259000 | | AND READ OPERATION, WHEN AUTOMATIC CYLINDER | | | |
| 4260000 | | LINKING IS REQUIRED. | \ | | |
| 4261000 | | | | | |
| 4262000 | | | | | |
| 4263000 | $SEEK-IMPL | \ ADDRESS DMA BYTE | \ | 3B0 | 8C89 |
| 4264000 | | SSPAI LOC(DMA1) | ; | | |
| 4265000 | | | | | |
| 4266000 | S | \ SET SEEK IMPLIED | \ | 3B1 | 8490 |
| 4267000 | | OCN ASPM CNST(20#) | ; | | |
| 4268000 | | | | | |
| 4269000 | S | \ RESTORE DMA BYTE | \ | 3B2 | A200 |
| 4270000 | | MWT | ; | | |
| 4271000 | | | | | |
| 4272000 | | \ THIS PORTION OF THE SEEK/RECALIBRATE ROUTINE SETS THE | | | |
| 4273000 | | SEEK ACTIVE BIT IN THE CHANNEL MONITOR BYTE FOR USE | | | |
| 4274000 | | BY THE WAIT-LOOP, TO DETERMINE WHICH CHANNELS HAVE | | | |
| 4275000 | | POSITIONERS IN MOTION. | \ | | |
| 4276000 | | | | | |
| 4277000 | $SK-RCB | \SET SPA FOR CHANNEL MONITOR | \ | 3B3 | 8C88 |
| 4278000 | | SSPAI LOC (MON1) | ; | | |
| 4279000 | | | | | |
| 4280000 | S | \SET SEEK ACTIVE BIT | \ | 3B4 | 8450 |
| 4281000 | | OCN ASPM CNST (10#) | ; | | |
| 4282000 | | | | | |
| 4283000 | S | \RE-WRITE MONITOR | \ | 3B5 | A200 |
| 4284000 | | MWT | ; | | |
| 4285000 | | | | | |
| 4286000 | S | \SET SPA FOR UNIT SELECT BYTE | \ | 3B6 | 8CEB |
| 4287000 | | SSPAI LOC (UNSEL) | ; | | |
| 4288000 | | | | | |
| 4289000 | S | \CLEAR PLATTER AND MSB OF CYLINDER | \ | 3B7 | 878F |
| 4290000 | | ACN ASPM CNST (E7#) | ; | | |
| 4291000 | | | | | |
| 4292000 | S | \RESTORE | \ | 3B8 | A200 |
| 4293000 | | MWT | ; | | |
| 4294000 | | | | | |
| 4295000 | S | \SET SPA FOR TASK | \ | 3B9 | 8C0A |
| 4296000 | | SSPAI LOC (TSK1) | ; | | |

MODEL: MPDC-REV3D  
REVISION: 000.00

RTL/6000 FILE EDIT  
MICROPROGRAM SECTION

08/01/77  12.605  PAGE: 111  
DOC.#:

| LINE # | | SEQUENCE: SSUPCS | | ADDRESS (HEX) | IMAGE (HEX) |
|---|---|---|---|---|---|
| | | -continued | | | |
| 4297000 | | | | | |
| 4298000 | S | \SKIP IF NOT IMPLIED SEEK | \ | 3BA | C454 |
| 4299000 | | TFZ ASPM TAX2 | ; | | |
| 4300000 | | | | | |
| 4301000 | S | GTO (SSEEK) | ; | 3BB | F3BE |
| 4302000 | | | | | |
| 4303000 | S | \ SKIP IF SEEK | \ | 3BC | C49E |
| 4304000 | | TFO ASPM TAX7 | ; | | |
| 4305000 | | | | | |
| 4306000 | S | GTO (SRECAL) | ; | 3BD | F3F1 |
| 4307000 | | | | | |
| 4308000 | SKIP HOF | | ; | | |

MODEL: MPDC-REV3D  
REVISION: 000.00

RTL/6000 FILE EDIT  
MICROPROGRAM SECTION

08/01/77  12.605  PAGE: 112  
DOC.#:

| LINE # | | SEQUENCE: SSUPCS | | ADDRESS (HEX) | IMAGE (HEX) |
|---|---|---|---|---|---|
| 4309000 | | | | | |
| 4310000 | SSEEK | \SKIP IF NO SEEK ERROR | \ | 3BE | D854 |
| 4311000 | | TFZ TAX2 AAD2 | ; | | |
| 4312000 | | | | | |
| 4313000 | S | GTO (SSEEK-ERR) | ; | 3BF | F5A4 |
| 4314000 | | | | | |
| 4315000 | S | \ADDRESS LSB OF CYLINDER | \ | 3C0 | 8C41 |
| 4316000 | | SSPAI LOC (CNF2) | ; | | |
| 4317000 | | | | | |
| 4318000 | S | \SKIP IF 100 TPI DEVICE | \ | 3C1 | D45C |
| 4319000 | | TFZ TAX6 AAD1 | ; | | |
| 4320000 | | | | | |
| 4321000 | S | GTO (SSEEK-2TPI) | ; | 3C2 | F3CF |
| 4322000 | | | | | |
| 4323000 | S | \LSB OF MAX CYLINDER TO ACU | \ | 3C3 | 832B |
| 4324000 | | LCN CNST (CC#) | ; | | |
| 4325000 | | | | | |
| 4326000 | S | \CURRENT CYLINDER MINUS MAX CYLINDER | \ | 3C4 | 6418 |
| 4327000 | | SUB ASPM BACU | ; | | |
| 4328000 | | | | | |
| 4329000 | S | \SKIP IF NOT AN ILLEGAL CYLINDER | \ | 3C5 | C04A |
| 4330000 | | TFZ TCOT | ; | | |
| 4331000 | | | | | |
| 4332000 | S | GTO (SSEEK-ILL) | ; | 3C6 | F5AB |
| 4333000 | | | | | |
| 4334000 | S | \ADDRESS MSB OF CYLINDER | \ | 3C7 | 8C40 |
| 4335000 | | SSPAI LOC (CNF1) | ; | | |
| 4336000 | | | | | |
| 4337000 | S | \SKIP IF NOT AN ILLEGAL CYLINDER | \ | 3C8 | C45E |
| 4338000 | | TFZ ASPM TAX7 | ; | | |
| 4339000 | | | | | |
| 4340000 | S | GTO (SSEEK-ILL) | ; | 3C9 | F5AB |
| 4341000 | | | | | |
| 4342000 | S | \ SAVE VOLUME BIT | \ | 3CA | 8424 |
| 4343000 | | ACN ASPM CNST (08#) | ; | | |
| 4344000 | | | | | |
| 4345000 | S | \ ADDRESS CONF A LOWER | \ | 3CB | 8C41 |
| 4346000 | | SSPAI LOC(CNF2) | ; | | |
| 4347000 | | | | | |
| 4348000 | S | \ SKIP IF MSB CYL BIT = 0 | \ | 3CC | C450 |
| 4349000 | | TFZ ASPM TAX0 | ; | | |
| 4350000 | | | | | |
| 4351000 | S | \ SET MSB OF CYLINDER | \ | 3CD | 8050 |
| 4352000 | | OCN CNST (10#) | ; | | |
| 4353000 | | | | | |
| 4354000 | S | GTO (SSEEK150) | ; | 3CE | F3DD |
| 4355000 | | | | | |
| 4356000 | SKIP HOF | | ; | | |

MODEL: MPDC-REV3D  
REVISION: 000.00

RTL/6000 FILE EDIT  
MICROPROGRAM SECTION

08/01/77  12.605  PAGE: 113  
DOC.#:

| LINE # | | SEQUENCE: SSUPCS | | ADDRESS (HEX) | IMAGE (HEX) |
|---|---|---|---|---|---|
| 4357000 | SSEEK-2TPI | \LSB OF MAX CYLINDER TO ACU | \ | 3CF | 8260 |
| 4358000 | | LCN CNST (98#) | ; | | |
| 4359000 | | | | | |
| 4360000 | S | \CURRENT CYLINDER MINUS MAX CYLINDER | \ | 3D0 | 6418 |
| 4361000 | | SUB ASPM BACU | ; | | |
| 4362000 | | | | | |
| 4363000 | S | \ADDRESS MSB OF CYLINDER | \ | 3D1 | 8C40 |
| 4364000 | | SSPAI LOC (CNF1) | ; | | |
| 4365000 | | | | | |
| 4366000 | S | \SAVE ONLY CYLINDER BIT | \ | 3D2 | 8405 |
| 4367000 | | ACN ASPM CNST (01#) | ; | | |
| 4368000 | | | | | |
| 4369000 | S | \ADDRESS WORK LOCATION OF SPM | \ | 3D3 | 8CAA |
| 4370000 | | SSPAI LOC (WL01) | ; | | |
| 4371000 | | | | | |
| 4372000 | S | \STORE CYLINDER BIT | \ | 3D4 | A200 |
| 4373000 | | MWT | ; | | |
| 4374000 | | | | | |
| 4375000 | S | \MSB OF MAX CYLINDER TO ACU | \ | 3D5 | 8001 |
| 4376000 | | LCN CNST (01#) | ; | | |
| 4377000 | | | | | |
| 4378000 | S | \CURRENT CYLINDER MINUS MAX CYLINDER MSB | \ | 3D6 | 6498 |
| 4379000 | | SUB ASPM BACU COTI | ; | | |
| 4380000 | | | | | |
| 4381000 | S | \SKIP IF VALID CYLINDER | \ | 3D7 | C04A |
| 4382000 | | TFZ TCOT | ; | | |
| 4383000 | | | | | |
| 4384000 | S | GTO (SSEEK-ILL) | ; | 3D8 | F5AB |
| 4385000 | | | | | |
| 4386000 | S | \ADDRESS CONF A UPPER | \ | 3D9 | 8C40 |
| 4387000 | | SSPAI LOC (CNF1) | ; | | |
| 4388000 | | | | | |
| 4389000 | S | \SAVE VOLUME AND CYLINDER BITS | \ | 3DA | 8424 |
| 4390000 | | ACN ASPM CNST (08#) | ; | | |
| 4391000 | | | | | |
| 4392000 | S | \SKIP IF MSB OF CYLINDER IS ZERO | \ | 3DB | C45E |
| 4393000 | | TFZ TAX7 ASPM | ; | | |
| 4394000 | | | | | |
| 4395000 | S | \SET MSB OF CYLINDER | \ | 3DC | 8050 |
| 4396000 | | OCN CNST (10#) | ; | | |
| 4397000 | | | | | |
| 4398000 | SKIP HOF | | ; | | |

```
MODEL: MPDC-REV3D                           RTL/6000 FILE EDIT                      08/01/77    12.605  PAGE: 114
REVISION: 000.00                            MICROPROGRAM SECTION                    DOC.#:
                                                                         ADDRESS  IMAGE
LINE #                                 SEQUENCE: $$UPCS                  (HEX)    (HEX)
4399000  $SEEK150    \ ADDRESS UNIT SELECT                       \         3DD    8CEB
4400000              SSPAI LOC(UNSEL)                            ;
4401000
4402000  $          \ SUPERIMPOSE SELECTION BITS                 \         3DE    643A
4403000              ORR ASPM                                    ;
4404000
4405000  $          \RESTORE                                     \         3DF    A200
4406000              MWT                                         ;
4407000
4408000  $          \ SEND TO ADAPTER                            \         3E0    7C6A
4409000              XFB AAD3 SRIA                               ;
4410000
4411000  $          \ ADDRESS CONF A LOWER                       \         3E1    8C41
4412000              SSPAI LOC(CNF2)                             ;
4413000
4414000  $          \ STORE CYL IN ACU                           \         3E2    643E
4415000              XFA ASPM                                    ;
4416000
4417000  $          \ SKIP IF 200 TPI                            \         3E3    D49C
4418000              TFO AAD1 TAX6                               ;
4419000
4420000  $          \ SHIFT CYL # LEFT FOR 100 TPI               \         3E4    6030
4421000              L5H                                         ;
4422000
4423000  $          \ SEND TO ADAPTER                            \         3E5    746A
4424000              XFB AAD1 SRIA                               ;
4425000
4426000  $           GTO ($STROBE)                               ;         3E6    F3F5
4427000
4428000 SKIP HOF                                                 ;

MODEL: MPDC-REV3D                           RTL/6000 FILE EDIT                      08/01/77    12.605  PAGE: 115
REVISION: 000.00                            MICROPROGRAM SECTION                    DOC.#:
                                                                         ADDRESS  IMAGE
LINE #                                 SEQUENCE: $$UPCS                  (HEX)    (HEX)
4429000             \ THIS PORTION OF THE RECALIBRATE ROUTINE IS USED FOR
4430000               ZEROING THE CONFIGURATION WORDS IN ORDER TO SELECT
4431000               PLATTER ZERO. TRACK ZERO AFTER THE RECALIBRATE.     \
4432000
4433000  $RECALPLSEL \RESET RECALIBRATE BIT                      \         3E7    87E7
4434000              ACN ASPM CNST (FB#)                         ;
4435000
4436000  $          \RESTORE MONITOR                             \         3E8    A200
4437000              MWT                                         ;
4438000
4439000  $          \CLEAR ACU                                   \         3E9    600E
4440000              ZER                                         ;
4441000
4442000  $          \SET SPA FOR MSB OF CONFIGURATION WORDS      \         3EA    8C40
4443000              SSPAI LOC (CNF1)                            ;
4444000
4445000  $          \CLEAR FOUR BYTES OF CONFIGURATION           \         3EB    A300
4446000              WIA                                         ;
4447000
4448000  $           WIA                                         ;         3EC    A300
4449000
4450000  $           WIA                                         ;         3ED    A300
4451000
4452000  $           MWT                                         ;         3EE    A200
4453000
4454000  $          \SET RETURN FOR WAIT LOOP                    \         3EF    E21D
4455000              LRA ($START-WAIT)                           ;
4456000
4457000  $           GTO ($SEEK)                                 ;         3F0    F3BE
4458000
4459000 SKIP HOF

MODEL: MPDC-REV3D                           RTL/6000 FILE EDIT                      08/01/77    12.605  PAGE: 116
REVISION: 000.00                            MICROPROGRAM SECTION                    DOC.#:
                                                                         ADDRESS  IMAGE
LINE #                                 SEQUENCE: $$UPCS                  (HEX)    (HEX)
4460000  $RECAL      \ SET RECALIBRATE IN ADAPTER                \         3F1    988D
4461000              LCN AAD2 CNST (20#)                         ;
4462000
4463000  $          \SET SPA FOR CHANNEL MONITOR                 \         3F2    8C88
4464000              SSPAI LOC (MON1)                            ;
4465000
4466000  $          \SET RECALIBRATE BIT                         \         3F3    8418
4467000              OCN ASPM CNST (04#)                         ;
4468000
4469000  $          \RESTORE MONITOR                             \         3F4    A200
4470000              MWT                                         ;
4471000
4472000  $STROBE    \ SET SEEK STROBE                            \         3F5    786B
4473000              XFB AAD6 SRIA                               ;
4474000
4475000  $          \ ADDRESS DEVICE STATUS                      \         3F6    8CEA
4476000              SSPAI LOC(DEVST)                            ;
4477000
4478000  $          \ RESET SEEK COMPLETE BIT                    \         3F7    86EF
4479000              ACN ASPM CNST (BF#)                         ;
4480000
4481000  $          \ RESTORE                                    \         3F8    A200
4482000              MWT                                         ;
4483000
4484000  $          \ RESET SEEK STROBE                          \         3F9    786B
4485000              XFB AAD6 SRIA                               ;
4486000
4487000  $          \ RESET ADAPTER COMMAND                      \         3FA    9800
4488000              LCN AAD2                                    ;
4489000
4490000  $           RTN                                         ;         3FB    C200
4491000
4492000 SKIP HOF

MODEL: MPDC-REV3D                           RTL/6000 FILE EDIT                      08/01/77    12.605  PAGE: 117
REVISION: 000.00                            MICROPROGRAM SECTION                    DOC.#:
                                                                         ADDRESS  IMAGE
LINE #                                 SEQUENCE: $$UPCS                  (HEX)    (HEX)
4493000
4494000  $FORMAT    \ ADDRESS DMA BYTE                           \         3FC    8C89
4495000              SSPAI LOC(DMA1)                             ;
```

MODEL: MPDC-REV30  
REVISION: 000.00

RTL/6000 FILE EDIT  
MICROPROGRAM SECTION

08/01/77  12.605  PAGE: 117  
DOC.#:

| LINE # | | | SEQUENCE: SSUPCS | | ADDRESS (HEX) | IMAGE (HEX) |
|---|---|---|---|---|---|---|
| 4496000 | | | -continued | | | |
| 4497000 | S | | \ SKIP IF FORMAT WRITE | \ | 3FD | C490 |
| 4498000 | | | TFO ASPM TAX0 | ; | | |
| 4499000 | | | | | | |
| 4500000 | S | | GTO (SFMT-READ) | ; | 3FE | F4E7 |
| 4501000 | | | | | | |
| 4502000 | SFWT-IDT | | \ SET FORMAT WRITE WITH DATA TRANSFER | \ | 3FF | 8309 |
| 4503000 | | | LCN CNST (C5#) | ; | | |
| 4504000 | | | | | | |
| 4505000 | S | | \ ADDRESS TASK | \ | 400 | 8C0A |
| 4506000 | | | SSPAI LOC(TSK1) | ; | | |
| 4507000 | | | | | | |
| 4508000 | S | | \ SKIP IF NOT DIAGNOSTIC MODE | \ | 401 | C45C |
| 4509000 | | | TFZ ASPM TAX6 | ; | | |
| 4510000 | | | | | | |
| 4511000 | S | | \ SET DIAGNOSTIC MODE | \ | 402 | 8050 |
| 4512000 | | | OCN CNST(10#) | ; | | |
| 4513000 | | | | | | |
| 4514000 | S | | \ SEND COMMAND TO ADAPTER | \ | 403 | 786A |
| 4515000 | | | XFB AAD2 SRIA | ; | | |
| 4516000 | | | | | | |
| 4517000 | S | | \ CLEAR STATUS AND FIFO IN ADP | \ | 404 | 746B |
| 4518000 | | | XFB AAD5 SRIA | ; | | |
| 4519000 | | | | | | |
| 4520000 | S | | \ LOAD AMK UPPER | \ | 405 | 93E2 |
| 4521000 | | | LCN AAD0 CNST (FA#) | ; | | |
| 4522000 | | | | | | |
| 4523000 | S | | \ LOAD AMK LOWER | \ | 406 | 92A2 |
| 4524000 | | | LCN AAD0 CNST (AA#) | ; | | |
| 4525000 | | | | | | |
| 4526000 | S | | \ LOAD DATA COUNT | \ | 407 | 9401 |
| 4527000 | | | LCN AAD1 CNST (01#) | ; | | |
| 4528000 | | | | | | |
| 4529000 | S | | \ LOAD RETURN | \ | 408 | E411 |
| 4530000 | | | LRA (SFWT-DAT) | ; | | |
| 4531000 | | | | | | |
| 4532000 | SKIP HOF | | | ; | | |

MODEL: MPDC-REV30  
REVISION: 000.00

RTL/6000 FILE EDIT  
MICROPROGRAM SECTION

08/01/77  12.605  PAGE: 118  
DOC.#:

| LINE # | | | SEQUENCE: SSUPCS | | ADDRESS (HEX) | IMAGE (HEX) |
|---|---|---|---|---|---|---|
| 4533000 | | | | | | |
| 4534000 | SWRT-MODE | | \SET RETURN FROM DATA LOOP | \ | 409 | E525 |
| 4535000 | | | LRA (SWRT-EOF) | ; | | |
| 4536000 | | | | | | |
| 4537000 | S | | \SET BYTE WRITE MODE | \ | 40A | 81A2 |
| 4538000 | | | LCN CNST (6A#) | ; | | |
| 4539000 | | | | | | |
| 4540000 | S | | \SKIP IF BYTE MODE | \ | 40B | C0B8 |
| 4541000 | | | TFO TBYT | ; | | |
| 4542000 | | | | | | |
| 4543000 | SWRT-RET | | \SET WRITE MODE ONLY | \ | 40C | 8182 |
| 4544000 | | | LCN CNST (62#) | ; | | |
| 4545000 | | | | | | |
| 4546000 | S | | \SKIP IF ADAPTER HARDWARE REQUEST | \ | 40D | C080 |
| 4547000 | | | TFO TAHR | ; | | |
| 4548000 | | | | | | |
| 4549000 | S | | \ERROR OR END OF FIELD | \ | 40E | C200 |
| 4550000 | | | RTN | ; | | |
| 4551000 | | | | | | |
| 4552000 | S | | \ENABLE WRITE HARDWARE PATH | \ | 40F | 0601 |
| 4553000 | | | EWP | ; | | |
| 4554000 | | | | | | |
| 4555000 | S | | GTO (SDATA-LOOP) | ; | 410 | F504 |
| 4556000 | | | | | | |
| 4557000 | SKIP HOF | | | ; | | |

MODEL: MPDC-REV30  
REVISION: 000.00

RTL/6000 FILE EDIT  
MICROPROGRAM SECTION

08/01/77  12.605  PAGE: 119  
DOC.#:

| LINE # | | | SEQUENCE: SSUPCS | | ADDRESS (HEX) | IMAGE (HEX) |
|---|---|---|---|---|---|---|
| 4558000 | | | | | | |
| 4559000 | SFWT-DAT | | \ DMK UPPER TO ADP | \ | 411 | 93E9 |
| 4560000 | | | LCN AAD0 CNST (FD#) | ; | | |
| 4561000 | | | | | | |
| 4562000 | S | | \ DMK LOWER TO ADP | \ | 412 | 9369 |
| 4563000 | | | LCN AAD0 CNST (DD#) | ; | | |
| 4564000 | | | | | | |
| 4565000 | S | | \ ADDRESS DATA LENGTH | \ | 413 | 8C09 |
| 4566000 | | | SSPAI LOC(DATL) | ; | | |
| 4567000 | | | | | | |
| 4568000 | S | | \ DATA COUNT TO ADAPTER | \ | 414 | 756A |
| 4569000 | | | XFB AAD1 BSPM SRIA | ; | | |
| 4570000 | | | | | | |
| 4571000 | S | | \ SET FORMAT WRITE WITH NO DATA XFER | \ | 415 | 9A09 |
| 4572000 | | | LCN AAD2 CNST (85#) | ; | | |
| 4573000 | | | | | | |
| 4574000 | S | | \ LOAD RETURN FROM WAIT-LOOP | \ | 416 | E418 |
| 4575000 | | | LRA (SFWT-RET) | ; | | |
| 4576000 | | | | | | |
| 4577000 | S | | GTO (SSTART-WAIT) | ; | 417 | F21D |
| 4578000 | | | | | | |
| 4579000 | SFWT-RET | | \ SKIP IF NOT EOR | \ | 418 | C062 |
| 4580000 | | | TFZ TRGZ | ; | | |
| 4581000 | | | | | | |
| 4582000 | S | | GTO (SEND-GAP) | ; | 419 | F41D |
| 4583000 | | | | | | |
| 4584000 | S | | \ SKIP IF END OF FIELD | \ | 41A | C06A |
| 4585000 | | | TFZ TNDR | ; | | |
| 4586000 | | | | | | |
| 4587000 | S | | GTO (STERM-STS) | ; | 41B | F57D |
| 4588000 | | | | | | |
| 4589000 | S | | GTO (SFWT-IDT) | ; | 41C | F3FF |
| 4590000 | | | | | | |
| 4591000 | SEND-GAP | | \ SKIP IF NDTSRQ | \ | 41D | C0AA |
| 4592000 | | | TFO TNDR | ; | | |
| 4593000 | | | | | | |
| 4594000 | S | | GTO (SEND-GAP) | ; | 41E | F41D |
| 4595000 | | | | | | |
| 4596000 | S | | GTO (STERM-NDR) | ; | 41F | F59C |
| 4597000 | | | | | | |
| 4598000 | SKIP HOF | | | ; | | |

| MODEL: MPDC-REV3D | | RTL/6000 FILE EDIT | | 08/01/77 | |
|---|---|---|---|---|---|
| REVISION: 000.00 | | MICROPROGRAM SECTION | | DOC.#: | 12.605 |
| LINE # | | SEQUENCE: $$UPCS | | ADDRESS (HEX) | IMAGE (HEX) |
| 4599000 | | | | | |
| 4600000 | | \ THIS IS THE ENTRY POINT FOR LOADING THE ADDRESS MARK | | | |
| 4601000 | | AND SEARCH ARGUMENT DURING A SEARCH AND READ OR A | | | |
| 4602000 | | SEARCH AND WRITE OPERATION. | \ | | |
| 4603000 | | | | | |
| 4604000 | $SCH-SET | \ CLEAR STATUS + FIFO IN ADP | \ | 420 | 746B |
| 4605000 | | XFB AAD5 SRIA | ; | | |
| 4606000 | | | | | |
| 4607000 | $ | \ LOAD AMK UPPER | \ | 421 | 93E2 |
| 4608000 | | LCN AAD0 CNST(FA#) | ; | | |
| 4609000 | | | | | |
| 4610000 | $ | \ LOAD AMK LOWER | \ | 422 | 92A2 |
| 4611000 | | LCN AAD0 CNST(AA#) | ; | | |
| 4612000 | | | | | |
| 4613000 | $ | \ ADDRESS CONF A UPPER | \ | 423 | 8C40 |
| 4614000 | | SSPAI LOC(CNF1) | ; | | |
| 4615000 | | | | | |
| 4616000 | $SCH-ARG | \SEND FIRST BYTE OF SEARCH ARG | \ | 424 | 716A |
| 4617000 | | XFB AAD0 BSPM SRIA | ; | | |
| 4618000 | | | | | |
| 4619000 | $ | \ INCREMENT SPA | \ | 425 | A100 |
| 4620000 | | IMA | ; | | |
| 4621000 | | | | | |
| 4622000 | $ | \SEND SECOND BYTE OF SEARCH ARG | \ | 426 | 716A |
| 4623000 | | XFB AAD0 BSPM SRIA | ; | | |
| 4624000 | | | | | |
| 4625000 | $ | \INCREMENT SPA | \ | 427 | A100 |
| 4626000 | | IMA | ; | | |
| 4627000 | | | | | |
| 4628000 | $ | \SEND THIRD BYTE OF SEARCH ARG | \ | 428 | 716A |
| 4629000 | | XFB AAD0 BSPM SRIA | ; | | |
| 4630000 | | | | | |
| 4631000 | $ | \INCREMENT SPA | \ | 429 | A100 |
| 4632000 | | IMA | ; | | |
| 4633000 | | | | | |
| 4634000 | $ | \SEND FOURTH BYTE OF SEARCH ARG | \ | 42A | 716A |
| 4635000 | | XFB AAD0 BSPM SRIA | ; | | |
| 4636000 | | | | | |
| 4637000 | $ | \ LOAD DATA COUNTER | \ | 42B | 9401 |
| 4638000 | | LCN AAD1 CNST(01#) | ; | | |
| 4639000 | | | | | |
| 4640000 | $ | \ STORE SEARCH + WRITE CONSTANT | \ | 42C | 822B |
| 4641000 | | LCN CNST(8C#) | ; | | |
| 4642000 | | | | | |
| 4643000 | SKIP HOF | | ; | | |

| MODEL: MPDC-REV3D | | RTL/6000 FILE EDIT | | 08/01/77 | |
|---|---|---|---|---|---|
| REVISION: 000.00 | | MICROPROGRAM SECTION | | DOC.#: | 12.605 |
| LINE # | | SEQUENCE: $$UPCS | | ADDRESS (HEX) | IMAGE (HEX) |
| 4644000 | $ | \ ADDRESS DMA CONTROL | \ | 42D | 8C89 |
| 4645000 | | SSPAI LOC(DMA1) | ; | | |
| 4646000 | | | | | |
| 4647000 | $ | \ SKIP IF WRITE | \ | 42E | C490 |
| 4648000 | | TFO ASPM TAX0 | ; | | |
| 4649000 | | | | | |
| 4650000 | $ | \ STORE SEARCH + READ COMMAND | \ | 42F | 8222 |
| 4651000 | | LCN CNST(8A#) | ; | | |
| 4652000 | | | | | |
| 4653000 | $ | \ SEND COMMAND TO ADAPTER | \ | 430 | 786A |
| 4654000 | | XFB AAD2 SRIA | ; | | |
| 4655000 | | | | | |
| 4656000 | $ | \ LOAD RETURN | \ | 431 | E433 |
| 4657000 | | LRA ($SCH-RET) | ; | | |
| 4658000 | | | | | |
| 4659000 | $ | GTO ($START-WAIT) | ; | 432 | F210 |
| 4660000 | | | | | |
| 4661000 | SKIP HOF | | ; | | |

| MODEL: MPDC-REV3D | | RTL/6000 FILE EDIT | | 08/01/77 | |
|---|---|---|---|---|---|
| REVISION: 000.00 | | MICROPROGRAM SECTION | | DOC.#: | 12.605 |
| LINE # | | SEQUENCE: $$UPCS | | ADDRESS (HEX) | IMAGE (HEX) |
| 4662000 | | \ THIS IS THE RETURN POINT FROM THE WAIT-LOOP AFTER THE | | | |
| 4663000 | | ADAPTER HAS SIGNALED FIRMWARE THAT A SEARCH OF AN ID | | | |
| 4664000 | | FIELD HAS BEEN COMPLETED. | \ | | |
| 4665000 | | | | | |
| 4666000 | $SCH-RET | \SKIP IF ADDRESS MARK ERROR | \ | 433 | DC9C |
| 4667000 | | TFO TAX6 AAD3 | ; | | |
| 4668000 | | | | | |
| 4669000 | $ | GTO ($SCH-RET1) | ; | 434 | F43A |
| 4670000 | | | | | |
| 4671000 | $ | \SKIP IF SECOND INDEX DETECTED | \ | 435 | DC9E |
| 4672000 | | TFO TAX7 AAD3 | ; | | |
| 4673000 | | | | | |
| 4674000 | $ | GTO ($SCH-SET) | ; | 436 | F420 |
| 4675000 | | | | | |
| 4676000 | $ | \ADDRESS STS1 | \ | 437 | 8C60 |
| 4677000 | | SSPAI LOC (STS1) | ; | | |
| 4678000 | | | | | |
| 4679000 | $ | \SET UNSUCESSFUL SEARCH | \ | 438 | 8611 |
| 4680000 | | OCN ASPM CNST (81#) | ; | | |
| 4681000 | | | | | |
| 4682000 | $ | GTO (STERM-CL1) | ; | 439 | F58E |
| 4683000 | | | | | |
| 4684000 | $SCH-RET1 | \ SKIP IF EOF+ID | \ | 43A | C06A |
| 4685000 | | TFZ TNDR | ; | | |
| 4686000 | | | | | |
| 4687000 | $ | GTO (STERM-STS) | ; | 43B | F57D |
| 4688000 | | | | | |
| 4689000 | $ | \GET STATUS (SEARCH COMPARISON RESULT) | \ | 43C | 7C3E |
| 4690000 | | XFA AAD3 | ; | | |
| 4691000 | | | | | |
| 4692000 | $ | \SKIP IF NO ERROR (HIT ON SEARCH) | \ | 43D | C086 |
| 4693000 | | TFO TEDZ | ; | | |
| 4694000 | | | | | |
| 4695000 | $ | GTO ($SCH-ERR) | ; | 43E | F44E |
| 4696000 | | | | | |
| 4697000 | $ | \RESET INDEX MARK COUNTER | \ | 43F | 704F |
| 4698000 | | ZER AAD4 SRIA | ; | | |
| 4699000 | | | | | |
| 4700000 | $ | \ ADDRESS DMA CONTROL | \ | 440 | 8C89 |
| 4701000 | | SSPAI LOC(DMA1) | ; | | |
| 4702000 | | | | | |

```
MODEL: MPDC-REV3D                           RTL/6000 FILE EDIT                        08/01/77    12.605  PAGE: 122
REVISION: 000.00                           MICROPROGRAM SECTION                        DOC.#:
                                                                                ADDRESS    IMAGE
LINE #                                  SEQUENCE: SSUPCS                         (HEX)    (HEX)
                                            -continued
4703000  s          \ SKIP IF WRITE                              \
4704000             TFO ASPM TAX0                                ;                441     C490
4705000
4706000  s          GTO (SREAD-DATA)                             ;                442     F543
4707000
4708000  SKIP HOF                                                ;

MODEL: MPDC-REV3D                           RTL/6000 FILE EDIT                        08/01/77    12.605  PAGE: 123
REVISION: 000.00                           MICROPROGRAM SECTION                        DOC.#:
                                                                                ADDRESS    IMAGE
LINE #                                  SEQUENCE: SSUPCS                         (HEX)    (HEX)
4709000  s          \ LOAD DMK UPPER                             \
4710000             LCN AAD0 CNST(FD#)                           ;                443     93E9
4711000
4712000  s          \ LOAD DMK LOWER                             \
4713000             LCN AAD0 CNST(DD#)                           ;                444     9369
4714000
4715000  s          \ ADDRESS DATA LENGTH                        \
4716000             SSPAI LOC(DATL)                              ;                445     8C09
4717000
4718000  s          \ SEND DATA LENGTH TO ADAPTER                \
4719000             XFB AAD1 BSPM SRIA                           ;                446     756A
4720000
4721000  s          \ ADDRESS TASK                               \
4722000             SSPAI LOC(TSK1)                              ;                447     8C0A
4723000
4724000  s          \ SET WRITE                                  \
4725000             LCN CNST(C4#)                                ;                448     8308
4726000
4727000  s          \ SKIP IF NOT DIAGNOSTIC                     \
4728000             TFZ ASPM TAX6                                ;                449     C45C
4729000
4730000  s          \ SET DIAGNOSTIC                             \
4731000             OCN CNST(D4#)                                ;                44A     8358
4732000
4733000  s          \ SEND WRITE CMD TO ADP                      \
4734000             XFB AAD2 SRIA                                ;                44B     786A
4735000
4736000  s          \ LOAD RETURN FROM DMA-CHK                   \
4737000             LRA (SSCH-UPD)                               ;                44C     E453
4738000
4739000  s          GTO (SWRT-MODE)                              ;                44D     F409
4740000
4741000  SSCH-ERR   \ SAVE READ ERROR                            \
4742000             ACN CNST(08#)                                ;                44E     8024
4743000
4744000  s          \ ADDRESS STATUS UPPER                       \
4745000             SSPAI LOC(STS1)                              ;                44F     8C60
4746000
4747000  s          \ SAVE PREVIOUSLY READ ERROR BIT             \
4748000             ORR ASPM                                     ;                450     643A
4749000
4750000  s          \ RESTORE STS1                               \
4751000             MWT                                          ;                451     A200
4752000
4753000  s          GTO (SSCH-SET)                               ;                452     F420
4754000
4755000  SKIP HOF

MODEL: MPDC-REV3D                           RTL/6000 FILE EDIT                        08/01/77    12.605  PAGE: 124
REVISION: 000.00                           MICROPROGRAM SECTION                        DOC.#:
                                                                                ADDRESS    IMAGE
LINE #                                  SEQUENCE: SSUPCS                         (HEX)    (HEX)
4756000
4757000  \ THIS PORTION OF FIRMWARE IS USED FOR THE FOLLOWING-
4758000        1. INCREMENTING THE SECTOR NUMBER.
4759000        2. CHECKING IF AUTOMATIC TRACK OR CYLINDER
4760000           LINKING IS REQUIRED.                           \
4761000
4762000  SSCH-UPD   \ ADDRESS SECTOR NUMBER                      \
4763000             SSPAI LOC(CNF4)                              ;                453     8C43
4764000
4765000  s          \ INCREMENT SECTOR                           \
4766000             INC ASPM                                     ;                454     6400
4767000
4768000  s          \ RESTORE NEW SECTOR                         \
4769000             MWT                                          ;                455     A200
4770000
4771000  s          \SET SPA FOR DATA LENGTH                     \
4772000             SSPAI LOC (DATL)                             ;                456     8C09
4773000
4774000  s          \SET CONSTANT FOR 24 SECTORS                 \
4775000             LCN CNST (18#)                               ;                457     8060
4776000
4777000  s          \SKIP IF DATA LENGTH = 256                   \
4778000             TFZ TAX3 ASPM                                ;                458     C456
4779000
4780000  s          \SET CONSTANT FOR 12 SECTORS                 \
4781000             LCN CNST (0C#)                               ;                459     8028
4782000
4783000  s          \SET SPA FOR SECTOR NUMBER                   \
4784000             SSPAI LOC (CNF4)                             ;                45A     8C43
4785000
4786000  s          \CHECK IF LINKING REQUIRED                   \
4787000             XOR ASPM BACU                                ;                45B     641A
4788000
4789000  s          \SKIP IF NO LINKING REQUIRED                 \
4790000             TFZ TEQZ                                     ;                45C     C046
4791000
4792000  s          GTO (SMAX-SECTOR)                            ;                45D     F482
4793000
4794000  SSCH-LRA   \SET RETURN FOR LOADING SEARCH ARGUMENT      \
4795000             LRA (SSCH-SET)                               ;                45E     E420
4796000
4797000  SSCH-TRGZ  \ SKIP IF RANGE NOT ZERO                     \
4798000             TFZ TRGZ                                     ;                45F     C062
4799000
4800000  s          GTO (STERM-NOR)                              ;                460     F59C
4801000
4802000  SKIP HOF                                                ;
```

MODEL: MPDC-REV3D  
REVISION: 000.00  
RTL/6000 FILE EDIT  
MICROPROGRAM SECTION  
08/01/77  12.605  PAGE: 125  
DOC.#:

| LINE # | | | SEQUENCE: SSUPCS | | ADDRESS (HEX) | IMAGE (HEX) |
|---|---|---|---|---|---|---|
| 4803000 | | \ THIS PART OF FIRMWARE IS USED FOR UPDATING SCRATCH PAD | | | | |
| 4804000 | | AFTER THE SUCESSFULL READING OR WRITTING OF A DATA FIELD. | | | | |
| 4805000 | | DURING WRITE OPERATIONS A FIRMWARE UPDATE TAKES PLACE | | | | |
| 4806000 | | SINCE THE HARDWARE WILL BE 16 WORDS INTO THE NEXT FIELD | | | | |
| 4807000 | | (EXTENDED OPERATION). | | | | |
| 4808000 | | DURING A READ OPERATION, THE BUS INTERFACE COUNTERS ARE | | | | |
| 4809000 | | STORED SINCE THEY ARE EXACT. | \ | | | |
| 4810000 | | | | | | |
| 4811000 | $DEC-RNG | \SET SPA FOR DMA BYTE | \ | | 461 | 8C89 |
| 4812000 | | SSPAI LOC (DMA1) | ; | | | |
| 4813000 | | | | | | |
| 4814000 | $ | \SKIP IF WRITE OPERATION | \ | | 462 | C490 |
| 4815000 | | TFO TAX0 ASPM | ; | | | |
| 4816000 | | | | | | |
| 4817000 | $ | \GO TO STORE BUS INTERFACE COUNTERS | \ | | 463 | F538 |
| 4818000 | | GTO ($STORE-CTRS) | ; | | | |
| 4819000 | | | | | | |
| 4820000 | $ | \ ADDRESS DATA LENGTH | \ | | 464 | 8C09 |
| 4821000 | | SSPAI LOC(DATL) | ; | | | |
| 4822000 | | | | | | |
| 4823000 | $ | \ SKIP IF DATA LENGTH = 256 | \ | | 465 | C450 |
| 4824000 | | TFZ ASPM TAX0 | ; | | | |
| 4825000 | | | | | | |
| 4826000 | $ | GTO ($DATL-576) | ; | | 466 | F473 |
| 4827000 | | | | | | |
| 4828000 | $ | \ LOAD CONSTANT FOR 256 | \ | | 467 | 8001 |
| 4829000 | | LCN CNST(01#) | ; | | | |
| 4830000 | | | | | | |
| 4831000 | $ | \ ADDRESS RANGE UPPER | \ | | 468 | 8C28 |
| 4832000 | | SSPAI LOC(RNG1) | ; | | | |
| 4833000 | | | | | | |
| 4834000 | $ | \ SUBTRACT 256 BYTES FROM COUNT | \ | | 469 | 6418 |
| 4835000 | | SUB ASPM | ; | | | |
| 4836000 | | | | | | |
| 4837000 | $ | \ RESTORE RANGE UPPER | \ | | 46A | A200 |
| 4838000 | | MWT | ; | | | |
| 4839000 | | | | | | |
| 4840000 | $ | \ LOAD CONSTANT FOR 256 | \ | | 46B | 8001 |
| 4841000 | | LCN CNST(01#) | ; | | | |
| 4842000 | | | | | | |
| 4843000 | $ | \ ADDRESS MEMORY ADDRESS MIDDLE | \ | | 46C | 8C20 |
| 4844000 | | SSPAI LOC(ADR1) | ; | | | |
| 4845000 | | | | | | |
| 4846000 | $ | \ ADD 256 TO MEMORY ADDRESS | \ | | 46D | 6424 |
| 4847000 | | ADD ASPM | ; | | | |
| 4848000 | | | | | | |
| 4849000 | $ | \ RESTORE ADR1 | \ | | 46E | A200 |
| 4850000 | | MWT | ; | | | |
| 4851000 | | | | | | |
| 4852000 | SKIP HOF | | | | | |

MODEL: MPDC-REV3D  
REVISION: 000.00  
RTL/6000 FILE EDIT  
MICROPROGRAM SECTION  
08/01/77  12.605  PAGE: 126  
DOC.#:

| LINE # | | | SEQUENCE: SSUPCS | | ADDRESS (HEX) | IMAGE (HEX) |
|---|---|---|---|---|---|---|
| 4853000 | $INC-MOD | \ ADDRESS MODULE | \ | | 46F | 8C23 |
| 4854000 | | SSPAI LOC(MOD1) | ; | | | |
| 4855000 | | | | | | |
| 4856000 | $ | \ UPDATE MODULE | \ | | 470 | 6480 |
| 4857000 | | INC ASPM COTI | ; | | | |
| 4858000 | | | | | | |
| 4859000 | $ | \ RESTORE MOD1 | \ | | 471 | A200 |
| 4860000 | | MWT | ; | | | |
| 4861000 | | | | | | |
| 4862000 | $ | RTN | ; | | 472 | C200 |
| 4863000 | | | | | | |
| 4864000 | $DATL-576 | \ LOAD CONSTANT FOR 64 | \ | | 473 | 8100 |
| 4865000 | | LCN CNST(40#) | ; | | | |
| 4866000 | | | | | | |
| 4867000 | $ | \ ADDRESS RANGE LOWER | \ | | 474 | 8C29 |
| 4868000 | | SSPAI LOC(RNG2) | ; | | | |
| 4869000 | | | | | | |
| 4870000 | $ | \ SUBTRACT 64 FROM RANGE | \ | | 475 | 6418 |
| 4871000 | | SUB ASPM | ; | | | |
| 4872000 | | | | | | |
| 4873000 | $ | \ RESTORE RNG2 AND ADDRESS RANGE UPPER | \ | | 476 | A208 |
| 4874000 | | WDA | ; | | | |
| 4875000 | | | | | | |
| 4876000 | $ | \ LOAD CONSTANT FOR 512 | \ | | 477 | 8002 |
| 4877000 | | LCN CNST(02#) | ; | | | |
| 4878000 | | | | | | |
| 4879000 | $ | \ SUBTRACT 512 FROM RNG USING PREVIOUS CARRY | \ | | 478 | 6498 |
| 4880000 | | SUB ASPM COTI | ; | | | |
| 4881000 | | | | | | |
| 4882000 | $ | \ RESTORE RNG1 | \ | | 479 | A200 |
| 4883000 | | MWT | ; | | | |
| 4884000 | | | | | | |
| 4885000 | $ | \ LOAD CONSTANT FOR 64 | \ | | 47A | 8100 |
| 4886000 | | LCN CNST(40#) | ; | | | |
| 4887000 | | | | | | |
| 4888000 | SKIP HOF | | | | | |

MODEL: MPDC-REV3D  
REVISION: 000.00  
RTL/6000 FILE EDIT  
MICROPROGRAM SECTION  
08/01/77  12.605  PAGE: 127  
DOC.#:

| LINE # | | | SEQUENCE: SSUPCS | | ADDRESS (HEX) | IMAGE (HEX) |
|---|---|---|---|---|---|---|
| 4889000 | $ | \ ADDRESS MEMORY ADDRESS LOWER | \ | | 47B | 8C21 |
| 4890000 | | SSPAI LOC(ADR2) | ; | | | |
| 4891000 | | | | | | |
| 4892000 | $ | \ ADD 64 TO ADDRESS | \ | | 47C | 6424 |
| 4893000 | | ADD ASPM | ; | | | |
| 4894000 | | | | | | |
| 4895000 | $ | \ RESTORE ADR2 AND ADDRESS ADR1 | \ | | 47D | A208 |
| 4896000 | | WDA | ; | | | |
| 4897000 | | | | | | |
| 4898000 | $ | \ LOAD CONSTANT FOR 512 | \ | | 47E | 8002 |
| 4899000 | | LCN CNST(02#) | ; | | | |
| 4900000 | | | | | | |
| 4901000 | $ | \ ADD 512 TO ADDRESS USING PREVIOUS CARRY | \ | | 47F | 64A4 |
| 4902000 | | ADD ASPM COTI | ; | | | |
| 4903000 | | | | | | |
| 4904000 | $ | \ RESTORE ADR1 | \ | | 480 | A200 |
| 4905000 | | MWT | ; | | | |
| 4906000 | | | | | | |
| 4907000 | $ | GTO ($INC-MOD) | ; | | 481 | F46F |
| 4908000 | | | | | | |
| 4909000 | SKIP HOF | | | | | |

```
MODEL: MPDC-REV3D                               RTL/6000 FILE EDIT                       08/01/77    12.605  PAGE: 128
REVISION: 000.00                                MICROPROGRAM SECTION                     DOC.#:
                                                                              ADDRESS   IMAGE
LINE #                                  SEQUENCE: $$UPCS                      (HEX)     (HEX)
4910000
4911000       \ THE MAX-SECTOR ROUTINE IS USED TO DETERMINE IF A HEAD
4912000         OR CYLINDER SWITCH IS NECESSARY AFTER DETECTING SECTOR
4913000         12 OR 24. WHEN SWITCHING IS REQUIRED, THIS ROUTINE
4914000         WILL UPDATE THE CONFIGURATION WORDS IN SCRATCH PAD
4915000         TO THE NEW TRACK AND CYLINDER.                         \
4916000
4917000 $MAX-SECTOR    \SKIP IF NOT END OF RANGE                       \         482    C062
4918000               TFZ TRGZ                                         ;
4919000
4920000   $           GTO ($TERM-NOR)                                  ;         483    F59C
4921000
4922000   $           \ ZERO SECTOR NUMBER                             \         484    600E
4923000               ZER                                              ;
4924000
4925000   $           \ RESTORE SECTOR AND ADDRESS TRACK (CNF3)        \         485    A208
4926000               WDA                                              ;
4927000
4928000   $           \ LOAD CONSTANT TO UPDATE TRACK                  \         486    8001
4929000               LCN CNST(01#)                                    ;
4930000
4931000   $           \ TOGGLE TRACK BIT                               \         487    641A
4932000               XOR ASPM                                         ;
4933000
4934000   $           \ RESTORE TRACK AND ADDRESS CYLINDER (CNF2)      \         488    A208
4935000               WDA                                              ;
4936000
4937000   $           \ SKIP IF TRACK = 0                              \         489    C05E
4938000               TFZ AACU TAX7                                    ;
4939000
4940000   $           GTO ($UPD-UNSEL)                                 ;         48A    F49A
4941000
4942000   $           \ INCREMENT CYLINDER                             \         48B    6400
4943000               INC ASPM                                         ;
4944000
4945000   $           \ RESTORE CYLINDER AND ADDRESS MSB               
4946000                 OF CYLINDER (CNF1)                             \         48C    A208
4947000               WDA                                              ;
4948000
4949000   $           \ INCREMENT MSB BASED ON PREVIOUS CARRY          \         48D    6480
4950000               INC ASPM COTI                                    ;
4951000
4952000   $           \ RESTORE MSB OF CYLINDER                        \         48E    A200
4953000               MWT                                              ;
4954000
4955000 SKIP HOF                                                       ;

MODEL: MPDC-REV3D                               RTL/6000 FILE EDIT                       08/01/77    12.605  PAGE: 129
REVISION: 000.00                                MICROPROGRAM SECTION                     DOC.#:
                                                                              ADDRESS   IMAGE
LINE #                                  SEQUENCE: $$UPCS                      (HEX)     (HEX)
4956000   $           \ ADDRESS DMA BYTE                               \         48F    8C89
4957000               SSPAI LOC(DMA1)                                  ;
4958000
4959000   $           \ SET IMPLIED SEEK BIT                           \         490    8490
4960000               OCN ASPM CNST (20#)                              ;
4961000
4962000   $           \ RESET FIRST PASS BIT                           \         491    82EF
4963000               ACN CNST(BF#)                                    ;
4964000
4965000   $           \ RESTORE DMA BYTE                               \         492    A200
4966000               MWT                                              ;
4967000
4968000   $           \ ADDRESS UNIT SELECT                            \         493    8CEB
4969000               SSPAI LOC(UNSEL)                                 ;
4970000
4971000   $           \ RESET TRACK BIT                                \         494    87E7
4972000               ACN ASPM CNST(FB#)                               ;
4973000
4974000   $           \ RESTORE UNSEL                                  \         495    A200
4975000               MWT                                              ;
4976000
4977000   $           \RESET MOTHER BOARD FIFO                         \         496    0088
4978000               RDA                                              ;
4979000
4980000   $           \CLEAR STATUS AND FIFO IN ADAPTER                \         497    744F
4981000               ZER AAD5 SRIA                                    ;
4982000
4983000   $           LRA ($SEEK-IMPL)                                 ;         498    E3B0
4984000
4985000   $           GTO ($DEC-RNG)                                   ;         499    F461
4986000
4987000 $UPD-UNSEL    \ ADDRESS UNIT SELECT                            \         49A    8CEB
4988000               SSPAI LOC(UNSEL)                                 ;
4989000
4990000   $           \ SET TRACK = 1                                  \         49B    8418
4991000               OCN ASPM CNST(04#)                               ;
4992000
4993000   $           \ RESTORE UNSEL                                  \         49C    A200
4994000               MWT                                              ;
4995000
4996000   $           \ SEND NEW TRACK TO ADAPTER                      \         49D    7C6A
4997000               XFB AAD3 SRIA                                    ;
4998000
4999000   $           GTO ($SCH-LRA)                                   ;         49E    F45E
5000000
5001000
5002000 SKIP HOF                                                       ;

MODEL: MPDC-REV3D                               RTL/6000 FILE EDIT                       08/01/77    12.605  PAGE: 130
REVISION: 000.00                                MICROPROGRAM SECTION                     DOC.#:
                                                                              ADDRESS   IMAGE
LINE #                                  SEQUENCE: $$UPCS                      (HEX)     (HEX)
5003000       \ THIS IS THE BEGINNING OF THE WRAPAROUND FIRMWARE. THE
5004000         ROUTINES PERFORM THE FOLLOWING FUNCTIONS-
5005000            1. LOADS UP TO 16 BYTES INTO EITHER THE MOTHER BOARD
5006000               OR ADAPTER FIFO IN ORDER TO VERIFY THE OUTPUT
5007000               DATA PATH.
5008000            2. READS THE DATA PREVIOUSLY LOADED FROM THE MOTHER
5009000               BOARD OR ADAPTER FIFO IN ORDER TO VERIFY THE INPUT
5010000               DATA PATH.                                       \
5011000
5012000 $WRAP         \ SKIP IF ADAPTER WRAPAROUND                     \         49F    C45E
5013000               TFZ ASPM TAX7                                    ;
```

| MODEL: MPDC-REV3D | | RTL/6000 FILE EDIT | | 08/01/77 | 12.605 PAGE: 130 |
|---|---|---|---|---|---|
| REVISION: 000.00 | | MICROPROGRAM SECTION | | DOC.#: | |
| | | | | ADDRESS | IMAGE |
| LINE # | | SEQUENCE: $SUPCS | | (HEX) | (HEX) |

-continued

```
5014000
5015000  S            \ GO TO MOTHER BRD WRAP        \      4A0   F4BC
5016000               GTO ($WRAP-MOTH)              ;
5017000
5018000  S            \ ADDRESS DMA BYTE             \      4A1   8C89
5019000               SSPAI LOC(DMA1)               ;
5020000
5021000  S            \ SKIP IF WRITE MODE           \      4A2   C490
5022000               TFO ASPM TAX0                 ;
5023000
5024000  S            GTO ($WRAP-READ)              ;      4A3   F4B1
5025000
5026000       \ THIS IS THE ADAPTER WRITE WRAPAROUND ROUTINE. IT LOADS
5027000         FROM MEMORY UP TO 16 DATA BYTES INTO THE ADAPTER FIFO.  \
5028000
5029000  $WRAP-WRT    \ CLEAR ADP STATUS AND FIFO    \      4A4   746B
5030000               XFB AAD5 SRIA                 ;
5031000
5032000  S            \ SET DATA COUNT = 16          \      4A5   9408
5033000               LCN AAD1 CNST(04#)            ;
5034000
5035000  S            \ LOAD ADP CMD                 \      4A6   9808
5036000               LCN AAD2 CNST(C4#)            ;
5037000
5038000  S            \ SET BYTE MODE WRITE          \      4A7   81A2
5039000               LCN CNST(6A#)                 ;
5040000
5041000  S            \ SKIP IF BYTE MODE            \      4A8   C0B8
5042000               TFO TBYT                      ;
5043000
5044000  S            \ SET WRITE MODE               \      4A9   81B2
5045000               LCN CNST(62#)                 ;
5046000
5047000  S            \ENABLE WRITE HARDWARE PATH    \      4AA   0601
5048000               EWP                           ;
5049000
5050000  SKIP HOF                                    ;
```

| MODEL: MPDC-REV3D | | RTL/6000 FILE EDIT | | 08/01/77 | 12.605 PAGE: 131 |
|---|---|---|---|---|---|
| REVISION: 000.00 | | MICROPROGRAM SECTION | | DOC.#: | |
| | | | | ADDRESS | IMAGE |
| LINE # | | SEQUENCE: $SUPCS | | (HEX) | (HEX) |

```
5051000  S            \LOAD RETURN                   \      4AB   E591
5052000               LRA ($TERM-CL3)               ;
5053000
5054000  S            \ LOAD RETURN FROM DMA-CHK     \      4AC   E59D
5055000               LRA ($TERM-NOR1)              ;
5056000
5057000  S            \SET CYCLE                     \      4AD   4020
5058000               CYC                           ;
5059000
5060000  $WRAP-WAIT   \SKIP IF NO ADAPTER BUFFER REQUEST  \  4AE   C0BC
5061000               TFO TNBR                      ;
5062000
5063000  S            GTO ($WRAP-WAIT)              ;      4AF   F4AE
5064000
5065000  S            GTO ($DMA-CHK)                ;      4B0   F574
5066000
5067000       \ THIS IS THE ADAPTER READ WRAPAROUND ROUTINE. IT TRANSFERS
5068000         TO MEMORY FROM THE ADAPTER FIFO THE DATA BYTES
5069000         PREVIOUSLY LOADED BY THE ADAPTER WRITE WRAPAROUND
5070000         COMMAND.                                    \
5071000
5072000  $WRAP-READ   \ SET DATA COUNT = 16          \      4B1   9420
5073000               LCN AAD1 CNST(08#)            ;
5074000
5075000  S            \ LOAD ADP CMD                 \      4B2   9802
5076000               LCN AAD2 CNST(C2#)            ;
5077000
5078000  S            \ SET BUSS = READ BYTE MODE    \      4B3   8128
5079000               LCN CNST(4C#)                 ;
5080000
5081000  S            \ SKIP IF BYTE MODE            \      4B4   C0B8
5082000               TFO TBYT                      ;
5083000
5084000  S            \ SET BUS = READ MODE          \      4B5   8108
5085000               LCN CNST(44#)                 ;
5086000
5087000  S            \ENABLE READ HARDWARE PATH     \      4B6   0600
5088000               ERP                           ;
5089000
5090000  S            \ LOAD RETURN FROM DMA-CHK     \      4B7   E59C
5091000               LRA ($TERM-NOR)               ;
5092000
5093000  S            \SET CYCLE                     \      4B8   4020
5094000               CYC                           ;
5095000
5096000  SKIP HOF                                    ;
```

| MODEL: MPDC-REV3D | | RTL/6000 FILE EDIT | | 08/01/77 | 12.605 PAGE: 132 |
|---|---|---|---|---|---|
| REVISION: 000.00 | | MICROPROGRAM SECTION | | DOC.#: | |
| | | | | ADDRESS | IMAGE |
| LINE # | | SEQUENCE: $SUPCS | | (HEX) | (HEX) |

```
5097000
5098000  $WRAP-READ1  \SKIP IF NO ADAPTER BUFFER REQUEST  \  4B9   C0BC
5099000               TFO TNBR                      ;
5100000
5101000  S            GTO ($WRAP-READ1)             ;      4BA   F4B9
5102000
5103000  S            GTO ($READ-EOR2)              ;      4BB   F519
5104000
5105000       \ THIS IS THE BEGINNING OF THE MOTHER BOARD WRAPAROUND
5106000         FIRMWARE.                                    \
5107000
5108000  $WRAP-MOTH   \ SET SPA FOR RANGE UPPER      \      4BC   8C28
5109000               SSPAI LOC(RNG1)               ;
5110000
5111000  S            \ TRANSFER RANGE UPPER THRU ALU \     4BD   612A
5112000               XFB BSPM                      ;
5113000
5114000  S            \ SKIP IF RANGE UPPER ZERO     \      4BE   C086
5115000               TFO TEQZ                      ;
5116000
```

MODEL: MPDC-REV3D  
REVISION: 000.00  
RTL/6000 FILE EDIT  
MICROPROGRAM SECTION  
08/01/77  12.605  PAGE: 132  
DOC.#:

| LINE # | | SEQUENCE: $SUPC5 | ADDRESS (HEX) | IMAGE (HEX) |
|---|---|---|---|---|
| | | -continued | | |
| 5117000 | S | \ ABORT - RANGE GT 16 | 4BF | F4E1 |
| 5118000 | | GTO ($WRAP-STS) | | |
| 5119000 | | | | |
| 5120000 | S | \ SET SPA FOR RANGE LOWER | 4C0 | 8C29 |
| 5121000 | | SSPAI LOC(RNG2) | | |
| 5122000 | | | | |
| 5123000 | S | \ HEX11 TO ACU | 4C1 | 8041 |
| 5124000 | | LCN CNST(11#) | | |
| 5125000 | | | | |
| 5126000 | S | \ CHECK FOR RANGE LOWER GT 16 | 4C2 | 6418 |
| 5127000 | | SUB ASPM BACU | | |
| 5128000 | | | | |
| 5129000 | S | \ SKIP IF RANGE LOWER LT 16 | 4C3 | C04A |
| 5130000 | | TFZ TCOT | | |
| 5131000 | | | | |
| 5132000 | S | \ ABORT - RANGE GT 16 | 4C4 | F4E1 |
| 5133000 | | GTO ($WRAP-STS) | | |
| 5134000 | | | | |
| 5135000 | S | \ SET SPA FOR DMA BYTE | 4C5 | 8C89 |
| 5136000 | | SSPAI LOC(DMA1) | | |
| 5137000 | | | | |
| 5138000 | S | \ SKIP IF WRITE MODE | 4C6 | C490 |
| 5139000 | | TFO ASPM TAXO | | |
| 5140000 | | | | |
| 5141000 | S | \ GO TO READ WRAP FOR MOTHER BOARD | 4C7 | F4D3 |
| 5142000 | | GTO ($WRAP-RDMO) | | |
| 5143000 | | | | |
| 5144000 | SKIP HOF | | | |

MODEL: MPDC-REV3D  
REVISION: 000.00  
RTL/6000 FILE EDIT  
MICROPROGRAM SECTION  
08/01/77  12.605  PAGE: 133  
DOC.#:

| LINE # | | SEQUENCE: $SUPC5 | ADDRESS (HEX) | IMAGE (HEX) |
|---|---|---|---|---|
| 5145000 | | | | |
| 5146000 | | \ THIS IS THE MOTHER BOARD WRITE WRAPAROUND ROUTINE. IT | | |
| 5147000 | | LOADS FROM MEMORY UP TO 16 DATA BYTES INTO THE MOTHER | | |
| 5148000 | | BOARD FIFO. | | |
| 5149000 | | | | |
| 5150000 | SWRAP-WRTM0 | \ SET BYTE MODE WRITE IN ACU | 4C8 | 8142 |
| 5151000 | | LCN CNST(6A#) | | |
| 5152000 | | | | |
| 5153000 | S | \ SKIP IF BYTE MODE | 4C9 | C088 |
| 5154000 | | TFO TBYT | | |
| 5155000 | | | | |
| 5156000 | S | \ SET WRITE MODE IN ACU | 4CA | 8182 |
| 5157000 | | LCN CNST(62#) | | |
| 5158000 | | | | |
| 5159000 | S | \ SET TEST MODE | 4CB | 0180 |
| 5160000 | | STD | | |
| 5161000 | | | | |
| 5162000 | S | \ENABLE WRITE HARDWARE PATH | 4CC | 0601 |
| 5163000 | | EWP | | |
| 5164000 | | | | |
| 5165000 | S | \ SET CYCLE | 4CD | 4020 |
| 5166000 | | CYC | | |
| 5167000 | | | | |
| 5168000 | SWRAP-WRTM1 | \ SKIP IF RANGE ZERO | 4CE | C0A2 |
| 5169000 | | TFO TRGZ | | |
| 5170000 | | | | |
| 5171000 | S | \ WAIT FOR RANGE ZERO | 4CF | F4CE |
| 5172000 | | GTO ($WRAP-WRTM1) | | |
| 5173000 | | | | |
| 5174000 | S | \ LOAD RETURN | 4D0 | E592 |
| 5175000 | | LRA ($TERM-CL4) | | |
| 5176000 | | | | |
| 5177000 | S | \ LOAD RETURN | 4D1 | E590 |
| 5178000 | | LRA ($TERM-NOR1) | | |
| 5179000 | | | | |
| 5180000 | S | GTO ($DMA-CHK) | 4D2 | F574 |
| 5181000 | | | | |
| 5182000 | SKIP HOF | | | |

MODEL: MPDC-REV3D  
REVISION: 000.00  
RTL/6000 FILE EDIT  
MICROPROGRAM SECTION  
08/01/77  12.605  PAGE: 134  
DOC.#:

| LINE # | | SEQUENCE: $SUPC5 | ADDRESS (HEX) | IMAGE (HEX) |
|---|---|---|---|---|
| 5183000 | | | | |
| 5184000 | | \ THIS IS THE MOTHER BOARD READ WRAPAROUND ROUTINE. IT | | |
| 5185000 | | TRANSFERS TO MEMORY FROM THE MOTHER BOARD FIFO THE DATA | | |
| 5186000 | | BYTES PREVIOUSLY LOADED BY THE WRITE WRAPAROUND COMMAND. | | |
| 5187000 | | | | |
| 5188000 | SWRAP-RDMO | \ SET BYTE MODE READ IN ACU | 4D3 | 8128 |
| 5189000 | | LCN CNST(4C#) | | |
| 5190000 | | | | |
| 5191000 | S | \ SKIP IF BYTE MODE | 4D4 | C088 |
| 5192000 | | TFO TBYT | | |
| 5193000 | | | | |
| 5194000 | S | \ SET READ MODE IN ACU | 4D5 | 8108 |
| 5195000 | | LCN CNST(44#) | | |
| 5196000 | | | | |
| 5197000 | S | \ SET TEST MODE | 4D6 | 0180 |
| 5198000 | | STD | | |
| 5199000 | | | | |
| 5200000 | S | \ SET CYCLE | 4D7 | 4020 |
| 5201000 | | CYC | | |
| 5202000 | | | | |
| 5203000 | S | \LOAD RETURN | 4D8 | E59C |
| 5204000 | | LRA ($TERM-NOR) | | |
| 5205000 | | | | |
| 5206000 | SWRAP-RDMO1 | \ENABLE READ HARDWARE PATH | 4D9 | 0600 |
| 5207000 | | ERP | | |
| 5208000 | | | | |
| 5209000 | S | \ SEND BYTE TO INTERFACE | 4DA | 7C4F |
| 5210000 | | ZER AAD7 SRIA | | |
| 5211000 | | | | |
| 5212000 | S | \NO OP FOR TIMING | 4DB | 0000 |
| 5213000 | | NOP | | |
| 5214000 | | | | |
| 5215000 | SWRAP-RDMO2 | \SKIP IF BUS CYCLE NOT ACTIVE | 4DC | C042 |
| 5216000 | | TFZ TBCA | | |
| 5217000 | | | | |
| 5218000 | S | \WAIT FOR BUS TO FINISH | 4DD | F4DC |
| 5219000 | | GTO ($WRAP-RDMO2) | | |

| | | | | |
|---|---|---|---|---|
| MODEL: MPDC-REV3D | | RTL/6000 FILE EDIT | 08/01/77 | 12.605 PAGE: 134 |
| REVISION: 000.00 | | MICROPROGRAM SECTION | DOC.#: | |
| | | | ADDRESS | IMAGE |
| LINE # | | SEQUENCE: SSUPCS | (HEX) | (HEX) |
| | | -continued | | |

```
5220000
5221000   S      \SKIP IF END OF RANGE                              \       4DE   C0A2
5222000          TFO TRGZ                                           ;
5223000
5224000   S      \SEND INTERFACE ANOTHER BYTE                       \       4DF   F4D9
5225000          GTO ($WRAP-RDM01)                                  ;
5226000
5227000   S      \GO TO CHECK FOR SINGLE BYTE STORED                \       4E0   F519
5228000          GTO ($READ-EOR2)                                   ;
5229000
5230000  SKIP HOF                                                   ;
```

| | | | | |
|---|---|---|---|---|
| MODEL: MPDC-REV3D | | RTL/6000 FILE EDIT | 08/01/77 | 12.605 PAGE: 135 |
| REVISION: 000.00 | | MICROPROGRAM SECTION | DOC.#: | |
| | | | ADDRESS | IMAGE |
| LINE # | | SEQUENCE: SSUPCS | (HEX) | (HEX) |

```
5231000
5232000  $WRAP-STS  \ SET STATUS BYTE 1 IN ACU                      \       4E1   8280
5233000             LCN CNST(A0#)                                   ;
5234000
5235000   S      \ SKIP IF DEVICE READY                             \       4E2   D890
5236000          TFO AAD2 TAX0                                      ;
5237000
5238000   S      \ SET STATUS BYTE 1 NOT RDY IN ACU                 \       4E3   8080
5239000          LCN CNST(20#)                                      ;
5240000
5241000   S      \ SET SPA FOR STS1                                 \       4E4   8C60
5242000          SSPAI LOC(STS1)                                    ;
5243000
5244000   S      \ UPDATE STATUS                                    \       4E5   A200
5245000          MWT                                                ;
5246000
5247000   S      GTO ($TERM-CL2)                                    ;       4E6   F5BF
5248000
5249000  SKIP HOF                                                   ;
```

| | | | | |
|---|---|---|---|---|
| MODEL: MPDC-REV3D | | RTL/6000 FILE EDIT | 08/01/77 | 12.605 PAGE: 136 |
| REVISION: 000.00 | | MICROPROGRAM SECTION | DOC.#: | |
| | | | ADDRESS | IMAGE |
| LINE # | | SEQUENCE: SSUPCS | (HEX) | (HEX) |

```
5250000  $FMT-READ  \ CLEAR ADP STATUS + FIFO +RESET READ GATE      \       4E7   7468
5251000             XFB AAD5 SRIA                                   ;
5252000
5253000   S      \SKIP IF RANGE NOT ZERO                            \       4E8   C062
5254000          TFZ TRGZ                                           ;
5255000
5256000   S      \GO TO TERMINATION                                 \       4E9   F59C
5257000          GTO ($TERM-NOR)                                    ;
5258000
5259000  $READ-IDT  \SET SPA FOR LOW ORDER BYTE OF TASK             \       4EA   8C0B
5260000             SSPAI LOC (TSK2)                                ;
5261000
5262000   S      \SKIP IF IGNORE READ ERRORS SET                    \       4EB   C490
5263000          TFO ASPM TAX0                                      ;
5264000
5265000   S      GTO ($READ-IDT1)                                   ;       4EC   F4F0
5266000
5267000   S      \SET SPA FOR DMA BYTE                              \       4ED   8C89
5268000          SSPAI LOC (DMA1)                                   ;
5269000
5270000   S      \ SET IGNORE READ ERROR BIT                        \       4EE   8450
5271000          OCN ASPM CNST (10#)                                ;
5272000
5273000   S      \RESTORE DMA BYTE                                  \       4EF   A200
5274000          MWT                                                ;
5275000
5276000  $READ-IDT1  \ SET FORMAT READ COMMAND                      \       4F0   8303
5277000              LCN CNST(C3#)                                  ;
5278000
5279000   S      \ ADDRESS TASK                                     \       4F1   8C0A
5280000          SSPAI LOC(TSK1)                                    ;
5281000
5282000   S      \ SKIP IF NOT DIAGNOSTIC MODE                      \       4F2   C45C
5283000          TFZ ASPM TAX6                                      ;
5284000
5285000   S      GTO ($READ-IDT2)                                   ;       4F3   F4FC
5286000
5287000   S      \ SEND COMMAND TO ADAPTER                          \       4F4   786A
5288000          XFB AAD2 SRIA                                      ;
5289000
5290000   S      \ LOAD AMK UPPER                                   \       4F5   93E2
5291000          LCN AAD0 CNST(FA#)                                 ;
5292000
5293000   S      \ LOAD AMK LOWER                                   \       4F6   92A2
5294000          LCN AAD0 CNST(AA#)                                 ;
5295000
5296000  SKIP HOF                                                   ;
```

| | | | | |
|---|---|---|---|---|
| MODEL: MPDC-REV3D | | RTL/6000 FILE EDIT | 08/01/77 | 12.605 PAGE: 137 |
| REVISION: 000.00 | | MICROPROGRAM SECTION | DOC.#: | |
| | | | ADDRESS | IMAGE |
| LINE # | | SEQUENCE: SSUPCS | (HEX) | (HEX) |

```
5297000   S      \ LOAD DATA COUNTER = 4                            \       4F7   9401
5298000          LCN AAD1 CNST(01#)                                 ;
5299000
5300000   S      \ RETURN FROM READ-EOF                             \       4F8   E543
5301000          LRA ($READ-DATA)                                   ;
5302000
5303000   S      \ RETURN FROM DATA-LOOP IF AAP REQ                 \       4F9   E51B
5304000          LRA ($READ-EOR)                                    ;
5305000
5306000   S      \ RETURN FROM WAIT-LOOP+FIRST TIME ONLY            \       4FA   E51F
5307000          LRA ($READ-AMK)                                    ;
5308000
5309000   S      GTO ($START-WAIT)                                  ;       4FB   F21D
5310000
5311000  $READ-IDT2  \SET DIAGNOSTIC READ ID                        \       4FC   9843
5312000              LCN AAD2 CNST (D3#)                            ;
5313000
5314000   S      GTO ($DIAG-READ4)                                  ;       4FD   F56D
5315000
```

```
MODEL: MPDC-REV3D                              RTL/6000 FILE EDIT                    08/01/77    12.605  PAGE: 137
REVISION: 000.00                               MICROPROGRAM SECTION                  DOC.#:
                                                                            ADDRESS  IMAGE
LINE #                                   SEQUENCE: $SUPCS                    (HEX)   (HEX)
                                             , -continued
5316000  $READ-MODE    \ SET BUS = READ BYTE MODE            \               4FE     8128
5317000                LCN CNST(4C#)                         ;
5318000
5319000  $             \ SKIP IF BYTE MODE                   \               4FF     C0B8
5320000                TFO TBYT                              ;
5321000
5322000  $READ-RET     \ SET BUS = READ MODE                 \               500     8108
5323000                LCN CNST(44#)                         ;
5324000
5325000  $             \SKIP IF ADAPTER HARDWARE REQUEST     \               501     C080
5326000                TFO TAHR                              ;
5327000
5328000  $             \ERROR OR END OF FIELD                \               502     C200
5329000                RTN                                   ;
5330000
5331000  $             \ENABLE READ HARDWARE PATH            \               503     0600
5332000                ERP                                   ;
5333000
5334000 SKIP HOF                                             ;

MODEL: MPDC-REV3D                              RTL/6000 FILE EDIT                    08/01/77    12.605  PAGE: 138
REVISION: 000.00                               MICROPROGRAM SECTION                  DOC.#:
                                                                            ADDRESS  IMAGE
LINE #                                   SEQUENCE: $SUPCS                    (HEX)   (HEX)
5335000        \ THIS IS THE COMMON DATA LOOP USED BY THE READ AND WRITE
5336000          ROUTINES. IT IS USED TO CHECK FOR THE ADAPTER FIFO
5337000          BEING FULL ON WRITES AND EMPTY ON READS IN ORDER TO
5338000          DETERMINE IF AN UNSOLICITED BUS REQUEST CAN BE
5339000          PROCESSED.                                  \
5340000
5341000  $DATA-LOOP    \SET CYCLE                            \               504     4020
5342000                CYC                                   ;
5343000
5344000  $DATA1        \ SKIP IF NO ADAPTER BUFFER REQUEST   \               505     C0BC
5345000                TFO TNBR                              ;
5346000
5347000  $             GTO ($DATA1)                          ;               506     F505
5348000
5349000  $             \NO OP FOR TIMING                     \               507     0000
5350000                NOP                                   ;
5351000
5352000  $             \NO OP FOR TIMING                     \               508     0000
5353000                NOP                                   ;
5354000
5355000  $             \CLEAR ACU                            \               509     600E
5356000                ZER                                   ;
5357000
5358000  $DATA2        \ SKIP IF NO BUS CYCLE ACTIVE         \               50A     C042
5359000                TFZ TBCA                              ;
5360000
5361000  $             GTO ($DATA2)                          ;               50B     F50A
5362000
5363000  $             \CLEAR CYCLE REGISTER                 \               50C     4020
5364000                CYC                                   ;
5365000
5366000  $             \ SKIP IF NO ADP REQUEST              \               50D     C04C
5367000                TFZ TREQ                              ;
5368000
5369000  $             \ RETURN TO-                                          50E     C200
5370000                  1. FWT-DAT  - FORMAT WRITES
5371000                  2. READ-EOR - ADAPTER REQ DURING READ DATA
5372000                  3. WRT-EOF  - ADAPTER REQ DURING WRITE DATA  \
5373000                RTN                                   ;
5374000
5375000 SKIP HOF                                             ;

MODEL: MPDC-REV3D                              RTL/6000 FILE EDIT                    08/01/77    12.605  PAGE: 139
REVISION: 000.00                               MICROPROGRAM SECTION                  DOC.#:
                                                                            ADDRESS  IMAGE
LINE #                                   SEQUENCE: $SUPCS                    (HEX)   (HEX)
5376000  $             \ ADDRESS DMA BYTE                    \               50F     8C89
5377000                SSPAI LOC(DMA1)                       ;
5378000
5379000  $             \ SKIP IF WRITE MODE                  \               510     C490
5380000                TFO ASPM TAX0                         ;
5381000
5382000  $             GTO ($DATA3)                          ;               511     F515
5383000
5384000  $             \ RETURN FROM WAIT-LOOP               \               512     E40C
5385000                LRA ($WRT-RET)                        ;
5386000
5387000  $             \ RETURN FROM DMA-CHK                 \               513     E21D
5388000                LRA ($START-WAIT)                     ;
5389000
5390000  $             GTO ($DMA-CHK)                        ;               514     F574
5391000
5392000  $DATA3        \ RETURN FROM WAIT-LOOP               \               515     E4FE
5393000                LRA ($READ-MODE)                      ;
5394000
5395000  $             \ RETURN FROM DMA-CHK                 \               516     E21D
5396000                LRA ($START-WAIT)                     ;
5397000
5398000  $             GTO ($DMA-CHK)                        ;               517     F574
5399000
5400000 SKIP HOF                                             ;

MODEL: MPDC-REV3D                              RTL/6000 FILE EDIT                    08/01/77    12.605  PAGE: 140
REVISION: 000.00                               MICROPROGRAM SECTION                  DOC.#:
                                                                            ADDRESS  IMAGE
LINE #                                   SEQUENCE: $SUPCS                    (HEX)   (HEX)
5401000  $READ-EOR     \ LOAD RETURN                         \               518     E529
5402000                LRA ($READ-EOF)                       ;
5403000
5404000  $READ-EOR2    \SKIP IF OFFSET RANGE HISTORY         \               519     C06C
5405000                TFZ TORH                              ;
5406000
5407000  $             \SKIP IF SINGLE BYTE STORED           \               51A     C0A4
5408000                TFO TSBS                              ;
5409000
5410000  $             GTO ($DMA-CHK)                        ;               51B     F574
5411000
```

MODEL: MPDC-REV30  
REVISION: 000.00

RTL/6000 FILE EDIT  
MICROPROGRAM SECTION

08/01/77 12.605 PAGE: 140  
DOC.#:

| LINE # | | | SEQUENCE: $SUPCS | | ADDRESS (HEX) | IMAGE (HEX) |
|---|---|---|---|---|---|---|
| | | | -continued | | | |
| 5412000 | S | | \ LOAD BUS CYCLE | \ | 51C | 8328 |
| 5413000 | | | LCN CNST(CC#) | ; | | |
| 5414000 | | | | | | |
| 5415000 | S | | \ CYCLE BUS | \ | 51D | 4020 |
| 5416000 | | | CYC | ; | | |
| 5417000 | | | | | | |
| 5418000 | S | | GTO ($DMA-CHK) | ; | 51E | F574 |
| 5419000 | | | | | | |
| 5420000 | $READ-AMK | | \ SKIP IF NO ADDRESS MARK ERROR | \ | 51F | DC5C |
| 5421000 | | | TFZ AAD3 TAX6 | ; | | |
| 5422000 | | | | | | |
| 5423000 | S | | GTO ($READ-STS) | ; | 520 | F533 |
| 5424000 | | | | | | |
| 5425000 | $READ-AMK1 | | \SKIP IF ADAPTER HARDWARE REQUEST | \ | 521 | C080 |
| 5426000 | | | TFO TAHR | ; | | |
| 5427000 | | | | | | |
| 5428000 | S | | \SKIP IF NO ERROR | \ | 522 | C04C |
| 5429000 | | | TFZ TREQ | ; | | |
| 5430000 | | | | | | |
| 5431000 | S | | GTO ($READ-MODE) | ; | 523 | F4FE |
| 5432000 | | | | | | |
| 5433000 | S | | GTO ($READ-AMK1) | ; | 524 | F521 |
| 5434000 | | | | | | |
| 5435000 | $WRT-EJF | | \ SKIP IF NOT EOF | \ | 525 | C0AA |
| 5436000 | | | TFO TNDR | ; | | |
| 5437000 | | | | | | |
| 5438000 | S | | GTO ($DMA-CHK) | ; | 526 | F574 |
| 5439000 | | | | | | |
| 5440000 | S | | \ LOAD RETURN FROM DMA-CHK | \ | 527 | E57D |
| 5441000 | | | LRA ($TERM-STS) | ; | | |
| 5442000 | | | | | | |
| 5443000 | S | | GTO ($DMA-CHK) | ; | 528 | F574 |
| 5444000 | | | | | | |
| 5445000 | SKIP HOF | | | ; | | |

MODEL: MPDC-REV30  
REVISION: 000.00

RTL/6000 FILE EDIT  
MICROPROGRAM SECTION

08/01/77 12.605 PAGE: 141  
DOC.#:

| LINE # | | | SEQUENCE: $SUPCS | | ADDRESS (HEX) | IMAGE (HEX) |
|---|---|---|---|---|---|---|
| 5446000 | | | | | | |
| 5447000 | $READ-EOF | | \ZERO TO ACU | \ | 529 | 600E |
| 5448000 | | | ZER | ; | | |
| 5449000 | | | | | | |
| 5450000 | S | | \CLEAR CYCLE REGISTER | \ | 52A | 4020 |
| 5451000 | | | CYC | ; | | |
| 5452000 | | | | | | |
| 5453000 | S | | \SKIP IF NO NON-DATA SERVICE REQUEST | \ | 52B | C06A |
| 5454000 | | | TFZ TNDR | ; | | |
| 5455000 | | | | | | |
| 5456000 | S | | GTO ($READ-STS) | ; | 52C | F533 |
| 5457000 | | | | | | |
| 5458000 | S | | \ GET DEVICE STATUS | \ | 52D | 7C3E |
| 5459000 | | | XFA AAD3 | ; | | |
| 5460000 | | | | | | |
| 5461000 | S | | \ SKIP IF ERROR | \ | 52E | C046 |
| 5462000 | | | TFZ TEQZ | ; | | |
| 5463000 | | | | | | |
| 5464000 | S | | \ RETURN TO- | | 52F | C200 |
| 5465000 | | | 1. READ-DATA-FORMAT READ | | | |
| 5466000 | | | 2. TERM-NOR-EOR | \ | | |
| 5467000 | | | RTN | ; | | |
| 5468000 | | | | | | |
| 5469000 | S | | \ADDRESS DMA BYTE | \ | 530 | 8C89 |
| 5470000 | | | $SPAI LOC (DMA1) | ; | | |
| 5471000 | | | | | | |
| 5472000 | S | | \SKIP IF NOT IGNORING READ ERRORS | \ | 531 | C456 |
| 5473000 | | | TFZ ASPM TAX3 | ; | | |
| 5474000 | | | | | | |
| 5475000 | S | | GTO ($READ-STS1) | ; | 532 | F535 |
| 5476000 | | | | | | |
| 5477000 | $READ-STS | | \ LOAD RETURN FROM STORE-CTRS | \ | 533 | E57D |
| 5478000 | | | LRA ($TERM-STS) | ; | | |
| 5479000 | | | | | | |
| 5480000 | S | | GTO ($STORE-CTRS) | ; | 534 | F538 |
| 5481000 | | | | | | |
| 5482000 | $READ-STS1 | | \RESET IGNORE READ ERROR BIT | \ | 535 | 87AF |
| 5483000 | | | ACN ASPM CNST (EF#) | ; | | |
| 5484000 | | | | | | |
| 5485000 | S | | \UPDATE DMA BYTE | \ | 536 | A200 |
| 5486000 | | | MWT | ; | | |
| 5487000 | | | | | | |
| 5488000 | S | | RTN | ; | 537 | C200 |
| 5489000 | | | | | | |
| 5490000 | SKIP HOF | | | ; | | |

MODEL: MPDC-REV30  
REVISION: 000.00

RTL/6000 FILE EDIT  
MICROPROGRAM SECTION

08/01/77 12.605 PAGE: 142  
DOC.#:

| LINE # | | | SEQUENCE: $SUPCS | | ADDRESS (HEX) | IMAGE (HEX) |
|---|---|---|---|---|---|---|
| 5491000 | | | | | | |
| 5492000 | | \ THIS ROUTINE IS USED TO STORE THE BUS INTERFACE | | | | |
| 5493000 | | | COUNTERS (ADDRESS, RANGE, AND OFFSET RANGE) IN RWS. | \ | | |
| 5494000 | | | | | | |
| 5495000 | $STORE-CTRS | | \ ADDRESS OFFSET LOWER | \ | 538 | 8C2B |
| 5496000 | | | $SPAI LOC(OFR2) | ; | | |
| 5497000 | | | | | | |
| 5498000 | S | | \ SAVE OFFSET LOWER IN OSR2 | \ | 539 | AE09 |
| 5499000 | | | WDA ABUS4 | ; | | |
| 5500000 | | | | | | |
| 5501000 | S | | \ SAVE OFFSET UPPER IN OSR1 | \ | 53A | AE09 |
| 5502000 | | | WDA ABUS4 | ; | | |
| 5503000 | | | | | | |
| 5504000 | S | | \ SAVE RANGE LOWER IN RNG2 | \ | 53B | AE09 |
| 5505000 | | | WDA ABUS4 | ; | | |
| 5506000 | | | | | | |
| 5507000 | S | | \ SAVE RANGE UPPER IN RNG1 | \ | 53C | AE01 |
| 5508000 | | | MWT ABUS4 | ; | | |
| 5509000 | | | | | | |
| 5510000 | S | | \ ADDRESS ADR2 | \ | 53D | 8C21 |
| 5511000 | | | $SPAI LOC(ADR2) | ; | | |
| 5512000 | | | | | | |

MODEL: MPDC-REV3D  
REVISION: 000.00  
RTL/6000 FILE EDIT  
MICROPROGRAM SECTION  
08/01/77  12.605  PAGE: 142  
DOC.#:

SEQUENCE: SSUPCS  
-continued

| LINE # | | | | ADDRESS (HEX) | IMAGE (HEX) |
|---|---|---|---|---|---|
| 5513000 | S | \ SAVE ADDRESS LOWER | \ | 53E | AE09 |
| 5514000 | | WDA ABUS4 | ; | | |
| 5515000 | | | | | |
| 5516000 | S | \ SAVE ADDRESS MID | \ | 53F | AE01 |
| 5517000 | | MWT ABUS4 | ; | | |
| 5518000 | | | | | |
| 5519000 | S | \ ADDRESS MOD1 | \ | 540 | 8C23 |
| 5520000 | | SSPAI LOC(MOD1) | ; | | |
| 5521000 | | | | | |
| 5522000 | S | \ SAVE MEM MODULE | \ | 541 | AE01 |
| 5523000 | | MWT ABUS4 | ; | | |
| 5524000 | | | | | |
| 5525000 | S | \ RETURN TO- | | 542 | C200 |
| 5526000 | | 1. END-GAP   - FORMAT WRITE | | | |
| 5527000 | | 2. TERM-CL2  - NORMAL TERMINATION | | | |
| 5528000 | | 3. TERM-STS  - ERROR IN DEVICE STATUS ON READ | | | |
| 5529000 | | 4. SCH-SET   - EXTENDED SEARCH AND READ | | | |
| 5530000 | | EXTENDED SEARCH AND WRITE | | | |
| 5531000 | | 5. SEEK-IMPL- IMPLICIT SEEK DURING AUTO TRACK | | | |
| 5532000 | | AND CYLINDER LINKING | \ | | |
| 5533000 | | RTN | ; | | |
| 5534000 | | | | | |
| 5535000 | SKIP HOF | | ; | | |

MODEL: MPDC-REV3D  
REVISION: 000.00  
RTL/6000 FILE EDIT  
MICROPROGRAM SECTION  
08/01/77  12.605  PAGE: 143  
DOC.#:

SEQUENCE: SSUPCS

| LINE # | | | | | ADDRESS (HEX) | IMAGE (HEX) |
|---|---|---|---|---|---|---|
| 5536000 | | | | | | |
| 5537000 | SREAD-DATA | \SKIP IF RANGE NOT EQUAL ZERO | \ | | 543 | C062 |
| 5538000 | | TFZ TRG2 | ; | | | |
| 5539000 | | | | | | |
| 5540000 | S | GTO (STERM-NOR) | ; | | 544 | F59C |
| 5541000 | | | | | | |
| 5542000 | S | \SET SPA FOR DMA BYTE | \ | | 545 | 8C89 |
| 5543000 | | SSPAI LOC (DMA1) | ; | | | |
| 5544000 | | | | | | |
| 5545000 | S | \RESET IGNORE READ ERROR BIT | \ | | 546 | 8784 |
| 5546000 | | ACN ASPM CNST (E0#) | ; | | | |
| 5547000 | | | | | | |
| 5548000 | S | \RESTORE DMA BYTE | \ | | 547 | A200 |
| 5549000 | | MWT | ; | | | |
| 5550000 | | | | | | |
| 5551000 | S | \ LOAD DATA MARK UPPER | \ | | 548 | 93E9 |
| 5552000 | | LCN AAD0 CNST(F0#) | ; | | | |
| 5553000 | | | | | | |
| 5554000 | S | \ LOAD DMK LOWER | \ | | 549 | 9369 |
| 5555000 | | LCN AAD0 CNST(DD#) | ; | | | |
| 5556000 | | | | | | |
| 5557000 | S | \ ADDRESS DATA LENGTH | \ | | 54A | 8C09 |
| 5558000 | | SSPAI LOC(DATL) | ; | | | |
| 5559000 | | | | | | |
| 5560000 | S | \ LOAD DATA LENGTH | \ | | 54B | 756A |
| 5561000 | | XFB AAD1 BSPM SRIA | ; | | | |
| 5562000 | | | | | | |
| 5563000 | S | \ ADDRESS TASK | \ | | 54C | 8C0A |
| 5564000 | | SSPAI LOC(TSK1) | ; | | | |
| 5565000 | | | | | | |
| 5566000 | S | \ SKIP IF NOT FORMAT READ ID | \ | | 54D | C45A |
| 5567000 | | TFZ ASPM TAX5 | ; | | | |
| 5568000 | | | | | | |
| 5569000 | S | GTO (SSPACE-DATA) | ; | | 54E | F55B |
| 5570000 | | | | | | |
| 5571000 | SKIP HOF | | ; | | | |

MODEL: MPDC-REV3D  
REVISION: 000.00  
RTL/6000 FILE EDIT  
MICROPROGRAM SECTION  
08/01/77  12.605  PAGE: 144  
DOC.#:

SEQUENCE: SSUPCS

| LINE # | | | | ADDRESS (HEX) | IMAGE (HEX) |
|---|---|---|---|---|---|
| 5572000 | S | \ SET READ COMMAND IN ADAPTER | \ | 54F | 9802 |
| 5573000 | | LCN AAD2 CNST(C2#) | ; | | |
| 5574000 | | | | | |
| 5575000 | S | \ RETURN FROM DMA-CHK IF SEARCH AND READ | \ | 550 | E453 |
| 5576000 | | LRA (SSCH-UPD) | ; | | |
| 5577000 | | | | | |
| 5578000 | S | \ SKIP IF SEARCH AND READ | \ | 551 | C49E |
| 5579000 | | TFO ASPM TAX7 | ; | | |
| 5580000 | | | | | |
| 5581000 | S | \ RETURN FROM DMA-CHK IF FORMAT READ | \ | 552 | E4E7 |
| 5582000 | | LRA (SFMT-READ) | ; | | |
| 5583000 | | | | | |
| 5584000 | S | \ RETURN FROM DATA LOOP IF EOF | \ | 553 | E51B |
| 5585000 | | LRA (SREAD-EOR) | ; | | |
| 5586000 | | | | | |
| 5587000 | S | \ RETURN FROM WAIT-LOOP FIRST TIME ONLY | \ | 554 | E51F |
| 5588000 | | LRA (SREAD-AMK) | ; | | |
| 5589000 | | | | | |
| 5590000 | S | GTO (SSTART-WAIT) | ; | 555 | F21D |
| 5591000 | | | | | |
| 5592000 | SKIP HOF | | ; | | |

MODEL: MPDC-REV3D  
REVISION: 000.00  
RTL/6000 FILE EDIT  
MICROPROGRAM SECTION  
08/01/77  12.605  PAGE: 145  
DOC.#:

SEQUENCE: SSUPCS

| LINE # | | | | ADDRESS (HEX) | IMAGE (HEX) |
|---|---|---|---|---|---|
| 5593000 | | | | | |
| 5594000 | SSPACE-DATA | \ SET READ WITHOUT DATA XFER IN ADAPTER | \ | 556 | 9A02 |
| 5595000 | | LCN AAD2 CNST(82#) | ; | | |
| 5596000 | | | | | |
| 5597000 | S | \ RETURN FROM WAIT LOOP | \ | 557 | E4E7 |
| 5598000 | | LRA (SFMT-READ) | ; | | |
| 5599000 | | | | | |
| 5600000 | S | GTO (SSTART-WAIT) | ; | 558 | F21D |
| 5601000 | | | | | |
| 5602000 | SDIAG-AMK | \SKIP IF NO ADDRESS MARK ERROR | \ | 559 | DC5C |
| 5603000 | | TFZ AAD3 TAX6 | ; | | |
| 5604000 | | | | | |
| 5605000 | S | GTO (SDIAG-AMK2) | ; | 55A | F55F |
| 5606000 | | | | | |
| 5607000 | SDIAG-AMK1 | \SKIP IF ADAPTER HARDWARE REQUEST | \ | 55B | C080 |

```
MODEL: MPDC-REV30                        RTL/6000 FILE EDIT                    08/01/77    12.605  PAGE: 145
REVISION: 000.00                         MICROPROGRAM SECTION                  DOC.#:
                                                                       ADDRESS  IMAGE
LINE #                          SEQUENCE: $$UPCS                       (HEX)    (HEX)
                                      -continued
5608000                  TFO TAHR                              ;
5609000
5610000   $              \SKIP IF NO ERROR                     \         55C    C04C
5611000                  TFZ TREQ                              ;
5612000
5613000   $              GTO ($READ-MODE)                      ;         55D    F4FE
5614000
5615000   $              GTO ($DIAG-AMK1)                      ;         55E    F55B
5616000
5617000  $DIAG-AMK2      \ SKIP IF NO ADAPTER ERRORS           \         55F    C06A
5618000                  TFZ TNDR                              ;
5619000
5620000   $              GTO ($READ-STS)                       ;         560    F533
5621000
5622000  $DIAG-HEAD      \ADDRESS TASK                         \         561    8C0A
5623000                  S5PA1 LOC (TSK1)                      ;
5624000
5625000   $              \SKIP IF HEAD ALIGNMENT TASK          \         562    C49B
5626000                  TFO TAX4 ASPM                         ;
5627000
5628000   $              GTO ($DIAG-READ3)                     ;         563    F56A
5629000
5630000   $              \SET ADAPTER COMMAND                  \         564    9A43
5631000                  LCN AAD2 CNST (93#)                   ;
5632000
5633000  SKIP HOF                                              ;

MODEL: MPDC-REV30                        RTL/6000 FILE EDIT                    08/01/77    12.605  PAGE: 146
REVISION: 000.00                         MICROPROGRAM SECTION                  DOC.#:
                                                                       ADDRESS  IMAGE
LINE #                          SEQUENCE: $$UPCS                       (HEX)    (HEX)
5634000  $DIAG-READ1     \RESET BUS                            \         565    4084
5635000                  RST                                   ;
5636000
5637000   $              \LOAD DUMMY RETURN                    \         566    E568
5638000                  LRA ($DIAG-READ2)                     ;
5639000
5640000   $              GTO ($START-WAIT)                     ;         567    F21D
5641000
5642000  $DIAG-READ2     \RESET INDEX COUNT                    \         568    707F
5643000                  XFA AAD4 SRIA                         ;
5644000
5645000   $              GTO ($DIAG-READ1)                     ;         569    F565
5646000
5647000  $DIAG-READ3     \RESET ADAPTER BUSY                   \         56A    9800
5648000                  LCN AAD2 CNST (00#)                   ;
5649000
5650000   $              \CLEAR ADAPTER STATUS AND FIFO        \         56B    746B
5651000                  XFB AAD5 SRIA                         ;
5652000
5653000   $              \LOAD ADAPTER COMMAND                 \         56C    9B62
5654000                  LCN AAD2 CNST(DA#)                    ;
5655000
5656000  $DIAG-READ4     \LOAD AMK UPPER                       \         56D    93E2
5657000                  LCN AAD0 CNST (FA#)                   ;
5658000
5659000   $              \ LOAD AMK LOWER                      \         56E    92A2
5660000                  LCN AAD0 CNST(AA#)                    ;
5661000
5662000   $              \ LOAD DUMMY DATA LENGTH              \         56F    97EB
5663000                  LCN AAD1 CNST(FF#)                    ;
5664000
5665000   $              \ RETURN FROM READ-EOF                \         570    E59C
5666000                  LRA ($TERM-NOR)                       ;
5667000
5668000   $              \ RETURN FROM DATA-LOOP IF ADP REQ    \         571    E51B
5669000                  LRA ($READ-EOR)                       ;
5670000
5671000   $              \ RETURN FROM WAIT-LOOP FIRST TIME    \         572    E559
5672000                  LRA ($DIAG-AMK)                       ;
5673000
5674000   $              GTO ($START-WAIT)                     ;         573    F21D
5675000
5676000  SKIP HOF                                              ;

MODEL: MPDC-REV30                        RTL/6000 FILE EDIT                    08/01/77    12.605  PAGE: 147
REVISION: 000.00                         MICROPROGRAM SECTION                  DOC.#:
                                                                       ADDRESS  IMAGE
LINE #                          SEQUENCE: $$UPCS                       (HEX)    (HEX)
5677000
5678000   \ THE DMA-CHK ROUTINE STORES THE FOLLOWING BUS STATUS
5679000     INDICATORS BEFORE GOING TO THE WAIT-LOOP TO CHECK
5680000     FOR AN UNSOLICITED BUS REQUEST-
5681000                       BIT 0 - 0
5682000                       BIT 1 - 0
5683000                       BIT 2 - 0
5684000                       BIT 3 - 0
5685000                       BIT 4 - BUS YELLOW INDICATOR
5686000                       BIT 5 - BUS NAK
5687000                       BIT 6 - BUS PARITY ERROR
5688000                       BIT 7 - BUS RED INDICATOR        \
5689000
5690000  $DMA-CHK        \ SKIP IF NO BUS CYCLES ACTIVE        \         574    C042
5691000                  TFZ TBCA                              ;
5692000
5693000   $              \ WAIT FOR BUS TO FINISH              \         575    F574
5694000                  GTO ($DMA-CHK)                        ;
5695000
5696000   $              \ ADDRESS STATUS BYTE LOWER           \         576    8C61
5697000                  S5PA1 LOC(STS2)                       ;
5698000
5699000   $              \ XFER BUS ERROR TO ACU               \         577    667A
5700000                  ORR ASPM BBST SRIA                    ;
5701000
5702000   $              \ RESTORE                             \         578    A200
5703000                  MWT                                   ;
5704000
5705000   $              \RESET BUS STATUS                     \         579    4084
5706000                  RST                                   ;
5707000
5708000   $              \MASK BUS YELLOW BIT                  \         57A    800F
```

```
MODEL: MPDC-REV3D                           RTL/6000 FILE EDIT                        08/01/77    12.605  PAGE: 147
REVISION: 000.00                            MICROPROGRAM SECTION                      DOC.#:
                                                                              ADDRESS  IMAGE
LINE #                                      SEQUENCE: SSUPCS                  (HEX)    (HEX)
                                               -continued
5709000              ACN AACU CNST (07#)                       ;
5710000
5711000   S          \SKIP IF BUS RED, BUS NAK, OR BUS PARITY  \               57B     C046
5712000              TFZ TEQZ                                  ;
5713000
5714000 SKIP HOF                                               ;

MODEL: MPDC-REV3D                           RTL/6000 FILE EDIT                        08/01/77    12.605  PAGE: 148
REVISION: 000.00                            MICROPROGRAM SECTION                      DOC.#:
                                                                              ADDRESS  IMAGE
LINE #                                      SEQUENCE: SSUPCS                  (HEX)    (HEX)
5715000  S           \ RETURN TO-                                              57C     C200
5716000              1. TERM-NOR  - TEST MODE WRITE
5717000              2. SCH-UPD   - SCH/WRT W/O ERROR ON DATA
5718000                             FIELD
5719000              3. FMT-DAT   - FORMAT WRITE (EOF ON ID)
5720000              4. START-WAIT- SERVICE BUS REQUESTS
5721000                             DURING DATA TRANSFERS
5722000              5. TERM-STS  - DEVICE ERROR ON WRITE
5723000                             OPERATION
5724000              6. READ-EOF  - EOF ON ALL READS
5725000              7. SCH-SET   - SCH/READ W/O ERROR ON DATA
5726000                             FIELD WITHOUT END OF RANGE
5727000              8. FMT-READ  - FORMAT READ ID AND DATA
5728000                             (EOF ON DATA FIELD)        \
5729000              RTN                                       ;
5730000
5731000 SKIP HOF                                               ;

MODEL: MPDC-REV3D                           RTL/6000 FILE EDIT                        08/01/77    12.605  PAGE: 149
REVISION: 000.00                            MICROPROGRAM SECTION                      DOC.#:
                                                                              ADDRESS  IMAGE
LINE #                                      SEQUENCE: SSUPCS                  (HEX)    (HEX)
5732000  STERM-STS   \ SKIP IF DEVICE READY                    \               57D     D890
5733000              TFO AAD2 TAX0                             ;
5734000
5735000  S           GTO (STERM-ATT)                           ;               57E     F59B
5736000
5737000  S           \ INPUT DEVICE ERROR STATUS               \               57F     7C3E
5738000              XFA AAD3                                  ;
5739000
5740000  S           \ SET READY                               \               580     8210
5741000              OCN CNST(80#)                             ;
5742000
5743000  S           \ SAVE STS1 ERROR BITS AND READY          \               581     82E7
5744000              ACN CNST(BB#)                             ;
5745000
5746000  S           \ ADDRESS STATUS UPPER                    \               582     8C60
5747000              SSPAI LOC(STS1)                           ;
5748000
5749000  S           \ SAVE PREVIOUS STORED STATUS             \               583     643A
5750000              ORR ASPM                                  ;
5751000
5752000  S           \SET SPA FOR TASK                         \               584     8C0A
5753000              SSPAI LOC (TSK1)                          ;
5754000
5755000  S           \SKIP IF FORMAT OPERATION                 \               585     C45E
5756000              TFZ TAX7 ASPM                             ;
5757000
5758000  S           GTO (STERM-STS1)                          ;               586     F589
5759000
5760000  S           \SKIP IF RANGE NOT ZERO                   \               587     C062
5761000              TFZ TRGZ                                  ;
5762000
5763000  S           \CLEAR FORMAT ERROR BIT                   \               588     83EE
5764000              ACN CNST(FE#)                             ;
5765000
5766000  STERM-STS1  \SET SPA FOR STS1                         \               589     8C60
5767000              SSPAI LOC (STS1)                          ;
5768000
5769000  S           \ RESTORE STS1 AND INCREMENT TO STS2      \               58A     A300
5770000              W1A                                       ;
5771000
5772000  S           \ INPUT DEVICE STATUS                     \               58B     7C3E
5773000              XFA AAD3                                  ;
5774000
5775000  S           \ SAVE RWTFRR AND SECERR                  \               58C     8304
5776000              ACN CNST(C0#)                             ;
5777000
5778000  S           \ SAVE PREVIOUS STORED BUS STATUS         \               58D     643A
5779000              ORR ASPM                                  ;
5780000
5781000 SKIP HOF                                               ;

MODEL: MPDC-REV3D                           RTL/6000 FILE EDIT                        08/01/77    12.605  PAGE: 150
REVISION: 000.00                            MICROPROGRAM SECTION                      DOC.#:
                                                                              ADDRESS  IMAGE
LINE #                                      SEQUENCE: SSUPCS                  (HEX)    (HEX)
5782000
5783000  STERM-CL1   \ RESTORE STATUS BYTE                     \               58E     A200
5784000              MWT                                       ;
5785000
5786000  STERM-CL2   \CLEAR STATUS AND FIFO IN ADAPTER         \               58F     746B
5787000              XFB AAD5 SRIA                             ;
5788000
5789000  S           \CLEAR ADAPTER HARDWARE REQUEST           \               590     7C4F
5790000              ZER AAD7 SRIA                             ;
5791000
5792000  STERM-CL3   \CLEAR ADAPTER AND RESET MDC FIFO         \               591     0088
5793000              RDA                                       ;
5794000
5795000  STERM-CL4   \CLEAR ACU                                \               592     600E
5796000              ZER                                       ;
5797000
5798000  S           \ RESET BUS CYCLES                        \               593     4020
5799000              CYC                                       ;
5800000
5801000  S           \ RESET TEST MODE                         \               594     0080
5802000              RSD                                       ;
5803000
```

| MODEL: MPDC-REV3D | | | | RTL/6000 FILE EDIT | | 08/01/77 | 12.605 PAGE: 150 |
|---|---|---|---|---|---|---|---|
| REVISION: 000.00 | | | | MICROPROGRAM SECTION | | DOC.#: | |
| LINE # | | | SEQUENCE: $SUPCS | | ADDRESS (HEX) | IMAGE (HEX) | |
| | | | -continued | | | | |
| 5804000 | $ | | GTO ($STARTINTPT) | \ | 595 | F33F | |
| 5805000 | | | | ; | | | |
| 5806000 | $TERM-ATT | | \ ADDRESS DEVICE STATUS | \ | 596 | BCEA | |
| 5807000 | | | SSPAI LOC(DEVST) | ; | | | |
| 5808000 | | | | | | | |
| 5809000 | $ | | \ STORE NEW STATUS | \ | 597 | BA00 | |
| 5810000 | | | MWT AAD2 | ; | | | |
| 5811000 | | | | | | | |
| 5812000 | $ | | \ SAVE READY BIT | \ | 598 | 8604 | |
| 5813000 | | | ACN ASPM CNST(80#) | ; | | | |
| 5814000 | | | | | | | |
| 5815000 | $ | | \ SET ATTENTION BIT | \ | 599 | 8110 | |
| 5816000 | | | OCN CNST(40#) | ; | | | |
| 5817000 | | | | | | | |
| 5818000 | $ | | \ ADDRESS STATUS UPPER | \ | 59A | 8C60 | |
| 5819000 | | | SSPAI LOC(STS1) | ; | | | |
| 5820000 | | | | | | | |
| 5821000 | $ | | GTO ($TERM-CL1) | ; | 59B | F58E | |
| 5822000 | | | | | | | |
| 5823000 | SKIP HOF | | | ; | | | |

| MODEL: MPDC-REV3D | | | | RTL/6000 FILE EDIT | | 08/01/77 | 12.605 PAGE: 151 |
|---|---|---|---|---|---|---|---|
| REVISION: 000.00 | | | | MICROPROGRAM SECTION | | DOC.#: | |
| LINE # | | | SEQUENCE: $SUPCS | | ADDRESS (HEX) | IMAGE (HEX) | |
| 5824000 | | | | | | | |
| 5825000 | $TERM-IOR | | \ LOAD RETURN | \ | 59C | E56F | |
| 5826000 | | | LRA ($TERM-CL2) | ; | | | |
| 5827000 | | | | | | | |
| 5828000 | $TERM-NOR1 | | \CLEAR ACU | \ | 59D | 600E | |
| 5829000 | | | ZER | ; | | | |
| 5830000 | | | | | | | |
| 5831000 | $ | | \RESET BUS CYCLE BYTE | \ | 59E | 4020 | |
| 5832000 | | | CYC | ; | | | |
| 5833000 | | | | | | | |
| 5834000 | $ | | \ READY BIT TO ACU | \ | 59F | 783E | |
| 5835000 | | | XFA AAD2 | ; | | | |
| 5836000 | | | | | | | |
| 5837000 | $ | | \ MASK READY BIT | \ | 5A0 | 8204 | |
| 5838000 | | | ACN CNST(80#) | ; | | | |
| 5839000 | | | | | | | |
| 5840000 | $ | | \ ADDRESS STATUS UPPER | \ | 5A1 | 8C60 | |
| 5841000 | | | SSPAI LOC(STS1) | ; | | | |
| 5842000 | | | | | | | |
| 5843000 | $ | | \ RESTORE STS1 | \ | 5A2 | A200 | |
| 5844000 | | | MWT | ; | | | |
| 5845000 | | | | | | | |
| 5846000 | $ | | GTO ($STORE-CTRS) | ; | 5A3 | F538 | |
| 5847000 | | | | | | | |
| 5848000 | SKIP HOF | | | ; | | | |

| MODEL: MPDC-REV3D | | | | RTL/6000 FILE EDIT | | 08/01/77 | 12.605 PAGE: 152 |
|---|---|---|---|---|---|---|---|
| REVISION: 000.00 | | | | MICROPROGRAM SECTION | | DOC.#: | |
| LINE # | | | SEQUENCE: $SUPCS | | ADDRESS (HEX) | IMAGE (HEX) | |
| 5849000 | $SEEK-ERR | | \ SET SEEK ERROR BIT 2 | \ | 5A4 | 8080 | |
| 5850000 | | | LCN CNST(20#) | ; | | | |
| 5851000 | | | | | | | |
| 5852000 | $ | | \ ADDRESS STATUS LOWER | \ | 5A5 | 8C61 | |
| 5853000 | | | SSPAI LOC(STS2) | ; | | | |
| 5854000 | | | | | | | |
| 5855000 | $ | | \ SAVE PREVIOUS BUS ERRORS | \ | 5A6 | 643A | |
| 5856000 | | | ORR ASPM | ; | | | |
| 5857000 | | | | | | | |
| 5858000 | $ | | \ RESTORE STS2 AND ADDRESS STS1 | \ | 5A7 | A20B | |
| 5859000 | | | WDA | ; | | | |
| 5860000 | | | | | | | |
| 5861000 | $ | | \ READY BIT TO ACU | \ | 5A8 | 783E | |
| 5862000 | | | XFA AAD2 | ; | | | |
| 5863000 | | | | | | | |
| 5864000 | $ | | \ MASK READY BIT | \ | 5A9 | 8204 | |
| 5865000 | | | ACN CNST(80#) | ; | | | |
| 5866000 | | | | | | | |
| 5867000 | $ | | GTO ($TERM-CL1) | ; | 5AA | F58E | |
| 5868000 | | | | | | | |
| 5869000 | $SEEK-ILL | | \ SET READY AND ILLEGAL SEEK | \ | 5AB | 820B | |
| 5870000 | | | LCN CNST(84#) | ; | | | |
| 5871000 | | | | | | | |
| 5872000 | $ | | \ ADDRESS STATUS UPPER | \ | 5AC | 8C60 | |
| 5873000 | | | SSPAI LOC(STS1) | ; | | | |
| 5874000 | | | | | | | |
| 5875000 | $ | | \ STORE STATUS | \ | 5AD | A200 | |
| 5876000 | | | MWT | ; | | | |
| 5877000 | | | | | | | |
| 5878000 | $ | | GTO ($STARTINTPT) | ; | 5AE | F33F | |
| 5879000 | | | | | | | |
| 5880000 | SKIP HOF | | | ; | | | |

| MODEL: MPDC-REV3D | | | | RTL/6000 FILE EDIT | | 08/01/77 | 12.605 PAGE: 153 |
|---|---|---|---|---|---|---|---|
| REVISION: 000.00 | | | | MICROPROGRAM SECTION | | DOC.#: | |
| LINE # | | | SEQUENCE: $SUPCS | | ADDRESS (HEX) | IMAGE (HEX) | |
| 5881000 | $UNUSED | | CSNF  \CONTROL STORE NO OP FILLER | \; | | | |
| 5882000 | | | | | | | |
| 5883000 | $ | | (5FA#)\HALT- IF RETURN FAILS | \ | 5FA | 0040 | |
| 5884000 | | | HLT | ; | | | |
| 5885000 | | | | | | | |
| 5886000 | $BLT-LRA002 | | (5FB#)\DECREMENT ACU | \ | 5FB | 607C | |
| 5887000 | | | DEC AACU SR1A | ; | | | |
| 5888000 | | | | | | | |
| 5889000 | $BLT-LRA003 | | (5FC#)\DECREMENT ACU | \ | 5FC | 607C | |
| 5890000 | | | DEC AACU SR1A | ; | | | |
| 5891000 | | | | | | | |
| 5892000 | $BLT-LRA004 | | (5FD#)\DECREMENT ACU | \ | 5FD | 607C | |
| 5893000 | | | DEC AACU SR1A | ; | | | |
| 5894000 | | | | | | | |
| 5895000 | $ | | (5FE#)\ | \ | 5FE | F05B | |
| 5896000 | | | GTO ($BLT-LRA001) | ; | | | |
| 5897000 | | | | | | | |
| 5898000 | $UPCS-LRC | | (5FF#)\LRC WORD FOR PROM SCAN | \ | 5FF | 37DB | |
| 5899000 | | | LONGPAR (0,5FE#,EVEN) | ; | | | |
| 5900000 | | | | | | | |
| 5901000 | | | | | | | |
| 5902000 | SKIP HOF | | | ; | | | |

MODEL: MPDC-REV3D
REVISION: 000.00

RTL/6000 FILE EDIT
MICROPROGRAM SECTION

08/01/77    12.005   PAGE: 154
DOC.#:

LINE #
5903000
5904000  \ THAT'S IT . THERE IS NO MORE .

SEQUENCE: SSUPCS

ADDRESS  IMAGE
(HEX)    (HEX)

THERE ARE NO SEVERE MESSAGES IN THE ABOVE FILE.
THERE ARE NO WARNING MESSAGES IN THE ABOVE FILE.

SNUMB = 2165T, ACTIVITY # = 04, , REPORT CODE = 74, RECORD COUNT = 000143

2165T 04 08-01-77   12.742                                                                                      PAGE    1

ORIGIN   DATE  MODULE  ENTRY LOCATION    ENTRY LOCATION    ENTRY LOCATION    ENTRY LOCATION    ENTRY LOCATION

SUBPROGRAMS INCLUDED IN DECK.

$   OPTION FORTRAN                                                      00000050
                       $   LIBRARY L1                                                          00000060
060332 00/00/00 CSLT  ...... 060332
         BLOCK COMMON     .DATA. 053260   MEM    053234    C99    053164
053012 00/00/00 NXTC  NXTCHR 053012
         BLOCK COMMON     .DATA. 052660   MEM    053234
052624 00/00/00 INTV  INTVAL 052624
                           .DATA. 052614
034660 10/08/76 CSLS  DSREAD 034660       CHKDB  034703    CSLSHT 034714    STSRT  034715
         BLOCK COMMON     .SMA   034656   .SMB   034654    .SMC   034652    MEM    053234
026630 11/03/76 RIOS  RIOS   026640       FSCORE 026640    ACCES  027022    ACCESS 027022    IBLKZ  026716
                       OPGDS  027277      CRARY  027554    OPARY  027670    GTARY  027751    PTARY  027754
                       RDBLK  030074      WTBLK  030077    MDARY  030147    ENARY  030303    CLARY  030327
                       DLARY  030344      ENGDS  030453    SVGDS  030466    RSGDS  030575    RLGDS  030707
                       CLGDS  030711      FWRAP  030727    CORES  033054    CORER  033143    WTTY   033427
024460 05/04/77 EXEC  OPDB   024460       CLDB   024617    NEWSYS 024675    NEWTOC 025024    FINTOC 025032
                       CHGNAM 025364      ACCCB  025373    CHGCB  025402    NEWARY 025600    FINARY 025770
                       GETNAM 026200      CAINIT 026254
         BLOCK COMMON    C99    053164

SUBPROGRAMS OBTAINED FROM USERS  LIBRARY    L1
024332 02/04/77 CSLC  BTANLR 024332       BTANRL 024334    BTINLR 024336    BTINRL 024340    BTMVLR 024342
                       BTMVRL 024344      BTORLR 024346    BTORRL 024350    BTXRLR 024352    BTXRRL 024354
                       KMPB   024356
024240 07/21/76 OOOO  .SVREG 024240       .NXTAD 024250    .MPTLY 024251    .PARAM 024252    .PMTLY 024276
                       .IPRAM 024277      .IP.01 024306
024064 10/18/76 MLRM  CHMVLR 024064       CHMVRL 024067    KMPC   024072

SUBPROGRAMS OBTAINED FROM SYSTEM LIBRARY 024030 74/01/11 FCRA  CREATE 024030
023724 06/14/72 FDTM  DATIM  023727
023542 01/10/73 F1XP  .FXP1  023542
022430 75/02/14 FRDB  .FRDB. 022763       .FWRB. 022522    .FBLT. 023256    .FBDT. 023242    .FRLR. 023144
                       .FWLR. 023174      .FBBC. 023107    .FBBCA 023105
022102 75/03/21 FRDD  .FRDD. 022292       .FWRD. 022253    .FPUN. 022254    .FENC. 022255    .FDEC. 022256
                       .FRCD. 022257      .FPRN. 022260    .FRTN. 022261    .FFIL. 022262    .DBCNV 022263
                       .BDCNV 022305      ..ABLK 022115    .QCOMP 022144    .LNSZ  022154    ..A37R 022253
                       .PRNIT 022117      .ASTRK 022424    ..TC   022121    .POINT 022141    .SIGN  022142
                       .FRMTR 022324      .FRMTZ 022324    .PUINT 022120    .FILL  022152    ..A2   022106
                       .FXMC. 022103      ..A7   022150    ..A1   022106    ..A3   022116    ..A4   022146
                       ..A8   022152      ..A9   022155    ..A13  022156    ..A14  022157    ..A15  022160
                       ..A17  022161      ..A18  022106    ..A21  022164    ..A24  022106    ..A30  022323
                       ..A31  022175      ..A27  022172    ..A32  022220    ..A33  022222    ..A34  022223
                       ..A35  022224      ..A37  022245    ..A51  022104    ..A52  022102    .LPRCH 022110
                       .CMACH 022111      .ECHR  022112    .OCT60 022107    .UPPRT 022113    .UPPRF 022114
                       .LWRT  022113      .LWRF  022114    .RCWIB 022174
016416 75/02/14 FDIO  .FRD   021261       .FWRT  021173    .FPN   021166    .FNC   021410    .FDC   021441

2165T 04 08-01-77   12.742                                                                                      PAGE    2

ORIGIN   DATE  MODULE  ENTRY LOCATION    ENTRY LOCATION    ENTRY LOCATION    ENTRY LOCATION    ENTRY LOCATION

.FCD   021261   .FPR   021173    .FFL   021373    .FRT   021352    .IOI   021025
                                .IOS   021120   .LBCTR 022007    .EFDBC 022072    .FCNVI 017217    .FCNVR 017226
                                .FCNV2 017312   .SKPB1 017176    .INCTR 022074    .CKSTA 017421    .FMSC1 016451
                                .FMSC2 016437   .FMSC4 016454    .FMSC5 016511    .FMSC6 016463    .EFFLG 022073
                                .SVRG  016422   .RETIN 016435    .GTARG 021203    .SXIT  016526    .LNBGN 021467
                                .SKPB4 017205   .VLIST 017132    .CSCFP 016544    .CFFAD 016534    .FEFLT 016616
                                .FDFLT 016615   .CSLSH 021010    .CDCPT 017321    .CSCFM 016542    .CCMMA 016560
                                .CRPAR 016654   .CLPAR 016620    .LBUFF 022010    .SKPB3 017213    .CKSTP 017402
                                ..CKST 017413   .DATUM 021772    ..STOP 017614    .VCOMA 020244    ..CCR  020257
                                .CN1   017436   .FWSZ  022061    .FCNV  017216    .STP   017607    .FCNVD 017235
                                .FCNVL 017245   .FCNVC 017254
016342 74/01/11 FEOF  .FEOF. 016342
016176 74/07/22 FSLW  .FSLEW 016176
015774 09/01/73 FEFT  .FEFT. 015774       .FRWT. 016001    .FEFTS 016006
015450 09/01/73 FXEM  FXEM   015461       .FXEM. 015460    .F.XE  015471    F.XMC  015620    .TAB1  015750
                       .LSTMS 015760      .KIND  015574    .BUGG  015573    .MXERR 015462    ..FX1  015464
                       ..FX2  015506      ..FX3  015514    .FX10  015603    .LRG   015530    ..FX8  015514
                       ..FX9  015505      .CLLR  015724    .EYDEE 015726    ..FX4  015516    ..FX5  015515
                       ..FX6  015561      ..FX7  015610
014270 75/02/14 FXEH  .FXM.  014310      F.XM   014757    ANYERR 015126    FXOPT  015010    FXDVCK 015050
                       .FGEHR 015001      FXALT  015065    .FXALT 015077    S.REG. 014300    .FERTN 014756
                       FXDV   015406      FXFDV  015404    FXCODE 014734    .TSMS  015101    .MSX   015105
                       .FXPNT 014635      .FATRC 014577    .FXSW1 014736    .FXSW2 014742    .FXSW3 014746
                       ERRLK  015134      .FLTPR 015136
014210 73/05/24 FxIT  .FEXIT 014210      EXIT   014210    .JEXIT 014210    JEXIT  014210
013420 74/11/06 FOPE  .FOPEN 013447      .FBAD. 013442    .FUFTB 014132    .FXOP. 013671    .FGTFB 013443
                       .FJOV. 013445
013162 07/04/65 FDPT  .FIDO. 013276
012764 08/25/72 FCOM  .FCOM. 012776       .FCOMA 012773    .FCOM  013060
012646 08/28/72 FCHA  .FCHMA 012652      .FCHM. 012654    .FCHM  012655
012522 73/09/05 FSTU  .FSETU 012547      .SETU. 012547    .RCOV  012536    FPARAM 012522    .FMDB. 012537
                       .FTL   012545      .FLTX1 012545    .LINSZ 012540
012520 73/09/03 FBCD  .ASCB. 012520       .ASCB  012520
012500 12/14/72 FMDE  MODE   012500
012276 03/05/73 FTAB  .GTAB. 012276
012272 74/10/24 FMXN  .MXNO  012272       .NMXNO 012273    .GFLG  012274    .FRENT 012275
012172 07/23/71 GRED  .GREAD 012172       .GAREA 012172    READ   012172
012074 07/23/71 GWRT  .GWRIT 012074       .GAWRI 012074    WRITE  012074
012012 01/03/66 GWAI  .GWAIT 012012       .GAWAI 012012    WAIT   012012
011762 01/03/66 GSTI  .GSTIN 011762       SETIN  011762
011666 01/03/66 GSTO  .GSTOT 011666       SETOUT 011666
011530 74/07/22 GCRE  .GCREA 011536
011460 07/07/69 GWRC  .GWTRC 011460       .GAWTR 011460    WTREC  011460
010724 75/01/15 GGTB  .GGTRB 010724       GETBK  010724    .GGET  010726    GET    010726    .GAGTB 010724
                       .GAGET 010726      .GROOT 010730
010716 07/07/69 GRMT  .GOPNP 010716       .GCLSR 010716    .GGETR 010716    .GPUTR 010716
010154 75/03/21 GPTB  .GCOPY 010154      COPY   010154    .GPTBK 010157    PUTBK  010157    .GPUT  010162
                       PUT    010162      .GACOP 010154    .GAPTB 010157    .GAPUT 010162    .GFR67 010671
                       .GPSAV 010165
010056 01/03/66 GPSZ  .GPTSZ 010056       .GAPTS 010056    PUTSZ  010056

```
2165T 04  08-01-77  12.742                                                                                    PAGE    3

ORIGIN   DATE    MODULE  ENTRY LOCATION     ENTRY LOCATION     ENTRY LOCATION     ENTRY LOCATION     ENTRY LOCATION 007262 75/02/05 GOPE  .GOPEN 007262    .GAOPE 007262    OPEN   007262
  007254 04/29/72 GRNT  .GXREA 007254    .GXWRT 007254    .GXLAB 007254    .GXOPN 007255
  006564 74/12/06 GCLO  .GCLSE 006564    .GACLS 006564    .GH185 006674    .GR186 006774    .GH178 006701
                        CLOSE  006564    .GBCLS 006564
  006464 07/07/69 GREL  .GRLSE 006464    .GARLS 006464    RELSE  006464
  006300 73/12/03 G20R  .GR200 006300
  006212 75/01/08 G25R  .GR225 006212
  006136 04/25/73 G50R  .GR250 006136
  005664 75/02/03 G27R  .GR275 005664
  005502 75/02/05 G37R  .GR377 005540    .GR375 005502    .GH37X 005557    .GR390 005577
  005460 74/12/03 G60R  .GR960 005465    .GABTB 005460
  005064 75/02/05 G80R  .GR980 005064    .GR979 005167    .GR99X 005070    .GR984 005135    .GR985 005167
                        .GR999 005103    ASCII  005165    ASCRPT 005172    NORKPT 005452
  005032 75/04/11 G90R  .GR990 005032    .GR991 005053
  004172 04/29/72 GLAB  .GINHD 004177    .GOUTH 004176    .GINTL 004175    .GOUTL 004174    .GUSWH 004173
                        .GOVRL 004200    .GLREA 004270    .GRCVY 004172    .GRPRV 004227
  004170 03/07/66 GINI  .GINID 004170
  003754 74/12/04 GCVT  .GATDB 004052    .GBTOA 003757    BCDASC 003757    ASCBCD 004052    .GATB. 004127
                        .GBTA. 004152
  003360 74/03/15 SMAA  .SRPT  003366    .SEC   003366    .SABRT 003730
                                           RANGE                 SIZE
                        ALLOCATED CORE   000000 THRU 063777    064000
                        RELOCATABLE      003360 THRU 063777    060420
              $    PRMFL    L1.R.R.DALIB/LIBRARY/USERLIB                              00000000
              $    FILE     GD.R1S                                                    00000000
              $    FFILE    11.LODENS.FIXLNG/20.BUFSIZ/21.NLABEL.NOSRLS               00000000
              $    TAPE     11.SID..F.CSL                                             00000000

FCB AND BUFFER SPACE
                 AVAILABLE        000101 THRU 003357    003257
                 FILE CTRL BLKS   003202 THRU 003360    000157
                 MAXIMUM BUFFER SPACE REQUIRED          00123C

26K. IS THE MINIMUM MEMORY NEEDED TO LOAD THIS ACTIVITY WITH ALL FILES OPEN   740808 2/H
              001532 LOCATIONS REQUIRED FOR LOAD TABLE
              EXECUTION PROGRAM ENTERED AT  060332   THROUGH  .FSETU
FILE RTLDB         HAD 000000 PUTS AND 004119 GETS
FILE CODE GD  HAD  000018 READS AND  000000 WRITES.

SNUMB = 2165T, ACTIVITY # = 04., REPORT CODE = 52, RECORD COUNT = 001017
```

RTL/6000 CSL PROGRAM                              08/01/77   12.748  PAGE   1
                                           DIRECTIVE REPORT

*** ROM IMAGES WILL BE PROCESSED
*** ALL ROMS ON ALL DATA BASES WILL BE PROCESSED

```
MPDC-REV5D              00.000                  RTL/6000 CSL PROGRAM                       08/01/77    12.748  PAGE  2
                                                LISTING BY ADDRESS                         UNNAMED MAIN ROM 8000 0000    0001 0098    0002 4086    8003 C08A    0004 C04A    8005 0040    8006 F009    0007 0040    0008 0040
8009 C086    800A C048    000B 0040    800C C08A    000D C04E    000E 0040    800F C076    0010 0040    8011 0800
8012 C046    0013 C088    8014 0040    0015 C04A                                                                      0001

0016 C08E    8017 0040    8018 C076    0019 C080    001A 0040    8018 0010    001C 4086    8010 4004    801E 603E
001F C086    0020 0040    8021 6002    8022 C088    0023 0040    8024 6000    0025 C046    0026 C08A    8027 0040
8028 603C    0029 C088    002A 0040    802B 8800                                                                      0002

002C 8001    802D 6C6B    802E 6C6B    002F 6C6B    8030 6C6B    0031 6C6B    0032 6C6B    8033 6C6B    0034 687E
8035 C086    8036 0040    0037 686A    0038 0000    8039 681A    803A 602A    003B C086    803C 0040    003D 683E
003E 8866    803F 0000    0040 687E    8041 C088                                                                      0003

8042 0040    0043 686A    8044 0000    0045 6826    0046 602A    8047 C088    8048 0040    0049 683E    004A 685A
804B 8C5B    004C C086    804D 0040    804E 6030    004F C086    8050 F02D    0051 CC91    0052 0040    8053 800B
0054 E05B    8055 E5FD    8056 E5FC    0057 E5FB                                                                      0004

0058 C200    8059 0040    805A 0040    005B 607C    805C C086    005D 0040    005E 83EB    805F 6C6B    8060 6C6B
0061 6C6B    0062 6C6B    8063 83E9    0064 6C6B    8065 83E8    8066 6C6B    0067 6C6B    0068 8020    8069 4020
806A 8BE9    006B 83EB    806C 4040    006D 687C                                                                      0005

006E 80FC    806F C04A    0070 F06C    8071 C060    8072 0040    0073 4040    8074 C0A0    0075 0040    0076 83EB
8077 8BE9    0078 4040    0079 687C    007A 80FC    807B C062    007C 0040    807D C04A    807E F078    007F 4040
0080 0000    8081 C0A2    8082 0040    0083 4100                                                                      0006

8084 0000    0085 C078    0086 0040    8087 4100    8088 0000    0089 6C3F    008A 6C3F    8088 6C3F    008C 6C3F
8080 8C3F    808E 8C3B    008F 6C3B    8090 C0A6    0091 0040    0092 8800    8093 8000    0094 A030    8095 6C5A
8096 C086    0097 0040    0098 6000    0099 C09A                                                                      0007

809A 8094    009B 0010    809C 8800    009D 4030    009E 8C00    809F AE00    80A0 6C00    00A1 A030    00A2 C09A
80A3 809F    00A4 6D1A    80A5 C086    80A6 0040    00A7 6C3C    00A8 A030    80A9 C09A    80AA F0A4    00AB E0AD
80AC 81F1    00AD 0010    00AE 8800    80AF A080                                                                      0008

00B0 E0C6    80B1 E0B4    80B2 E0B4    00B3 E0B4    80B4 83EB    00B5 A200    80B6 683E    80B7 A100    80B8 612A
00B9 C046    00BA 80B7    80BB C088    00BC 0040    80BD 681A    80BE C086    00BF 0040    80C0 A300    00C1 0000
00C2 087E    80C3 C086    00C4 F0B4    80C5 C200                                                                      0009

80C6 0010    80C7 0010    00C8 8800    80C9 A080    80CA AA00    00CB 611A    80CC C086    00CD 0040    00CE A100
80CF 0040    00D0 C0A6    80D1 F0CA    80D2 A008    00D3 603C    80C4 611A    00D5 C086    00D6 0040    80D7 C0A6
80DA 80D2    00D9 0010    00DA 8800    80DB A080                                                                      0010

00DC 83EB    80DD 686A    80DE 6D6B    00DF A008    00E0 6D6B    80E1 A008    80E2 6D6B    00E3 A008    80E4 6D6B
80E5 A008    00E6 6D6B    80E7 A008    00E8 6D6B    00E9 A008    00EA 6D6B    80EB A008    00EC 6C5B    80ED C086
80EE 0040    00EF 603C    80F0 611A    00F1 C086                                                                      0011

00F2 80EC    80F3 C0A6    00F4 F0DE    80F5 0010    80F6 C050    00F7 C090    00F8 0000    80F9 8800    80FA 9800
00FB 746B    80FC A080    00FD 0068    00FE 4040    80FF 83EB    0100 686A    8101 716A    8102 A008    0103 716A
8104 A100    0105 9802    0106 0600    8107 603E                                                                      0012

8108 7C7F    0109 0000    010A C080    810B 0040    010C 681A    810D C086    810E 0040    010F A008    8110 9802
0111 0600    0112 603E    8113 7C7F    0114 0000    8115 C040    8116 0040    0117 681A    0118 C086    8119 0040
811A A008    011B 784E    811C C0A6    011D F101                                                                      0013
```

MPDC-REV3D 00.000 RTL/6000 CSL PROGRAM LISTING BY ADDRESS 08/01/77 12.748 PAGE 3
UNNAMED MAIN ROM

```
011E 9800  811F 0010  8120 4020  0121 8800  0122 A024  8123 E131  0124 4084  8125 646B  8126 686B
0127 6C6B  0128 6C6B  8129 6C6B  812A 8300  012B 4020  812C C0AE  012D F12C  012E 0002  812F 643F
0130 C200  8131 6838  8132 603B  0133 603B                                                           0014

8134 603B  0135 602A  0136 C086  8137 0040  8138 83EB  0139 E13B  013A F124  813B 682F  013C 602F
813D 602F  813E 602F  013F 602A  8140 C088  0141 0040  0142 600E  8143 4084  0144 6457  8145 6857
8146 E148  0147 F127  0148 E158  0149 600E                                                           0015

814A 6C6B  014B 6C6B  814C 6C6B  014D 646B  014E 686B  814F 6057  0150 6057  8151 8340  8152 4020
0153 C0AE  8154 F153  0155 0002  0156 643F  8157 C200  8158 682F  0159 602F  015A 602F  815B 601B
015C 602A  815D C088  015F 83EB  015F 0040                                                           0016

0160 4084  8161 E163  8162 F14A  0163 683B  8164 603B  0165 603B  0166 6027  8167 602A  8168 C086
0169 0040  016A 0010  816B C050  016C C090  816D 0000  816E 4020  016F 9800  8170 4084  0171 8800
0172 0088  8173 744F  0174 A024  8175 A080                                                           0017

8176 8BEB  0177 6C6B  0178 6C6B  8179 6C6B  817A 6C6B  017B 6C6B  817C 6C6B  017D 6C6B  017E 4040
817F 8182  8180 4084  0181 4020  0182 C0AE  8183 F182  0184 0002  8185 656B  8186 A008  0187 696B
0188 A008  8189 C0AE  818A F189  018B 0002                                                           0018

818C 600E  018D C042  018E F182  818F 746B  0190 4020  8191 9408  8192 9808  0193 8182  8194 0601
0195 4020  0196 C0BC  8197 F196  0198 C086  0199 F198  019A 600E  819B 784E  019C 4084  819D 4020
819E 8040  019F 6864  01A0 9420  81A1 9802                                                           0019

81A2 8108  01A3 0600  81A4 4020  01A5 C0AE  01A6 F1A5  81A7 0002  81A8 651B  01A9 C086  01AA 0040
81AB A008  01AC 6918  81AD C086  81AE 0040  01AF A008  81B0 600E  81B1 4020  01B2 C040  81B3 F1A2
81B4 9800  81B5 0088  81B6 C0A6  0187 F17F                                                           0020

01B8 A020  8189 4084  81BA 0010  01BB 4020  81BC 4084  01BD 0088  01BE 80EA  81BF 6C6B  01C0 600E
81C1 6C6B  81C2 6C6B  01C3 8800  81C4 8008  01C5 A300  01C6 600E  81C7 A200  81C8 8800  01C9 656B
01CA A100  81CB 696B  01CC 4084  81CD 8380                                                           0021

81CE 4020  01CF 0000  81D0 C042  01D1 F1D0  01D2 8028  81D3 603C  01D4 C086  81D5 F1D3  81D6 603F
01D7 8204  01D8 611A  81D9 C086  01DA 611A  01DB A008  81DC 603F  01DD 611A  01DE C046  81DF F1E9
81E0 8801  81E1 8200  01E2 6164  81E3 A208                                                           0022

01E4 6480  81E5 A200  81E6 C046  01E7 0040  01E8 F1C8  81E9 0010  81EA 4020  01EB 4084  81EC 0088
01ED 0010  01EE 0098  81EF 0004  01F0 E1FA  81F1 0010  81F2 8800  01F3 A080  01F4 A300  01F5 0000
01F6 C0A6  81F7 F1F4  81F8 0010  01F9 C200                                                           0023

01FA A030  81FB 8CEB  01FC A200  81FD 6000  81FE C09A  01FF F1FA  0200 600E  8201 F205  8202 6C00
0203 C05A  8204 F21D  0205 A030  0206 0088  8207 746B  8208 7C4F  0209 8CEB  020A 706A  820B 8C8A
020C 8083  820D A300  820E B600  020F 8CE9                                                           0024

8210 80E9  0211 A200  0212 8CEA  0213 BA00  0214 C490  8215 F21B  8216 8C60  0217 8200  0218 A200
8219 E202  821A F3F1  021B 4018  821C F202  021D 4002  021E C0BC  821F F227  0220 4004  0221 A020
0222 C072  8223 F287  0224 8BE9  8225 4430                                                           0025

8226 C200  0227 C040  0228 F220  8229 C068  822A F21D  022B C074  822C F25A  022D 4004  022E 8000
822F C072  0230 F21E  8231 8BEA  8232 643E  0233 C086  8234 F27D  0235 A030  0236 8CEB  8237 706A
8238 8CEA  0239 8604  023A 8C60  023B 643A                                                           0026
```

MPDC-REV3D 00.000 RTL/6000 CSL PROGRAM LISTING BY ADDRESS 08/01/77 12.748 PAGE 4
UNNAMED MAIN ROM

```
023C A200  823D 8CEA  823E 643E  023F BA00  8240 611A  0241 C086  0242 F28A  8243 6C00  0244 C09A
8245 F235  0246 8BEB  0247 643E  0248 C086  8249 F2AC  824A 600E  024B 8C88  824C A030  024D C458
024E F33F  824F 6C00  0250 C09A  8251 F24C                                                           0027

8252 F21D  0253 C040  8254 F257  0255 C08C  0256 F21D  8257 8BE9  8258 A430  0259 C200  025A 4004
8258 8000  825C C072  825D F21E  825E 4001  025F A030  0260 8C88  8261 C490  8262 F279  0263 8C03
8264 8704  0265 6C6B  8266 8C02  8267 606B                                                           0028

8268 6C4F  0269 8CA8  026A 696B  826B 8CA0  026C 656B  826D 4084  826E 8200  026F 4020  8270 C076
0271 F278  0272 C08E  8273 F270  0274 8C88  8275 600E  8276 A200  0277 4018  0278 4084  8279 6C00
827A C09A  027B F25F  827C F231  027D 603C                                                           0029

027E A200  827F 8BE9  8280 696A  0281 A100  0282 0000  8283 8807  0284 C490  8285 F281  8286 85EF
8287 A200  0288 A830  8289 F366  828A C052  828B F2A4  828C C454  828D F29E  028E C492  828F F2A4
0290 8C88  8291 C45A  8292 F3E7  0293 C496                                                           0030

8294 F2A2  0295 87AF  0296 A200  8297 8C0A  8298 C454  0299 F382  829A 8C89  829B C454  029C F382
829D F33F  829E 8C88  029F C496  02A0 C45A  82A1 F5A4  82A2 4018  82A3 8CEA  82A4 C050  02A5 F2A9
02A6 C450  82A7 F596  82A8 F243  02A9 C450                                                           0031

02AA F243  82AB F596  02AC 603C  82AD A200  02AE 88E9  02AF 696A  82B0 A100  02B1 0000  02B2 8807
82B3 C492  02B4 F2B0  02B5 86EF  82B6 F287  02B7 C044  02B8 F326  82B9 8CA1  82BA A201  02BB 84EE
82BC 8CA0  02BD A201  02BE 6C6A  82BF A701                                                           0032

02C0 AA01  82C1 8021  82C2 681A  02C3 C086  82C4 F2D0  02C5 8CA1  02C6 8000  82C7 C452  82C8 8200
02C9 8C89  02CA A200  82CB C201  02CC A201  82CD C0BA  82CE F33D  02CF F2B8  82D0 C0BA  02D1 F2DC
02D2 8003  82D3 681A  02D4 C086  82D5 F2D8                                                           0033

82D6 A208  02D7 A200  02D8 8C61  82D9 8412  82DA A200  02DB F321  82DC 8001  02DD 681A  02DE C086
82DF F2E6  82E0 A008  82E1 C450  82E2 1000  82E3 C452  02E4 F309  82E5 F33D  82E6 800B  02E7 681A
02E8 C086  82E9 F33D  82EA 4010  02EB 8C88                                                           0034

82EC 8100  02ED A200  02EE 8C61  82EF C45C  02F0 F2D8  82F1 4084  82F2 600E  82F3 A208  82F4 A200
02F5 8C0A  02F6 C450  02F7 C454  82F8 F301  02F9 88EB  02FA 6400  02FB A200  02FC 6C3E  82FD 686A
82FE 8510  02FF A200  8300 F33D  0301 8BEA                                                           0035

0302 6400  8303 A200  0304 6C3E  8305 686A  8306 8610  03C7 A200  0308 F330  8309 8BE9  830A C0AB
030B F310  830C 601A  030D C086  030E F310  830F F59C  0310 6C3E  8311 686A  8312 600E  0313 C450
8314 F318  0315 C452  0316 F310  8317 F321                                                           0036

8318 A200  0319 8BEA  031A 643C  831B A200  031C F321  831D A200  831E 88EB  031F 643C  0320 A200
0321 4084  8322 8C88  0323 8430  8324 A200  0325 F253  8326 603F  8327 80EE  8328 6C6A  0329 616B
032A A100  832B 616B  832C 8240  032D 4020                                                           0037

832E 8061  032F 681A  8330 C086  0331 F336  0332 8BEB  8333 A208  0334 86EF  8335 A200  8336 C04E
0337 F33D  0338 C0B6  8339 F336  833A 8C61  833C A200  033D 4084  033E F253  033F 8C03
0340 84EF  8341 602A  8342 C046  0343 F63F                                                           0038

8344 8CAB  0345 A200  0346 8C03  8347 8704  8348 6C6B  0349 8C02  034A 6D6B  834B 6C4F  034C 8CA1
834D 8704  834E 8CA8  034F 643A  8350 A200  0351 686B  0352 8CA0  8353 656B  0354 4084  8355 8200
8356 4020  0357 C04E  0358 F360  8359 C0B6                                                           0039
```

```
MPDC-REV3D              00.000                    RTL/6000 CSL PROGRAM              08/01/77    12.748  PAGE   5
                                                  LISTING BY ADDRESS
                                                  UNNAMED MAIN ROM

835A F357    035B 8C88    835C 8610    035D A200    035E 4010    835F F364    8360 8C88    0361 600E    0362 A200
8363 4018    0364 4084    8365 F21D    0366 8C89    0367 8604    036B A200    8369 8CEB    836A 706A    036B E21D
836C 8C0A    036D C452    036E F382    836F D890                                                                         0040

0370 F33F    8371 C490    8372 F383    0373 8CEB    8374 87E7    0375 A200    0376 8C42    8377 6430    8378 6030
0379 8CEB    037A 643A    837B 7C6A    037C A200    837D 8C0A    837E C454    037F F360    0380 D854    8381 F5A4
8382 8BE9    0383 AE00    8384 8C89    0385 C490                                                                         0041

0386 F38B    8387 6C4F    8388 6C4F    0389 8C29    038A F38C    838B 8C2B    038C 6D6B    838D A008    838E 0000
038F C85A    8390 F38C    8391 8C21    0392 6D6B    8393 A008    8394 6D6B    8395 8C23    8396 6D6B    0397 8CA0
0398 656B    8399 8CA1    839A 8704    039B 686B                                                                         0042

839C C0A2    039D F3A0    039E C060    839F F59C    83A0 8C0A    03A1 C452    03A2 F49F    83A3 8100    03A4 C456
03AE F561    83AF F420    83B0 8C89    03B1 8490                                                                         0043

83B2 A200    03B3 8C88    83B4 8450    03B5 A200    0386 8CEB    83B7 878F    83B8 A200    0389 8C0A    03BA C454
83BB F3BE    03BC C49E    83BD F3F1    83BE D854    03BF F5A4    83C0 8C41    03C1 D45C    03C2 F3CF    83C3 832B
03C4 6418    83C5 C0A4    83C6 F5AB    03C7 8C40                                                                         0044

03C8 C45E    83C9 F5AB    83CA 8424    03CB 8C41    83CC C450    03CD 8050    03CE F3DD    83CF 8260    03D0 6418
83D1 8C40    83D2 8405    03D3 8CAA    83D4 A200    03D5 8001    03C6 6498    83D7 C04A    83D8 F5AB    03D9 8C40
03DA 8424    83DB C45E    03DC 8050    83DD 8CEB                                                                         0045

83DE 643A    03DF A200    03E0 7C6A    83E1 8C41    83E2 643E    03E3 D49C    83E4 6030    03E5 746A    03E6 F3F5
33E7 87E7    83E8 A200    03E9 600E    03EA 8C40    83EB A300    03EC A300    83ED A300    83EE A200    03EF E21D
83F0 F3BE    03F1 9880    03F2 8C88    83F3 841B                                                                         0046

03F4 A200    83F5 786B    83F6 8CEA    03F7 B6EF    03F8 A200    83F9 786B    83FA 9800    03FB C200    83FC 8C89
03FD C490    03FE F4E7    83FF 8309    0400 8C0A    8401 C45C    8402 8050    0403 786A    8404 7468    0405 93E2
0406 92A2    8407 9401    8408 E411    0409 E525                                                                         0047

040A 81A2    840B C088    040C 8182    040D C080    840E C200    040F 0601    8410 F504    0411 93E9    0412 9369
8413 8C09    0414 756A    8415 9A09    8416 E618    0417 F21D    0418 C062    8419 F41D    841A C06A    041B F57D
841C F3FF    041D C0AA    041E F41D    041F F59C                                                                         0048

8420 746B    0421 93E2    0422 92A2    0423 8C40    0424 716A    8425 A100    8426 716A    0427 A100    0428 716A
8429 A100    842A 716A    042B 9401    842C 8228    042D 8C89    042E C490    842F 8222    0430 786A    8431 E433
8432 F21D    0433 DC9C    8434 F43A    0435 DC9E                                                                         0049

0436 F420    8437 8C60    8438 8611    0439 F58E    043A C06A    843B F57D    043C 7C3E    843D C086    843E F44E
043F 704F    8440 8C89    0441 C490    0442 F543    0443 93E9    0444 9369    8445 8C09    0446 756A    0447 8C0A
0448 8308    8449 C45C    844A 8358    044B 786A                                                                         0050

844C E453    044D F409    044E 8024    044F 8C60    0450 643A    8451 A200    8452 F420    0453 8C43    8454 6400
0455 A200    0456 8C09    8457 8060    0458 C06A    0459 8028    045A 8C43    845B 641A    045C C046    845D F482
845E E420    045F C062    0460 F59C    0461 8C89                                                                         0051

8462 C490    0463 F538    8464 8C09    0465 C450    0466 F473    0467 8001    0468 8C28    0469 6418    046A A200
846B 8001    046C 8C20    846D 6424    846E A200    046F 8C23    0470 6480    0471 A200    0472 C200    8473 8100
0474 8C29    8475 641B    8476 A208    0477 8002                                                                         0052

MPDC-REV3D              00.000                    RTL/6000 CSL PROGRAM              08/01/77    12.748  PAGE   6
                                                  LISTING BY ADDRESS
                                                  UNNAMED MAIN ROM 0478 6498    8479 A200    847A 8100    047B 8C21    847C 6424    047D A208    047E 8002    847F 64A4    8480 A200
0481 F46F    0482 C062    8483 F59C    0484 600E    8485 A208    8486 8001    8487 641A    0488 A208    8489 C05E
848A F49A    048B 6400    848C A208    048D 6480                                                                         0053

048E A200    848F 8C89    0490 8490    0491 82EF    0492 A200    0493 8CEB    8494 87E7    0495 A200    0496 0088
8497 F44F    8498 E3B0    0499 F461    049A 8CEB    049C A200    849D 7C6A    849E F45E    049F C45E
04A0 F4BC    84A1 8C89    04A2 C490    04A3 F4B1                                                                         0054

84A4 F46B    04A5 9408    04A6 9808    84A7 81A2    84A8 C088    04A9 8182    04AA 0601    84AB E591    04AC E59D
84AD 4020    84AE C08C    04AF F4AE    04B0 F574    04B1 9420    04B2 9802    84B3 812B    04B4 C088    84B5 8108
84B6 0600    0487 E59C    04B8 4020    04B9 C08C                                                                         0055

84BA F4B9    04BB F519    84BC 8C28    04BD 612A    04BE C086    84BF F4E1    04C0 8C29    84C1 8041    84C2 6418
04C3 C04A    84C4 F4E1    04C5 8C89    04C6 C490    04C7 F4D3    84C8 81A2    04C9 C088    04CA 8182    84CB U180
04CC 0601    84CD 4020    84CE C0A2    04CF F4CE                                                                         0056

04D0 E592    04D1 E59D    04D2 F574    04D3 8128    04D4 C088    84D5 8108    84D6 0180    04D7 4020    04D8 E59C
04D9 0600    84DA 7C4F    04DB 0000    84DC C042    04DD F4DC    04CE C0A2    84DF F4D9    84E0 F519    04E1 B2B0
04E2 D890    84E3 8080    04E4 8C60    04E5 A200                                                                         0057

84E6 F58F    04E7 746B    04E8 C062    04E9 F59C    84EA 8C0B    04EB C490    84EC F4F0    04ED 8C89    04EE 8450
04EF A200    04F0 8303    84F1 8C0A    04F2 C45C    04F3 F4FC    04F4 786A    04F5 93E2    04F6 92A2    04F7 9401
84F8 E543    04F9 E518    04FA E51F    04FB F21D                                                                         0058

04FC F843    84FD F56D    84FE 8128    04FF C088    8500 8108    85C1 C080    0502 C200    8503 0600    0504 4020
8505 C0BC    8506 F505    8507 0000    8508 0000    8509 600E    850A C042    850B F50A    850C 4020    850D C04C
050E C200    850F 8C89    0510 C490    8511 F515                                                                         0059

8512 E40C    0513 E21D    8514 F574    0515 E4FE    0516 E21D    8517 F574    8518 E529    0519 C06C    051A C0A4
851B F574    051C 8328    051D 4020    851E F574    051F DC5C    0520 F533    8521 C080    8522 C04C    0523 F4FE
8524 F521    0525 C0AA    0526 F574    0527 E57D                                                                         0060

8528 F574    0529 600E    052A 4020    852B C06A    052C F533    852D 7C3E    852E C046    052F C200    8530 8C89
0531 C456    0532 F535    0533 E57D    0534 F538    8535 87AF    8536 A200    0537 C200    0538 8C2B    8539 AE09
853A AE09    053B AE09    853C AE01    053D 8C21                                                                         0061

053E AE09    853F AE01    0540 8C23    8541 AE01    8542 C200    0543 C062    8544 F59C    0545 8C89    0546 8784
8547 A200    8548 93E9    0549 9369    054A 8C09    054B 756A    054C 8C0A    054D C45A    854E F556    054F 9802
8550 E453    0551 C49E    0552 E4E7    0553 E518                                                                         0062

0554 E51F    8555 F21D    8556 9A02    0557 E4E7    0558 F21D    0559 DC5C    855A F55F    055B C080    855C C04C
055D F4FE    055E F55B    855F C06A    8560 F533    0561 8C0A    0562 C498    8563 F56A    0564 9A43    8565 4084
8566 E568    0567 F21D    0568 707F    8569 F565                                                                         0063

856A F800    056B F46B    856C 9862    056D 93E2    056E 92A2    856F 97EB    0570 E59C    8571 E518    8572 E559
0573 F21D    8574 C042    0575 F574    0576 8C61    8577 667A    8578 A200    0579 4084    057A 800F    857B C048
857C C200    857D D890    857E F596    057F 7C3E                                                                         0064

0580 8210    8581 82E7    8582 8C60    0583 643A    8584 8C0A    8585 C45E    8586 F589    8587 C062    8588 83EE
0589 8C60    058A A300    858B 7C3E    058C 8304    858D 643A    858E A200    058F 746B    8590 7C4F    0591 0088
0592 600E    8593 4020    8594 0080    8595 F33F                                                                         0065
```

| | | | | | | | | | |
|---|---|---|---|---|---|---|---|---|---|
| 8596 MCEA | 0597 8A00 | 0598 8604 | 8599 8110 | 859A 8C60 | 059B F58E | 859C E58F | 059D 600E | 059E 4020 | |
| 859F F83E | 85A0 8204 | 05A1 8C60 | 05A2 A200 | 85A3 F538 | 05A4 8080 | 85A5 8C01 | 85A6 643A | 05A7 A208 | |
| 05A8 F83E | 85A9 8204 | 85AA F58E | 05AB 8208 | | | | | | 0066 |
| 85AC 8C60 | 05AD A200 | 05AE F33F | 85AF 0000 | 85B0 0000 | 85B1 0000 | 85B2 0000 | 05B3 0000 | 85B4 0000 | |
| 05B5 0000 | 05B6 0000 | 85B7 0000 | 85B8 0000 | 85B9 0000 | 05BA 0000 | 85BB 0000 | 05BC 0000 | 85BD 0000 | |
| 85BE 0000 | 05BF 0000 | 85C0 0000 | 05C1 0000 | | | | | | 0067 |
| 05C2 0000 | 85C3 0000 | 05C4 0000 | 85C5 0000 | 85C6 0000 | 05C7 0000 | 05C8 0000 | 85C9 0000 | 85CA 0000 | |
| 05CB 0000 | 85CC 0000 | 05CD 0000 | 05CE 0000 | 85CF 0000 | 05D0 0000 | 85D1 0000 | 85D2 0000 | 05D3 0000 | |
| 85D4 0000 | 05D5 0000 | 05D6 0000 | 85D7 0000 | | | | | | 0068 |
| 85D8 0000 | 05D9 0000 | 05DA 0000 | 85DB 0000 | 05DC 0000 | 85DD 0000 | 85DE 0000 | 05DF 0000 | 05E0 0000 | |
| 85E1 0000 | 85E2 0000 | 05E3 0000 | 05E4 0000 | 05E5 0000 | 85E6 0000 | 85E7 0000 | 85E8 0000 | 05E9 0000 | |
| 05EA 0000 | 85EB 0000 | 05EC 0000 | 85ED 0000 | | | | | | 0069 |
| 85EE 0000 | 05EF 0000 | 85F0 0000 | 05F1 0000 | 05F2 0000 | 85F3 0000 | 05F4 0000 | 85F5 0000 | 85F6 0000 | |
| 05F7 0000 | 05F8 0000 | 85F9 0000 | 85FA 0040 | 05FB 607C | 85FC 607C | 05FD 607C | 05FE F058 | 85FF 3708 | |
| 8600 0000 | 0601 0000 | 0602 0000 | 8603 0000 | | | | | | 0070 |
| 0604 0000 | 8605 0000 | 8606 0000 | 0607 0000 | 0608 0000 | 8609 0000 | 860A 0000 | 060B 0000 | 860C 0000 | |
| 060D 0000 | 060E 0000 | 860F 0000 | 0610 0000 | 8611 0000 | 8612 0000 | 0613 0000 | 8614 0000 | 0615 0000 | |
| 0616 0000 | 8617 0000 | 8618 0000 | 0619 0000 | | | | | | 0071 |
| 061A 0000 | 861B 0000 | 061C 0000 | 861D 0000 | 861E 0000 | 061F 0000 | 0620 0000 | 8621 0000 | 8622 0000 | |
| 0623 0000 | 8624 0000 | 0625 0000 | 0626 0000 | 8627 0000 | 8628 0000 | 0629 0000 | 062A 0000 | 862B 0000 | |
| 062C 0000 | 862D 0000 | 862E 0000 | 062F 0000 | | | | | | 0072 |
| 8630 0000 | 0631 0000 | 0632 0000 | 8633 0000 | 0634 0000 | 8635 0000 | 8636 0000 | 0637 0000 | 0638 0000 | |
| 8639 0000 | 063A 0000 | 063B 0000 | 863C 0000 | 063D 0000 | 063E 0000 | 863F 0000 | 0640 0000 | 8641 0000 | |
| 8642 0000 | 0643 0000 | 0644 0000 | 0645 0000 | | | | | | 0073 |
| 0646 0000 | 8647 0000 | 8648 0000 | 0649 0000 | 064A 0000 | 864B 0000 | 064C 0000 | 864D 0000 | 864E 0000 | |
| 064F 0000 | 8650 0000 | 0651 0000 | 0652 0000 | 8653 0000 | 0654 0000 | 8655 0000 | 8656 0000 | 0657 0000 | |
| 0658 0000 | 8659 0000 | 865A 0000 | 065B 0000 | | | | | | 0074 |
| 865C 0000 | 065D 0000 | 065E 0000 | 865F 0000 | 8660 0000 | 0661 0000 | 0662 0000 | 8663 0000 | 0664 0000 | |
| 8665 0000 | 8666 0000 | 0667 0000 | 0668 0000 | 8669 0000 | 866A 0000 | 066B 0000 | 865C 0000 | 066D 0000 | |
| 066E 0000 | 866F 0000 | 0670 0000 | 8671 0000 | | | | | | 0075 |
| 8672 0000 | 0673 0000 | 8674 0000 | 0675 0000 | 0676 0000 | 8677 0000 | 8678 0000 | 0679 0000 | 067A 0000 | |
| 867B 0000 | 067C 0000 | 867D 0000 | 867E 0000 | 067F 0000 | 0680 0000 | 8681 0000 | 8682 0000 | 0683 0000 | |
| 8684 0000 | 0685 0000 | 0686 0000 | 8687 0000 | | | | | | 0076 |
| 8688 0000 | 0689 0000 | 068A 0000 | 868B 0000 | 068C 0000 | 868D 0000 | 868E 0000 | 068F 0000 | 8690 0000 | |
| 0691 0000 | 0692 0000 | 8693 0000 | 0694 0000 | 8695 0000 | 8696 0000 | 8697 0000 | 0698 0000 | 8699 0000 | |
| 869A 0000 | 069B 0000 | 869C 0000 | 069D 0000 | | | | | | 0077 |
| 069E 0000 | 869F 0000 | 86A0 0000 | 06A1 0000 | 06A2 0000 | 86A3 0000 | 06A4 0000 | 86A5 0000 | 86A6 0000 | |
| 06A7 0000 | 06A8 0000 | 86A9 0000 | 86AA 0000 | 06AB 0000 | 86AC 0000 | 06AD 0000 | 06AE 0000 | 86AF 0000 | |
| 06B0 0000 | 86B1 0000 | 86B2 0000 | 06B3 0000 | | | | | | 0078 |

| | | | | | | | | | |
|---|---|---|---|---|---|---|---|---|---|
| 86B4 0000 | 06B5 0000 | 06B6 0000 | 86B7 0000 | 86B8 0000 | 06B9 0000 | 06BA 0000 | 86BB 0000 | 06BC 0000 | |
| 86BD 0000 | 86BE 0000 | 06BF 0000 | 86C0 0000 | 06C1 0000 | 06C2 0000 | 86C3 0000 | 06C4 0000 | 86C5 0000 | |
| 86C6 0000 | 06C7 0000 | 06C8 0000 | 86C9 0000 | | | | | | 0079 |
| 86CA 0000 | 06CB 0000 | 86CC 0000 | 06CD 0000 | 06CE 0000 | 86CF 0000 | 06D0 0000 | 86D1 0000 | 86D2 0000 | |
| 06D3 0000 | 86D4 0000 | 86D5 0000 | 06D6 0000 | 86D7 0000 | 86D8 0000 | 06D9 0000 | 06DA 0000 | 86DB 0000 | |
| 06DC 0000 | 86DD 0000 | 86DE 0000 | 06DF 0000 | | | | | | 0080 |
| 06E0 0000 | 86E1 0000 | 86E2 0000 | 06E3 0000 | 86E4 0000 | 06E5 0000 | 06E6 0000 | 86E7 0000 | 86E8 0000 | |
| 06E9 0000 | 06EA 0000 | 86EB 0000 | 06EC 0000 | 86ED 0000 | 86EE 0000 | 06EF 0000 | 86F0 0000 | 06F1 0000 | |
| 06F2 0000 | 86F3 0000 | 06F4 0000 | 86F5 0000 | | | | | | 0081 |
| 86F6 0000 | 06F7 0000 | 06F8 0000 | 86F9 0000 | 86FA 0000 | 06FB 0000 | 86FC 0000 | 06FD 0000 | 06FE 0000 | |
| 86FF 0000 | 0700 0000 | 8701 0000 | 8702 0000 | 0703 0000 | 8704 0000 | 0705 0000 | 0706 0000 | 8707 0000 | |
| 8708 0000 | 0709 0000 | 070A 0000 | 870B 0000 | | | | | | 0082 |
| 070C 0000 | 870D 0000 | 870E 0000 | 070F 0000 | 8710 0000 | 0711 0000 | 0712 0000 | 8713 0000 | 0714 0000 | |
| 8715 0000 | 8716 0000 | 071B 0000 | 0716 0000 | 8719 0000 | 871A 0000 | 071B 0000 | 871C 0000 | 071D 0000 | |
| 071E 0000 | 871F 0000 | 8720 0000 | 0721 0000 | | | | | | 0083 |
| 0722 0000 | 8723 0000 | 0724 0000 | 8725 0000 | 8726 0000 | 0727 0000 | 0728 0000 | 8729 0000 | 872A 0000 | |
| 072B 0000 | 872C 0000 | 072D 0000 | 072E 0000 | 872F 0000 | 0730 0000 | 8731 0000 | 8732 0000 | 0733 0000 | |
| 8734 0000 | 0735 0000 | 0736 0000 | 8737 0000 | | | | | | 0084 |
| 8738 0000 | 0739 0000 | 073A 0000 | 873B 0000 | 073C 0000 | 873D 0000 | 873E 0000 | 073F 0000 | 8740 0000 | |
| 0741 0000 | 0742 0000 | 8743 0000 | 0744 0000 | 8745 0000 | 8746 0000 | 0747 0000 | 0748 0000 | 8749 0000 | |
| 874A 0000 | 074B 0000 | 874C 0000 | 074D 0000 | | | | | | 0085 |
| 074E 0000 | 874F 0000 | 0750 0000 | 0751 0000 | 8752 0000 | 0753 0000 | 8754 0000 | 0755 0000 | 0756 0000 | |
| 8757 0000 | 8758 0000 | 0759 0000 | 075A 0000 | 875B 0000 | 075C 0000 | 875D 0000 | 875E 0000 | 075F 0000 | |
| 0760 0000 | 8761 0000 | 8762 0000 | 0763 0000 | | | | | | 0086 |
| 8764 0000 | 0765 0000 | 0766 0000 | 8767 0000 | 8768 0000 | 0769 0000 | 076A 0000 | 876B 0000 | 076C 0000 | |
| 876D 0000 | 876E 0000 | 076F 0000 | 8770 0000 | 0771 0000 | 0772 0000 | 8773 0000 | 0774 0000 | 8775 0000 | |
| 8776 0000 | 0777 0000 | 0778 0000 | 8779 0000 | | | | | | 0087 |
| 877A 0000 | 077B 0000 | 077C 0000 | 877D 0000 | 077E 0000 | 877F 0000 | 0780 0000 | 0781 0000 | 8782 0000 | |
| 8783 0000 | 0784 0000 | 0785 0000 | 8786 0000 | 0787 0000 | 8788 0000 | 8789 0000 | 878A 0000 | 078B 0000 | |
| 878C 0000 | 078D 0000 | 078E 0000 | 878F 0000 | | | | | | 0088 |
| 0790 0000 | 8791 0000 | 8792 0000 | 0793 0000 | 0794 0000 | 8795 0000 | 0796 0000 | 8797 0000 | 8798 0000 | |
| 0799 0000 | 079A 0000 | 879B 0000 | 079C 0000 | 879D 0000 | 879E 0000 | 079F 0000 | 87A0 0000 | 07A1 0000 | |
| 87A2 0000 | 07A3 0000 | 87A4 0000 | 07A5 0000 | | | | | | 0089 |
| 07A6 0000 | 87A7 0000 | 87A8 0000 | 07A9 0000 | 07AA 0000 | 87AB 0000 | 07AC 0000 | 87AD 0000 | 87AE 0000 | |
| 87AF 0000 | 87B0 0000 | 07B1 0000 | 07B2 0000 | 87B3 0000 | 07B4 0000 | 87B5 0000 | 87B6 0000 | 07B7 0000 | |
| 87B8 0000 | 87B9 0000 | 87BA 0000 | 07BB 0000 | | | | | | 0090 |
| 87BC 0000 | 07BD 0000 | 07BE 0000 | 87BF 0000 | 07C0 0000 | 87C1 0000 | 87C2 0000 | 07C3 0000 | 87C4 0000 | |
| 07C5 0000 | 07C6 0000 | 87C7 0000 | 87C8 0000 | 07C9 0000 | 07CA 0000 | 87CB 0000 | 07CC 0000 | 87CD 0000 | |
| 87CE 0000 | 07CF 0000 | 87D0 0000 | 07D1 0000 | | | | | | 0091 |

```
MPDC-REV3D            00.000                    RTL/6000 CSL PROGRAM              08/01/77   12.748  PAGE   9
                                                LISTING BY ADDRESS                UNNAMED MAIN ROM

07D2 0000   87D3 0000   07D4 0000   87D5 0000   87D6 0000   07D7 0000   C7D8 0000   87D9 0000   87DA 0000
07DB 0000   87DC 0000   07DD 0000   07DE 0000   87DF 0000   87E0 0000   07E1 0000   07E2 0000   87E3 0000
07E4 0000   87E5 0000   87E6 0000   07E7 0000                                                               0092

07E8 0000   87E9 0000   87EA 0000   07EB 0000   87EC 0000   07ED 0000   07EE 0000   87EF 0000   07F0 0000
87F1 0000   87F2 0000   07F3 0000   87F4 0000   07F5 0000   07F6 0000   87F7 0000   87F8 0000   07F9 0000
07FA 0000   87FB 0000   07FC 0000   87FD 0000                                                               0093

87FE 0000   07FF 0000   0800 0000   8801 0000   8802 0000   0803 0000   8804 0000   0805 0000   0806 0000
8807 0000   8808 0000   0809 0000   080A 0000   880B 0000   080C 0000   880D 0000   880E 0000   080F 0000
8810 0000   0811 0000   0812 0000   8813 0000                                                               0094

0814 0000   8815 0000   8816 0000   0817 0000   0818 0000   8819 0000   881A 0000   081B 0000   881C 0000
081D 0000   081E 0000   881F 0000   8820 0000   0821 0000   0822 0000   8823 0000   0824 0000   8825 0000
8826 0000   0827 0000   0828 0000   8829 0000                                                               0095

882A 0000   082B 0000   882C 0000   082D 0000   082E 0000   882F 0000   0830 0000   8831 0000   8832 0000
0833 0000   8834 0000   0835 0000   0836 0000   8837 0000   8838 0000   0839 0000   083A 0000   883B 0000
083C 0000   883D 0000   883E 0000   083F 0000                                                               0096

8840 0000   0841 0000   0842 0000   8843 0000   0844 0000   8845 0000   8846 0000   0847 0000   0848 0000
8849 0000   884A 0000   084B 0000   884C 0000   084D 0000   084E 0000   884F 0000   8850 0000   8851 0000
8852 0000   0853 0000   8854 0000   0855 0000                                                               0097

0856 0000   8857 0000   8858 0000   0859 0000   085A 0000   885B 0000   085C 0000   885D 0000   885E 0000
085F 0000   0860 0000   8861 0000   8862 0000   0863 0000   8864 0000   8865 0000   0866 0000   8867 0000
8868 0000   0869 0000   086A 0000   886B 0000                                                               0098

086C 0000   886D 0000   886E 0000   086F 0000   8870 0000   0871 0000   0872 0000   8873 0000   0874 0000
8875 0000   8876 0000   0877 0000   0878 0000   8879 0000   887A 0000   087B 0000   887C 0000   087D 0000
087E 0000   887F 0000   8880 0000   0881 0000                                                               0099

0882 0000   8883 0000   0884 0000   8885 0000   8886 0000   0887 0000   0888 0000   8889 0000   888A 0000
088B 0000   888C 0000   088D 0000   088E 0000   888F 0000   0890 0000   8891 0000   8892 0000   0893 0000
8894 0000   0895 0000   0896 0000   8897 0000                                                               0100

8898 0000   0899 0000   089A 0000   889B 0000   089C 0000   889D 0000   889E 0000   089F 0000   08A0 0000
88A1 0000   88A2 0000   08A3 0000   88A4 0000   08A5 0000   08A6 0000   88A7 0000   88A8 0000   08A9 0000
08AA 0000   88AB 0000   08AC 0000   88AD 0000                                                               0101

88AE 0000   08AF 0000   88B0 0000   88B1 0000   08B2 0000   88B3 0000   08B4 0000   88B5 0000   88B6 0000
08B7 0000   08B8 0000   88B9 0000   88BA 0000   08BB 0000   88BC 0000   08BD 0000   08BE 0000   88BF 0000
08C0 0000   88C1 0000   88C2 0000   08C3 0000                                                               0102

88C4 0000   08C5 0000   08C6 0000   88C7 0000   88C8 0000   08C9 0000   08CA 0000   88CB 0000   08CC 0000
88CD 0000   88CE 0000   08CF 0000   88D0 0000   08D1 0000   08D2 0000   88D3 0000   08D4 0000   88D5 0000
88D6 0000   08D7 0000   08D8 0000   08D9 0000                                                               0103

88DA 0000   08DB 0000   88DC 0000   08DD 0000   08DE 0000   88DF 0000   88E0 0000   08E1 0000   08E2 0000
88E3 0000   08E4 0000   88E5 0000   08E6 0000   08E7 0000   08E8 0000   88E9 0000   88EA 0000   08EB 0000
88EC 0000   08ED 0000   08EE 0000   88EF 0000                                                               0104

MPDC-REV3D            00.000                    RTL/6000 CSL PROGRAM              08/01/77   12.748  PAGE  10
                                                LISTING BY ADDRESS                UNNAMED MAIN ROM

08F0 0000   88F1 0000   88F2 0000   08F3 0000   88F4 0000   08F5 0000   08F6 0000   88F7 0000   88F8 0000
08F9 0000   08FA 0000   88FB 0000   08FC 0000   88FD 0000   88FE 0000   08FF 0000   8900 0000   0901 0000
0902 0000   8903 0000   0904 0000   8905 0000                                                               0105

8906 0000   0907 0000   0908 0000   8909 0000   890A 0000   090B 0000   890C 0000   090D 0000   090E 0000
890F 0000   0910 0000   8911 0000   8912 0000   0913 0000   0914 0000   0915 0000   0916 0000   8917 0000
8918 0000   0919 0000   091A 0000   891B 0000                                                               0106

091C 0000   891D 0000   891E 0000   091F 0000   0920 0000   8921 0000   8922 0000   0923 0000   8924 0000
0925 0000   0926 0000   8927 0000   0928 0000   0929 0000   092A 0000   892B 0000   092C 0000   892D 0000
892E 0000   092F 0000   8930 0000   0931 0000                                                               0107

0932 0000   8933 0000   0934 0000   8935 0000   8936 0000   0937 0000   8938 0000   8939 0000   893A 0000
093B 0000   893C 0000   093D 0000   093E 0000   893F 0000   0940 0000   8941 0000   8942 0000   0943 0000
8944 0000   0945 0000   0946 0000   8947 0000                                                               0108

8948 0000   0949 0000   094A 0000   894B 0000   094C 0000   894D 0000   894E 0000   094F 0000   8950 0000
0951 0000   0952 0000   8953 0000   0954 0000   8955 0000   0956 0000   0957 0000   0958 0000   8959 0000
895A 0000   095B 0000   895C 0000   095D 0000                                                               0109

095E 0000   895F 0000   8960 0000   0961 0000   0962 0000   8963 0000   0964 0000   8965 0000   8966 0000
0967 0000   0968 0000   8969 0000   896A 0000   096B 0000   896C 0000   096D 0000   096E 0000   896F 0000
0970 0000   8971 0000   8972 0000   0973 0000                                                               0110

8974 0000   0975 0000   0976 0000   8977 0000   8978 0000   0979 0000   097A 0000   897B 0000   097C 0000
897D 0000   897E 0000   097F 0000   0980 0000   8981 0000   8982 0000   8983 0000   8984 0000   0985 0000
0986 0000   8987 0000   8988 0000   0989 0000                                                               0111

098A 0000   898B 0000   098C 0000   898D 0000   898E 0000   098F 0000   8990 0000   0991 0000   0992 0000
8993 0000   0994 0000   8995 0000   0996 0000   0997 0000   0998 0000   8999 0000   899A 0000   099B 0000
899C 0000   099D 0000   099E 0000   899F 0000                                                               0112

89A0 0000   09A1 0000   09A2 0000   89A3 0000   89A4 0000   89A5 0000   89A6 0000   09A7 0000   09A8 0000
89A9 0000   89AA 0000   09AB 0000   89AC 0000   09AD 0000   09AE 0000   89AF 0000   09B0 0000   89B1 0000
89B2 0000   09B3 0000   09B4 0000   89B5 0000                                                               0113

09B6 0000   89B7 0000   89B8 0000   09B9 0000   09BA 0000   89BB 0000   09BC 0000   89BD 0000   89BE 0000
09BF 0000   89C0 0000   09C1 0000   09C2 0000   89C3 0000   89C4 0000   89C5 0000   89C6 0000   09C7 0000
09C8 0000   89C9 0000   89CA 0000   09CB 0000                                                               0114

89CC 0000   09CD 0000   09CE 0000   89CF 0000   09D0 0000   89D1 0000   89D2 0000   09D3 0000   89D4 0000
09D5 0000   09D6 0000   89D7 0000   89D8 0000   09D9 0000   09DA 0000   89DB 0000   09DC 0000   89DD 0000
89DE 0000   09DF 0000   09E0 0000   89E1 0000                                                               0115

89E2 0000   09E3 0000   89E4 0000   09E5 0000   09E6 0000   89E7 0000   89E8 0000   09E9 0000   09EA 0000
89EB 0000   09EC 0000   89ED 0000   89EE 0000   09EF 0000   89F0 0000   09F1 0000   09F2 0000   89F3 0000
09F4 0000   89F5 0000   89F6 0000   09F7 0000                                                               0116

09F8 0000   89F9 0000   89FA 0000   09FB 0000   89FC 0000   09FD 0000   09FE 0000   89FF 0000   8A00 0000
0A01 0000   0A02 0000   8A03 0000   0A04 0000   8A05 0000   8A06 0000   0A07 0000   0A08 0000   8A09 0000
8A0A 0000   0A0B 0000   0A0C 0000   8A0D 0000                                                               0117
```

MPDC-REV3D       00.000                              RTL/6000 CSL PROGRAM                   08/01/77   12.748 PAGE  11
                                                     LISTING BY ADDRESS                     UNNAMED MAIN ROM

0A0E 0000   8A0F 0000   0A10 0000   8A11 0000   8A12 0000   0A13 0000   8A14 0000   0A15 0000   0A16 0000
       8A17 0000   8A18 0000   0A19 0000   0A1A 0000   8A1B 0000   0A1C 0000   8A1D 0000   8A1E 0000   0A1F 0000
       0A20 0000   8A21 0000   8A22 0000   0A23 0000                                                              0118

8A24 0000   0A25 0000   0A26 0000   8A27 0000   8A28 0000   0A29 0000   0A2A 0000   8A2B 0000   0A2C 0000
       8A2D 0000   0A2E 0000   0A2F 0000   8A30 0000   0A31 0000   0A32 0000   8A33 0000   8A34 0000   8A35 0000
       8A37 0000   0A37 0000   0A38 0000   8A39 0000                                                              0119

8A3A 0000   0A3B 0000   8A3C 0000   0A3D 0000   0A3E 0000   8A3F 0000   0A40 0000   8A41 0000   8A42 0000
       0A43 0000   8A44 0000   0A45 0000   0A46 0000   8A47 0000   0A48 0000   0A49 0000   0A4A 0000   8A4B 0000
       0A4C 0000   8A4D 0000   8A4E 0000   0A4F 0000                                                              0120

8A50 0000   0A51 0000   8A52 0000   8A53 0000   0A54 0000   8A55 0000   8A56 0000   0A57 0000   0A58 0000
       8A59 0000   8A5A 0000   0A5B 0000   8A5C 0000   0A5D 0000   0A5E 0000   8A5F 0000   8A60 0000   0A61 0000
       0A62 0000   8A63 0000   0A64 0000   8A65 0000                                                              0121

8A66 0000   0A67 0000   0A68 0000   8A69 0000   8A6A 0000   0A6B 0000   8A6C 0000   0A6D 0000   0A6E 0000
       8A6F 0000   0A70 0000   8A71 0000   8A72 0000   0A73 0000   8A74 0000   0A75 0000   0A76 0000   8A77 0000
       8A78 0000   0A79 0000   0A7A 0000   8A7B 0000                                                              0122

0A7C 0000   8A7D 0000   8A7E 0000   0A7F 0000   0A80 0000   8A81 0000   8A82 0000   8A83 0000   8A84 0000
       0A85 0000   0A86 0000   8A87 0000   8A88 0000   0A89 0000   0A8A 0000   8A8B 0000   0A8C 0000   8A8D 0000
       8A8E 0000   0A8F 0000   0A90 0000   0A91 0000                                                              0123

0A92 0000   8A93 0000   0A94 0000   8A95 0000   8A96 0000   0A97 0000   0A98 0000   8A99 0000   8A9A 0000
       0A9B 0000   8A9C 0000   0A9D 0000   0A9E 0000   8A9F 0000   8AA0 0000   0AA1 0000   0AA2 0000   8AA3 0000
       0AA4 0000   8AA5 0000   8AA6 0000   0AA7 0000                                                              0124

0AA8 0000   8AA9 0000   8AAA 0000   0AAB 0000   8AAC 0000   0AAD 0000   0AAE 0000   8AAF 0000   0AB0 0000
       8AB1 0000   8AB2 0000   0AB3 0000   8AB4 0000   0AB5 0000   0AB6 0000   8AB7 0000   8AB8 0000   0AB9 0000
       0ABA 0000   8ABB 0000   0ABC 0000   8ABD 0000                                                              0125

8ABE 0000   0ABF 0000   8AC0 0000   0AC1 0000   0AC2 0000   8AC3 0000   0AC4 0000   8AC5 0000   8AC6 0000
       0AC7 0000   0AC8 0000   8AC9 0000   8ACA 0000   0ACB 0000   8ACC 0000   0ACD 0000   0ACE 0000   8ACF 0000
       0AD0 0000   8AD1 0000   0AD2 0000   0AD3 0000                                                              0126

8AD4 0000   0AD5 0000   0AD6 0000   8AD7 0000   8AD8 0000   0AD9 0000   0ADA 0000   8ADB 0000   0ADC 0000
       8ADD 0000   8ADE 0000   0ADF 0000   0AE0 0000   8AE1 0000   8AE2 0000   0AE3 0000   0AE4 0000   0AE5 0000
       0AE6 0000   8AE7 0000   8AE8 0000   0AE9 0000                                                              0127

0AEA 0000   8AEB 0000   0AEC 0000   8AED 0000   8AEE 0000   0AEF 0000   8AF0 0000   0AF1 0000   0AF2 0000
       8AF3 0000   0AF4 0000   8AF5 0000   8AF6 0000   0AF7 0000   0AF8 0000   8AF9 0000   8AFA 0000   0AFB 0000
       8AFC 0000   0AFD 0000   0AFE 0000   8AFF 0000                                                              0128

0B00 0000   8B01 0000   8B02 0000   0B03 0000   0B04 0000   0B05 0000   0B06 0000   8B07 0000   8B08 0000
       0B09 0000   0B0A 0000   8B0B 0000   0B0C 0000   8B0D 0000   8B0E 0000   0B0F 0000   8B10 0000   0B11 0000
       0B12 0000   8B13 0000   0B14 0000   8B15 0000                                                              0129

8B16 0000   0B17 0000   0B18 0000   8B19 0000   8B1A 0000   0B1B 0000   8B1C 0000   0B1D 0000   0B1E 0000
       8B1F 0000   8B20 0000   0B21 0000   0B22 0000   8B23 0000   0B24 0000   8B25 0000   8B26 0000   0B27 0000
       0B28 0000   8B29 0000   8B2A 0000   0B2B 0000                                                              0130

MPDC-REV3D       00.000                              RTL/6000 CSL PROGRAM                   08/01/77   12.748 PAGE  12
                                                     LISTING BY ADDRESS                     UNNAMED MAIN ROM

8B2C 0000   0B2D 0000   0B2E 0000   8B2F 0000   0B30 0000   8B31 0000   8B32 0000   0B33 0000   8B34 0000
       0B35 0000   8B36 0000   8B37 0000   8B38 0000   0B39 0000   0B3A 0000   8B3B 0000   0B3C 0000   8B3D 0000
       8B3E 0000   0B3F 0000   8B40 0000   0B41 0000                                                              0131

0B42 0000   8B43 0000   0B44 0000   8B45 0000   8B46 0000   0B47 0000   0B48 0000   8B49 0000   8B4A 0000
       0B4B 0000   8B4C 0000   0B4D 0000   8B4E 0000   8B4F 0000   8B50 0000   8B51 0000   8B52 0000   0B53 0000
       8B54 0000   0B55 0000   0B56 0000   8B57 0000                                                              0132

8B58 0000   0B59 0000   0B5A 0000   8B5B 0000   0B5C 0000   8B5D 0000   8B5E 0000   0B5F 0000   0B60 0000
       8B61 0000   8B62 0000   0B63 0000   0B64 0000   0B65 0000   0B66 0000   8B67 0000   8B68 0000   0B69 0000
       0B6A 0000   8B6B 0000   0B6C 0000   8B6D 0000                                                              0133

8B6E 0000   0B6F 0000   8B70 0000   0B71 0000   0B72 0000   8B73 0000   0B74 0000   8B75 0000   8B76 0000
       0B77 0000   0B78 0000   8B79 0000   8B7A 0000   0B7B 0000   8B7C 0000   8B7D 0000   0B7E 0000   8B7F 0000
       8B80 0000   0B81 0000   0B82 0000   8B83 0000                                                              0134

0B84 0000   8B85 0000   8B86 0000   0B87 0000   0B88 0000   8B89 0000   8B8A 0000   0B8B 0000   8B8C 0000
       0B8D 0000   0B8E 0000   8B8F 0000   0B90 0000   8B91 0000   8B92 0000   0B93 0000   0B94 0000   0B95 0000
       0B96 0000   8B97 0000   8B98 0000   0B99 0000                                                              0135

0B9A 0000   8B9B 0000   0B9C 0000   8B9D 0000   8B9E 0000   0B9F 0000   0BA0 0000   8BA1 0000   8BA2 0000
       0BA3 0000   8BA4 0000   0BA5 0000   0BA6 0000   8BA7 0000   8BA8 0000   0BA9 0000   0BAA 0000   8BAB 0000
       0BAC 0000   8BAD 0000   8BAE 0000   0BAF 0000                                                              0136

8BB0 0000   0BB1 0000   0BB2 0000   8BB3 0000   0BB4 0000   8BB5 0000   8BB6 0000   0BB7 0000   0BB8 0000
       8BB9 0000   8BBA 0000   0BBB 0000   0BBC 0000   8BBD 0000   0BBE 0000   8BBF 0000   8BC0 0000   0BC1 0000
       8BC2 0000   0BC3 0000   8BC4 0000   0BC5 0000                                                              0137

0BC6 0000   8BC7 0000   8BC8 0000   0BC9 0000   0BCA 0000   8BCB 0000   8BCC 0000   0BCD 0000   8BCE 0000
       0BCF 0000   8BD0 0000   0BD1 0000   0BD2 0000   8BD3 0000   0BC4 0000   8BD5 0000   0BD6 0000   0BD7 0000
       0BD8 0000   8BD9 0000   0BDA 0000   0BDB 0000                                                              0138

8BDC 0000   0BDD 0000   0BDE 0000   8BDF 0000   8BE0 0000   0BE1 0000   0BE2 0000   8BE3 0000   0BE4 0000
       8BE5 0000   8BE6 0000   0BE7 0000   0BE8 0000   8BE9 0000   8BEA 0000   0BEB 0000   8BEC 0000   0BED 0000
       0BEE 0000   8BEF 0000   0BF0 0000   8BF1 0000                                                              0139

8BF2 0000   0BF3 0000   8BF4 0000   0BF5 0000   0BF6 0000   8BF7 0000   8BF8 0000   0BF9 0000   0BFA 0000
       8BFB 0000   0BFC 0000   8BFD 0000   8BFE 0000   0BFF 0000   8C00 0000   0C01 0000   0C02 0000   8C03 0000
       0C04 0000   8C05 0000   8C06 0000   0C07 0000                                                              0140

0C08 0000   8C09 0000   8C0A 0000   0C0B 0000   8C0C 0000   0C0D 0000   0C0E 0000   8C0F 0000   0C10 0000
       8C11 0000   8C12 0000   0C13 0000   8C14 0000   0C15 0000   0C16 0000   8C17 0000   0C18 0000   0C19 0000
       0C1A 0000   0C1B 0000   0C1C 0000   8C1D 0000                                                              0141

8C1E 0000   0C1F 0000   0C20 0000   8C21 0000   8C22 0000   0C23 0000   8C24 0000   0C25 0000   0C26 0000
       8C27 0000   8C28 0000   0C29 0000   0C2A 0000   8C2B 0000   0C2C 0000   8C2D 0000   8C2E 0000   0C2F 0000
       0C30 0000   0C31 0000   0C32 0000   8C33 0000                                                              0142

0C34 0000   8C35 0000   8C36 0000   0C37 0000   0C38 0000   8C39 0000   8C3A 0000   0C3B 0000   8C3C 0000
       0C3D 0000   0C3E 0000   8C3F 0000   0C40 0000   8C41 0000   8C42 0000   0C43 0000   8C44 0000   0C45 0000
       0C46 0000   8C47 0000   0C48 0000   0C49 0000                                                              0143

| | | | | | | | | | |
|---|---|---|---|---|---|---|---|---|---|
| 0C4A 0000 | 8C4B 0000 | 0C4C 0000 | 8C4D 0000 | 8C4E 0000 | 0C4F 0000 | 8C50 0000 | 0C51 0000 | 0C52 0000 | |
| 8C53 0000 | 0C54 0000 | 0C55 0000 | 8C56 0000 | 0C57 0000 | 0C58 0000 | 8C59 0000 | 8C5A 0000 | 0C5B 0000 | |
| 8C5C 0000 | 0C5D 0000 | 0C5E 0000 | 8C5F 0000 | | | | | | 0144 |
| 8C60 0000 | 0C61 0000 | 0C62 0000 | 8C63 0000 | 0C64 0000 | 8C65 0000 | 8C66 0000 | 0C67 0000 | 0C68 0000 | |
| 8C69 0000 | 8C6A 0000 | 0C6B 0000 | 0C6C 0000 | 0C6D 0000 | 0C6E 0000 | 8C6F 0000 | 0C70 0000 | 8C71 0000 | |
| 8C72 0000 | 0C73 0000 | 8C74 0000 | 0C75 0000 | | | | | | 0145 |
| 0C76 0000 | 8C77 0000 | 8C78 0000 | 0C79 0000 | 0C7A 0000 | 8C7B 0000 | 0C7C 0000 | 8C7D 0000 | 8C7E 0000 | |
| 0C7F 0000 | 0C80 0000 | 8C81 0000 | 8C82 0000 | 0C83 0000 | 8C84 0000 | 0C85 0000 | 0C86 0000 | 8C87 0000 | |
| 8C88 0000 | 0C89 0000 | 0C8A 0000 | 8C8B 0000 | | | | | | 0146 |
| 0C8C 0000 | 8C8D 0000 | 8C8E 0000 | 0C8F 0000 | 8C90 0000 | 0C91 0000 | 0C92 0000 | 8C93 0000 | 0C94 0000 | |
| 8C95 0000 | 8C96 0000 | 0C97 0000 | 0C98 0000 | 8C99 0000 | 8C9A 0000 | 0C9B 0000 | 8C9C 0000 | 0C9D 0000 | |
| 0C9E 0000 | 8C9F 0000 | 8CA0 0000 | 0CA1 0000 | | | | | | 0147 |
| 0CA2 0000 | 8CA3 0000 | 0CA4 0000 | 8CA5 0000 | 8CA6 0000 | 0CA7 0000 | 0CA8 0000 | 8CA9 0000 | 8CAA 0000 | |
| 0CAB 0000 | 8CAC 0000 | 0CAD 0000 | 0CAE 0000 | 8CAF 0000 | 0CB0 0000 | 8CB1 0000 | 8CB2 0000 | 0CB3 0000 | |
| 8CB4 0000 | 0CB5 0000 | 0CB6 0000 | 8CB7 0000 | | | | | | 0148 |
| 8CB8 0000 | 0CB9 0000 | 0CBA 0000 | 8CBB 0000 | 0CBC 0000 | 8CBD 0000 | 8CBE 0000 | 0CBF 0000 | 8CC0 0000 | |
| 0CC1 0000 | 0CC2 0000 | 8CC3 0000 | 0CC4 0000 | 8CC5 0000 | 8CC6 0000 | 0CC7 0000 | 0CC8 0000 | 8CC9 0000 | |
| 8CCA 0000 | 0CCB 0000 | 0CCC 0000 | 0CCD 0000 | | | | | | 0149 |
| 0CCE 0000 | 8CCF 0000 | 0CD0 0000 | 8CD1 0000 | 8CD2 0000 | 0CD3 0000 | 8CD4 0000 | 0CD5 0000 | 0CD6 0000 | |
| 8CD7 0000 | 0CD8 0000 | 0CD9 0000 | 0CDA 0000 | 8CDB 0000 | 0CDC 0000 | 8CDD 0000 | 8CDE 0000 | 0CDF 0000 | |
| 0CE0 0000 | 8CE1 0000 | 8CE2 0000 | 0CE3 0000 | | | | | | 0150 |
| 8CE4 0000 | 0CE5 0000 | 0CE6 0000 | 8CE7 0000 | 8CE8 0000 | 0CE9 0000 | 0CEA 0000 | 8CEB 0000 | 0CEC 0000 | |
| 8CED 0000 | 8CEE 0000 | 0CEF 0000 | 0CF0 0000 | 0CF1 0000 | 0CF2 0000 | 8CF3 0000 | 0CF4 0000 | 8CF5 0000 | |
| 8CF6 0000 | 0CF7 0000 | 8CF8 0000 | 8CF9 0000 | | | | | | 0151 |
| 8CFA 0000 | 0CFB 0000 | 8CFC 0000 | 0CFD 0000 | 0CFE 0000 | 8CFF 0000 | 0D00 0000 | 8D01 0000 | 8D02 0000 | |
| 0D03 0000 | 8D04 0000 | 0D05 0000 | 0D06 0000 | 8D07 0000 | 8D08 0000 | 0D09 0000 | 0D0A 0000 | 8D0B 0000 | |
| 0D0C 0000 | 8D0D 0000 | 8D0E 0000 | 0D0F 0000 | | | | | | 0152 |
| 8D10 0000 | 0D11 0000 | 0D12 0000 | 8D13 0000 | 0D14 0000 | 8D15 0000 | 8D16 0000 | 0D17 0000 | 0D18 0000 | |
| 8D19 0000 | 8D1A 0000 | 0D1B 0000 | 8D1C 0000 | 0D1D 0000 | 0D1E 0000 | 8D1F 0000 | 8D20 0000 | 0D21 0000 | |
| 0D22 0000 | 8D23 0000 | 0D24 0000 | 8D25 0000 | | | | | | 0153 |
| 8D26 0000 | 0D27 0000 | 0D28 0000 | 8D29 0000 | 8D2A 0000 | 0D2B 0000 | 8D2C 0000 | 0D2D 0000 | 0D2E 0000 | |
| 8D2F 0000 | 0D30 0000 | 8D31 0000 | 0D32 0000 | 8D33 0000 | 8D34 0000 | 0D35 0000 | 8D36 0000 | 8D37 0000 | |
| 8D38 0000 | 0D39 0000 | 0D3A 0000 | 8D3B 0000 | | | | | | 0154 |
| 0D3C 0000 | 8D3D 0000 | 8D3E 0000 | 0D3F 0000 | 8D40 0000 | 0D41 0000 | 0D42 0000 | 8D43 0000 | 0D44 0000 | |
| 8D45 0000 | 0D46 0000 | 0D47 0000 | 0D48 0000 | 8D49 0000 | 0D4A 0000 | 0D4B 0000 | 8D4C 0000 | 0D4D 0000 | |
| 0D4E 0000 | 8D4F 0000 | 0D50 0000 | 8D51 0000 | | | | | | 0155 |
| 8D52 0000 | 0D53 0000 | 8D54 0000 | 0D55 0000 | 0D56 0000 | 8D57 0000 | 8D58 0000 | 0D59 0000 | 0D5A 0000 | |
| 8D5B 0000 | 0D5C 0000 | 8D5D 0000 | 8D5E 0000 | 0D5F 0000 | 0D60 0000 | 8D61 0000 | 8D62 0000 | 0D63 0000 | |
| 8D64 0000 | 0D65 0000 | 0D66 0000 | 8D67 0000 | | | | | | 0156 |

| | | | | | | | | | |
|---|---|---|---|---|---|---|---|---|---|
| 8D68 0000 | 0D69 0000 | 0D6A 0000 | 8D6B 0000 | 0D6C 0000 | 8D6D 0000 | 8D6E 0000 | 0D6F 0000 | 8D70 0000 | |
| 0D71 0000 | 0D72 0000 | 8D73 0000 | 0D74 0000 | 8D75 0000 | 8D76 0000 | 0D77 0000 | 0D78 0000 | 8D79 0000 | |
| 8D7A 0000 | 0D7B 0000 | 0D7C 0000 | 8D7D 0000 | | | | | | 0157 |
| 0D7E 0000 | 8D7F 0000 | 8D80 0000 | 0D81 0000 | 0D82 0000 | 8D83 0000 | 0D84 0000 | 8D85 0000 | 8D86 0000 | |
| 0D87 0000 | 0D88 0000 | 8D89 0000 | 8D8A 0000 | 0D8B 0000 | 8D8C 0000 | 0D8D 0000 | 0D8E 0000 | 8D8F 0000 | |
| 0D90 0000 | 8D91 0000 | 8D92 0000 | 0D93 0000 | | | | | | 0158 |
| 8D94 0000 | 0D95 0000 | 0D96 0000 | 8D97 0000 | 8D98 0000 | 0D99 0000 | 0D9A 0000 | 8D9B 0000 | 0D9C 0000 | |
| 8D9D 0000 | 0D9E 0000 | 0D9F 0000 | 8DA0 0000 | 8DA1 0000 | 8DA2 0000 | 0DA3 0000 | 0DA4 0000 | 0DA5 0000 | |
| 0DA6 0000 | 8DA7 0000 | 8DA8 0000 | 0DA9 0000 | | | | | | 0159 |
| 0DAA 0000 | 8DAB 0000 | 0DAC 0000 | 8DAD 0000 | 8DAE 0000 | 0DAF 0000 | 0DB0 0000 | 0DB1 0000 | 0DB2 0000 | |
| 8DB3 0000 | 0DB4 0000 | 0DB5 0000 | 0DB6 0000 | 0DB7 0000 | 0DB8 0000 | 8DB9 0000 | 8DBA 0000 | 0DBB 0000 | |
| 8DBC 0000 | 0DBD 0000 | 0DBE 0000 | 8DBF 0000 | | | | | | 0160 |
| 0DC0 0000 | 8DC1 0000 | 8DC2 0000 | 0DC3 0000 | 8DC4 0000 | 0DC5 0000 | 0DC6 0000 | 8DC7 0000 | 8DC8 0000 | |
| 0DC9 0000 | 0DCA 0000 | 8DCB 0000 | 0DCC 0000 | 8DCD 0000 | 8DCE 0000 | 0DCF 0000 | 8DD0 0000 | 0DD1 0000 | |
| 0DD2 0000 | 8DD3 0000 | 0DD4 0000 | 8DD5 0000 | | | | | | 0161 |
| 8DD6 0000 | 0DD7 0000 | 0DD8 0000 | 8DD9 0000 | 8DDA 0000 | 0DDB 0000 | 8DDC 0000 | 0DDD 0000 | 0DDE 0000 | |
| 8DDF 0000 | 0DE0 0000 | 0DE1 0000 | 0DE2 0000 | 8DE3 0000 | 0DE4 0000 | 8DE5 0000 | 8DE6 0000 | 0DE7 0000 | |
| 0DE8 0000 | 8DE9 0000 | 8DEA 0000 | 0DEB 0000 | | | | | | 0162 |
| 8DEC 0000 | 0DED 0000 | 0DEE 0000 | 8DEF 0000 | 0DF0 0000 | 8DF1 0000 | 8DF2 0000 | 0DF3 0000 | 8DF4 0000 | |
| 0DF5 0000 | 0DF6 0000 | 8DF7 0000 | 0DF8 0000 | 0DF9 0000 | 0DFA 0000 | 8DFB 0000 | 0DFC 0000 | 8DFD 0000 | |
| 8DFE 0000 | 0DFF 0000 | 0E00 0000 | 8E01 0000 | | | | | | 0163 |
| 8E02 0000 | 0E03 0000 | 8E04 0000 | 0E05 0000 | 0E06 0000 | 0EC7 0000 | 8E08 0000 | 0E09 0000 | 0E0A 0000 | |
| 8E0B 0000 | 0E0C 0000 | 8E0D 0000 | 8E0E 0000 | 0E0F 0000 | 8E10 0000 | 0E11 0000 | 0E12 0000 | 8E13 0000 | |
| 0E14 0000 | 8E15 0000 | 0E16 0000 | 0E17 0000 | | | | | | 0164 |
| 0E18 0000 | 8E19 0000 | 0E1A 0000 | 8E1B 0000 | 8E1C 0000 | 0E1D 0000 | 0E1E 0000 | 8E1F 0000 | 8E20 0000 | |
| 0E21 0000 | 0E22 0000 | 8E23 0000 | 0E24 0000 | 8E25 0000 | 8E26 0000 | 0E27 0000 | 0E28 0000 | 8E29 0000 | |
| 8E2A 0000 | 0E2B 0000 | 0E2C 0000 | 0E2D 0000 | | | | | | 0165 |
| 0E2E 0000 | 8E2F 0000 | 0E30 0000 | 8E31 0000 | 8E32 0000 | 0E33 0000 | 8E34 0000 | 0E35 0000 | 0E36 0000 | |
| 8E37 0000 | 8E38 0000 | 0E39 0000 | 0E3A 0000 | 8E3B 0000 | 0E3C 0000 | 8E3D 0000 | 8E3E 0000 | 0E3F 0000 | |
| 8E40 0000 | 0E41 0000 | 0E42 0000 | 8E43 0000 | | | | | | 0166 |
| 0E44 0000 | 8E45 0000 | 8E46 0000 | 0E47 0000 | 0E48 0000 | 8E49 0000 | 8E4A 0000 | 0E4B 0000 | 8E4C 0000 | |
| 0E4D 0000 | 0E4E 0000 | 8E4F 0000 | 0E50 0000 | 8E51 0000 | 8E52 0000 | 0E53 0000 | 8E54 0000 | 0E55 0000 | |
| 0E56 0000 | 8E57 0000 | 0E58 0000 | 0E59 0000 | | | | | | 0167 |
| 0E5A 0000 | 8E5B 0000 | 0E5C 0000 | 8E5D 0000 | 8E5E 0000 | 0E5F 0000 | 0E60 0000 | 8E61 0000 | 8E62 0000 | |
| 0E63 0000 | 8E64 0000 | 0E65 0000 | 0E66 0000 | 8E67 0000 | 8E68 0000 | 0E69 0000 | 0E6A 0000 | 8E6B 0000 | |
| 0E6C 0000 | 8E6D 0000 | 0E6E 0000 | 0E6F 0000 | | | | | | 0168 |
| 8E70 0000 | 0E71 0000 | 0E72 0000 | 8E73 0000 | 0E74 0000 | 8E75 0000 | 8E76 0000 | 0E77 0000 | 0E78 0000 | |
| 8E79 0000 | 8E7A 0000 | 0E7B 0000 | 8E7C 0000 | 0E7D 0000 | 0E7E 0000 | 8E7F 0000 | 8E80 0000 | 0E81 0000 | |
| 0E82 0000 | 8E83 0000 | 0E84 0000 | 8E85 0000 | | | | | | 0169 |

| MPDC-REV3D | | 00.000 | | | RTL/6000 CSL PROGRAM<br>LISTING BY ADDRESS | | | 08/01/77 12.748 PAGE 15<br>UNNAMED MAIN ROM | | |
|---|---|---|---|---|---|---|---|---|---|---|
| 8E86 0000 | 0E87 0000 | 0E88 0000 | 8E89 0000 | 8E8A 0000 | 0E8B 0000 | 8E8C 0000 | 0E8D 0000 | 0E8E 0000 | | |
| 8E8F 0000 | 0E90 0000 | 8E91 0000 | 8E92 0000 | 0E93 0000 | 8E94 0000 | 0E95 0000 | 0E96 0000 | 8E97 0000 | | |
| 8E98 0000 | 0E99 0000 | 0E9A 0000 | 8E9B 0000 | | | | | | | 0170 |
| 0E9C 0000 | 8E9D 0000 | 8E9E 0000 | 0E9F 0000 | 0EA0 0000 | 8EA1 0000 | 8EA2 0000 | 0EA3 0000 | 8EA4 0000 | | |
| 0EA5 0000 | 0EA6 0000 | 8EA7 0000 | 8EA8 0000 | 0EA9 0000 | 0EAA 0000 | 8EAB 0000 | 0EAC 0000 | 8EAD 0000 | | |
| 8EAE 0000 | 0EAF 0000 | 8EB0 0000 | 0EB1 0000 | | | | | | | 0171 |
| 0EB2 0000 | 8EB3 0000 | 8EB4 0000 | 8EB5 0000 | 8EB6 0000 | 0EB7 0000 | 0EB8 0000 | 8EB9 0000 | 8EBA 0000 | | |
| 0EBB 0000 | 8EBC 0000 | 8EBD 0000 | 0EBE 0000 | 8EBF 0000 | 0EC0 0000 | 8EC1 0000 | 8EC2 0000 | 0EC3 0000 | | |
| 8EC4 0000 | 0EC5 0000 | 0EC6 0000 | 8EC7 0000 | | | | | | | 0172 |
| 8EC8 0000 | 0EC9 0000 | 0ECA 0000 | 8ECB 0000 | 0ECC 0000 | 8ECD 0000 | 8ECE 0000 | 0ECF 0000 | 8ED0 0000 | | |
| 0ED1 0000 | 0ED2 0000 | 8ED3 0000 | 0ED4 0000 | 8ED5 0000 | 8ED6 0000 | 0ED7 0000 | 0ED8 0000 | 8ED9 0000 | | |
| 8EDA 0000 | 0EDB 0000 | 8EDC 0000 | 0EDD 0000 | | | | | | | 0173 |
| 0EDE 0000 | 8EDF 0000 | 8EE0 0000 | 0EE1 0000 | 0EE2 0000 | 8EE3 0000 | 0EE4 0000 | 8EE5 0000 | 8EE6 0000 | | |
| 0EE7 0000 | 0EE8 0000 | 8EE9 0000 | 8EEA 0000 | 0EEB 0000 | 8EEC 0000 | 0EED 0000 | 0EEE 0000 | 8EEF 0000 | | |
| 0EF0 0000 | 8EF1 0000 | 8EF2 0000 | 0EF3 0000 | | | | | | | 0174 |
| 8EF4 0000 | 0EF5 0000 | 0EF6 0000 | 8EF7 0000 | 8EF8 0000 | 0EF9 0000 | 0EFA 0000 | 8EFB 0000 | 0EFC 0000 | | |
| 8EFD 0000 | 8EFE 0000 | 0EFF 0000 | 8F00 0000 | 0F01 0000 | 0F02 0000 | 8F03 0000 | 0F04 0000 | 8F05 0000 | | |
| 8F06 0000 | 0F07 0000 | 0F08 0000 | 8F09 0000 | | | | | | | 0175 |
| 8F0A 0000 | 0F0B 0000 | 8F0C 0000 | 0F0D 0000 | 0F0E 0000 | 8F0F 0000 | 0F10 0000 | 8F11 0000 | 8F12 0000 | | |
| 0F13 0000 | 8F14 0000 | 0F15 0000 | 8F16 0000 | 8F17 0000 | 8F18 0000 | 0F19 0000 | 0F1A 0000 | 8F1B 0000 | | |
| 0F1C 0000 | 8F1D 0000 | 8F1E 0000 | 0F1F 0000 | | | | | | | 0176 |
| 0F20 0000 | 8F21 0000 | 8F22 0000 | 0F23 0000 | 8F24 0000 | 0F25 0000 | 0F26 0000 | 8F27 0000 | 8F28 0000 | | |
| 0F29 0000 | 0F2A 0000 | 8F2B 0000 | 0F2C 0000 | 8F2D 0000 | 8F2E 0000 | 0F2F 0000 | 8F30 0000 | 0F31 0000 | | |
| 0F32 0000 | 8F33 0000 | 0F34 0000 | 8F35 0000 | | | | | | | 0177 |
| 8F36 0000 | 0F37 0000 | 0F38 0000 | 8F39 0000 | 8F3A 0000 | 0F3B 0000 | 8F3C 0000 | 0F3D 0000 | 0F3E 0000 | | |
| 8F3F 0000 | 0F40 0000 | 8F41 0000 | 8F42 0000 | 0F43 0000 | 8F44 0000 | 8F45 0000 | 0F46 0000 | 8F47 0000 | | |
| 8F48 0000 | 0F49 0000 | 0F4A 0000 | 8F4B 0000 | | | | | | | 0178 |
| 0F4C 0000 | 8F4D 0000 | 8F4E 0000 | 0F4F 0000 | 8F50 0000 | 0F51 0000 | 0F52 0000 | 8F53 0000 | 0F54 0000 | | |
| 8F55 0000 | 8F56 0000 | 0F57 0000 | 0F58 0000 | 8F59 0000 | 8F5A 0000 | 0F5B 0000 | 8F5C 0000 | 0F5D 0000 | | |
| 0F5E 0000 | 8F5F 0000 | 8F60 0000 | 0F61 0000 | | | | | | | 0179 |
| 0F62 0000 | 8F63 0000 | 8F64 0000 | 0F65 0000 | 8F66 0000 | 0F67 0000 | 0F68 0000 | 8F69 0000 | 8F6A 0000 | | |
| 0F6B 0000 | 8F6C 0000 | 0F6D 0000 | 8F6E 0000 | 0F6F 0000 | 0F70 0000 | 8F71 0000 | 8F72 0000 | 0F73 0000 | | |
| 8F74 0000 | 0F75 0000 | 0F76 0000 | 8F77 0000 | | | | | | | 0180 |
| 8F78 0000 | 0F79 0000 | 0F7A 0000 | 8F7B 0000 | 0F7C 0000 | 8F7D 0000 | 8F7E 0000 | 0F7F 0000 | 0F80 0000 | | |
| 8F81 0000 | 8F82 0000 | 0F83 0000 | 8F84 0000 | 0F85 0000 | 0F86 0000 | 8F87 0000 | 8F88 0000 | 0F89 0000 | | |
| 0F8A 0000 | 8F8B 0000 | 0F8C 0000 | 8F8D 0000 | | | | | | | 0181 |
| 8F8E 0000 | 0F8F 0000 | 8F90 0000 | 0F91 0000 | 0F92 0000 | 8F93 0000 | 0F94 0000 | 8F95 0000 | 8F96 0000 | | |
| 0F97 0000 | 0F98 0000 | 8F99 0000 | 8F9A 0000 | 0F9B 0000 | 8F9C 0000 | 0F9D 0000 | 0F9E 0000 | 8F9F 0000 | | |
| 8FA0 0000 | 0FA1 0000 | 0FA2 0000 | 8FA3 0000 | | | | | | | 0182 |

| MPDC-REV3D | | 00.000 | | | RTL/6000 CSL PROGRAM<br>LISTING BY ADDRESS | | | 08/01/77 12.748 PAGE 16<br>UNNAMED MAIN ROM | | |
|---|---|---|---|---|---|---|---|---|---|---|
| 0FA4 0000 | 8FA5 0000 | 8FA6 0000 | 0FA7 0000 | 0FA8 0000 | 8FA9 0000 | 8FAA 0000 | 0FAB 0000 | 8FAC 0000 | | |
| 0FAD 0000 | 0FAE 0000 | 8FAF 0000 | 8FB0 0000 | 0FB1 0000 | 8FB2 0000 | 0FB3 0000 | 8FB4 0000 | 0FB5 0000 | | |
| 0FB6 0000 | 8FB7 0000 | 8FB8 0000 | 0FB9 0000 | | | | | | | 0183 |
| 0FBA 0000 | 8FBB 0000 | 0FBC 0000 | 8FBD 0000 | 8FBE 0000 | 0FBF 0000 | 8FC0 0000 | 0FC1 0000 | 0FC2 0000 | | |
| 8FC3 0000 | 0FC4 0000 | 8FC5 0000 | 8FC6 0000 | 0FC7 0000 | 0FC8 0000 | 8FC9 0000 | 8FCA 0000 | 0FCB 0000 | | |
| 8FCC 0000 | 0FCD 0000 | 0FCE 0000 | 8FCF 0000 | | | | | | | 0184 |
| 0FD0 0000 | 8FD1 0000 | 8FD2 0000 | 0FD3 0000 | 8FD4 0000 | 0FD5 0000 | 0FD6 0000 | 8FD7 0000 | 8FD8 0000 | | |
| 0FD9 0000 | 0FDA 0000 | 8FDB 0000 | 0FDC 0000 | 8FDD 0000 | 8FDE 0000 | 0FDF 0000 | 0FE0 0000 | 8FE1 0000 | | |
| 8FE2 0000 | 0FE3 0000 | 0FE4 0000 | 8FE5 0000 | | | | | | | 0185 |
| 0FE6 0000 | 8FE7 0000 | 8FE8 0000 | 0FE9 0000 | 0FEA 0000 | 8FEB 0000 | 0FEC 0000 | 8FED 0000 | 8FEE 0000 | | |
| 0FEF 0000 | 8FF0 0000 | 0FF1 0000 | 0FF2 0000 | 8FF3 0000 | 0FF4 0000 | 0FF5 0000 | 8FF6 0000 | 0FF7 0000 | | |
| 0FF8 0000 | 8FF9 0000 | 8FFA 0000 | 0FFB 0000 | | | | | | | 0186 |
| 8FFC 0000 | 0FFD 0000 | 0FFE 0000 | 8FFF 0000 | | | | | | | 0187 |

*** RTL/6000 CSL PROGRAM NORMAL TERMINATION

```
BBBBBBBBBBBBBBBBB BBBBBBBBBBBBBBBBBBBBBBBBBBBBBBBBBBBBBBBBBBBBBBBBBBBBBBBBBBBB
BBBBBBBBBBBBBBBB  BBBBBBBBBBBBBBBBBBBBBBBBBBBBBBBBBBBBBBBBBBBBBBBBBBBBBBBBBBBB
              BBBB    B      B    BBBBB    BBBBB
                  B  B   BB     B    B       B
BBBB    BBBB      B      B    BBBB   BBBBB   B     BBBB    BBBB
                 BBB     B      B    B       B
                 B       B  B B B    B       B
                 BBBBBBB BBB    BBBB BBBB    B
BBBBBBBBBBBBBBBBB BBBBBBBBBBBBBBBBBBBBBBBBBBBBBBBBBBBBBBBBBBBBBBBBBBBBBBBBBBBB
BBBBBBBBBBBBBBBB  BBBBBBBBBBBBBBBBBBBBBBBBBBBBBBBBBBBBBBBBBBBBBBBBBBBBBBBBBBBB
-- 30 --      DATE 08-01-77    TIME 13.077     PR 0 11   G6080
```

| 2864T 2 MODEL: MPDC-V1<br>FILE: | | RTL/6000 FILE EDIT<br>MICROPROGRAM SECTION | C 29/76 16:06'27" PAGE 49<br>REV: 000.00 ALTER # 1937 |
|---|---|---|---|
| ALTER# | | SEQUENCE: SOURCE | LINE & ADDRESS IMAGE<br>(HEX) (HEX) |
| 1937 | \THE FOLLOWING ROUTINE IS USED TO SWAP THE BUS LOGIC TO | | 01942C00 |
| 1938 | VERIFY THE DRIVERS AND RECEIVERS AS WELL AS THE BUS | | 01943C00 |
| 1939 | ADDRESS AND DATA REGISTERS. THE TEST SENDS BAD MODULE | | 01944C00 |
| 1940 | ADDRESS PARITY IN ORDER TO CYCLE THE BUS WITHOUT A | | 01945C00 |
| 1941 | RESPONSE FROM MEMORY. THERE ARE FOUR PORTIONS OF THIS | | 01946C00 |
| 1942 | TEST DEFINED AS FOLLOWS: | | 01947C00 |
| 1943 | | | 01948C00 |
| 1944 | 1. CYCLE THE BUS WITH ALL ZEROS PATTERN USING THE | | 01949C00 |
| 1945 | HARDWARE DATA TRANSFER REGISTERS. | | 01950C00 |

| ALTER# | | SEQUENCE: SSUPCS | | LINE # | ADDRESS (HEX) | IMAGE (HEX) |
|---|---|---|---|---|---|---|
| | | -continued | | | | |
| 1946 | | 2. CYCLE THE BUS WITH ALL ONES PATTERN USING THE | | 01951C00 | | |
| 1947 | | HARDWARE DATA TRANSFER REGISTERS. | | 01952000 | | |
| 1948 | | 3. CYCLE THE BUS WITH ALL ZEROS PATTERN USING THE | | 01953C00 | | |
| 1949 | | SECOND HALF READ REGISTERS. | | 01954000 | | |
| 1950 | | 4. CYCLE THE BUS WITH ALL ONES PATTERN USING THE | | 01955C00 | | |
| 1951 | | SECOND HALF READ REGISTERS. | \ | 01956C00 | | |
| 1952 | | | | 01957C00 | | |
| 1953 | SBLT-NEXT12 | \CLEAR ACU | \ | 01958C00 | 118 | 0010 |
| 1954 | | CRF | ; | 01959C00 | | |
| 1955 | | | | 0196CC00 | | |
| 1956 | $ | \CLEAR SPA | \ | 01961CC0 | 11C | 8800 |
| 1957 | | LCN ASPA CNST (00#) | ; | 01962000 | | |
| 1958 | | | | 01963000 | | |
| 1959 | $ | \SET MODULE BAD PARITY | \ | 01964C00 | 11D | A024 |
| 1960 | | MBP | ; | 01965000 | | |
| 1961 | | | | 01966C00 | | |
| 1962 | $ | \SET RETURN FROM BUS LOAD | \ | 01967C00 | 11E | E12C |
| 1963 | | LRA (SBLTBUSWR1) | ; | 01968C00 | | |
| 1964 | | | | 01969C00 | | |
| 1965 | SBLTBUSLD1 | \RESET BUS | \ | 0197CC00 | 11F | 4064 |
| 1966 | | RST | ; | 01971C00 | | |
| 1967 | | | | 01972CC0 | | |
| 1968 | $ | \LOAD MSB DATA | \ | 01973C00 | 120 | 6468 |
| 1969 | | XFB ABUS2 SRIA | ; | 01974C00 | | |
| 1970 | | | | 01975C00 | | |
| 1971 | $ | \LOAD LSB DATA | \ | 01976C00 | 121 | 666B |
| 1972 | | XFB ABUS3 SRIA | ; | 01977CC0 | | |
| 1973 | | | | 01978CC0 | | |
| 1974 | SKIP HOF | | ; | 01979C00 | | |

CONTINUED  1975

| ALTER# | | SEQUENCE: SSUPCS | | LINE # | ADDRESS (HEX) | IMAGE (HEX) |
|---|---|---|---|---|---|---|
| 1975 | SBLTBUSLD1A | \LOAD ADDRESS LOW | \ | 0198C000 | 122 | 6C6B |
| 1976 | | XFB ABUS4 SRIA | ; | 01981000 | | |
| 1977 | | | | 01982CC0 | | |
| 1978 | $ | \LOAD ADDRESS MID | \ | 01983C00 | 123 | 6C6B |
| 1979 | | XFB ABUS4 SRIA | ; | 01984C00 | | |
| 1980 | | | | 01985000 | | |
| 1981 | $ | \LOAD ADDRESS HI | \ | 01986C00 | 124 | 6C6B |
| 1982 | | XFB ABUS4 SRIA | ; | 01987C00 | | |
| 1983 | | | | 01988C00 | | |
| 1984 | $ | \CYCLE CONSTANT TO ACU | \ | 01989C00 | 125 | 8300 |
| 1985 | | LCN CNST (C0#) | ; | 0199CC00 | | |
| 1986 | | | | 01991CC0 | | |
| 1987 | $ | \SET BUS CYCLE | \ | 01992CC0 | 126 | 4020 |
| 1988 | | CYC | ; | 01993C00 | | |
| 1989 | | | | 01994000 | | |
| 1990 | SBLTBUSLD2 | \SKIP IF MYDCNN SET | \ | 01995C00 | 127 | C0AE |
| 1991 | | TFO TDCN | ; | 01996000 | | |
| 1992 | | | | 01997C00 | | |
| 1993 | $ | GTO (SBLTBUSLD2) | ; | 01998C00 | 128 | F127 |
| 1994 | | | | 01999C00 | | |
| 1995 | $ | \SET FIRMWARE BUS ACK | \ | 0200CC00 | 129 | 0002 |
| 1996 | | SBA | ; | 02001C00 | | |
| 1997 | | | | 02002C00 | | |
| 1998 | $ | \MSB OF DATA REG TO ACU | \ | 02003C00 | 12A | 643F |
| 1999 | | XFA ABUS2 | ; | 02004C00 | | |
| 2000 | | | | 02005CC0 | | |
| 2001 | $ | RTN | ; | 02006C00 | 12B | C200 |
| 2002 | | | | 02007C00 | | |
| 2003 | SKIP HOF | | ; | 02009C00 | | |

CONTINUED  2004

| ALTER# | | SEQUENCE: ISUPCS | | LINE # | ADDRESS (HEX) | IMAGE (HEX) |
|---|---|---|---|---|---|---|
| 2004 | SBLTBUSWR1 | \OR LSB OF DATA WITH ACU | \ | 02009C00 | 12C | 6D3B |
| 2005 | | ORR ABUS3 | ; | 02010C00 | | |
| 2006 | | | | 02011C00 | | |
| 2007 | $ | \OR LOW ADDRESS WITH ACU | \ | 02012C00 | 12D | 6D3B |
| 2008 | | ORR ABUS1 | ; | 02013C00 | | |
| 2009 | | | | 02014CC0 | | |
| 2010 | $ | \OR MID ADDRESS WITH ACU | \ | 02015C00 | 12E | 6D3B |
| 2011 | | ORR ABUS1 | ; | 02016C00 | | |
| 2012 | | | | 02017C00 | | |
| 2013 | $ | \OR HI ADDRESS WITH ACU | \ | 02018C00 | 12F | 6D3B |
| 2014 | | ORR ABUS1 | ; | 02019C00 | | |
| 2015 | | | | 02020C00 | | |
| 2016 | $ | \CHECK ACU FOR ALL ZEROS | \ | 02021C00 | 130 | 662A |
| 2017 | | XFB BACU | ; | 02022C00 | | |
| 2018 | | | | 02023C00 | | |
| 2019 | $ | \SKIP IF ACU EQUAL TO ZERO | \ | 02024C00 | 131 | C0B6 |
| 2020 | | TFO TEQZ | ; | 02025C00 | | |
| 2021 | | | | 02026C00 | | |
| 2022 | $ | \HALT- BUS WRAPAROUND FAILURE | \ | 02027C00 | 132 | 0040 |
| 2023 | | HLT | ; | 02028C00 | | |
| 2024 | | | | 02029C00 | | |
| 2025 | $ | \HEX FF TO ACU | \ | 02030C00 | 133 | 83E8 |
| 2026 | | LCN CNST (FF#) | ; | 02031C00 | | |
| 2027 | | | | 02032C00 | | |
| 2028 | $ | \SET RETURN FROM BUS LOAD | \ | 02033C00 | 134 | E136 |
| 2029 | | LRA (SBLTBUSWR2) | ; | 02034C00 | | |
| 2030 | | | | 02035CC0 | | |
| 2031 | $ | GTO (SBLTBUSLD1) | ; | 02036CC0 | 135 | F11F |
| 2032 | | | | 02037C00 | | |
| 2033 | SKIP HOF | | ; | 02038C00 | | |

CONTINUED  2034

```
ALTER#                SEQUENCE: $SUPCS                          LINE # ADDRESS IMAGE
                                                                       (HEX)  (HEX)

2034   S$LTBUSWR2   \AND LSB OF DATA WITH ACU           \       02039C00  136  682F
2035                AND ABUS3                           ;       0204CC00
2036                                                            02041D00
2037        $       \AND LOW ADDRESS WITH ACU           \       02042300  137  602F
2038                AND ABUS1                           ;       02043C00
2039                                                            02044C00
2040        $       \AND MID ADDRESS WITH ACU           \       02045000  138  602F
2041                AND ABUS1                           ;       02046000
2042                                                            02047000
2043        $       \AND HI ADDRESS WITH ACU            \       0204EC00  139  602F
2044                AND ABUS1                           ;       02048000
2045                                                            02050000
2046        $       \CHECK ACU FOR ALL ONES             \       02051000  13A  602A
2047                XFB BACU                            ;       02052C00
2048                                                            02053C00
2049        $       \SKIP IF ACU EQUAL TO ONES          \       020540C0  13B  C088
2050                TFO TEQF                            ;       02055000
2051                                                            02056000
2052        $       \HALT- BUS WRAPAROUND FAILURE       \       02057C00  13C  0040
2053                HLT                                 ;       02058000
2054                                                            02059000
2055        $       \CLEAR ACU                          \       02060000  13D  600E
2056                ZER                                 ;       02061000
2057                                                            02062C00
2058        $       \RESET BUS                          \       02063C00  13E  4084
2059                RST                                 ;       02064C00
2060                                                            02065000
2061        $       \ONES TO MSB OF DATA                \       02066CC0  13F  6457
2062                BNT ABUS2 SR1A                      ;       02067000
2063                                                            02068000
2064        $       \ONES TO LSB OF DATA                \       02069000  140  6857
2065                BNT ABUS3 SR1A                      ;       0207CC00
2066                                                            02071C00
2067        $       \SET RETURN                         \       02072C00  141  E143
2068                LRA ($BLTBUSWR2A)                   ;       02073000
2069                                                            02074C00
2070        $       GTO ($BLTBUSL01A)                   ;       02075C00  142  F122
2071                                                            02076C00
2072   $BLTBUSWR2A  \SET RETURN FROM BUS LOAD           \       02077C00  143  E153
2073                LRA ($BLTBUSWR3)                    ;       02078C00
2074                                                            02079C00
2075        $       \CLEAR ACU                          \       0208CC00  144  600E
2076                ZER                                 ;       02081000
2077                                                            02082000
2078   SKIP HOF                                         ;       02083C00
```

CONTINUED                                                                  2079

```
ALTER#                SEQUENCE: $SUPCS                          LINE # ADDRESS IMAGE
                                                                       (HEX)  (HEX)

2079   $BLTBUSLO5   \ LOAD H.W. ADDRESS REG LOW         \       02084C00  145  6C08
2080                XFB ABUS4 SR1A                      ;       02085C00
2081                                                            02086C00
2082        $       \ LOAD H.W. ADDRESS REG MID         \       02087C00  146  6C08
2083                XFB ABUS4 SR1A                      ;       02088C00
2084                                                            02089C00
2085        $       \ LOAD H.W. ADDRESS HI              \       0208CC00  147  6C08
2086                XFB ABUS4 SR1A                      ;       02091C00
2087                                                            02092C00
2088        $       \LOAD MSB OF DATA REG               \       02093C00  148  6468
2089                XF2 ABUS2 SR1A                      ;       02094C00
2090                                                            02095C00
2091        $       \LOAD LSB OF DATA REG               \       02096000  149  686B
2092                XF8 ABUS3 SR1A                      ;       02097C00
2093                                                            02098C00
2094        $       \LOAD MSB OF SHR REG                \       02099C00  14A  6057
2095                BNT ABUS1 SR1A                      ;       02100C00
2096                                                            02101C00
2097        $       \LOAD LSB OF SHR REG                \       02102C00  14B  6057
2098                BNT ABUS1 SR1A                      ;       02103C00
2099                                                            02104C00
2100        $       \CYCLE CONSTANT TO ACU              \       02105C00  14C  8340
2101                LCN CNST (00#)                      ;       02106C00
2102                                                            02107C00
2103        $       \SET BUS CYCLE                      \       02108000  14D  4020
2104                CYC                                 ;       02109C00
2105                                                            0211CC00
2106   $BLTBUSL04   \SKIP IF MYDCNN SET                 \       02111C00  14E  C0AE
2107                TFO TDCN                            ;       02112C00
2108                                                            02113C00
2109        $       GTO ($BLTBUSL04)                    ;       02114C00  14F  F14E
2110                                                            02115C00
2111        $       \SET FIRMWARE BUS ACK               \       02116C00  150  0002
2112                SBA                                 ;       02117C00
2113                                                            02118C00
2114        $       \MSB OF DATA REG TO ACU             \       02119C00  151  643F
2115                XFA ABUS2                           ;       02120C00
2116                                                            02121C00
2117        $       RTN                                 ;       02122C00  152  C200
2118                                                            02123C00
2119   SKIP HOF                                         ;       02124C00
```

CONTINUED                                                                  2120

```
28641 02  MODEL: MPDC-REV1                    RTL/6000 FILE EDIT                    07/29/76  16:06'27"  PAGE  54
FILE:                                         MICROPROGRAM SECTION                  REV: 000.00    ALTER #  2120

ALTER#                           SEQUENCE: SSUPCS                              LINE #  ADDRESS  IMAGE
                                                                                       (HEX)    (HEX)

2120    SBLTBUSWR3    \AND LSB OF DATA WITH ACU              \       02125C00   153   662F
2121                  AND ABUS3                              ;       02126C00
2122                                                                 02127C00
2123     $            \AND LOW ADDRESS WITH ACU              \       02128C00   154   602F
2124                  AND ABUS1                              ;       02129C00
2125                                                                 0213CC00
2126     $            \AND MID ADDRESS WITH ACU              \       02131C00   155   602F
2127                  AND ABUS1                              ;       02132C00
2128                                                                 02133C00
2129     $            \AND HI ADDRESS WITH ACU               \       02134C00   156   601B
2130                  XOR ABUS1                              ;       02135000
2131                                                                 02136C00
2132     $            \CHECK ACU FOR ALL ONES                \       02137000   157   602A
2133                  XFB BACU                               ;       02138C00
2134                                                                 02139000
2135     $            \SKIP IF ACU EQUAL TO ONES             \       0214CC00   158   C088
2136                  TFO TEQF                               ;       02141000
2137                                                                 02142C00
2138     $            \HALT- BUS SWR WRAPAROUND FAILURE      \       02143C00   159   0040
2139                  HLT                                    ;       02144000
2140                                                                 02145000
2141     $            \HEX FF TO ACU                         \       02146C00   15A   83E8
2142                  LCN CNST (FF#)                         ;       02147000
2143                                                                 02148C00
2144     $            \RESET BUS                             \       02149C00   15B   4084
2145                  RST                                    ;       0215CC00
2146                                                                 02151C00
2147     $            \SET RETURN FROM BUS LOAD              \       02152C00   15C   E15E
2148                  LRA (SBLTBUSWR4)                       ;       02153000
2149                                                                 02154C00
2150     $            GTO (SBLTBUSL03)                       ;       02155000   15D   F145
2151                                                                 02156C00
2152    SKIP NOF                                             ;       02157C00

** CONTINUED **                                           2153

28641 02  MODEL: MPDC-REV1                    RTL/6000 FILE EDIT                    07/29/76  16:06'27"  PAGE  55
FILE:                                         MICROPROGRAM SECTION                  REV: 000.00    ALTER #  2153

ALTER#                           SEQUENCE: SSUPCS                              LINE #  ADDRESS  IMAGE
                                                                                       (HEX)    (HEX)

2153    SBLTBUSWR4    \AND LSB OF DATA WITH ACU              \       02158C00   15E   663B
2154                  ORR ABUS3                              ;       02159C00
2155                                                                 0216CC00
2156     $            \OR LOW ADDRESS WITH ACU               \       02161C00   15F   603B
2157                  ORR ABUS1                              ;       02162000
2158                                                                 02163C00
2159     $            \OR MID ADDRESS WITH ACU               \       02164C00   160   603B
2160                  ORR ABUS1                              ;       02165C00
2161                                                                 02166000
2162     $            \OR HI ADDRESS WITH ACU                \       02167C00   161   6027
2163                  XNF ABUS1                              ;       02168C00
2164                                                                 02169C00
2165     $            \CHECK ACU FOR ALL ZEROS               \       0217CC00   162   602A
2166                  XFB BACU                               ;       02171000
2167                                                                 02172C00
2168     $            \SKIP IF ACU EQUAL TO ZERO             \       02173C00   163   C086
2169                  TFO TEQZ                               ;       02174C00
2170                                                                 02175C00
2171     $            \HALT- BUS SWR WRAPAROUND FAILURE      \       02176C00   164   0040
2172                  HLT                                    ;       02177C00
2173                                                                 02178C00
2174    SKIP NOF                                             ;       02179C00

** CONTINUED **                                           2175

28641 02  MODEL: MPDC-REV1                    RTL/6000 FILE EDIT                    07/29/76  16:06'27"  PAGE  56
FILE:                                         MICROPROGRAM SECTION                  REV: 000.00    ALTER #  2175

ALTER#                           SEQUENCE: SSUPCS                              LINE #  ADDRESS  IMAGE
                                                                                       (HEX)    (HEX)

2175    \THE FOLLOWING ROUTINE IS USED TO WRAP THE MOTHER BOARD      0218CC00
2176    \FIFO THRU THE ADAPTER TO CHECK THE READ AND WRITE CYCLE     02181C00
2177    \LOGIC.                                                \     02182CC0
2178                                                                 02183000
2179    SBLT-NEXT15   \CLEAR ACU                              \      02184000   165   0010
2180                  CRF                                     ;      02185C00
2181                                                                 02186C00
2182     $            \CLEAR SPA                              \      02187C00   166   8800
2183                  LCN ASPA CNST (00#)                     ;      02188C00
2184                                                                 02189000
2185     $            \CLEAR MOTHER BOARD FIFO                \      0219CC00   167   0088
2186                  RDA                                     ;      02191000
2187                                                                 02192C00
2188     $            \CLEAR ADAPTER FIFO                     \      02193000   168   744F
2189                  ZER AADS SRIA                           ;      02194C00
2190                                                                 02195C00
2191     $            \SET MODULE BAD PARITY                  \      02196C00   169   A024
2192                  MBP                                     ;      02197000
2193                                                                 02198C00
2194     $            \SET S.P. TEST MODE                     \      02199C00   16A   A080
2195                  SPT                                     ;      0220CC00
2196                                                                 02201C00
2197     $            \HEX FF TO SPA                          \      02202C00   16B   88E8
2198                  LCN ASPA CNST (FF#)                     ;      02203000
2199                                                                 02204000
2200     $            \CLEAR OFFSET RANGE LOWER               \      02205C00   16C   6C6B
2201                  XFB ABUS4 SRIA                          ;      02206C00
2202                                                                 02207000
2203     $            \CLEAR OFFSET RANGE HI                  \      02208000   16D   6C6B
2204                  XFB ABUS4 SRIA                          ;      02209000
2205                                                                 0221CC00
2206     $            \CLEAR RANGE LOW                        \      02211C00   16E   6C6B
2207                  XFB ABUS4 SRIA                          .      02212000
2208                                                                 02213C00
2209     $            \CLEAR RANGE HI                         \      02214C00   16F   6C6B
2210                  XFB ABUS4 SRIA                          ;      02215000
2211                                                                 02216000
```

```
2 8641     CDPL: MPI...V?                    KIL/5D1U FILE EDIT                    07/29/76  16:06*27"  PAGE  56
FILE:                                        MICROPROGRAM SECTION                   REV: 0C0.00    ALTER #  2175

ALTER#                          SEQUENCE: $$LPCS                    LINE #  ADDRESS  IMAGE
                                          -continued                         (HEX)    (HEX)
2212    $           \CLEAR ADDRESS LOW                   \        U2217C0C   170  6C6B
2213                XFB ABUS4 SRIA                       ;        02218U0C
2214                                                              U22190GG
2215    $           \CLEAR ADDRESS MID                   \        U222CC0C   171  6C6B
2216                XFB ABUS4 SRIA                       ;        02221JG0
2217                                                              J2222C00
2218    $           \CLEAR ADDRESS HI                    \        U2223C0C   172  6C6B
2219                XFB ABUS4 SRIA                       ;        J2224C00
2220                                                              02225C0C
2221    ;           \SET RANGE TO NON ZERO               \        02226000   173  4040
2222                ORC                                  ;        02227C0C
2223                                                              U2228L00
2224    SKIP HOF                                         ;        02229C0G

** CONTINUED **                                           2225
```

In accordance with the invention a hardware/firmware diagnostic testing method and system is provided for testing logic interfaces between system units of a data processing system. The system under test need not be detached from the processing system, nor integrated with special diagnostic equipments. Rather, the diagnostic tests may be isolated from errors occurring in the logic interfaces associated with other system units without altering the system configuration.

Having described the invention in connection with certain specific embodiments thereof, it is to be understood that further modifications may now suggest themselves to those skilled in the art, and it is intended to cover such modifications as fall within the scope of the appended claims.

What is claimed is:

1. A method of testing bus interface logic electrically coupling a system unit having a firmware control system to a common communication bus in a data processing system having plural system units including a main memory unit, which comprises:
   a. generating within said system unit an incorrect parity code and loading said incorrect parity code into output address registers of said system unit;
   b. loading under firmware control predetermined data and a main memory address stored in said firmware control system respectively into output data registers and said output address registers of said system unit;
   c. under firmware control issuing a bus cycle request and unloading said output data registers and said output address registers on said common bus, thereby supplying said main memory address with said incorrect parity code to said common bus to avoid intervening communications from said main memory unit;
   d. generating from said system unit an acknowledgement of said main memory address with said incorrect parity code to initiate a loading of said predetermined data and said main memory address respectively into input data registers and input address registers of said system unit; and
   e. comparing in an arithmetic unit within said system unit and under firmware control said predetermined data and said main memory address with the contents of said input data registers and said input address registers to detect interface logic errors.

2. A test system wholly contained within a system unit for testing through normal information paths the operability of interface logic electrically coupling said system unit with a common communication bus in a data processing system having plural system units including a main memory unit, said system unit having both an input and an output data storage means and an input and an output address storage means, which comprises:
   a. firmware control means for loading predetermined data into said output data storage means and a main memory address into said output address storage means for transfer to said common bus;
   b. parity generating means responsive to said firmware control system for providing an incorrect parity code to said output address storage means, thereby accommodating the combination of said incorrect parity code with said main memory address to avoid intervening communications from said main memory unit;
   c. logic gating means in electrical communication with said firmware control means for generating to said common bus an acknowledgement of a non-occurring response by said main memory unit to said main memory address, thereby accommodating the loading of said predetermined data and said main memory address under firmware control from said common bus respectively to said input data storage means and said input address storage means; and
   d. logic compare means responsive to said firmware control means for sensing an equivalence between said input and said output data storage means, and between said input and said output address storage means.

3. The combination set forth in claim 2, wherein said parity generating means includes:
   a. a flip-flop responsive to said firmware control means; and
   b. a parity generator in electrical communication with said flip-flop for providing said incorrect parity code.

4. The combination set forth in claim 2, wherein said logic gating means includes:
   a. a NAND gate responsive to said firmware control means; and
   b. a NOR gate in electrical communication with said NAND gate for supplying an acknowledgement signal to said common bus.

5. A method of controlling the flow of binary coded information through normal information paths between a system unit having a firmware control system and a command communication bus in a data processing system having plural system units including a main memory unit electrically coupled to said common bus, and verifying the operability of interface logic electrically coupling said system unit with said common bus which comprises:
   a. generating within said system unit a false recognition code and loading said false code under firmware control into output address registers of said system unit;
   b. loading under firmware control predetermined data and a main memory address from said firmware control system respectively into output data registers and said output address registers of said system unit;

c. generating from said system unit an acknowledgement of said main memory address with said false code to gate said output data registers and said output address registers respectively into input data registers and input address registers of said system unit; and d. comparing in an arithmetic unit within said system unit and under firmware control said predetermined data and said main memory address respectively with the contents of said input data registers and said input address registers to detect interface logic errors.

* * * * *